(12) United States Patent
Katsuyama

(10) Patent No.: US 11,375,082 B2
(45) Date of Patent: *Jun. 28, 2022

(54) PRINTING SYSTEM, METHOD OF GENERATING HALFTONE PROCESSING RULE, METHOD OF ACQUIRING CHARACTERISTIC PARAMETER, IMAGE PROCESSING DEVICE, IMAGE PROCESSING METHOD, HALFTONE PROCESSING RULE, HALFTONE IMAGE, METHOD OF MANUFACTURING PRINTED MATERIAL, INKJET PRINTING SYSTEM, AND PROGRAM

(71) Applicant: FUJIFILM Corporation, Toyko (JP)

(72) Inventor: Kimito Katsuyama, Tokyo (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/162,406

(22) Filed: Jan. 29, 2021

(65) Prior Publication Data

US 2021/0160399 A1    May 27, 2021

Related U.S. Application Data

(60) Division of application No. 16/775,601, filed on Jan. 29, 2020, now Pat. No. 10,944,886, which is a
(Continued)

(30) Foreign Application Priority Data

Mar. 27, 2014  (JP) ................................ 2014-066008
Sep. 30, 2014  (JP) ................................ 2014-200066
(Continued)

(51) Int. Cl.
H04N 1/405 (2006.01)
H04N 1/00 (2006.01)
(Continued)

(52) U.S. Cl.
CPC .......... H04N 1/4052 (2013.01); B41J 2/2054 (2013.01); B41J 2/2139 (2013.01);
(Continued)

(58) Field of Classification Search
None
See application file for complete search history.

(56) References Cited

U.S. PATENT DOCUMENTS 6,665,425 B1   12/2003  Sampath et al.
7,036,900 B2    5/2006  Vanhooydonck
(Continued)

FOREIGN PATENT DOCUMENTS

JP   2001-358941 A   12/2001
JP   2002-331653 A   11/2002
(Continued)

OTHER PUBLICATIONS

United States Notice of Allowance dated Nov. 2, 2020, in U.S. Appl. No. 16/775,601.
(Continued)

*Primary Examiner* — Scott A Rogers
(74) *Attorney, Agent, or Firm* — McGinn I.P. Law Group, PLLC.

(57) ABSTRACT

There are provided a printing system, a method of generating a halftone processing rule, a method of acquiring a characteristic parameter, image processing device and method, a halftone processing rule, a halftone image, a method of manufacturing a printed material, an ink jet printing system, and a program which are capable of reducing an operation load of a user and acquiring a halftone
(Continued)

processing rule appropriate for the printing system. A characteristic parameter acquisition chart including a pattern for acquiring characteristic parameters related to characteristics of the printing system is output, and the output characteristic parameter acquisition chart is read by image reading means. The characteristic parameters are acquired by analyzing the read image of the characteristic parameter acquisition chart, and halftone processing rules that define the processing contents of halftone processes used in the printing system are generated based on the acquired characteristic parameters.

12 Claims, 78 Drawing Sheets

Related U.S. Application Data division of application No. 15/969,894, filed on May 3, 2018, now Pat. No. 10,594,896, which is a continuation of application No. 15/276,383, filed on Sep. 26, 2016, now Pat. No. 9,967,428, which is a continuation of application No. PCT/JP2015/059348, filed on Mar. 26, 2015.

(30) Foreign Application Priority Data

| Sep. 30, 2014 | (JP) | 2014-200068 |
|---|---|---|
| Feb. 26, 2015 | (JP) | 2015-036460 |
| Feb. 26, 2015 | (JP) | 2015-036461 |
| Feb. 26, 2015 | (JP) | 2015-036462 |
| Feb. 26, 2015 | (JP) | 2015-036463 |
| Feb. 26, 2015 | (JP) | 2015-036464 |
| Feb. 26, 2015 | (JP) | 2015-036465 |

(51) Int. Cl.

| H04N 1/407 | (2006.01) |
|---|---|
| G06K 15/02 | (2006.01) |
| G06K 15/10 | (2006.01) |
| H04N 1/034 | (2006.01) |
| B41J 2/205 | (2006.01) |
| B41J 2/21 | (2006.01) |
| H04N 1/60 | (2006.01) |
| H04N 1/52 | (2006.01) |

(52) U.S. Cl.
CPC ......... *G06K 15/027* (2013.01); *G06K 15/102* (2013.01); *G06K 15/1881* (2013.01); *H04N 1/00039* (2013.01); *H04N 1/00045* (2013.01); *H04N 1/00087* (2013.01); *H04N 1/034* (2013.01); *H04N 1/4051* (2013.01); *H04N 1/4078* (2013.01); *H04N 1/52* (2013.01); *H04N 1/6027* (2013.01); *H04N 1/6038* (2013.01); *H04N 1/6041* (2013.01); *H04N 1/6097* (2013.01)

(56) References Cited

U.S. PATENT DOCUMENTS

| 7,052,100 | B2 | 5/2006 | Otsuki |
|---|---|---|---|
| 7,434,907 | B2 | 10/2008 | Otsuki |
| 7,484,824 | B2 | 2/2009 | Chiwata |
| 7,520,583 | B2 | 4/2009 | Arazaki |
| 7,524,009 | B2 | 4/2009 | Chiwata |
| 7,652,789 | B2 | 1/2010 | Berns et al. |
| 7,706,604 | B2 | 4/2010 | Berns et al. |
| 7,773,774 | B2 | 8/2010 | Rasmussen et al. |
| 7,804,512 | B2 | 9/2010 | Funayama |
| 8,031,363 | B2 | 10/2011 | Marsden et al. |
| 8,111,425 | B2 | 2/2012 | Inoue |
| 8,150,106 | B2 | 4/2012 | Wu et al. |
| 8,157,345 | B2 | 4/2012 | Sasayama |
| 8,164,791 | B2 | 4/2012 | Sasayama |
| 8,194,262 | B2 | 6/2012 | Anderson et al. |
| 8,223,385 | B2 | 7/2012 | Minhas |
| 8,292,401 | B2 | 10/2012 | Sasayama |
| 8,454,109 | B2 | 6/2013 | Shibata |
| 8,482,822 | B2 | 7/2013 | Sasayama |
| 8,544,978 | B2 | 10/2013 | Araki |
| 8,571,269 | B2 | 10/2013 | Wu et al. |
| 8,625,166 | B2 | 1/2014 | Yabe |
| 8,638,467 | B2 | 1/2014 | Morimoto |
| 8,760,712 | B2 | 6/2014 | Enge et al. |
| 8,792,136 | B2 | 7/2014 | Wakui |
| 8,867,973 | B2 | 10/2014 | Masui |
| 9,004,637 | B2 | 4/2015 | Hattori et al. |
| 9,213,894 | B2 | 12/2015 | Yamagishi |
| 9,350,903 | B2 | 5/2016 | Goto et al. |
| 9,860,423 | B2 * | 1/2018 | Katsuyama ......... H04N 1/4051 |
| 2004/0223017 | A1 | 11/2004 | Otsuki |
| 2005/0017999 | A1 | 1/2005 | Yoshida |
| 2005/0105110 | A1 | 5/2005 | Katsuyama |
| 2006/0072160 | A1 | 4/2006 | Yamazaki |
| 2006/0181554 | A1 | 8/2006 | Otsuki |
| 2007/0229870 | A1 | 10/2007 | Doi et al. |
| 2011/0234673 | A1 | 9/2011 | Ueshima |
| 2012/0050377 | A1 | 3/2012 | Ueshima |
| 2012/0257526 | A1 | 10/2012 | Wakui |
| 2013/0038907 | A1 | 2/2013 | Yanai |
| 2015/0043836 | A1 | 2/2015 | Shibata |
| 2016/0248933 | A1 * | 8/2016 | Yamada ............ H04N 1/4053 |

FOREIGN PATENT DOCUMENTS

| JP | 2004-080109 A | 3/2004 |
|---|---|---|
| JP | 2004-122629 A | 4/2004 |
| JP | 2005-323101 A | 11/2005 |
| JP | 2006-103005 A | 4/2006 |
| JP | 2006-129322 A | 5/2006 |
| JP | 2006-305735 A | 11/2006 |
| JP | 2007-216644 A | 8/2007 |
| JP | 2007-223151 A | 9/2007 |
| JP | 2007-266841 A | 10/2007 |
| JP | 2007-276162 A | 10/2007 |
| JP | 2008-027122 A | 2/2008 |
| JP | 2009-018476 A | 1/2009 |
| JP | 2009-018479 A | 1/2009 |
| JP | 2009-166501 A | 7/2009 |
| JP | 2010-141395 A | 6/2010 |
| JP | 2011-201121 A | 10/2011 |
| JP | 2012-071474 A | 4/2012 |
| JP | 2012-222433 A | 11/2012 |
| JP | 2013-038643 A | 2/2013 |
| JP | 2013-157912 A | 8/2013 |
| JP | 2013-224000 A | 10/2013 |

OTHER PUBLICATIONS

United States Office Action dated Aug. 20, 2020, in U.S. Appl. No. 16/775,601.
Communication Pursuant to Article 94(3) EPC dated May 20, 2020, in corresponding Europen Patent Application No. 19155766.9.
United States Notice of Allowance dated Oct. 23, 2019, in U.S. Appl. No. 15/969,994.
United States Office Action dated Jul. 9, 2019, in U.S. Appl. No. 15/969,994.
United States Office Action dated Apr. 16, 2019, in U.S. Appl. No. 15/969,994.
United States Notice of Allowance dated Jan. 2, 2018 in U.S. Appl. No. 15/276,383.
United States Office Action dated Aug. 23, 2017 in U.S. Appl. No. 15/276,383.
United States Office Action dated Jan. 10, 2017 in U.S. Appl. No. 15/276,383.

(56) References Cited

OTHER PUBLICATIONS

Japanese Office Action dated Oct. 4, 2016 in Application No. 2015-036460 with an English translation thereof.
Japanese Office Action dated Oct. 4, 2016 in Application No. 2015-036461 with an English translation thereof.
Extended European Search Report dated Apr. 24, 2017, In European Application No. 15768242.8.
Japanese Office Action dated Oct. 11, 2016 with an English translation thereof.
International Search Report (ISR) (PCT Form PCT/ISA/210), in PCT/JP2015/059348, dated Jun. 30, 2015.
"Digital Halftoning Techniques for Printing," Thrasyvoulos N. Pappas, IS&T's 47$^{th}$ Annual Conference, Rochester, NY, May 15-20, 1994, pp. 1-5.
"Model-Based Digital Halftoning" Thrasyvoulos N. Pappas, Jan P. Allebach, and David L. Nuehoff, IEEE Signal Processing Magazine Jul. 2003, pp. 14-27.
Japanese Office Action dated May 18, 2017 in Japanese Application No. 2015-036460 with a US Global Dossier English translation thereof.
Japanese Office Action dated May 22, 2017 in Japanese Application No. 2015-036465, with a US Global Dossier English translation thereof.
European Patent Office Communication pursuant to Article 94(c) EPC dated Feb. 7, 2018, in corresponding Patent Application No. 15768242.8.
Inkjet Printer Model-Based Halftoning_, Je-Ho Lee, Member, IEEE, and Jan P. Allebach, Fellow, IEEE, IEEE Transactions on Image Processing, col. 14, No. 5, May 2005, pp. 674-689.
Written Opinion of the ISA/JPO (PCT/ISA/237) in PCT/JP2015/059348, dated Jun. 30, 2015 and English translation thereof.

\* cited by examiner

FIG. 7
| INTER-DOT DISTANCE (SET VALUE) | CHANGE IN INTER-DOT DISTANCE DUE TO LANDING INTERFERENCE |
|---|---|
| 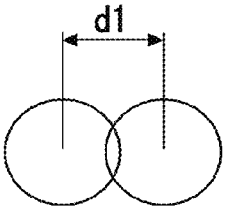 d1 | 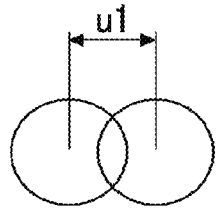 u1 |
| 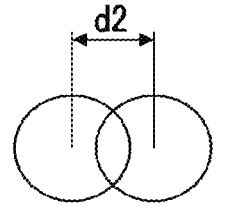 d2 | 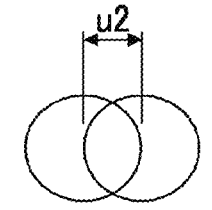 u2 |
| 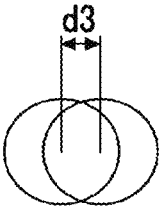 d3 | 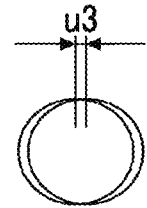 u3 |

| HT ALGORITHM | IMAGE QUALITY | SYSTEM COST | HALFTONE GENERATING TIME | HALFTONE PROCESSING TIME |
|---|---|---|---|---|
| DITHER METHOD | LOW | LOW | SHORT | SHORT |
| ERROR DIFFUSION METHOD | MEDIUM | MEDIUM | MEDIUM | MEDIUM |
| Direct Binary Search METHOD | HIGH | HIGH | LONG | LONG |

| 1 | 2 |
|---|---|
| 3 | 4 |
| 5 | 6 |
| 7 | 8 |

FIG. 13

PAPER TRANSPORT DIRECTION

PAPER TRANSPORT DIRECTION

SYSTEM ERROR

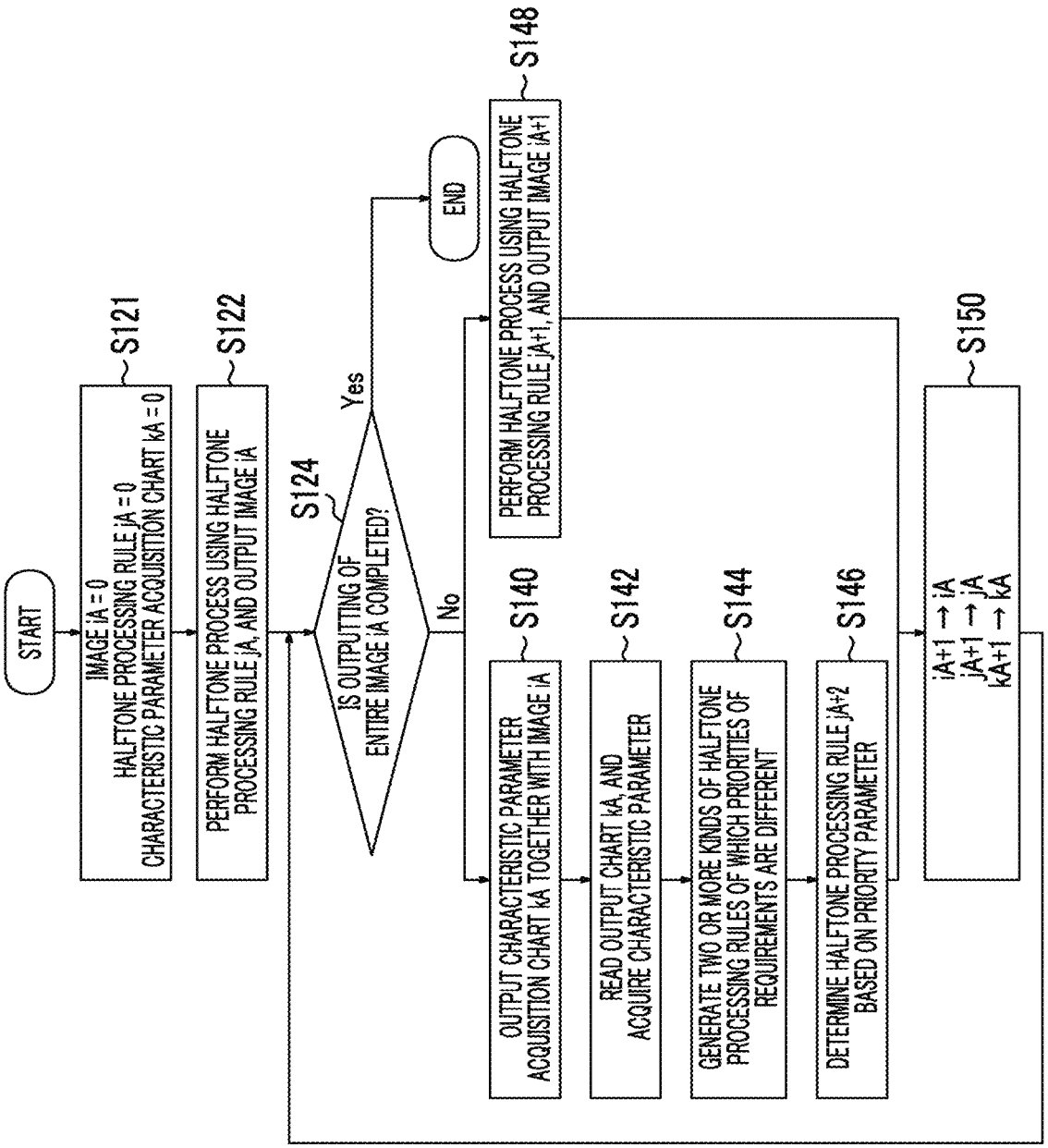

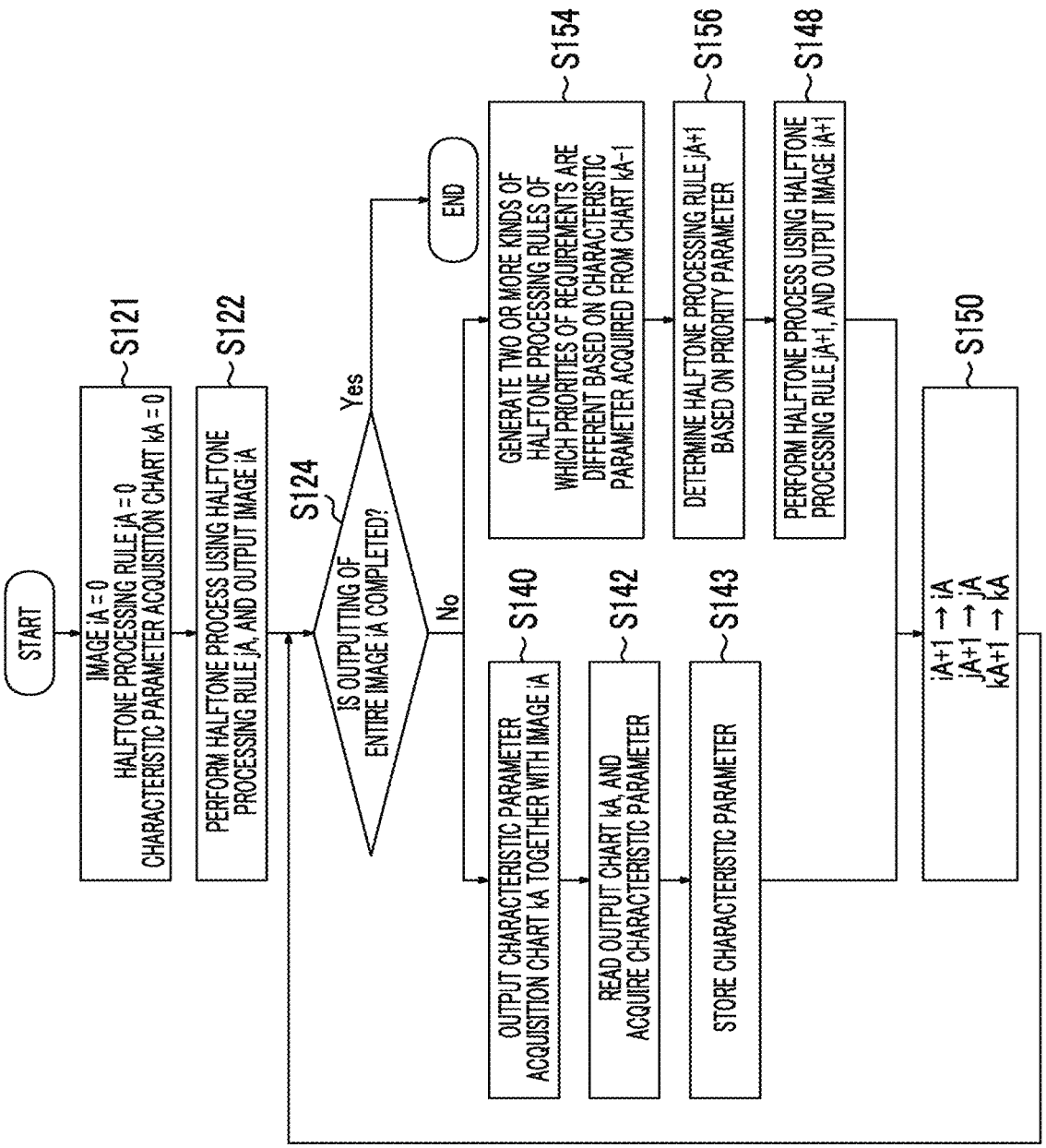

FIG. 49

| PRINTING MODE | KIND OF INK | RESOLUTION | DROPLET KIND | NUMBER OF PATHS | SCANNING SPEED | FREQUENCY | UNI/BI | NOZZLE | TRANSPORT AMOUNT |
|---|---|---|---|---|---|---|---|---|---|
| A | K | LOW | INTERMEDIATE/LARGE/EXTRA-LARGE | 1 | 1 | 1 | BI | ALL | 50 |
| B | C M Y K | LOW | INTERMEDIATE/LARGE/EXTRA-LARGE | 1 | 1 | 1 | BI | ALL | 50 |
| C |  | INTERMEDIATE | SMALL/INTERMEDIATE/LARGE | 2 | 1 | 1 | BI | ALL | 25 |
| D |  | HIGH | EXTRA-SMALL/SMALL/INTERMEDIATE | 2 | 2 | 4 | BI | ALL | 25 |
| E | C,Lc M,Lm Y K | INTERMEDIATE | SMALL/INTERMEDIATE/LARGE | 2 | 1 | 1 | BI | ALL | 25 |
| F |  | HIGH | EXTRA-SMALL/SMALL/INTERMEDIATE | 2 | 2 | 4 | BI | ALL | 25 |
| G |  | SUPER-HIGH | EXTRA-SMALL | 4 | 4 | 8 | UNI | SOME | 11 |

| 1 | 2 | 1 | 2 | 1 | 2 | 1 |
|---|---|---|---|---|---|---|
| 3 | 4 | 3 | 4 | 3 | 4 | 3 |
| 5 | 6 | 5 | 6 | 5 | 6 | 5 |
| 7 | 8 | 7 | 8 | 7 | 8 | 7 |
| 1 | 2 | 1 | 2 | 1 | 2 | 1 |
| 3 | 4 | 3 | 4 | 3 | 4 | 3 |
| 5 | 6 | 5 | 6 | 5 | 6 | 5 |
| 7 | 8 | 7 | 8 | 7 | 8 | 7 |
| 1 | 2 | 1 | 2 | 1 | 2 | 1 |

|  |  | SURROUNDING DOT | | | |
|---|---|---|---|---|---|
|  |  | BLACK, SMALL | BLACK, MEDIUM | MAGENTA, SMALL | MAGENTA, MEDIUM |
| GIVEN DOT | BLACK, SMALL | $f_{bs\_bs}()$ | $f_{bs\_bm}()$ | $f_{bs\_ms}()$ | $f_{bs\_mm}()$ |
|  | BLACK, MEDIUM | $f_{bm\_bs}()$ | $f_{bm\_bm}()$ | $f_{bm\_ms}()$ | $f_{bm\_mm}()$ |
|  | MAGENTA, SMALL | $f_{ms\_bs}()$ | $f_{ms\_bm}()$ | $f_{ms\_ms}()$ | $f_{ms\_mm}()$ |
|  | MAGENTA, MEDIUM | $f_{mm\_bs}()$ | $f_{mm\_bm}()$ | $f_{mm\_ms}()$ | $f_{mm\_mm}()$ |

PRINTING SYSTEM, METHOD OF GENERATING HALFTONE PROCESSING RULE, METHOD OF ACQUIRING CHARACTERISTIC PARAMETER, IMAGE PROCESSING DEVICE, IMAGE PROCESSING METHOD, HALFTONE PROCESSING RULE, HALFTONE IMAGE, METHOD OF MANUFACTURING PRINTED MATERIAL, INKJET PRINTING SYSTEM, AND PROGRAM

CROSS-REFERENCE TO RELATED APPLICATIONS

The present application is a Divisional Application of U.S. patent application Ser. No. 16/775,601, filed on Jan. 29, 2020, which is a Divisional Application of U.S. patent application Ser. No. 15/969,894, filed on May 3, 2018, now U.S. Pat. No. 10,594,896, issued on Mar. 17, 2020, which is a Continuation of U.S. patent application Ser. No. 15/276,383, filed on Sep. 26, 2016, now U.S. Pat. No. 9,967,428, issued on May 8, 2018, which is a "bypass" Continuation of PCT International Application No. PCT/JP2015/059348 filed on Mar. 26, 2015 claiming priority to Japanese Patent Application No. 2014-066008 filed on Mar. 27, 2014, Japanese Patent Application No. 2014-200066 filed on Sep. 30, 2014, Japanese Patent Application No. 2014-200068 filed on Sep. 30, 2014, Japanese Patent Application No. 2015-036460 filed on Feb. 26, 2015, Japanese Patent Application No. 2015-036461 filed on Feb. 26, 2015, Japanese Patent Application No. 2015-036462 filed on Feb. 26, 2015, Japanese Patent Application No. 2015-036463 filed on Feb. 26, 2015, Japanese Patent Application No. 2015-036464 filed on Feb. 26, 2015 and Japanese Patent Application No. 2015-036465 filed on Feb. 26, 2015. Each of the above applications is hereby expressly incorporated by reference, in their entirety, into the present application.

BACKGROUND OF THE INVENTION

1. Field of the Invention

The present invention relates to a printing system, a method of generating a halftone processing rule, a method of acquiring a characteristic parameter, image processing device and method, a halftone processing rule, a halftone image, a printed material manufacturing method, an inkjet printing system, and a program, and more particularly, to an image processing technology of generating a print halftone image from a continuous-tone image.

2. Description of the Related Art

In a printing system in which a printing device such as an ink jet printing device or an offset printing device forms an image, a halftone process is performed on data of a continuous-tone image expressed by multiple gradations, and thus, data of a halftone image corresponding to an image output mode of the printing device is generated. The data of the halftone image is used as printing dot image data indicating a dot pattern in which dot arrangement of halftone dots reproduced by the printing device or a size of each dot is defined. The printing device forms an image based on the data of the halftone image.

As the method of the halftone process, there are various methods such as a dither method, an error diffusion method, and a direct binary search (DBS) method. For example, in the dither method, multi-value data of the continuous-tone image is converted into binary dot data by comparing a threshold value and a pixel value of a processing target pixel using a threshold value matrix called a dither mask, assigning dot-ON pixels in a case where the pixel value is equal to or greater than the threshold value and assigning dot-OFF pixels in a case where the pixel value is less than the threshold value.

JP2012-222433A describes a printing system capable of selecting a halftone process appropriate for a printed material in consideration of productivity of the printed material. The printing system described in JP2012-222433A may select one signal processing condition from signal processing conditions of a plurality of halftone processes having different dot distribution characteristics, and may perform the halftone process using the selected signal processing condition.

In the printing system described in JP2012-222433A, four printing mode may be prepared, and an operator may select the printing mode. If the printing mode is selected, since a recommended halftone processing condition is presented, the operator can select an optimum halftone processing condition.

"Digital Halftoning Techniques for Printing" (Thrasvoulos N. Papas IS&T's 47Th Annual Conference, Rochester, N.Y., May 15-20, 1994), "Model-Based Digital Halftoning" (Thrasvoulos N. Papas, Jan P. Allebach, and David L. Neuhoff, IEEE SIGNAL PROCESSING MAGAZINE JULY 2003, p 14-27), and "Inkjet Printer Model-Based Halftoning" (Je-Ho Lee and Jan P. Allebach, IEEE TRANSACTIONS ON IMAGE PROCESSING, VOL. 14. NO. 5 MAY 2005, P 674-689) describe a technology called model-based halftoning. "Digital Halftoning Techniques for Printing" (Thrasvoulos N. Papas IS&T's 47Th Annual Conference, Rochester, N.Y., May 15-20, 1994), describes a method of performing halftone design capable of improving dispersibility of a dot having an intermediate gradation based on an image in which the overlapping of dots is reproduced in consideration of the spreading of a dot and the size of a dot at the time of printing from the characteristics of the printing system. The term of "halftone design" means that the specific content of the halftone process is designed, that is, the halftone processing rule is generated.

"Model-Based Digital Halftoning" (Thrasvoulos N. Papas, Jan P. Allebach, and David L. Neuhoff, IEEE SIGNAL PROCESSING MAGAZINE JULY 2003, p 14-27), and "Inkjet Printer Model-Based Halftoning" (Je-Ho Lee and Jan P. Allebach, IEEE TRANSACTIONS ON IMAGE PROCESSING, VOL. 14. NO. 5 MAY 2005, P 674-689) describe a method of performing halftone design based on an image in which bidirectional error characteristics as position shift characteristics which is a position shift of a dot in an outward path and an inward path through a reciprocating operation in serial scanning are reproduced in addition to taking account of the overlapping of the dots.

JP2013-038643A describes a method of performing halftone design having tolerance to a paper transport error or bidirectional error in a serial scanning type. JP2009-018479A describes a method of performing halftone design having tolerance to a position shift of a printing head in a line printer including a line head configured such that a plurality of printing head is arranged.

JP2013-038643A describes a multipath and JP2009-018479A describes a single path, and these literatures describe that the halftone design capable of improving the dispersibility of a dot on a per path basis is performed. These literatures may be classified as a "path dispersion halftoning" technology.

SUMMARY OF THE INVENTION

A printing result based on the halftone image generated through the halftone process depends on the characteristics of the printing system. Accordingly, it is preferable that the halftone processing rule appropriate for the printing system is generated based on the characteristic parameters related to the characteristics of the printing system.

For example, in an ink jet printing system, as the characteristic parameters related to the characteristics of the printing system, there are resolution, the number of nozzles, ink kind, an average dot density, an average dot diameter, an average dot shape, a dot density, a dot diameter, a dot shape, a dot forming position shift, non-jetting and landing interference of each printing element. Among the above-described various characteristic parameters, since the parameter of the dot density, the dot diameter, the dot shape or the landing interference of each printing element are changed depending on a combination of an ink or a printing medium to be used and the characteristics of a recording head and the dot forming position shift or the non-jetting is changed by the state of the recording head, if the user inputs an appropriate value for the various parameters, an operation load is excessive. The characteristics of the recording head include a frequency or a waveform of a driving signal applied to the recording head when an ink is jetted. For example, the state of the recording head indicates the inclining or bending of the recording head, a distance from the printing medium, or a state of each printing element.

The invention has been made in view of such circumstances, and it is an object of the invention to provide a printing system, a method of generating a halftone processing rule, an image processing device and a program which are capable of setting characteristic parameters related to characteristics of the printing system without giving an excessive load to a user and capable of acquiring a halftone processing rule appropriate for the printing system.

In the printing system described in JP2012-222433A, the user can comprehend the halftone processing condition in which a total evaluation value is maximized for each printing mode, but the halftone processing condition in which the total evaluation value is maximized is not necessarily a condition in which the characteristics of the printing system in each printing mode are appropriately reflected.

That is, in the printing system capable of selecting the printing mode, it is preferable that the halftone process is performed using the halftone processing rule appropriate for each printing mode. In order to generate the halftone processing rule appropriate for each printing mode, it is preferable that the characteristics of the printing system for each printing mode are appropriately comprehended. The term of the halftone processing condition corresponds to the term of a candidate processing condition described in Cited Literature 1.

The invention has been made in view of such circumstances, and it is another object of the invention to provide a printing system, a method of acquiring a characteristic parameter, an image processing device and a program which are capable of appropriately comprehending characteristics of the printing system for each printing mode.

[Other Problems]

The model-based halftoning technology described in "Model-Based Digital Halftoning" (Thrasvoulos N. Papas, Jan P. Allebach, and David L. Neuhoff, IEEE SIGNAL PROCESSING MAGAZINE JULY 2003, p 14-27) and "Inkjet Printer Model-Based Halftoning" (Je-Ho Lee and Jan P. Allebach, IEEE TRANSACTIONS ON IMAGE PROCESSING, VOL. 14. NO. 5 MAY 2005, P 674-689) realizes the halftone process capable of achieving favorable image quality even in a state in which there is the bidirectional error by reproducing the bidirectional error characteristics and generating the optimum halftone processing rule in the serial scan type.

The path dispersion halftoning technology described in JP2013-038643A and JP2009-018479A generates the halftone processing rule having tolerance to the position shift error of the recording head, the bidirectional error or the paper transport error.

The system error taken into consideration in JP2013-038643A and JP2009-018479A is the position shift error of the recording head, the bidirectional error or the paper transport error, but a system error other than these errors is added at the time of actual printing in some cases. For example, as an item of the system error which is not taken into consideration in JP2013-038643A and JP2009-018479A, there is a head vibration error according to carriage movement, an error for each nozzle, non-jetting, or an error for each droplet kind. The term of "printing head" corresponds to the term of "recording head".

The path dispersion halftoning technology described in JP2013-038643A is a method of improving the dispersibility of each dot arrangement of each scanning path, and the weighting of an evaluation value of the dispersibility of the entire image is in charge of the user.

In the method described in JP2013-038643A, there is a problem that an actual system error is not sufficiently reflected and thus, it is difficult to necessarily perform the optimum halftone process in the actual system. For example, the halftone design using the related method is performed in an excess restriction condition in a system in which the bidirectional error is completely none or a system in which the bidirectional error is extremely less, and image quality is deteriorated in some cases.

In the path dispersion halftoning technology described in JP2009-018479A, the halftone design having tolerance to only an attachment position error of a connection portion between the respective printing heads is performed in the single path type.

However, as described above, since various system errors are added in addition to the position error between the printing head at the time of actual printing, in a case where the system is in a state in which there is the system error other than the position error between the printing heads, favorable image quality is not acquired.

The invention has been made in view of such circumstances, and it is another object of the invention to provide image processing device and method, a printing system, a method of generating a halftone processing rule, a halftone processing rule, a halftone image, a method of manufacturing a printed matter, and a program which are capable of realizing an appropriate halftone process capable of acquiring favorable image quality in consideration of a system error influencing actual printing.

In the ink jet printing device, when dots of ink droplets are jetted adjacent to each other on a recording medium, landing interference occurs between the adjacent dots overlapping each other on the printing medium in some cases. The landing interference indicates a phenomenon in which ink droplets adjacent to each other on the recording medium are drawn to each other by the influence of surface energy of a liquid, and thus, the ink droplets are moved on the recording medium. Since the dots are formed in positions shifted from the original landing positions due to the landing interference, the granularity of the image is deteriorated or gloss is not uniform, and thus, the image quality is deteriorated.

The invention has been made in view of such circumstances, and it is another object of the invention to provide image processing device and method, an ink jet printing system, and a program which are capable of suppressing image quality deterioration caused by landing interference and are capable of realizing the generation of the halftone image capable of forming an image having high image quality.

In order to achieve the aforementioned objects, the following invention aspects are provided.

A printing system according to a first aspect is a printing system comprising: characteristic-parameter-acquisition-chart output means for outputting a characteristic parameter acquisition chart including a pattern for acquiring characteristic parameters related to characteristics of a printing system; image reading means for reading the characteristic parameter acquisition chart output by the characteristic-parameter-acquisition-chart output means; characteristic parameter acquisition means for acquiring the characteristic parameters by analyzing a read image of the characteristic parameter acquisition chart acquired by the image reading means; and halftone process generation means for generating halftone processing rules that define the processing contents of halftone processes used in the printing system based on the characteristic parameter acquired by the characteristic parameter acquisition means.

According to the first aspect, the characteristic parameter acquisition chart is output by the printing system, and the output characteristic parameter acquisition chart is read by the image reading means. The information of the characteristic parameter is acquired from the read image of the characteristic parameter acquisition chart, and the halftone processing rule appropriate for the printing system is generated based on the acquired characteristic parameter.

According to the first aspect, it is possible to simply set the characteristic parameter of the printing system without giving an excessive load to a user, and it is possible to generate the halftone processing rule appropriate for the characteristics of the printing system.

As a second aspect, in the printing system according to the first aspect, the halftone processing rule may be specified by a combination of a halftone algorithm and a halftone parameter.

As a third aspect, in the printing system according to the second aspect, any one method of a dither method, an error diffusion method, and a direct binary search method may be adopted as the halftone algorithm.

As a fourth aspect, in the printing system according to the second aspect or the third aspect, the halftone parameter may include at least one parameter of a size and a threshold value of a dither mask in the dither method, a size of an error diffusion matrix, a diffusion coefficient and setting of an applied gradation section of the error diffusion matrix in the error diffusion method, the number of times pixels are updated and an exchange pixel range in the direct binary search method, or a parameter for evaluating system error tolerance.

As a fifth aspect, in the printing system according to any one of the first aspect to the fourth aspect, the printing system may include an image forming unit that includes a plurality of printing elements serving to form dots on a printing medium, and the characteristics of the printing system may be characteristics that include at least one of individual recording characteristics of the plurality of printing elements or common characteristics to the plurality of printing elements.

As a sixth aspect, in the printing system according to the fifth aspect, the recording characteristics may be characteristics that include at least one of a dot density, a dot diameter, a dot shape, a dot recording position error, or recording inexecutable abnormality.

As a seventh aspect, in the printing system according to the fifth aspect or the sixth aspect, the common characteristics may be characteristics that include at least one of an average dot density, an average dot diameter, an average dot shape, or landing interference.

As an eighth aspect, in the printing system according to any one of the fifth aspect to the seventh aspect, the characteristic parameter acquisition means may acquire parameters related to the individual recording characteristics of the printing element and the common characteristics to the plurality of printing elements from the read image of the characteristic parameter acquisition chart on which recording is performed multiple times by using the same printing element by the characteristic-parameter-acquisition-chart output means.

As a ninth aspect, in the printing system according to any one of the fifth aspect to the eighth aspect, the characteristic parameter acquisition means may acquire parameters related to errors of the printing system from the read image of the characteristic parameter acquisition chart on which recording is performed multiple times by using the same printing element by the characteristic-parameter-acquisition-chart output means.

As a tenth aspect, in the printing system according to any one of the fifth aspect to the ninth aspect, the characteristic parameter acquisition chart may include a continuous dot pattern in which two or more dots are recorded so as to be in contact, and the characteristic parameter acquisition means may acquire a parameter related to the landing interference from the continuous dot pattern.

As an eleventh aspect, in the printing system according to the tenth aspect, the characteristic parameter acquisition chart may include multiple kinds of continuous dot patterns in which at least any one of an inter-dot distance between the two or more dots or a recording time difference between the two or more dots is differentiated.

As a twelfth aspect, in the printing system according to any one of the fifth aspect to the eleventh aspect, the characteristic parameter acquisition chart may include a discrete dot pattern in which dots are discretely recorded in an isolation state in which a single dot is isolated from another dot, and the characteristic parameter acquisition means may generate dispersion information related to dispersion of dots from the discrete dot pattern.

As a thirteenth aspect, in the printing system according to any one of the first aspect to the twelfth aspect, the halftone process generation means may generate two or more kinds of halftone processing rules of which balances of priority for a plurality of requirements required in the halftone process are different based on the characteristic parameters.

As a fourteenth aspect, in the printing system according to the thirteenth aspect, the plurality of requirements may include at least two items of image quality, cost, a halftone generating time, a halftone processing time, tolerance to a system error, or tolerance to environment change.

As a fifteenth aspect, the printing system according to the thirteenth aspect to the fourteenth aspect may further comprise: halftone registration means for registering the two or more kinds of halftone processing rules generated by the halftone process generation means, as candidates of the halftone process capable of being used in the printing system.

As a sixteenth aspect, the printing system according to any one of the thirteenth aspect to the fifteenth aspect may further comprise: halftone-selection-chart output means for outputting a halftone selection chart including quality comparison and evaluation image regions of the halftone processes by using the two or more kinds of halftone processing rules generated by the halftone process generation means.

As a seventeenth aspect, the printing system according to any one of the thirteenth aspect to the sixteenth aspect may further comprise: evaluation value calculation means for calculating an evaluation value for quantitatively evaluating at least one item of image quality, cost, a halftone generating time or a halftone processing time of the halftone process defined by the halftone processing rule.

As an eighteenth aspect, the printing system according to the seventeenth aspect may further comprise: information presentation means for presenting information of the evaluation value to a user.

As a nineteenth aspect, the printing system according to any one of the thirteenth aspect to the eighteenth aspect may further comprise: halftone selection operating means for performing an operation of allowing a user to select the kind of the halftone process used in printing from the kinds of the halftone processes defined by the two or more kinds of halftone processing rules generated by the halftone process generation means.

As a twentieth aspect, the printing system according to any one of the thirteenth aspect to the nineteenth aspect may further comprise: halftone automatic selection means for automatically selecting the kind of the halftone process used in the printing of the printing system from the kinds of the halftone processes defined by the two or more kinds of halftone processing rules generated by the halftone process generation means based on priority parameters related to priorities for the plurality of requirements.

As a twenty-first aspect, the printing system according to the twentieth aspect may further comprise: a priority input unit for allowing a user to input information related to the priorities for the plurality of requirements.

As a twenty-second aspect, in the printing system according to the twentieth aspect or the twenty-first aspect, the halftone automatic selection means may include determination-evaluation-value calculation means for calculating a determination evaluation value for evaluating adequateness of the halftone process defined by the halftone processing rule generated by the halftone process generation means based on the priority parameter, and the halftone automatic selection means automatically selects the kind of the halftone process used in the printing of the printing system based on the determination evaluation value calculated by the determination-evaluation-value calculation means.

As a twenty-third aspect, in the printing system according to any one of the twentieth aspect to the twenty-second aspect, the halftone automatic selection means may include simulation image generation means for generating a simulation image in a case where a halftone image acquired by applying the halftone process defined by the halftone processing rule generated by the halftone process generation means is printed, and image-quality-evaluation-value calculation means for calculating an image quality evaluation value from the simulation image.

As a twenty-fourth aspect, the printing system according to any one of the twentieth aspect to the twenty-third aspect may further comprise: priority parameter retention means for retaining the priority parameter.

As a twenty-fifth aspect, the printing system according to any one of the first aspect to the twenty-fourth aspect may further comprise: setting means for setting parameters related to system errors assumed in a case where printing is performed by the printing system; means for generating a simulation image in which the system error indicated by the parameter is reflected; and image quality evaluation means for evaluating image quality of a simulation image in which the system error is reflected. The parameter may include the characteristic parameters, and the halftone process generation means generates the halftone processing rule based on a simulation image in which the evaluation falls in a target range.

The "means for generating the simulation image" may serve as the same processing means as the "simulation image generation means" of the twenty-third aspect, or may be provided as individual processing means.

The "simulation image in which the system error is reflected" refers to a simulation image generated in a condition in which the system error is added in setting of simulation condition when the simulation image is generated.

The "target range" is a predetermined range defined as an image quality target. The target range may be defined as an image quality target capable of satisfying required image quality target. The target range may be defined as a condition for securing that image quality is favorable with an allowable level. The target range may include a case where an evaluation value as an index for evaluating the image quality is most favorable.

According to the twenty-fifth aspect, it is possible to generate the halftone processing rule appropriate for the printing system in consideration of the system error on the assumption of actual printing performed by the printing system. Accordingly, it is possible to realize an appropriate halftone process capable of achieving favorable image quality, and it is possible to acquire a print image having favorable image quality.

As a twenty-sixth aspect, in the printing system according to the twenty-fifth aspect, the system error may include characteristic errors expected to exhibit reproducibility as the characteristics of the printing system, and random system errors as irregularly changed errors.

The "expected to exhibit reproducibility" includes a case where the error has reproducibility and the error is reasonably expected to exhibit reproducibility with a high probability from a statistical probability distribution. For example, an average value or a center value of a distribution of the measurement values of the system error may be used as the "characteristic error".

The "irregularly changed" includes a case where the error is changed temporally or depending on a place. The irregularly changed error is an error having reproducibility lower than the characteristic error, and may be comprehended as a component of "dispersion" for the characteristic error form a statistical probability distribution. It is understood that the random system error is a change component added to the characteristic error. As the random system error as the change component added to the characteristic error, there may be both a positive value and a negative value.

As a twenty-seventh aspect, in the printing system according to the twenty-sixth aspect, a plurality of levels may be determined for values of the random system errors, and simulation images for the respective levels in which the random system errors corresponding to the plurality of levels are reflected may be generated by the means for generating the simulation image.

As a twenty-eighth aspect, in the printing system according to the twenty-seventh aspect, the plurality of levels may be determined according to a system error distribution of the printing system.

As a twenty-ninth aspect, in the printing system according to the twenty-eighth aspect, the image quality evaluation means may perform image quality evaluation on the simulation images for the respective levels and may calculate an image quality evaluation value acquired by integrating the image quality evaluation of the simulation images for the respective levels.

As a thirtieth aspect, in the printing system according to any one of the twenty-seventh aspect to the twenty-ninth aspect, the image quality evaluation means may include calculation means for calculating the summation of the evaluation values of the simulation images for the respective levels or a weighted sum acquired by multiplying a weighting factor to the evaluation values of the simulation images for the respective levels, and the weighting factor may be determined according to the system error distribution of the printing system.

As a thirty-first aspect, in the printing system according to any one of the twenty-fifth aspect to the thirtieth aspect may further comprise: a storage unit that accumulates data of the parameter acquired in the past. The halftone processing rule may be generated based on the accumulated data.

As a thirty-second aspect, in the printing system according to the thirty-first aspect, information of the system error distribution of the printing system may be updated based on the accumulated data.

As a thirty-third aspect, the printing system according to the thirty-first aspect or the thirty-second aspect may further comprise: characteristic parameter update determination means for determining whether or not to update the characteristic parameter; and specified value acquisition means for acquiring a specified value used to determine whether or not to update the characteristic parameter by the characteristic parameter update determination means. The characteristic parameter update determination means may update the characteristic parameter in a case where a difference between a new characteristic parameter acquired by the characteristic parameter acquisition means and an existing characteristic parameter which is stored in the storage unit and is acquired in the past exceeds to the specified value acquired by the specified value acquisition means.

As a thirty-fourth aspect, in the printing system according to the thirty-third aspect, the characteristic parameter update determination means may determine whether or not to update the characteristic parameter indicating the characteristic error expected to exhibit reproducibility as the characteristics of the printing system.

As a thirty-fifth aspect, in the printing system according to the thirty-third aspect or the thirty-fourth aspect, the characteristic parameter update determination means may determine whether or not to update, as the characteristic parameter, at least any one of an average dot density of the plurality of printing elements, an average dot diameter of the plurality of printing elements, an average dot shape of the plurality of printing elements, landing interference in the plurality of printing elements, a dot density for each printing element, a dot diameter for each printing element, a dot shape for each printing element, a dot recording position error for each printing element, recording inexecutable abnormality for each printing element, a dot position shift for each droplet kind, a bidirectional printing position shift, a bidirectional printing position shift for each droplet kind, a head vibration error, a transport error of the printing medium, or a head module vibration error in a head formed using a plurality of head modules.

As a thirty-sixth aspect, in the printing system according to any one of the thirty-third aspect to the thirty-fifth aspect, the specified value acquisition means may acquire a specified value determined based on accumulated characteristic parameters.

As a thirty-seventh aspect, in the printing system according to any one of the thirty-third aspect to the thirty-fifth aspect, the specified value acquisition means may acquire a specified value determined based on an irregularly changed error as the characteristics of the printing system.

As a thirty-eighth aspect, in the printing system according to any one of the first aspect to the thirty-seventh aspect, the characteristic-parameter-acquisition-chart output means may output a characteristic parameter acquisition chart together with a continuously output image, and the characteristic parameter acquisition means may acquire the characteristic parameters by analyzing the read image of the characteristic parameter acquisition chart which is already output together with the image.

As a thirty-ninth aspect, the printing system according to any one of the first aspect to the thirty-eighth aspect may further comprise: halftone processing means for performing the halftone process by using the halftone processing rule generated by the halftone process generation means. The characteristic-parameter-acquisition-chart output means may output the characteristic parameter acquisition chart together with each of a plurality of images, the halftone process generation means may generate the halftone processing rule based on the read image of the characteristic parameter acquisition chart output by the characteristic-parameter-acquisition chart output means, and the halftone processing means may perform the halftone process on the plurality of images using the halftone processing rule generated by the halftone processing means.

As a fortieth aspect, in the printing system according to the thirty-eighth aspect, the characteristic-parameter-acquisition-chart output means may output the characteristic parameter acquisition chart together with an image output two or more images earlier than the image on which the halftone process is performed, the characteristic parameter acquisition means may acquire the characteristic parameter by using the characteristic parameter acquisition chart together with the image output two or more images earlier than the image on which the halftone process is performed, and the halftone process generation means may generate the halftone processing rule by using the characteristic parameter acquisition chart together with the image output two or more images earlier than the image on which the halftone process is performed.

As a forty-first aspect, in the printing system according to the fortieth aspect, any one or more processes of a process of causing the characteristic-parameter-acquisition-chart output means to output the characteristic parameter acquisition chart, a process of causing using the characteristic parameter acquisition means to acquire the characteristic parameter, and a process of causing the halftone process generation means to generate the halftone processing rule may be performed in parallel with the halftone process performed by the halftone processing means for performing the halftone process by using the halftone processing rule generated by the halftone process generation means.

As a forty-second aspect, the printing system according to any one of the first aspect to the forty-first aspect may further comprise: quality request acquisition means for acquiring a quality request for a print image. The characteristic-parameter-acquisition-chart output means may change at least any one of the content of the characteristic parameter acquisition chart or an output condition of the characteristic parameter acquisition chart in response to the quality request for the print image acquired by the quality request acquisition means.

As a forty-third aspect, the printing system according to any one of the first aspect to the forty-first aspect may further comprise: quality request acquisition means for acquiring a quality request for a print image. The image reading means may change a reading condition of the characteristic parameter acquisition chart in response to the quality request for the print image acquired by quality request acquisition means.

As a forty-fourth aspect, the printing system according to any one of the first aspect to the forty-first aspect may further comprise: quality request acquisition means for acquiring a quality request for a print image. The characteristic parameter acquisition means may change a method of acquiring the characteristic parameter in response to the quality request for the print image acquired by the quality request acquisition means.

As a forty-fifth aspect, the printing system according to any one of the first aspect to the forty-first aspect may further comprise: quality request acquisition means for acquiring a quality request for a print image. The halftone process generation means may change the content of the halftone processing rule in response to the quality request for the print image acquired by the quality request acquisition means.

As a forty-sixth aspect, the printing system according to any one of the first aspect to the forty-fifth aspect may further comprise: dot-reproduction-accuracy-investigation-dedicated-chart output means for outputting a dedicated chart to investigate dot reproduction accuracy; and dot-reproduction-accuracy analysis means for analyzing the dedicated chart to investigate the dot reproduction accuracy output by the dot-reproduction-accuracy-investigation-dedicated-chart output means. The characteristic-parameter-acquisition-chart output means may change at least any one of the content of the characteristic parameter acquisition chart or an output condition of the characteristic parameter acquisition chart depending on the analyzing result of the dot-reproduction-accuracy analysis means.

As a forty-seventh aspect, the printing system according to any one of the first aspect to the forty-fifth aspect may further comprise: dot-reproduction-accuracy-investigation-dedicated-chart output means for outputting a dedicated chart to investigate dot reproduction accuracy; and dot-reproduction-accuracy analysis means for analyzing the dedicated chart to investigate the dot reproduction accuracy output by the dot-reproduction-accuracy-chart output means. The image reading means may change a reading condition of the characteristic parameter acquisition chart depending on the analyzing result of the dot-reproduction-accuracy analysis means.

As a forty-eighth aspect, the printing system according to any one of the first aspect to the forty-fifth aspect may further comprise: dot-reproduction-accuracy-investigation-dedicated-chart output means for outputting a dedicated chart to investigate dot reproduction accuracy; and dot-reproduction-accuracy analysis means for analyzing the dedicated chart to investigate the dot reproduction accuracy output by the dot-reproduction-accuracy-investigation-dedicated-chart output means. The characteristic parameter acquisition means may change a method of acquiring the characteristic parameter depending on the analyzing result of the dot-reproduction-accuracy analysis means.

As a forty-ninth aspect, the printing system according to any one of the first aspect to the forty-fifth aspect may further comprise: dot-reproduction-accuracy-investigation-dedicated-chart output means for outputting a dedicated chart to investigate dot reproduction accuracy; and dot-reproduction-accuracy analysis means for analyzing the dedicated chart to investigate the dot reproduction accuracy output by the dot-reproduction-accuracy-investigation-dedicated-chart output means. The halftone process generation means may change the content of the halftone processing rule depending on the analyzing result of the dot-reproduction-accuracy analysis means.

As a fiftieth aspect, the printing system according to any one of the first aspect to the forty-ninth aspect may further comprise: characteristic parameter storage means for storing characteristic parameters related to a system specification, among the characteristic parameters; and characteristic-parameter-acquisition-chart generation means for generating characteristic parameter acquisition charts. The characteristic-parameter-acquisition-chart generation means may generate the characteristic parameter acquisition chart based on the characteristic parameter related to the system specification acquired from the characteristic parameters related to the system specification stored in the characteristic parameter storage means, the characteristic-parameter-acquisition-chart output means may output the characteristic parameter acquisition chart generated by the characteristic-parameter-acquisition-chart generation means, the image reading means may read the characteristic parameter acquisition chart output by the characteristic-parameter-acquisition-chart output means, and the characteristic parameter acquisition means may acquire the characteristic parameters by analyzing the read image of the characteristic parameter acquisition chart acquired by the image reading means.

As a fifty-first aspect, the printing system according to any one of the first aspect to the forty-ninth aspect may further comprise: characteristic parameter storage mans for storing characteristic parameters related to a system specification, among the characteristic parameters; characteristic-parameter-acquisition-chart storage means for storing the characteristic parameter acquisition charts; and characteristic-parameter-acquisition-chart selection means for selecting the characteristic parameter acquisition chart from the characteristic parameter acquisition charts stored in the characteristic-parameter-acquisition-chart storage means. The characteristic-parameter-acquisition-chart selection means may select the characteristic parameter acquisition chart based on the characteristic parameter related to the system specification acquired from the characteristic parameters related to the system specification stored in the characteristic parameter storage means, the characteristic-parameter-acquisition-chart output means may output the characteristic parameter acquisition chart selected by the characteristic-parameter-acquisition-chart selection means, the image reading means may read the characteristic parameter acquisition chart output by the characteristic-parameter-acquisition-chart output means, and the characteristic parameter acquisition means may acquire the characteristic parameters by analyzing the read image of the characteristic parameter acquisition chart acquired by the image reading means.

As a method of generating a halftone processing rule according to a fifty-second aspect is a method of generating a halftone processing rule comprising: a characteristic-parameter-acquisition-chart output step of outputting a characteristic parameter acquisition chart including a pattern for acquiring characteristic parameters related to characteristics of a printing system; an image reading step of reading the characteristic parameter acquisition chart output in the characteristic-parameter-acquisition-chart output step; a characteristic parameter acquisition step of acquiring the characteristic parameters by analyzing a read image of the characteristic parameter acquisition chart acquired in the image reading step; and a halftone process generation step of generating halftone processing rule that define halftone processes used in the printing system based on the characteristic parameters acquired in the characteristic parameter acquisition step.

In the fifty-second aspect, it is possible to appropriately combine the same matters as the matters specified in the second aspect to the fifty-first aspect. In this case, a processing unit or a functional unit (means) as means serving as the process or function specified in the printing system may be comprehended as an element of a "step" of a corresponding process or operation.

An image processing device according to a fifty-third aspect is an image processing device comprising: characteristic-parameter-acquisition-chart generation means for generating chart data of a characteristic parameter acquisition chart including a pattern for acquiring characteristic parameters related to characteristics of a printing system; characteristic parameter acquisition means for acquiring the characteristic parameters by analyzing a read image of the characteristic parameter acquisition chart printed by the printing system based on the chart data; and halftone process generation means for generating halftone processing rules that define the processing contents of halftone processes used in the printing system based on the characteristic parameters acquired by the characteristic parameter acquisition means.

According to the fifty-third aspect, the characteristic parameter acquisition chart is output by the printing system based on the chart data of the characteristic parameter acquisition chart generated by the image processing device. The output characteristic parameter acquisition chart is read by the image reading means, and thus, the read image of the characteristic parameter acquisition chart is acquired. The image processing device acquires the information of the characteristic parameter by analyzing the read image of the characteristic parameter acquisition chart, and generates the halftone processing rule based on the acquired characteristic parameter.

According to the image processing device according to the fifty-third aspect, it is possible to simply set the characteristic parameter of the printing system without giving an excessive load to the user, and it is possible to generate the halftone processing rule appropriate for the characteristics of the printing system.

In the fifty-third aspect, it is possible to appropriately combine the same matters as the matters specified in the second aspect to the fifty-first aspect.

A program according to a fifty-fourth aspect is a program causing a computer to function as: characteristic-parameter-acquisition-chart generation means for generating chart data of a characteristic parameter acquisition chart including a pattern for acquiring characteristic parameters related to characteristics of a printing system; characteristic parameter acquisition means for acquiring the characteristic parameters by analyzing a read image of the characteristic parameter acquisition chart printed by the printing system based on the chart data; and a halftone process generation means for generating halftone processing rules that define the processing contents of halftone processes used in the printing system based on the characteristic parameters acquired by the characteristic parameter acquisition means.

It is possible to appropriately combine the same matters as the matters specified in the second aspect to the fifty-first aspect with the program according to the fifty-fourth aspect. In this case, a processing unit or a functional unit (means) as means serving as the process or function specified in the printing system may be comprehended as an element of a program for realizing means of a corresponding process or operation.

A printing system according to a fifty-fifth aspect is a printing system comprising: printing mode selection means for selecting a printing mode of a printing system; characteristic-parameter-acquisition-chart output means for outputting a characteristic parameter acquisition chart which includes a pattern for acquiring characteristic parameters related to characteristics of the printing system, the characteristic parameter acquisition chart being for use in the printing mode selected by the printing mode selection means; chart-output-condition setting means for setting a chart output condition when the characteristic parameter acquisition chart is output by the characteristic-parameter-acquisition-chart output means, the chart-output-condition setting means setting the chart output condition depending on the printing mode selected by the printing mode selection means; image reading means for reading the characteristic parameter acquisition chart output by the characteristic-parameter-acquisition-chart output means; and characteristic parameter acquisition means for acquiring the characteristic parameter by analyzing a read image of the characteristic parameter acquisition chart acquired by the image reading means.

According to the fifty-fifth aspect, since the output condition of the characteristic parameter acquisition chart including the pattern for acquiring the characteristic parameters is set depending on the set printing mode, it is possible to output the characteristic parameter acquisition chart on which the characteristics of the printing system for each printing mode are reflected, and it is possible to appropriately comprehend the characteristics of the printing system for each printing mode.

In the fifty-fifth aspect, since the optimized characteristic parameter acquisition chart can be output, in a case where the characteristic parameter acquisition chart is reduced, it is possible to reduce the processing time when the characteristic parameter acquisition chart is output, it is possible to reduce the amount of the printing medium on which the characteristic parameter acquisition chart is output, and it is possible to reduce the amount of ink.

As a fifty-sixth aspect, in the printing system according to the fifty-fifth aspect, the chart-output-condition setting means may set at least one of a chart item related to the content of the characteristic parameter acquisition chart or a scanning condition related to an operation of the characteristic-parameter-acquisition-chart output means when the chart output condition is set.

As a fifty-seventh aspect, the printing system according to the fifty-sixth aspect may further comprise: a recording head that includes a plurality of printing elements which jets a liquid. The chart-output-condition setting means may set, as the chart item, at least any one of the kind of the liquid used to output the characteristic parameter acquisition chart, the kind of a liquid droplet of the liquid used to output the characteristic parameter acquisition chart, or the printing element used to output the characteristic parameter acquisition chart, when the chart output condition is set.

As a fifty-eighth aspect, in the printing system according to the fifty-seventh aspect, the recording head may be a serial scan type recording head that jets the liquid while scanning in a main scanning direction, and the chart-output-condition setting means may set, as the scanning condition, at least any one of a scanning speed applied to the outputting of the characteristic parameter acquisition chart, the transport amount of the printing medium applied to the outputting of the characteristic parameter acquisition chart, a jetting frequency applied to the outputting of the characteristic parameter acquisition chart, or a scanning type applied to the outputting of the characteristic parameter acquisition chart, when the chart output condition is set.

As a fifty-ninth aspect, the printing system according to the fifty-sixth aspect may further comprise: a serial scan type recording head that includes a plurality of printing elements which jets a liquid droplet, the recording head jetting a liquid while scanning in a main scanning direction. The chart-output-condition setting means may set, as the scanning condition, at least any one of a scanning speed applied to the outputting of the characteristic parameter acquisition chart, the transport amount of a printing medium applied to the outputting of the characteristic parameter acquisition chart, a jetting frequency applied to the outputting of characteristic parameter acquisition chart, or a scanning type applied to the outputting of the characteristic parameter acquisition chart, when the chart output condition is set.

As a sixtieth aspect, in the printing system according to the fifty-eighth aspect or the fifty-ninth aspect, the chart-output-condition setting means may set, as the scanning type, at least one of unidirectional scanning, bidirectional scanning, or the number of scanning paths, when the chart output condition is set.

As a sixty-first aspect, the printing system according to any one of the fifty-fifth aspect to the sixtieth aspect may further comprise: halftone process generation means for generating halftone processing rules that define the processing contents of halftone processes used in the printing system based on the characteristic parameters acquired by the characteristic parameter acquisition means.

As a sixty-second aspect, the printing system according to any one of the fifty-fifth aspect to the sixty-first aspect may further comprise: error message display means for displaying an error message indicating that the occurrence of an error in the printing system, which is determined based on the characteristic parameters acquired by the characteristic parameter acquisition means.

A method of acquiring a characteristic parameter according to a sixty-third aspect is a method of acquiring a characteristic parameter. The method comprises: a printing mode selection step of selecting a printing mode of a printing system; a characteristic-parameter-acquisition-chart output step of outputting a characteristic parameter acquisition chart which includes a pattern for acquiring characteristic parameters related to characteristics of the printing system, the characteristic parameter acquisition chart being for use in the printing mode selected in the printing mode selection step; a chart-output-condition setting step of setting a chart output condition when the characteristic parameter acquisition chart is output in the characteristic-parameter-acquisition-chart output step, the chart-output-condition setting step setting the chart output condition depending on the printing mode selected in the printing mode selection step; an image reading step of reading the characteristic parameter acquisition chart output in the characteristic-parameter-acquisition-chart output step; and a characteristic parameter acquisition step of acquiring the characteristic parameters by analyzing a read image of the characteristic parameter acquisition chart acquired in the image reading step.

In the sixty-third aspect, it is possible to appropriately combine the same matters as the matters specified in the fifty-sixth aspect to the sixty-second aspect. In this case, a processing unit or a functional unit (means) as means serving as the process or function specified in the printing system may be comprehended as an element of a "step" of a corresponding process or operation.

An image processing device according to a sixty-fourth aspect is an image processing device comprising: printing mode selection means for selecting a printing mode of a printing system; characteristic-parameter-acquisition-chart output means for outputting a characteristic parameter acquisition chart which includes a pattern for acquiring characteristic parameters related to characteristics of the printing system, the characteristic parameter acquisition chart being for use in the printing mode selected by the printing mode selection means; chart-output-condition setting means for setting a chart output condition when the characteristic parameter acquisition chart is output by the characteristic-parameter-acquisition chart output means, the chart-output-condition setting means setting the chart output condition depending on the printing mode selected by the printing mode selection means; image reading means for reading the characteristic parameter acquisition chart output by the characteristic-parameter-acquisition-chart output means; and characteristic parameter acquisition means for acquiring the characteristic parameters by analyzing a read image of the characteristic parameter acquisition chart acquired by the image reading means.

In the sixty-fourth aspect, it is possible to appropriately combine the same matters as the matters specified in the fifty-sixth aspect to the sixty-second aspect.

A program according to a sixty-fifth aspect is a program causing a computer to function as: printing mode selection means for selecting a printing mode of a printing system; characteristic-parameter-acquisition-chart output means for outputting a characteristic parameter acquisition chart which includes a pattern for acquiring characteristic parameters related to characteristics of the printing system, the characteristic parameter acquisition chart being for use in the printing mode selected by the printing mode selection means; chart-output-condition setting means for setting a chart output condition when the characteristic parameter acquisition chart is output by the characteristic-parameter-acquisition chart output means, the chart-output-condition setting means setting the chart output condition depending on the printing mode selected by the printing mode selection means; image reading means for reading the characteristic parameter acquisition chart output by the characteristic-parameter-acquisition-chart output means; and characteristic parameter acquisition means for acquiring the characteristic parameters by analyzing a read image of the characteristic parameter acquisition chart acquired by the image reading means.

In the sixty-fifth aspect, it is possible to appropriately combine the same matters as the matters specified in the fifty-sixth aspect to the sixty-second aspect. In this case, it is possible to appropriately combine the same matters as the matters specified in the fifty-sixth aspect to the sixty-second aspect with the program according to the sixty-fifth aspect. In this case, a processing unit or a functional unit (means) as means serving as the process or function specified in the printing system may be comprehended as an element of a program for realizing means of a corresponding process or operation.

As an image processing device according to a sixty-sixth aspect is an image processing device comprising: setting means for setting parameters related to system errors assumed in a case where printing is performed by a printing system; simulation image generation means for generating a simulation image in which the system error indicated by the parameter is reflected; image quality evaluation means for evaluating image quality of the simulation image; and halftone process generation means for generating halftone processing rules that defines the processing contents of halftone processes used in the printing system based on the simulation image in which the evaluation falls in a target range.

The "simulation image in which the system error is reflected" refers to a simulation image generated in a condition in which the system error is added in setting of simulation condition when the simulation image is generated.

The "target range" is a predetermined range defined as an image quality target. The target range may be defined as an image quality target capable of satisfying required image quality target. The target range may be defined as a condition for securing that image quality is favorable with an allowable level. The target range may include a case where an evaluation value as an index for evaluating the image quality is most favorable.

According to the sixty-sixth aspect, it is possible to generate the halftone processing rule appropriate for the printing system in consideration of the system error on the assumption of actual printing performed by the printing system. Accordingly, it is possible to realize an appropriate halftone process capable of achieving favorable image quality, and it is possible to acquire a print image having favorable image quality.

As a sixty-seventh aspect, in the image processing device according to the sixty-sixth aspect, the image quality evaluation means may calculate an image quality evaluation value of the simulation image.

As a sixty-eighth aspect, the image processing device according to the sixty-sixth aspect to the sixty-seventh aspect may further comprise: parameter acquisition means for acquiring the parameter related to the system error.

As a sixty-ninth aspect, the image processing device according to the sixty-eighth aspect may further comprise: information input means, as the parameter acquisition means, for allowing the user to input the parameter.

As a seventieth aspect, in the image processing device according to the sixty-ninth aspect, the information input means may include average value input means for inputting an average value of the parameters in a plurality of printing elements provided in the printing system or an average equivalent value which is a value equivalent to the average value, or an average value of errors due to the vibration of a recording head provided in the printing system or an average equivalent value which is a value equivalent to the average value, and a deviation input means for inputting a deviation from the average value or the average equivalent value.

According to the seventieth aspect, it is possible to save an input load of the parameter without giving an excessive operation load in inputting of the parameter unlike the aspect in which the parameters are individually input for the plurality of printing elements.

It is preferable that average value display means for displaying the input average value (or the average equivalent value) and deviation display means for displaying a deviation are provided.

As an example of the parameter for inputting the average value or the average equivalent value and the deviation, there is an individual parameter of the printing element. As an example of the individual parameter of the printing element, there are a dot density, a dot diameter (a diameter of a dot), a dot shape, a dot forming position shift and a position shift for each droplet kind.

As a seventy-first aspect, the image processing device according to any one of the sixty-eighth aspect to the seventieth aspect may further comprise: image analysis means, as the parameter acquisition means, for acquiring the parameters by analyzing a read image of a characteristic parameter acquisition chart printed by the printing system.

As a seventy-second aspect, in the image processing device according to the seventy-first aspect, the characteristic parameter acquisition chart may include a continuous dot pattern in which two or more dots are recorded so as to be in contact, and the characteristic parameter acquisition means acquires a parameter related to landing interference from the continuous dot pattern.

As a seventy-third aspect, in the image processing device according to the seventy-second aspect, the characteristic parameter acquisition chart may include multiple kinds of continuous dot patterns in which at least one of an inter-dot distance between the two or more dots or a recording time difference between the two or more dots is differentiated.

As a seventy-fourth aspect, in the image processing device according to any one of the sixty-sixth aspect to the seventy-third aspect, the system errors may be characteristic errors expected to exhibit reproducibility as the characteristics of the printing system.

The "expected to exhibit reproducibility" includes a case where the error has reproducibility and the error is reasonably expected to exhibit reproducibility with a high probability from a statistical probability distribution. For example, an average value or a center value of a distribution of the measurement values of the system error may be used as the "characteristic error".

As a seventy-fifth aspect, in the image processing device according to any one of the sixty-sixth aspect to the seventy-third aspect, the system errors may include characteristic errors expected to exhibit reproducibility as the characteristics of the printing system, and random system errors as irregularly changed errors.

The "irregularly changed" includes a case where the error is changed temporally or depending on a place. The irregularly changed error is an error having reproducibility lower than the characteristic error, and may be comprehended as a component of "dispersion" for the characteristic error form a statistical probability distribution. It is understood that the random system error is a change component added to the characteristic error. As the random system error as the change component added to the characteristic error, there may be both a positive value and a negative value.

As a seventy-sixth aspect, in the image processing device according to the seventy-fifth aspect, a plurality of levels may be determined for values of the random system errors, and simulation images for the respective levels in which the random system errors corresponding to the plurality of levels are reflected may be generated by the simulation image generation means.

As a seventy-seventh aspect, in the image processing device according to the seventy-sixth aspect, the plurality of levels may be determined according to a system error distribution of the printing system.

As a seventy-eighth aspect, in the image processing device according to the seventy-sixth aspect to the seventy-seventh aspect, the image quality evaluation means may perform image quality evaluation on the simulation images for the respective levels and may calculate an image quality evaluation value acquired by integrating the image quality evaluation of the simulation images for the respective levels.

As a seventy-ninth aspect, in the image processing device according to any one of the seventy-sixth aspect to the seventy-eighth aspect, the image quality evaluation means may include calculation means for calculating the summation of the evaluation values of the simulation images for the respective levels or a weighted sum acquired by multiplying a weighing factor to the evaluation values of the simulation images for the respective levels, and the weighting factor is determined according to the system error distribution of the printing system.

As an eightieth aspect, the image processing device according to any one of the sixty-sixth aspect to the seventy-ninth aspect may further comprise: a storage unit that accumulates data of the parameter acquired in the past. The halftone processing rule may be generated based on the accumulated data.

As an eighty-first aspect, in the image processing device according to the eightieth aspect, information of the system error distribution of the printing system may be updated based on the accumulated data.

As an eighty-second aspect, in the image processing device according to any one of the sixty-sixth aspect to the eighty-first aspect, the simulation image generation means may generate a simulation image in which the influence of the landing interference is reflected.

As an eighty-third aspect, in the image processing device according to any one of the sixty-sixth aspect to the eighty-second aspect, the simulation image generation means may generate a simulation image which includes a plurality of colors, the simulation image being generated by reflecting the influence of the landing interference between the colors.

As an eighty-fourth aspect, in the image processing device according to any one of the sixty-sixth aspect to the eighty-third aspect, the simulation image generation means may generate a simulation image which includes dots corresponding to multiple droplet kinds, the simulation image being generated by reflecting the influence of landing interference caused by the droplet kind.

As an eighty-fifth aspect, in the image processing device according to any one of the sixty-sixth aspect to the eighty-fourth aspect, the simulation image generation means may generate a simulation image in which the influence of landing interference caused by an inter-dot interference is reflected.

As an eighty-sixth aspect, in the image processing device according to any one of the sixty-sixth aspect to the eighty-fifth aspect, the simulation image generation means may generate a simulation image in which the influence of landing interference caused by a jetting time difference is reflected.

As an eighty-seventh aspect, in the image processing device according to any one of the sixty-sixth aspect to the eighty-sixth aspect, the simulation image generation means may generate a simulation image in which at least any one of a change in inter-dot distance, a change in dot density, or a change in dot shape is reflected as the influence of the landing interference.

As an eighty-eighth aspect, the image processing device according to any one of the sixty-sixth aspect to the eighty-sixth aspect may further comprise: inter-dot contact determination means for determining whether or not dots are in contact. The simulation image generation means may generate a simulation image in which the influence of the landing interference is reflected on dots determined to be in contact by the inter-dot contact determination means.

As an eighty-ninth aspect, in the image processing device according to any one of the sixty-sixth aspect to the eighty-eighth aspect, the simulation image generation means may calculate a vector summation acquired by adding vectors indicated by directions from a given dot which is a target dot on which the influence of the landing interference is reflected toward surrounding dots having a possibility that the landing interference with the given dot occurs and distances between the given dot and the surrounding dots, and may generate a simulation image in which the influence of the landing interference of the given dot is reflected using the calculated vector summation.

As a ninetieth aspect, in the image processing device according to any one of the sixty-sixth aspect to the eighty-ninth aspect, the simulation image generation means may generate a simulation image in serial scanning type printing performed using a plurality of scanning paths, may reflect the influence of the landing interference on dots jetted along each scanning path when the simulation image is generated, and may repeat the reflection of the landing interference for the respective scanning paths.

As a ninety-first aspect, in the image processing device according to any one of the sixty-sixth aspect to the ninetieth aspect, the simulation image generation means may generate a high-resolution simulation image through the halftone processing result.

A printing system according to a ninety-second aspect is a printing system comprising: the image processing device according to any one of the sixty-sixth aspect to the ninety-first aspect; and a printing device that performs printing on a printing medium based on a halftone image generated through a halftone process defined by a halftone processing rule.

A printing system according to a ninety-third aspect is a printing system comprising: setting means for setting a parameter related to a system error assumed in a case where printing is performed by a printing system; simulation image generation means for generating a simulation image in which the system error indicated by the parameter is reflected; image quality evaluation means for evaluating image quality of the simulation image; halftone process generation means for generating halftone processing rules that define the processing contents of halftone processes used in the printing system based on the simulation image in which the evaluation falls in a target range; and a printing device that performs printing on a printing medium based on a halftone image generated through the halftone process defined by the halftone processing rule.

A method of generating a halftone processing rule according to a ninety-fourth aspect is a method of generating a halftone processing rule. The method comprises: a setting step of setting a parameter related to a system error assumed in a case where printing is performed by a printing system; a simulation image generation step of generating a simulation image in which the system error indicated by the parameter is reflected; an image quality evaluation step of evaluating image quality of the simulation image; and a halftone process generation step of generating halftone processing rules that define the processing contents of halftone processes used in the printing system based on the simulation image in which the evaluation falls in a target range.

It is possible to appropriately combine the same matters as the matters specified in the sixty-seventh aspect to the ninety-first aspect with the ninety-fourth aspect. In this case, a processing unit or a functional unit (means) as means serving as the process or function specified in the printing system may be comprehended as an element of a "step" of a corresponding process or operation. The method of generating the halftone processing rule according to the ninety-fourth aspect may be comprehended as the invention of the method of producing the halftone processing rule. The halftone processing rule may be comprehended as information provided for the halftone process and is equivalent to a program. Accordingly, the ninety-fourth aspect may be interpreted as the method of producing the halftone processing rule.

A ninety-fifth aspect is a halftone processing rule generated by performing the method of generating a halftone processing rule according to the ninety-fourth aspect.

The halftone processing rule may be specified by the combination of the halftone algorithm and the halftone parameter. As an example of the halftone processing rule, there are a dither mask of the dither method, an error diffusion matrix or information of an applied gradation range in the error diffusion method, and the number of times pixels are updated and an exchange pixel range in the direct binary search method.

According to the halftone processing rule according to the ninety-fifth aspect, it is possible to generate a target image having favorable image quality.

An image processing method of generating a halftone image according to a ninety-sixth aspect is an image processing method of generating a halftone image by performing a halftone process defined by a halftone processing rule generated by performing the method of generating a halftone processing rule according to the ninety-fourth aspect.

The image processing method according to the ninety-sixth aspect may be comprehend as the invention of the method of producing the halftone image. The "halftone image" may be a form of image data as information provided for a printing control process, or may be a form of a print image printed according to the image data. The ninety-sixth aspect may be interpreted as the method of producing the halftone image.

A ninety-seventh aspect is a halftone image generated by performing a halftone process defined by a halftone processing rule generated by performing the method of generating a halftone processing rule according to the ninety-fourth aspect.

A ninety-eighth aspect is a printed material manufacturing method of acquiring a printed material by performing printing on a printing medium based on a halftone image generated through a halftone process defined by a halftone processing rule generated by performing the method of generating a halftone processing rule according to the ninety-fourth aspect.

According to the ninety-eighth aspect, it is possible to produce a favorable printed material falling in a target range of image quality.

A program according to the ninety-ninth aspect is a program causing a computer to function as: setting means for setting a parameter related to a system error assumed in a case where printing is performed by a printing system; simulation image generation means for generating a simulation image in which the system error indicated by the parameter is reflected; image quality evaluation means for evaluating image quality of the simulation image; and halftone process generation means for generating halftone processing rules that define the processing contents of halftone processes used in the printing system based on the simulation image in which the evaluation falls in a target range.

It is possible to appropriately combine the same matters as the matters specified in the sixty-seventh aspect to the ninety-first aspect to the ninety-ninth aspect. In this case, means serving as the process or function specified in the image processing device may be comprehended as an element of a program for realizing means of a corresponding process or operation.

An image processing device according to one hundredth aspect is an image processing device that performs at least one of a process of generating halftone processing rules which define the contents of halftone processes used in an ink jet printing system and the halftone process. The device comprises: analysis means for analyzing a contact state of each dot of a plurality of pixels of a dot image indicating a dot arrangement form with another dot; landing-interference-influence evaluation means for calculating a landing interference evaluation value for evaluating the degree of influence of dot movement due to landing interference based on information indicating the contact state acquired by the analysis means; and signal processing means for performing at least one process of a process of generating a halftone parameter of the halftone processing rule or a process of generating a halftone image through the halftone process by using the landing interference evaluation value calculated by the landing-interference-influence evaluation means or using an evaluation value generated based on the landing interference evaluation value calculated by the landing-interference-influence evaluation means.

As the "plurality of pixels of the dot image", all pixels constituting the dot image may be used as targets, or some of the plurality of pixels constituting the dot image may be used as targets.

The "contact state" refers to a contact direction and/or a contact amount. The "landing interference evaluation value" is an evaluation value for quantitatively representing the degree of influence of dot movement by a value. The influence of the dot movement is quantitatively evaluated by the landing interference evaluation value. The "evaluation value generated based on the landing interference evaluation value" is another evaluation value two-dimensionally generated based on the landing interference evaluation value. The "evaluation value generated based on the landing interference evaluation value" is a value in which the landing interference evaluation value is reflected.

The "using the landing interference evaluation value or using the evaluation value generated based on the landing interference evaluation value" includes a case where a processing result of a process of comparing the "landing interference evaluation value" or the "evaluation value generated based on the landing interference evaluation value" with a certain specified value (for example, specified reference value), a process of comprehending an increase/decrease tendency of the "landing interference evaluation value" or the "evaluation value generated based on the landing interference evaluation value" by comparing the value of the "landing interference evaluation value" calculated from different dot images or the "evaluation value generated based on the landing interference evaluation value", or a combination process thereof is used.

The halftone processing rule may be specified by the combination of the halftone algorithm and the halftone parameter. As an example of the halftone processing rule, there are a dither mask of the dither method, an error diffusion matrix or information of an applied gradation range in the error diffusion method, and the number of times pixels are updated and an exchange pixel range in the direct binary search method.

According to the one hundredth aspect, it is possible to quantitatively evaluating the influence of the dot movement due to the landing interference by using the landing interference evaluation value, and it is possible to acquire the halftone parameter and/or the halftone image in which the influence of the image quality of the dot movement due to the landing interference is relatively less. According to the one hundredth aspect, it is possible to suppress the image quality deterioration caused by the landing interference, and it is possible to generate an image having high image quality.

As one hundred-first aspect, in the image processing device according to the one hundredth aspect, the signal processing means may generate at least one of the halftone parameter or the halftone image having tolerance to the dot movement due to the landing interference based on a result of a comparison process using the landing interference evaluation value or the evaluation value generated based on the landing interference evaluation value.

The "halftone image having tolerance to the dot movement due to the landing interference" means that the image has robustness such that an equivalent image quality level to the landing interference phenomenon is maintained, in other words, means that the image has fastness such that the image quality deterioration due to the landing interference falls in an allowable range.

The "specified reference value" may be appropriately set in terms of an allowable range of the landing interference evaluation value or an allowable range of the target image quality. The reference value compared with the landing interference evaluation value and the reference value compared with the evaluation value generated based on the landing interference evaluation value may be set to be different reference values.

As one hundred-second aspect, in the image processing device according to the one hundred-third aspect, the comparison process may include a process of comparing the landing interference evaluation value with a specified reference value or a process of comparing the evaluation value generated based on the landing interference evaluation value with a specified reference value, and the signal processing means may perform at least one of a process of generating the halftone parameter such that dot arrangement falls in an allowable range indicated by the specified reference value or a process of generating the halftone image such that dot arrangement falls in an allowable range indicated by the specified reference value, based on the comparing result of the comparison process.

As one hundred-third aspect, in the image processing device according to the one hundred-second aspect, the signal processing means may generate at least one of the halftone parameter or the halftone image in which the degree of influence of the dot movement due to the landing interference is equal to or less than the degree of influence of the dot movement indicated by the specified reference value by comparing the landing interference evaluation value with the specified reference value.

As one hundred-fourth aspect, the image processing device according to any one of the one hundredth aspect to the one hundred-third aspect may further comprise: movement amount calculation means for calculating the movement amount of the dot movement due to the landing interference based on the information indicating the contact state acquired by the analysis means. The landing-interference-influence evaluation means may calculate the landing interference evaluation value based on information indicating the movement amount calculated by the movement amount calculation means.

The movement amount of the dot movement due to the landing interference is described as a "landing interference movement amount" in some cases. The landing interference evaluation value may be directly calculated from the information indicating the contact state, or the landing interference evaluation value may be calculated from the information indicating the landing interference movement amount by acquiring the landing interference movement amount based on the information indicating the contact state, as in the fifth aspect.

As one hundred-fifth aspect, the image processing device according to any one of the one hundredth aspect to the one hundred-third aspect may further comprise: error reflection processing means for generating the dot arrangement on which at least one error of a dot diameter, a dot shape, a dot forming position shift, or non-jetting is reflected as an error of the ink jet printing system. The analysis means may analyze the contact state of the dot on which the error is reflected with another dot, and the landing-interference-influence evaluation means may calculate the landing interference evaluation value for evaluating the degree of influence of the dot movement due to the landing interference in a case where the error is reflected.

As one hundred-sixth aspect, in the image processing device according to the one hundred-fifth aspect, the analysis means may perform a process of analyzing the contact state in a case where the non-reflection of the error is performed and in a case where the error is reflected, and the landing-interference-influence evaluation means may calculate a first landing interference evaluation value as the landing interference evaluation value for evaluating the degree of influence of the dot movement due to the landing interference in the case where the non-reflection of the error is performed, and may calculate a second landing interference evaluation value as the landing interference evaluation value for evaluating the degree of influence of the dot movement due to the landing interference in the case where the error is reflected.

The "case where the non-reflection of the error is performed" refers to a case where the error is not reflected". A case where the error is not reflected is equivalent to a state before the error is reflected. The expression of "the error is reflected" means that an error component is added to the dot image, and is a synonym for the addition of the error.

The first landing interference evaluation value and the second landing interference evaluation value may be used as the "landing interference evaluation value". The first evaluation value may be generated based on the first landing interference evaluation value, and the second evaluation value may be generated based on the second landing interference evaluation value.

The first evaluation value and the second evaluation value may be used as the "evaluation value", and a new "evaluation value" may be generated by combining the first evaluation value and the second evaluation value.

As one hundred-seventh aspect, in the image processing device according to the one hundred-fifth aspect, the analysis means may perform a process of analyzing the contact state in a case where the non-reflection of the error is performed and in a case where the error is reflected, the landing-interference-influence evaluation means may calculate a first landing interference evaluation value for evaluating the degree of influence of the dot movement due to the landing interference in the case where the non-reflection of the error is performed, and may calculate a second landing interference evaluation value for evaluating the degree of influence of the dot movement due to the landing interference in the case where the error is reflected, and the landing-interference-influence evaluation means may calculate the landing interference evaluation value from a weighted sum of the first landing interference evaluation value and the second landing interference evaluation value.

As one hundred-eighth aspect, the image processing device according to any one of the one hundred-fifth aspect to the one hundred-seventh aspect may further comprise: movement amount calculation means for calculating the movement amount of the dot movement due to the landing interference based on the information indicating the contact state acquired by the analysis means. The landing-interference-influence evaluation means may calculate the landing interference evaluation value based on information indicating the movement amount calculated by the movement amount calculation means.

As one hundred-ninth aspect, in the image processing device according to the one hundred-eighth aspect, the landing-interference-influence evaluation means may calculate the landing interference evaluation value from information indicating the movement amount of only a dot group on which the error is reflected.

According to the one hundred-ninth aspect, it is possible to reduce a calculation amount, and it is possible to simply evaluate the influence of the landing interference.

As one hundred-tenth aspect, in the image processing device according to the one hundred-eighth aspect or the one hundred-ninth aspect, in a case where the dot forming position shift is reflected as the error, the landing-interference-influence evaluation means may calculate the landing interference evaluation value from only the movement amount in a direction parallel to a direction to which the error due to the dot forming position shift is applied, among directions of the dot movement due to the landing interference.

As one hundred-eleventh aspect, in the image processing device according to any one of the one hundred-fourth aspect and the one hundred-eighth aspect to the one hundred-tenth aspect, the landing-interference-influence evaluation means may calculate the landing interference evaluation value from only the movement amount in a direction perpendicular to a scanning direction of the ink jet printing system, among directions of the dot movement due to the landing interference.

An ink jet printing system according to one hundred-twelfth aspect is an ink jet printing system comprising: the image processing device according to any one of the one hundredth aspect to the one hundred-eleventh aspect; and an ink jet printing device that performs printing on a printing medium based on a halftone image generated through a halftone process determined by the halftone processing rule or a halftone image generated by the signal processing means.

An image processing method according to one hundred-thirteenth aspect is an image processing method of performing at least one process of a process of generating halftone processing rules that define the contents of halftone processes used in an ink jet printing system or the halftone process. The method comprises: an analysis step of analyzing a contact state of each dot of a plurality of pixels of a dot image indicating a dot arrangement form with another dot; a landing-interference-influence evaluation step of calculating a landing interference evaluation value for evaluating the degree of influence of dot movement due to landing interference based on information indicating the contact state acquired in the analysis step; and a signal processing step of performing at least one process of a process of generating a halftone parameter of the halftone processing rule or a process of generating a halftone image through the halftone process by using an evaluating result of the landing interference evaluation value calculated in the landing-interference-influence evaluation step or using an evaluating result of an evaluation value generated based on the landing interference evaluation value calculated in the landing-interference-influence evaluation step.

It is possible to appropriately combine the same matters as the matters specified in the one hundred-first aspect to the one hundred-twelfth aspect with the one hundred-thirteenth aspect. In this case, means serving as the process or function specified in the image processing device may be comprehended as an element of a "step" of a corresponding process or operation.

The image processing method according to the one hundred-thirteenth aspect in a case where the image processing step performs the process of generating the halftone parameter of the halftone processing rule may be comprehended as the invention of the method of producing the halftone processing rule. The halftone processing rule is information provided for the halftone process and is equivalent to a program. Accordingly, the image processing method according to the one hundred-thirteenth aspect in a case where the signal processing step of generating the halftone parameter is provided may be interpreted as the invention of the method of generating the halftone processing rule.

The image processing method according to the one hundred-thirteenth aspect in a case where the signal processing step performs the halftone process of generating the halftone image may be comprehended as the invention of the halftone processing method, or may be comprehended as the invention of the method of generating the halftone image. The "halftone image" may be a form of image data as information provided for the printing control process, or may be a form of the print image printed according to the image data. The image processing method according to the one hundred-thirteenth aspect in a case where the signal processing step of generating the halftone image is provided may be interpreted as the invention of the method of producing the halftone image.

A program according to one hundred-fourteenth aspect is a program causing a computer to function as an image processing device that performs at least one process of a process of generating halftone processing rules that define the contents of halftone processes used in an ink jet printing system or the halftone process. The program causing the computer to function as: analysis means for analyzing a contact state of each dot of a plurality of pixels of a dot image indicating a dot arrangement form with another dot; landing-interference-influence evaluation means for calculating a landing interference evaluation value for evaluating the degree of influence of dot movement due to landing interference based on information indicating the contact state acquired by the analysis means; and signal processing means for performing at least one process of a process of generating a halftone parameter of the halftone processing rule or a process of generating a halftone image through the halftone process by using the landing interference evaluation value calculated by the landing-interference-influence evaluation means or using an evaluation value generated based on the landing interference evaluation value calculated by the landing-interference-influence evaluation means.

It is possible to appropriately combine the same matters as the matters specified in the one hundred-first aspect to the one hundred-twelfth aspect to the one hundred-fourteenth aspect. In this case, means serving as the process or function specified in the image processing device may be comprehended as an element of a program for realizing means of a corresponding process or operation.

An image processing device according to one hundred-fifteenth aspect is an image processing device comprising: error reflection processing means for generating the dot arrangement in which at least one error of a dot diameter, a dot shape, a dot forming position shift or non-jetting which is an element of an error of an ink jet printing system is reflected on dots recorded by the ink jet printing system; first information generation means for generating first information corresponding to a contact state between dots in first dot arrangement which is the dot arrangement before the error is reflected; second information generation means for generating second information corresponding to a contact state between dots in second dot arrangement which is the dot arrangement in a case where the error is reflected; landing-interference-influence evaluation means for calculating a landing interference evaluation value for quantitatively evaluating a change of the influence of dot movement due to landing interference before and after the error is reflected based on the first information and the second information; and signal processing means for performing at least one process of a process of generating a halftone parameter of a halftone processing rule or a process of generating a halftone image by using the landing interference evaluation value calculated by the landing-interference-influence evaluation means or using an evaluation value generated based on the landing interference evaluation value calculated by the landing-interference-influence evaluation means.

The image processing device according to the one hundred-fifteenth aspect functions as an image processing device that performs at least one of the process of generating the halftone processing rules which define the contents of the halftone processes used in the ink jet printing system or the halftone process. The "dots recorded by the ink jet printing system are dots of the dot image (that is, the halftone image) indicating the dot arrangement form on the assumption of the recording performed by the ink jet printing system. The "dots recorded by the ink jet printing system" may be all the dots constituting the dot image, or may be some dots thereof.

The "contact state between dots" includes a state in which the dots are in contact and a state in which the dots are not in contact".

The "before the error is reflected" refers to a state in which the error is not reflected, that is, a case where the error is not reflected. The "case where the error is reflected" refers to a state after the error is reflected. The expression of "the error is reflected" means that the error component is added to the dot image, and is a synonym for the addition of the error.

The "before and after the error is reflected" refers to both the dot arrangements of the first dot arrangement which is the state before the error is reflected and the second dot arrangement which is the state after the error is reflected.

The "landing interference evaluation value" is the evaluation value for quantitatively representing the degree of the change of the influence of the dot movement by a value. The change of the influence of the dot movement is quantitatively evaluated by the landing interference evaluation value. The "evaluation value generated based on the landing interference evaluation value" is another evaluation value tow-dimensionally generated based on the landing interference evaluation value. The "evaluation value generated based on the landing interference evaluation value" is a value on which the landing interference evaluation value is reflected.

The "using the landing interference evaluation value or using the evaluation value generated based on the landing interference evaluation value" includes a case where a processing result of a process of comparing the "landing interference evaluation value" or the "evaluation value generated based on the landing interference evaluation value" with a certain specified value (for example, specified reference value), a process of comprehending an increase/decrease tendency of the "landing interference evaluation value" or the "evaluation value generated based on the landing interference evaluation value" by comparing the value of the "landing interference evaluation value" calculated from different dot images or the "evaluation value generated based on the landing interference evaluation value", or a combination process thereof is used.

The halftone processing rule may be specified by the combination of the halftone algorithm and the halftone parameter. As an example of the halftone processing rule, there are a dither mask of the dither method, an error diffusion matrix or information of an applied gradation range in the error diffusion method, and the number of times pixels are updated and an exchange pixel range in the direct binary search method.

According to the one hundred-fifteenth aspect, since the change of the influence of the dot movement due to the landing interference before and after the error reflection can be quantitatively evaluated using the landing interference evaluation value, it is possible to acquire the halftone parameter and/or the halftone image in which the change of the influence of the dot movement due to the landing interference before and after the error reflection is relatively less. According to the one hundred-fifteenth aspect, it is possible to suppress the image quality deterioration caused by the landing interference, and it is possible to generate an image having high image quality.

As one hundred-sixteenth aspect, in the image processing device according to the one hundred-fifteenth aspect, the signal processing means may generate at least one of the halftone parameter or the halftone image having tolerance to the dot movement due to the landing interference based on a result of a comparison process using the landing interference evaluation value or the evaluation value generated based on the landing interference evaluation value.

The "halftone image having tolerance to the dot movement due to the landing interference" means that the image has robustness such that an equivalent image quality level to the landing interference phenomenon is maintained, in other words, means that the image has fastness such that the image quality deterioration due to the landing interference falls in an allowable range.

As one hundred-seventeenth aspect, in the image processing device according to the one hundred-sixteenth aspect, the comparison process may include a process of comparing the landing interference evaluation value with a specified reference value or a process of comparing the evaluation value generated based on the landing interference evaluation value with a specified reference value, and the signal processing means may perform at least one of a process of generating the halftone parameter such that dot arrangement falls in an allowable range indicated by the specified reference value or a process of generating the halftone image such that dot arrangement falls in an allowable range indicated by the specified reference value based on the comparing result of the comparison process.

As one hundred-eighteenth aspect, in the image processing device according to one hundred-sixteenth aspect, the signal processing means may generate at least one of the halftone parameter or the halftone image in which the degree of influence of the dot movement due to the landing interference is equal to or less than the degree of influence of the dot movement indicated by the specified reference value by comparing the landing interference evaluation value with the specified reference value.

As one hundred-nineteenth aspect, in the image processing device according to any one of the one hundred-fifteenth aspect to the one hundred-eighteenth aspect, the first information generation means may include first analysis means for analyzing a contact direction and a contact amount of each of a plurality of dots of the first dot arrangement with another dot, the first information may be first contact state information indicating the contact direction and the contact amount acquired by the first analysis means, the second information generation means may include second analysis means for analyzing a contact state and a contact amount of each of a plurality of dots in the second dot arrangement with another dot, the second information may be second contact state information indicating the contact direction and the contact amount acquired by the second analysis means, and the landing-interference-influence evaluation means may calculate the landing interference evaluation value for quantitatively evaluating a change of the movement amount of the dot movement due to the landing interference before and after the error is reflected.

As one hundred-twentieth aspect, the image processing device according to the one hundred-nineteenth aspect may further comprise: first movement amount calculation means for calculating the movement amount of the dot movement due to the landing interference based on the first contact state information; and second movement amount calculation means for calculating the movement amount of the dot movement due to the landing interference based on the second contact state information. The landing-interference-influence evaluation means may calculate the landing interference evaluation value based on first movement amount information indicating the movement amount acquired by the first movement amount calculation means and second movement amount information indicating the movement amount acquired by the second movement amount calculation means.

It is possible to directly calculate the landing interference evaluation value from the information of the "contact direction and the contact amount" as the first contact state information indicating the dot contact state in the first dot arrangement and the information of the "contact direction and the contact amount" as the second contact state information indicating the dot contact state in the second dot arrangement. As in the one hundred-twentieth aspect, the first movement amount information indicating the movement amount of the dot due to the landing interference is calculated based on the information of the "contact direction and the contact amount" as the first contact state information and the second movement amount information indicating the movement amount of the dot due to the landing interference is calculated based on the information of the "contact direction and the contact amount" as the second contact state information, so that the landing interference evaluation value may be calculated from the first movement amount information and the second movement amount information. It is understood that the landing interference evaluation value calculated by the configuration of the one hundred-twentieth aspect is calculated based on the first contact state information and the second contact state information.

As one hundred-twenty-first aspect, in the image processing device according to the one hundred-nineteenth aspect or the one hundred-twentieth aspect, the landing-interference-influence evaluation means may calculate the landing interference evaluation value for quantitatively evaluating a change of the movement amount of only a dot group to which the error is reflected.

According to the one hundred-twenty-first aspect, it is possible to reduce the calculation amount, and it is possible to simply evaluate the influence of the landing interference.

As one hundred-twenty-second aspect, in the image processing device according to any one of the one hundred-nineteenth aspect to the one hundred-twenty-first aspect, in a case where the dot forming position shift is reflected as the error, the landing-interference-influence evaluation means may calculate the landing interference evaluation value for quantitatively evaluating only a change of the movement amount in a direction parallel to a direction to which the error due to the dot forming position shift is applied, among directions of the dot movement due to the landing interference.

As one hundred-twenty-third aspect, in the image processing device according to any one of the one hundred-nineteenth aspect to the one hundred-twenty-second aspect, the landing-interference-influence evaluation means may calculate the landing interference evaluation value for quantitatively evaluating only a change of the movement amount in a direction perpendicular to a scanning direction of the ink jet printing system, among directions of the dot movement due to the landing interference.

As one hundred-twenty-fourth aspect, in the image processing device according to any one of the one hundred-fifteenth aspect to the one hundred-eighteenth aspect, the first information may be first contact state information indicating a contact state between dots in the first dot arrangement, the second information may be second contact state information indicating a contact state between dots in the second dot arrangement, and the landing-interference-influence evaluation means may calculate the landing interference evaluation value for quantitatively evaluating a change of the contact state before and after the error is reflected.

As one hundred-twenty-fifth aspect, in the image processing device according to the one hundred-twenty-fourth aspect, the change of the contact state may be represented by any one of a first state change changed from a contact state of a dot with another dot to a non-contact state and a second state change changed from the non-contact state of the dot with the other dot to the contact state, or the number of dots exhibiting both the state changes of the first state change and the second state change.

As one hundred-twenty-sixth aspect, in the image processing device according to the one hundred-twenty-fourth aspect to the one hundred-twenty-fifth aspect, the landing-interference-influence evaluation means may calculate the landing interference evaluation value for quantitatively evaluating a change of the contact state of only a dot group on which the error is reflected.

According to the one hundred-twenty-sixth aspect, it is possible to reduce the calculation amount, and it is possible to simply evaluate the influence of the landing interference.

As one hundred-twenty-seventh aspect, in the image processing device according to any one of the one hundred-twenty-fourth aspect to the one hundred-twenty-sixth aspect, in a case where the dot forming position shift is reflected as the error, the landing-interference-influence evaluation means may calculate the landing interference evaluation value for quantitatively evaluating only a change of the contact state in a direction parallel to a direction to which the error due to the dot forming position shift is added, among directions of the dot movement due to the landing interference.

As one hundred-twenty-eighth aspect, in the image processing device according to any one of the one hundred-twenty-fourth aspect to the one hundred-twenty-seventh aspect, the landing-interference-influence evaluation means may calculate the landing interference evaluation value for quantitatively evaluating only a change of the contact state in a direction perpendicular to a scanning direction of the ink jet printing system, among directions of the dot movement due to the landing interference.

An ink jet printing system according to one hundred-twenty-ninth aspect is an ink jet printing system comprising: the image processing device according to any one of the one hundred-fifteenth aspect to the one hundred-twenty-eighth aspect; and an ink jet printing device that performs printing on a printing medium based on a halftone image generated through a halftone process determined by the halftone processing rule or a halftone image generated by the signal processing means.

An image processing method according to one hundred-thirtieth aspect is an image processing method comprising: an error reflection processing step of generating the dot arrangement in which at least one error of a dot diameter, a dot shape, a dot forming position shift, or non-jetting which is an element of an error of an ink jet printing system is reflected on dots recorded by the ink jet printing system; a first information generation step of generating first information corresponding to a contact state between dots in first dot arrangement which is the dot arrangement before the error is reflected; a second information generation step of generating second information corresponding to a contact state between dots in second dot arrangement which is the dot arrangement in a case where the error is reflected; a landing-interference-influence evaluation step of calculating a landing interference evaluation value for quantitatively evaluating a change of the influence of the dot movement due to the landing interference before and after the error is reflected based on the first information and the second information; and a signal processing step of performing at least one process of a process of generating a halftone parameter of a halftone processing rule or a process of generating a halftone image by using the landing interference evaluation value calculated in the landing-interference-influence evaluation step or using an evaluation value generated based on the landing interference evaluation value calculated in the landing-interference-influence evaluation step.

It is possible to appropriately combine the same matters as the matters specified in the one hundred-sixteenth aspect to the one hundred-twenty-eighth aspect with the one hundred-thirtieth aspect. In this case, means serving as the process or function specified in the image processing device may be comprehended as an element of a "step" of a corresponding process or operation.

The image processing method according to the one hundred-sixteenth aspect in a case where the signal processing step performs the process of generating the halftone parameter of the halftone processing rule may be comprehended as the invention of the method of generating the halftone processing rule. The halftone processing rule may be comprehended as information provided for the halftone process and is equivalent to a program. Accordingly, the image processing method according to the one hundred-thirtieth aspect in a case where the the signal processing step of generating the halftone parameters is provided may be interpreted as the method of producing the halftone processing rule.

The image processing method according to the one hundred-thirtieth aspect in a case where the signal processing step performs the halftone process of generating the halftone image may be comprehended as the invention of the halftone processing method, or may be comprehended as the invention of the method of generating the halftone image. The halftone image may be a form of image data as information provided for the printing control process, or may be a form of the print image printed according to the image data. The image processing method according to the one hundred-thirtieth aspect in a case where the signal processing step of generating the halftone image is provided may be interpreted as the invention of the method of producing the halftone image.

A program according to one hundred-thirty-first aspect is a program causing a computer to function as: error reflection processing means for generating the dot arrangement in which at least one error of a dot diameter, a dot shape, a dot forming position shift, or non-jetting which is an element of an error of an ink jet printing system is reflected on dots recorded by the ink jet printing system; first information generation means for generating first information corresponding to a contact state between dots in first dot arrangement which is the dot arrangement before the error is reflected; second information generation means for generating second information corresponding to a contact state between dots in second dot arrangement which is the dot arrangement in a case where the error is reflected; landing-interference-influence evaluation means for calculating a landing interference evaluation value for quantitatively evaluating a change of the influence of the dot movement due to the landing interference before and after the error is reflected based on the first information and the second information; and signal processing means for performing at least one process of a process of generating a halftone parameter of a halftone processing rule or a process of generating a halftone image by using the landing interference evaluation value calculated by the landing-interference-influence evaluation means or using an evaluation value generated based on the landing interference evaluation value calculated by the landing-interference-influence evaluation means.

It is possible to appropriately combine the same matters as the matters specified in the one hundred-sixteenth aspect to the one hundred-twenty-eighth aspect to the one hundred-thirty-first aspect. In this case, means serving as the process or function specified in the image processing device may be comprehended as an element of a program for realizing means of a corresponding process or operation.

An image processing device according to one hundred-thirty-second aspect is an image processing device comprising: analysis means for analyzing a contact state of each dot of a plurality of pixels recorded by an ink jet printing system with another dot; group classification means for performing a group classification process of classifying dots into a plurality of groups based on information indicating the contact state acquired by the analysis means; dispersibility-evaluation-value calculation means for calculating a dispersibility evaluation value for evaluating dispersibility of a dot group for each classified group; and signal processing means for performing at least one process of a process of generating a halftone parameter of a halftone processing rule or a process of generating a halftone image by using the dispersibility evaluation value calculated by the dispersibility-evaluation-value calculation means or using an evaluation value generated based on the dispersibility evaluation value calculated by the dispersibility-evaluation-value calculation means.

The image processing device according to the one hundred-thirty-second aspect functions as an image processing device that performs at least one of the process of generating the halftone processing rules which define the contents of the halftone processes used in the ink jet printing system or the halftone process. The "dots recorded by the ink jet printing system are dots of the dot image (that is, the halftone image) indicating the dot arrangement form on the assumption of the recording performed by the ink jet printing system. The "dots recorded by the ink jet printing system" may be all the dots constituting the dot image, or may be some dots thereof.

Here, the "contact state" refers to the contact direction and/or the contact amount. The movement direction and the movement amount of the dot movement due to the landing interference may be different depending on the contact state between the dots, the movement direction or the movement amount due to the landing interference may be estimated from the contact state. Accordingly, it is possible to classify the dots in terms of the influence of the landing interference based on the information indicating the contact state. Here, the "influence due to the landing interference" includes the combination of the movement direction and the movement amount of the dot movement due to the landing interference.

The dot group having the common or similar contact state may be estimated that the influence due to the landing interference is in common or is similar, and the dot group having the common or similar contact state may be classified as the same group. Here, the "similar" means that the dots have similarity falling in an allowable range capable of being treated as a substantially same range depending on the detailedness of the classification. The dots may be classified into a plurality of groups depending on different contact states. In a case where the dots are classified into the groups in consideration of only a specific contact state, it is interpreted that the dots are classified into at least two groups of the group of the dot group corresponding to the considered specific contact state or the non-corresponding group.

The "for each classified group" is not limited to each of all the classified groups, and includes the meaning of a per group basis of at least one group which is a part of the plurality of classified groups. The dispersibility-evaluation-value calculation means calculates the dispersibility evaluation value for evaluating dispersibility of the dot group on a per group basis for all the plurality of classified groups or a part of the groups. A case where the dispersibility evaluation value is calculated for only one (single) group of the plurality of classified groups is included in the concept of the "each classified group".

The "dispersibility evaluation value" is an evaluation value for quantitatively representing the dispersibility of the dot group by the value. The degree of the influence of the dot movement due to the landing interference is quantitatively evaluated by the dispersibility evaluation value for each classified group. The dispersibility evaluation value may be used as the landing interference evaluation value for evaluating the influence of the landing interference.

The "evaluation value generated based on the dispersibility evaluation value" is another evaluation value two-dimensionally generated based on the dispersibility evaluation value. The "evaluation value generated based on the dispersibility evaluation value" is a value on which the dispersibility evaluation value is reflected.

The "using the dispersibility evaluation value or using the evaluation value generated based on the dispersibility evaluation value" includes a case where a processing result of a process of comparing the "dispersibility evaluation value" or the "evaluation value generated based on the dispersibility evaluation value" with a certain specified value (for example, specified reference value), a process of comprehending an increase/decrease tendency of the "dispersibility evaluation value" or the "evaluation value generated based on the dispersibility evaluation value" by comparing the value of the "dispersibility evaluation value" calculated from different dot images or the "evaluation value generated based on the dispersibility evaluation value", or a combination process thereof is used.

The halftone processing rule may be specified by the combination of the halftone algorithm and the halftone parameter. As an example of the halftone processing rule, there are a dither mask of the dither method, an error diffusion matrix or information of an applied gradation range in the error diffusion method, and the number of times pixels are updated and an exchange pixel range in the direct binary search method.

According to the one hundred-thirty-second aspect, it is possible to evaluate the dispersibility of each dot group for each group of the dot group in which the influence of the landing interference is in common or is similar, and it is possible to acquire the halftone parameter and/or the halftone image in which the dispersibility of each dot group is favorable. According to the one hundred-thirty-second aspect, it is possible to suppress the image quality deterioration caused by the landing interference, and it is possible to generate the image having high image quality.

As one hundred-thirty-third aspect, in the image processing device according to the one hundred-thirty-second aspect, the signal processing means may generate at least one of the halftone parameter or the halftone image having tolerance to dot movement due to landing interference based on a result of a comparison process using the dispersibility evaluation value or the evaluation value generated based on the dispersibility evaluation value.

As one hundred-thirty-fourth aspect, in the image processing device according to the one hundred-thirty-third aspect, the comparison process may include a process of comparing the dispersibility evaluation value with a specified reference value or a process of comparing the evaluation value generated based on the dispersibility evaluation value with a specified reference value, and the signal processing means may perform at least one of a process of generating the halftone parameter such that dot arrangement falls in an allowable range indicated by the specified reference value or a process of generating the halftone image such that dot arrangement falls in an allowable range indicated by the specified reference value based on the comparing result of the comparison process.

The "specified reference value" may be appropriately set in terms of an allowable range of the dispersibility evaluation value or an allowable range of the target image quality.

The reference value compared with the dispersibility evaluation value and the reference value compared with the evaluation value generated based on the dispersibility evaluation value may be set to be different reference values.

As one hundred-thirty-fifth aspect, in the image processing device according to the one hundred-thirty-third aspect, the signal processing means may generate at least one of the halftone image or the halftone parameter in which the dot group has a favorable dispersibility equal to or greater than a reference of the dispersibility indicated by the reference value by comparing the dispersibility evaluation value with the specified reference value.

As one hundred-thirty-sixth aspect, the image processing device according to any one of the one hundred-thirty-second aspect to the one hundred-thirty-fifth aspect may further comprise: movement amount calculation means for calculating a movement direction and a movement amount of dot movement due to landing interference based on information indicating the contact sate acquired by the analysis means. The group classification means may perform the group classification process based on information indicating the movement direction and the movement amount acquired by the movement amount calculation means.

It is possible to directly perform the group classification process from the information indicating the contact state. As in the one hundred-thirty-sixth aspect, the movement direction and the movement amount of the dot movement due to the landing interference is calculated based on the information indicating the contact state, and the group classification process may be performed from the information indicating the movement direction and the movement amount.

As one hundred-thirty-seventh aspect, the image processing device according to any one of the one hundred-thirty-second aspect to the one hundred-thirty-sixth aspect may further comprise: error reflection processing means for generating the dot arrangement in which at least one error of a dot diameter, a dot shape, a dot forming position shift, or non-jetting which is an element of an error of the ink jet printing system is reflected. The group classification means may perform the group classification process based on the information indicating the contact state of the dot on which the error is reflected.

As one hundred-thirty-eighth aspect, in the image processing device according to the one hundred-thirty-seventh aspect, the group classification means may perform the group classification process on only a dot group on which the error is reflected.

According to the one hundred-thirty-eighth aspect, it is possible to reduce a calculation amount, and it is possible to simply evaluate the influence of the landing interference.

As one hundred-thirty-ninth aspect, in the image processing device according to the one hundred-thirty-seventh aspect to the one hundred-thirty-eighth aspect, in a case where the dot forming position shift is reflected as the error, the group classification means may perform the group classification process on only dots in which a movement direction of the dot movement due to the landing interference is a direction parallel to a direction to which the error is added.

As one hundred-fortieth aspect, in the image processing device according to any one of the one hundred-thirty-seventh aspect to the one hundred-thirty-ninth aspect, in a case where the dot forming position shift is reflected as the error, the dispersibility-evaluation-value calculation means may calculate the dispersibility evaluation value for only a group to which the dots in which the movement direction of the dot movement due to the landing interference is the direction parallel to the direction to which the error is added belong.

An ink jet printing system according to one hundred-forty-first aspect is an ink jet printing system comprising: the image processing device according to any one of the one hundred-thirty-second aspect to the one hundred-fortieth aspect; and an ink jet printing device that performs printing on a printing medium based on a halftone image generated through a halftone process determined by the halftone processing rule or a halftone image generated by the signal processing means.

An image processing method according to one hundred-forty-second aspect is an image processing method comprising: an analysis step of analyzing a contact state of each dot of a plurality of pixels recorded by an ink jet printing system with another dot; a group classification step of performing a group classification process of classifying dots into a plurality of groups based on information indicating the contact state acquired in the analysis step; a dispersibility-evaluation-value calculation step of calculating a dispersibility evaluation value for evaluating dispersibility of each dot group for each classified group; and a signal processing step of performing at least one process of a process of generating a halftone parameter of a halftone processing rule or a process of generating a halftone image by using the dispersibility evaluation value calculated in the dispersibility-evaluation-value calculation step or using an evaluation value generated based on the dispersibility evaluation value calculated in the dispersibility-evaluation-value calculation step.

It is possible to appropriately combine the same matters as the matters specified in the one hundred-thirty-third aspect to the one hundred-fortieth aspect with the one hundred-forty-second aspect. In this case, means serving as the process or function specified in the image processing device may be comprehended as an element of a "step" of a corresponding process or operation.

The image processing method according to the one hundred-forty-second aspect in a case where the image processing step performs the process of generating the halftone parameter of the halftone processing rule may be comprehended as the invention of the method of producing the halftone processing rule. The halftone processing rule is information provided for the halftone process and is equivalent to a program. Accordingly, the image processing method according to the one hundred-forty-second aspect in a case where the signal processing step of generating the halftone parameter is provided may be interpreted as the invention of the method of generating the halftone processing rule.

The image processing method according to the one hundred-forty-second aspect in a case where the signal processing step performs the halftone process of generating the halftone image may be comprehended as the invention of the halftone processing method, or may be comprehended as the invention of the method of generating the halftone image. The "halftone image" may be a form of image data as information provided for the printing control process, or may be a form of the print image printed according to the image data. The image processing method according to the one hundred-forty-second aspect in a case where the signal processing step of generating the halftone image is provided may be interpreted as the invention of the method of producing the halftone image.

A program according to one hundred-forty-third aspect is a program causing a computer to function as: analysis means for analyzing a contact state of each dot of a plurality of pixels recorded by an ink jet printing system with another dot; group classification means for performing a group classification process of classifying dots into a plurality of groups based on information indicating the contact state acquired by the analysis process; dispersibility-evaluation-value calculation means for calculating a dispersibility evaluation value for evaluating dispersibility of each dot group for each classified group; and signal processing means for performing at least one process of a process of generating a halftone parameter of a halftone processing rule or a process of generating a halftone image by using the dispersibility evaluation value calculated by the dispersibility-evaluation-value calculation means or using an evaluation value generated based on the dispersibility evaluation value calculated by the dispersibility-evaluation-value calculation means.

It is possible to appropriately combine the same matters as the matters specified in the one hundred-thirty-third aspect to the one hundred-fortieth aspect with the one hundred-forty-third aspect. In this case, means serving as the process or function specified in the image processing device may be comprehended as an element of a program for realizing means of a corresponding process or operation.

According to the inventions described in the first aspect to the fifty-fourth aspect, it is possible to set the characteristic parameters related to the characteristics of the printing system without giving an excessive load to a user, and it is possible to generate the halftone processing rule appropriate for the printing system.

According to the inventions described in the fifty-fifth aspect to the sixty-fifth aspect, since the output condition of the characteristic parameter acquisition chart including the pattern for acquiring the characteristic parameter is set depending on the set printing mode, it is possible to output the characteristic parameter acquisition chart on which the characteristics of the printing system for each printing mode are reflected, and it is possible to appropriately comprehend the characteristics of the printing system for each printing mode.

According to the inventions described in the sixty-sixth aspect to the ninety-ninth aspect, the appropriate halftone processing rule is generated based on the simulation image in which the system error on the assumption of actual printing is reflected. Accordingly, it is possible to acquire the image having favorable image quality.

According to the inventions described in the one hundredth aspect to the one hundred-forty-third aspect, it is possible to generate the halftone processing rule or perform the halftone process capable of suppressing the image quality deterioration caused by the landing interference. Accordingly, it is possible to acquire the image having tolerance to the landing interference and favorable image quality.

BRIEF DESCRIPTION OF THE DRAWINGS

FIG. 7 is an explanatory diagram of a characteristic parameter related to landing interference.

FIG. 13 is an explanatory diagram showing that the error in which a dot diameter is decreased by a predetermined amount is added to dots of pixels of a third path in a case where the drawing is performed in the drawing mode shown in FIG. 12A.

FIG. 44 is a flowchart of the method of generating a halftone processing rule according to the application example of the fifth embodiment.

FIG. 45 is a flowchart of a first modification example of the method of generating a halftone processing rule according to the application example of the fifth embodiment.

FIG. 49 is an explanatory diagram of a printing mode.

DESCRIPTION OF THE PREFERRED EMBODIMENTS

Hereinafter, embodiments of the present invention will be described in detail with reference to the accompanying drawings.

Figure 1:
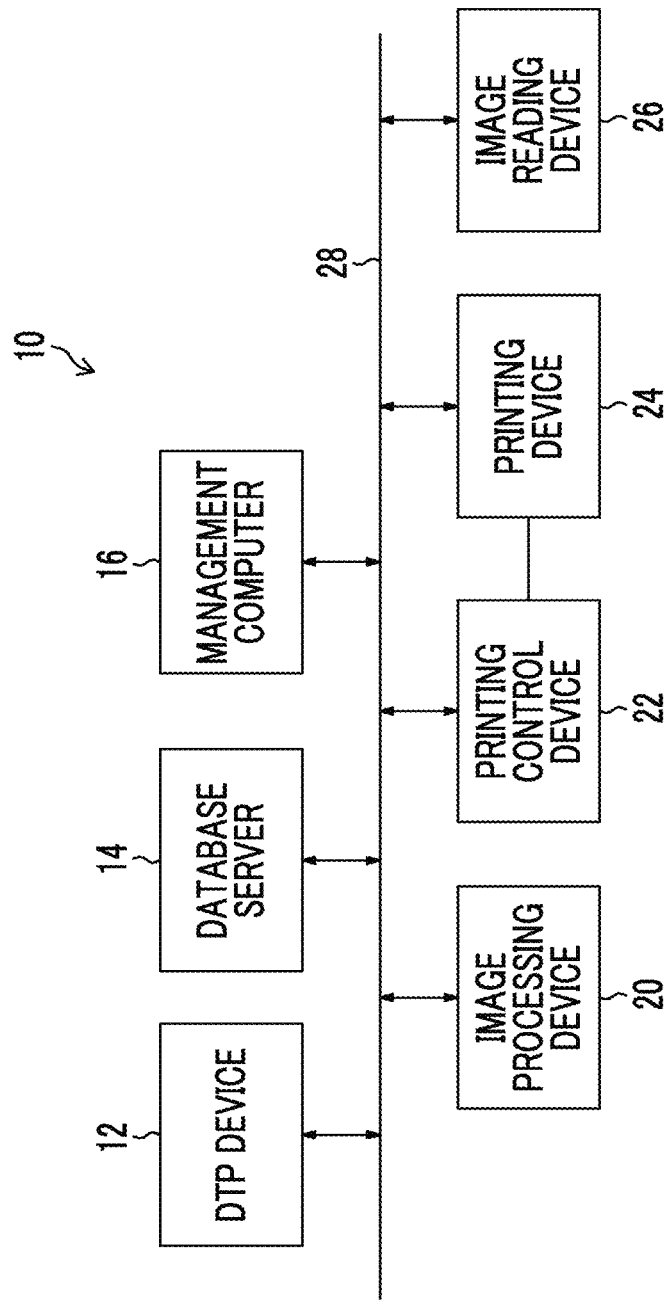
FIG. 1 is a block diagram showing a configuration example of a printing system according to an embodiment of the present invention.

FIG. 1 is a block diagram showing a configuration example of a printing system according to an embodiment of the present invention. A printing system 10 includes a desk top publishing device (DTP) 12, a database server 14, a management computer 16, an image processing device 20, a printing control device 22, a printing device 24, and an image reading device 26. The image processing device 20 is connected to the DTP device 12, the database server 14, the management computer 16, the printing control device 22 and the image reading device 26 via an electric communication line 28.

The electric communication line 28 may be a local area network (LAN), a wide area network (WAN), or may be a combination thereof. The electric communication line 28 is not limited to a wired communication line, and a part of the electric communication line or the entire electric communication line may be a wireless communication line. In the present specification, the term "connection" between devices capable of delivering a signal is not limited to a wired connection, and includes a wireless connection.

The DTP device 12 is a device that generates manuscript image data indicating the content of an image desired to be printed. The DTP device 12 is realized by combining hardware and software of a computer. The term "software" is a synonym for a program. The DTP device 12 is used to perform an operation of editing various kinds of image components such as characters, figures, patterns, illustrations and photographic images which are desired to be printed and laying the image components out on a printing surface.

The manuscript image data as print source image data is generated by the editing operation performed by the DTP device 12. The DTP device 12 generates an electronic manuscript using a page description language (PDL). The manuscript image data generated by the DTP device 12 is transmitted to the database server 14 or the image processing device 20. Means for generating the manuscript image data is not limited to an aspect in which the manuscript image data is generated by the DTP device 12, and may include an aspect in which the manuscript image data is generated by another computer or an image creating and editing device (not shown). The manuscript image data may be input to the database server 14, the image processing device 20, or the printing control device 22 via the electric communication line 28 or using a removal media (external storage medium) such as a memory card.

The database server 14 is a device that manages various data items such as a job ticket of the electronic manuscript, color sample data, target profile, and device profile appropriate for a combination of the printing device 24 and paper. For example, the job ticket may be in the form of a job definition format (JDF) file.

The management computer 16 performs various managements in the printing system 10. For example, the management computer performs an image management, a printing job management, and an operation status management of one or plurality of printing devices 24.

The image processing device 20 functions as means for performing rasterizing on the printing manuscript image data (for example, data described using a page description language) generated by the DTP device 12. The rasterizing process is called a raster image processor (RIP) process. The image processing device 20 may realize one function of a RIP device.

The image processing device 20 has a halftone processing function and a color conversion function of converting the printing manuscript image data which is a continuous-tone image into each color dot-patterned data appropriate for the output of the printing device 24. The image processing device 20 of the present example has a function of generating two or more halftone processing rules for the halftone processing function, based on characteristic parameter of the printing device 24 of the printing system 10. That is, the image processing device 20 has a halftone process generation function of generating the halftone processing rule and a halftone processing function of performing the halftone process on the continuous-tone image using the generated halftone processing rules. The image processing device 20 may be realized by combining the hardware and the software of the computer.

The halftone processing rule is a processing rule for performing the halftone process of converting data of the continuous-tone image into data of a halftone image which is the dot-patterned data. The halftone processing rule is defined by a combination of a halftone algorithm and a halftone parameter. The halftone processing rule means a specific calculation mechanism of the halftone process, and specifies the content of the halftone process.

For example, as the kind of the halftone algorithm, there are a dither method, an error diffusion method, and a direct binary search method. The halftone parameter is a specific parameter used in a calculation process according to the halftone algorithm. The halftone parameter is determined for each halftone algorithm. For example, as the halftone parameter in the dither method, a size and a threshold value of a dither matrix are determined. As the halftone parameter in the error diffusion method, there are a matrix size of an error diffusion matrix, an error diffusion coefficient, and setting of an applied gradation section of each error diffusion matrix. As the halftone parameter in the direct binary search method, there are a pixel update number indicating the number of times of a process of replacing (exchanging) pixels is performed, and an exchange pixel range indicating a pixel range in which the pixels are replaced. A parameter for evaluating tolerance to a system error may be added to the halftone parameter in each halftone algorithm. When the halftone processing rule is generated, at least one parameter of the plurality of parameters described above is specified as the halftone parameter.

The specific content of the processing function of the image processing device 20 will be described below. The data of the halftone image generated by the image processing device 20 is supplied to the printing control device 22, and thus, a target image is printed by the printing device 24.

The printing control device 22 controls a printing operation performed the printing device 24 based on the print image data generated by the image processing device 20. The printing device 24 is image forming means for printing the image data according to the control of the printing control device 22. A printing method or the kind of color material to be used in the printing device 24 is not particularly limited. For example, as the printing device 24, various kinds of printing devices such as an ink jet printing machine, an electrophotographic printer, a laser printer, an offset printing machine and a flexographic printing machine may be adopted. The term "printing device" is understood as a synonym for a printing machine, a printer, an image recording device, an image forming device and an image output device. As the color material, ink or toner may be used depending on the kind of the printing device 24.

Here, an example in which an ink jet printing machine which is an example of a non-plate type digital printing machine is used as the printing device 24 will be described. In the printing system 10 according to the present embodiment, an ink jet printing machine capable of forming a color image using four color inks of cyan (C), magenta (M), yellow (Y) and black (K) is used as an example of the printing device 24. However, the number of colors of the inks or a combination thereof is not limited to this example. For example, in addition to four colors of CMYK, an aspect in which light color inks such as light cyan (LC) and light magenta (LM) are added, or an aspect in which special color inks such as red and green are used may be applied.

Although an aspect in which the printing control device 22 and the printing device 24 are depicted as separate blocks and a signal is delivered between these devices through the wired or wireless communication connection has been shown in FIG. 1, the present embodiment is not limited to such a configuration, and a printing device in which the printing control device 22 and the printing device 24 are integrally combined may be used.

In a case where a plate type printing machine using a printing plate is adopted as the printing device 24, the printing system includes a plate making device (not shown) such as a plate recorder that makes a printing plate from the image data in addition to the printing control device 22. In this case, the plate making device such as the plate recorder, a controller thereof, and a printing machine that prints the image data using the printing plate made by the plate making device are connected to the electric communication line 28. In a case where the plate type printing machine is used, the configuration in which the printing control device 22, the plate making device (not shown) and the printing device 24 are combined can be comprehended as the "printing device" as a whole. The printing device 24 corresponds to one example of an "image forming unit".

The image reading device 26 is means for reading an image of a printed material printed by the printing device 24 and generating electronic image data indicating the read image. The image reading device 26 includes an imaging element (photoelectric conversion element) that images the image of the printed material and converts the imaged image information into an electric signal, and a signal processing circuit that processes the signal acquired from the image element and generates digital image data.

As the image reading device 26, a separate scanner (for example, a flatbed scanner, that is, an office scanner capable of being used online) from the printing device 24 may be used. The image reading device 26 may be combined with the printing device 24. For example, line sensors (image units) for reading the image may be provided in a paper transport path of the printing device 24, and a print image may be read by the line sensors while transporting the printed material on which the image has formed. The line sensor for reading the image which is provided in the paper transport path in the printing device 24 is referred to as the term "inline scanner" or "inline sensor" in some cases. The image reading device 26 corresponds to one example of "image reading means".

The read image data of the print image generated by the image reading device 26 is input to the image processing device 20. The image processing device 20 has a function of analyzing the read image data acquired from the image reading device 26.

<Variation of System Configuration>

The functions of the DTP device 12, the database server 14, the management computer 16, the image processing device 20 and the printing control device 22 may be realized by one computer, or may be realized by a plurality of computers. The roles and functions of the respective computers may be shared in various forms. For example, the functions of the DTP device 12 and the image processing device 20 may be realized by one computer, or the function of the image processing device 20 may be offered within the management computer 16. The function of the image processing device 20 and the function of the printing control device 22 may be realized by one computer. The function of the image processing device 20 may be shared and realized by a plurality of computers.

The numbers of DTP devices 12, database servers 14, management computers 16, image processing devices 20, printing control devices 22, printing devices 24, image reading devices 26 and plate making devices which are included in the present system are not particularly limited.

A network system in which the DTP device 12, the database server 14, the management computer 16, the image processing device 20 and the printing control device 22 are connected to the electric communication line 28 has been described in the present example. However, when the present invention is implemented, the respective elements may not be necessarily connected to the communication network.

<Hardware Configuration of Image Processing Device 20>

Figure 2:
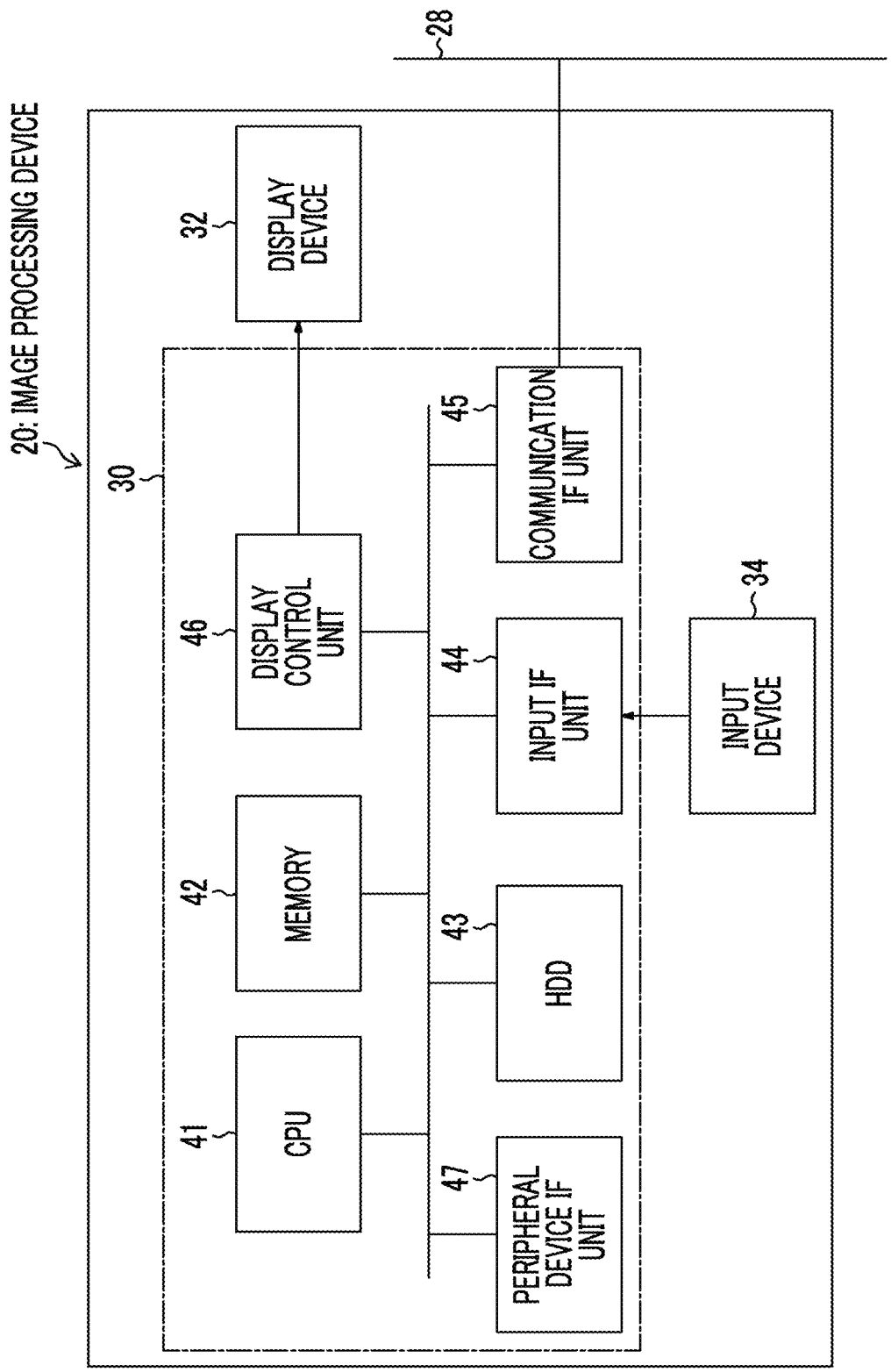
FIG. 2 is a block diagram showing a hardware configuration example of an image processing device.

FIG. 2 is a block diagram showing a hardware configuration example of the image processing device 20. The image processing device 20 of the present example is realized using a personal computer (PC). That is, the image processing device 20 includes a PC main body 30, a display device 32, and an input device 34. The term "PC" means a personal computer, and includes various types of computers such as a desktop computer, a laptop computer and a tablet computer. The PC main body 30 includes a central processing unit (CPU) 41, a memory 42, a hard disk drive (HDD) 43 as a storage device that stores and retains various programs or data items, an input interface unit 44, a communication interface unit 45 for network connection, a display control unit 46, and a peripheral device interface unit 47.

The image reading device 26 described in FIG. 1 may be connected to the image processing device 20 through the peripheral device interface unit 47 of FIG. 2.

For example, as the display device 32, a liquid crystal display or an organic electro-luminescence (EL) display may be used. The display device 32 is connected to the display control unit 46. The input device 34 may adopt various means such as a keyboard, a mouse, a touch panel and a trackball, and may be an appropriate combination thereof. In the present example, as the input device 34, a keyboard and a mouse are used. The input device 34 is connected to the input interface unit 44. The display device 32 and the input device 34 function as a user interface (UI). An operator (user) may input various information items by using the input device 34 while viewing the content displayed on a screen of the display device 32, and may operate the image processing device 20 or the printing device 24. The operator can comprehend (check) a system state through the display device 32.

Various programs or data items required for the image processing are stored in the hard disk drive 43. For example, chart data of a characteristic parameter acquisition chart, a calculation program for generating a characteristic parameter, an image processing program including a process of generating the halftone processing rule, and a program of generating a halftone selection chart are stored. The programs stored in the hard disk drive 43 are loaded to the memory 42, and the loaded programs are executed by the CPU 41. Thus, various means defined by the programs are functioned.

The same hardware configurations as those of the PC main body 30, the display device 32 and the input device 34 shown in FIG. 2 may be adopted as the hardware configurations of the DTP device 12, the database server 14, the management computer 16 and the printing control device 22 described in FIG. 1.

<Description related to Function of Image Processing Device 20>

Figure 3:
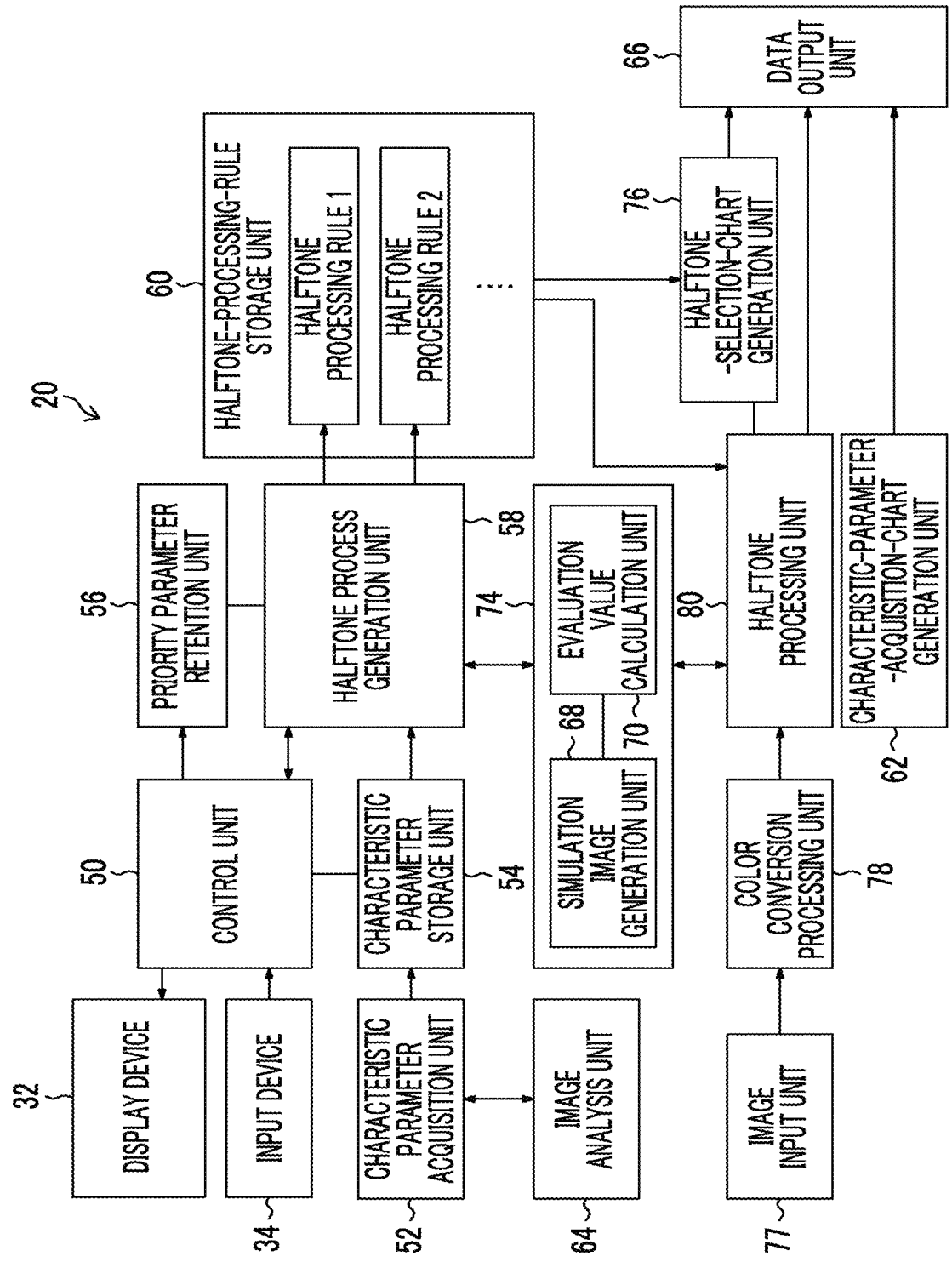
FIG. 3 is a block diagram for describing a function of an image processing device according to a first embodiment.

FIG. 3 is a block diagram for describing a function of an image processing device 20 according to a first embodiment. The image processing device 20 includes a control unit 50, a characteristic parameter acquisition unit 52, a characteristic parameter storage unit 54, a priority parameter retention unit 56, a halftone process generation unit 58, and a halftone-processing-rule storage unit 60.

The control unit 50 controls the operations of the respective units of the image processing device 20. The characteristic parameter acquisition unit 52 is means for acquiring a characteristic parameter related to the characteristics of the printing system 10 including the printing device 24 described in FIG. 1. For example, in an ink jet printing system, as the characteristic parameter related to the characteristics of the printing system, there are resolution, the number of nozzles, an ink kind, an average dot density, an average dot diameter, an average dot shape, and a dot density, a dot diameter, a dot shape, a dot forming position shift, non-jetting and landing interference of each printing element. Information related to at least one of the parameters described herein, preferably, the plurality of parameters is acquired through the characteristic parameter acquisition unit 52.

The dot forming position shift is a concept for comprehensively representing that a position in which a dot is actually formed is shifted from an ideal dot forming position in which a dot is formed. The "ideal position in which a dot is formed" is a target position in design and indicates a dot forming position in a state in which it is assumed that there is no error. There are various causes of the dot forming position shift. For example, there are the bending of each printing element in a jetting direction, a variation in jetting speed of each printing element, a shift in jetting timing of each printing element, a shift in jetting timing between outward scanning and inward scanning in bidirectional scanning, a shift in position between the outward scanning and the inward scanning in the bidirectional scanning, the bending of the outward scanning and the inward scanning in the bidirectional scanning in the jetting direction, a shift in jetting timing of each scanning path of a plurality of scanning paths, a shift in position of each scanning path, and bending of each scanning path in the jetting direction. The dot forming position shift is generated by the cause including at least one of the causes described herein. The "bending of a nozzle in a jetting direction" means "jetting bending".

Among various characteristic parameters described above, since parameters such as a dot density, a dot diameter, a dot shape and landing interference of each printing element are changed depending on a combination of the characteristics of the recording head, an ink or a printing medium to be used and the dot forming position shift or the non-jetting is changed by the state of the recording head, if appropriate values are input as these various parameters by the user, an operation load is increased. The characteristics of the recording head include a waveform or a frequency of a driving signal applied to the recording head when the ink is jetted, and the state of the recording head includes, for example, the inclining or bending of the recording head and indicates a distance from the printing medium or a state of each printing element.

The printing element means a recording element serving to record the dot in the printing device 24. In the case of an ink jet printing device, a nozzle for jetting an ink in an ink jet head corresponds to the "printing element". In the case of a printing device using a relief plate, a relief of a protrusion portion of a halftone dot in the plate corresponds to the "printing element".

The characteristics of the printing system include at least one of individual recording characteristics of a plurality of printing elements or common characteristics of the plurality of printing elements. The individual recording characteristics of the printing elements include at least one of a dot density, a dot diameter, a dot shape, a dot recording position error, or unrecordable abnormality. In the ink jet printing device, the dot recording position error corresponds to the "dot forming position shift", and the unrecordable abnormality corresponds to the "non-jetting".

The "common characteristics" of the plurality of printing elements include at least one of an average dot density, an average dot diameter, an average dot shape, or landing interference.

A method of acquiring the characteristic parameter may be performed by causing the printing device 24 to output the characteristic parameter acquisition, causing the image reading device 26 (see FIG. 1) such as the inline scanner or the office scanner to read the characteristic parameter acquisition chart and to analyze the read image.

Among the resolution, the number of nozzles, the ink kind, the average dot density, the average dot diameter, the average dot shape, and the dot density, the dot diameter, the dot shape, the dot forming position shift, the non-jetting and the landing interference of each printing element, the resolution, the number of nozzles and the kind of the ink are characteristic parameters related to the system specification.

Accordingly, it is preferable that the characteristic parameters related to the system specifications are previously retained within the system. It is preferable that data of the characteristic parameter acquisition chart for acquiring the parameters related to the individual characteristics of the system is generated based on the resolution, the number of nozzles and the kind of the ink which are the characteristic parameters related to the system specification or data of the characteristic parameter acquisition chart is selected from data items of a plurality of characteristic parameter acquisition charts that is previously retained within the system, the characteristic parameter acquisition chart is output by the printing device 24 of the printing system 10, the characteristic parameter acquisition chart is read from the image reading device 26 (see FIG. 1), and various characteristic parameter related to the characteristics specific to the printing device 24 are acquired.

In addition, as the characteristic parameters related to the system specification, there are a droplet kind, unidirectional scanning or bidirectional scanning, a scanning speed, the amount of transported printing media, and a jetting frequency. It is preferable that the data of the characteristic parameter acquisition chart is generated based on at least one the characteristic parameter related to the system specification which includes the characteristic parameters.

The image processing device 20 of the present example includes a characteristic-parameter-acquisition-chart generation unit 62 and an image analysis unit 64, as means for automatically acquiring the characteristic parameters related to the characteristics of the printing system 10.

The characteristic-parameter-acquisition-chart generation unit 62 is a processing unit that generates chart data for the characteristic parameter acquisition chart including the parameters for acquiring the characteristic parameters related to the characteristics of the printing system. The chart data generated by the characteristic-parameter-acquisition-chart generation unit 62 is sent to the printing control device 22 (see FIG. 1) through the data output unit 66, and the characteristic parameter acquisition chart is printed by the printing device 24.

The combination of the characteristic-parameter-acquisition-chart generation unit 62 and the configuration in which the characteristic parameter acquisition chart is output by the printing device 24 (see FIG. 1) based on the chart data generated by the characteristic-parameter-acquisition-chart generation unit 62 corresponds to one example of "characteristic-parameter-acquisition-chart output means". The characteristic-parameter-acquisition-chart generation unit 62 corresponds to one example of "characteristic-parameter-acquisition-chart generation means".

An example of the characteristic parameter acquisition chart will be described below in detail, but a single dot pattern of each printing element by a head of each color of the ink may be the characteristic parameter acquisition chart. The single dot pattern is a pattern which is obtained by isolating each dot from another dot without overlapping another dot and individually jetting dots. The chart of the single dot pattern is read, and thus, the parameters related to the dot density, dot diameter, dot shape, dot forming position shift and non-jetting of each printing element can be read.

The characteristic parameter acquisition chart may include a continuous dot pattern in which a plurality of dots overlaps in addition to the single dot pattern. The continuous dot pattern may include a continuous dot pattern in which an inter-dot distance between two dots is changed and the dots are jetted such that apart of each dot overlaps a part of another dot. Such a continuous dot pattern is used to acquire a parameter of a dot deformation amount due to landing interference.

In a case where there the droplet kind of the present printing system 10 is one, a single dot pattern may be formed by independently jetting one kind of dot, and a continuous dot pattern may be formed by jetting a plurality of dots so as to overlap each other. In a case where the droplet kind of the present printing system is plural, a single dot pattern may be formed by independently jetting the respective kinds of dots, and a continuous dot pattern may be formed by jetting a combination of the respective kinds of dots so as to overlap each other.

When the characteristic parameter acquisition chart is output, a single dot of the same printing element may be printed multiple times, and the average values of the dot densities, the dot diameters, the dot shapes and the dot forming position shifts thereof may be the dot density, the dot diameter, the dot shape and the dot forming position shift of the printing element. An average dot density, an average dot diameter and an average dot shape may be acquired by averaging the dot densities, the dot diameters and the dot shapes of the respective printing elements.

In a case where a tolerance deign to the system error is performed, a variance $\sigma^2$ indicating a variation in an average value of measurement values acquired by reading the characteristic parameter acquisition chart may be calculated, and a value of a standard deviation a which is the square root of the variation a may be used as a predetermined amount of an error to be used later.

A printing result of the characteristic parameter acquisition chart printed by the printing device 24 is read by the image reading device 26, and the data of the read image of the characteristic parameter acquisition chart is acquired.

The image analysis unit 64 functions as a characteristic parameter generation unit that analyzes the read image read by the image reading device 26 and generates information of the characteristic parameter. The information of the characteristic parameter is automatically acquired from the characteristic parameter acquisition chart by the image analysis unit 64. The image analysis unit 64 corresponds to one example of "image analysis means".

That is, the characteristic parameter acquisition unit 52 of the image processing device 20 is configured to automatically acquire the characteristic parameter from a result measured by analyzing the read image of the characteristic parameter acquisition chart. The combination of the image analysis unit 64 and the characteristic parameter acquisition unit 52 correspond to one example of "characteristic parameter acquisition means".

The information of the characteristic parameter acquired through the characteristic parameter acquisition unit 52 is stored in the characteristic parameter storage unit 54. The characteristic parameters related to the system specification may be previously stored in the characteristic parameter storage unit 54.

The halftone process generation unit 58 generates the halftone processing rule that defines the processing content of each of two or more kinds of halftone processes of which the balances of priority for a plurality of requirements required in the halftone process are different based on the characteristic parameters. The image processing device 20 includes an image quality evaluation processing unit 74 that includes a simulation image generation unit 68 and an evaluation value calculation unit 70, and the halftone process generation unit 58 generates the two or more kinds of halftone processing rules in cooperation with the image quality evaluation processing unit 74. The halftone process generation unit 58 corresponds to one example of "halftone process generation means". The evaluation value calculation unit 70 corresponds to one example of "evaluation value calculation means". The image quality evaluation processing unit 74 corresponds to one example of "image quality evaluation means".

The image quality evaluation processing unit 74 performs an optimum searching process in which an evaluation value is enhanced while repeatedly performing the generation of the simulation image and the calculation of the evaluation value of the image quality for the simulation image. The halftone parameter is determined through the process performed by the image quality evaluation processing unit 74.

The multiple kinds of halftone processing rules generated by the halftone process generation unit 58 are registered in the halftone-processing-rule storage unit 60. For the sake of convenience in the illustration, it has been described in FIG. 3 that two kinds of different halftone processing rules 1 and 2 are generated and the halftone processing rules 1 and 2 are stored and retained in the halftone-processing-rule storage unit 60. However, in a case where K is an integer which is equal to or greater than 2, K or more kinds, that is, multiple kinds of halftone processing rules may be generated. All or a part of the K kinds of generated halftone processing rules 1, 2, . . . , and K may be registered as a line-up in the halftone-processing-rule storage unit 60. The halftone-processing-rule storage unit 60 corresponds to one example of halftone registration means. Multiple kinds of halftone processing rules as candidates of the halftone process capable of being used in the printing system 10 may be registered in the halftone-processing-rule storage unit 60. The halftone processing rule actually used in the printing is determined among the plurality of halftone processing rules generated in the halftone process generation unit 58.

The image processing device 20 of the present example includes a halftone-selection-chart generation unit 76 as selection supporting means for selecting any one halftone processing rule of the plurality of halftone processing rules.

The halftone-selection-chart generation unit 76 generates chart data of the halftone selection chart in which the printing results of the halftone images acquired by two or more kinds of halftone processing rules are arranged so as to be compared. The chart data generated by the halftone-selection-chart generation unit 76 is sent to the printing control device 22 (see FIG. 1) through the data output unit 66, and the halftone selection chart is printed by the printing device 24.

The combination of the halftone-selection-chart generation unit 76 and the printing device 24 corresponds to one example of "halftone-selection-chart output means".

A user can select a desired halftone processing rule while viewing the output result of the halftone selection chart. A selection operation of the halftone processing rule performed by the user is performed using the input device 34. The input device 34 functions as "halftone selection operating means" for allowing the user to perform the selection operation of the desired halftone processing rule. That is, the input device 34 functions as halftone selection operating means for receiving a user operation for allowing the user to select the kind of any one halftone process from the two or more kinds of halftone processes used to generate the halftone selection chart.

The input device is not limited to the function of selecting the halftone processing rule by the user, and may have a function of allowing the system to automatically select one halftone processing rule. In this case, it is necessary to previously retain priority parameters related to the priorities for the plurality of requirements in the halftone process. Priority parameters that designate the balances of priority related to the plurality of requirements are stored in the priority parameter retention unit 56. The priority parameter retention unit 56 corresponds to one example of priority parameter retention means.

The priority parameter may be freely input by the user through the input device 34. The balances of priority may be set and the setting content may be changed. Alternatively, as the priority parameter, one kind or multiple kinds of selection candidates may be previously prepared on the system. In a case where multiple kinds of selection candidates related to the setting of the priority parameter are prepared, the user can select any one selection candidate through the input device 34 in consideration of the printing purpose or usage and productivity.

The balances of priority for the requirements may be designated by the priority parameter, and thus, one optimum halftone processing rule recommended on the system may be uniquely determined according to the priority parameter specified by the priority parameter retention unit 56. The automatic selection function may be realized by the control unit 50, and the configuration of the control unit 50 serving to perform the automatic selection process corresponds to one example of halftone automatic selection means.

The input device 34 functions as a priority input unit for allowing the user to input a setting related to the priority for each requirement. The halftone processing rule (that is, a combination of the halftone algorithm and the halftone parameter) based on the setting of the priority and the halftone processing rule which is the balance of the priority symmetrical with the balances of priority related to the user setting may be generated depending on the priority set by the user, and these halftone processing rules may be compared.

The balance of the priority may be slightly adjusted with the priority set by the user as its reference, and the plurality of halftone processing rules may be generated based on the plurality of set balances of the priority.

The image processing device 20 has a function of performing the halftone process on the data of the continuous-tone image according to the generated halftone processing rule. That is, the image processing device 20 includes an image input unit 77, a color conversion processing unit 78, and a halftone processing unit 80.

The image input unit 77 is an input interface unit that inputs the data of the manuscript image, and functions as an image data acquisition unit. The image input unit 77 may be a data input terminal that inputs the manuscript image data from another signal processing unit outside or inside the device. As the image input unit 77, a wired or wireless communication interface unit may be adopted, a media interface unit that performing reading and writing on an external storage medium (removable disk) such as a memory card may be adopted, or an appropriate combination thereof may be adopted.

The color conversion processing unit 78 performs the color converting process on the manuscript image data by using color profile in accordance with the form of ICC profile by the International Color Consortium (ICC), and generates a color image signal appropriate for outputting performed by the printing device 24. In a case where four color inks of CMYK are used in the printing device 24, image signals of CMYK are generated by the color conversion processing unit 78. In addition to CMYK, in a case where six color inks which include light magenta (LM) and light cyan (LC) are used, image signals which include the respective color components of CMYK, LM and LC are generated by the color conversion processing unit 78.

The halftone processing unit 80 performs the halftone process on the continuous-tone images of the respective colors by using the halftone processing rule generated by the halftone process generation unit 58, and generates the halftone image. The data of the halftone image generated by the halftone processing unit 80 is sent to the printing control device 22 (see FIG. 1) through the data output unit 66, and the printing is performed by the printing device 24.

A method of acquiring the printed material by performing the printing on the printing medium by the printing device 24 based on the halftone image generated through the process by the halftone processing unit 80 may be comprehended as a method of manufacturing the printed material.

The image quality evaluation processing unit 74 of the image processing device 20 may calculate the evaluation value of the printing halftone image in cooperation with the halftone processing unit 80. Information of the evaluation value related to the halftone image generated by the halftone processing unit 80 may be displayed on the screen of the display device 32, and may be supplied to the outside through the data output unit 66.

<Procedure of Determining Halftone Processing Rule in Printing System>

Figure 4:
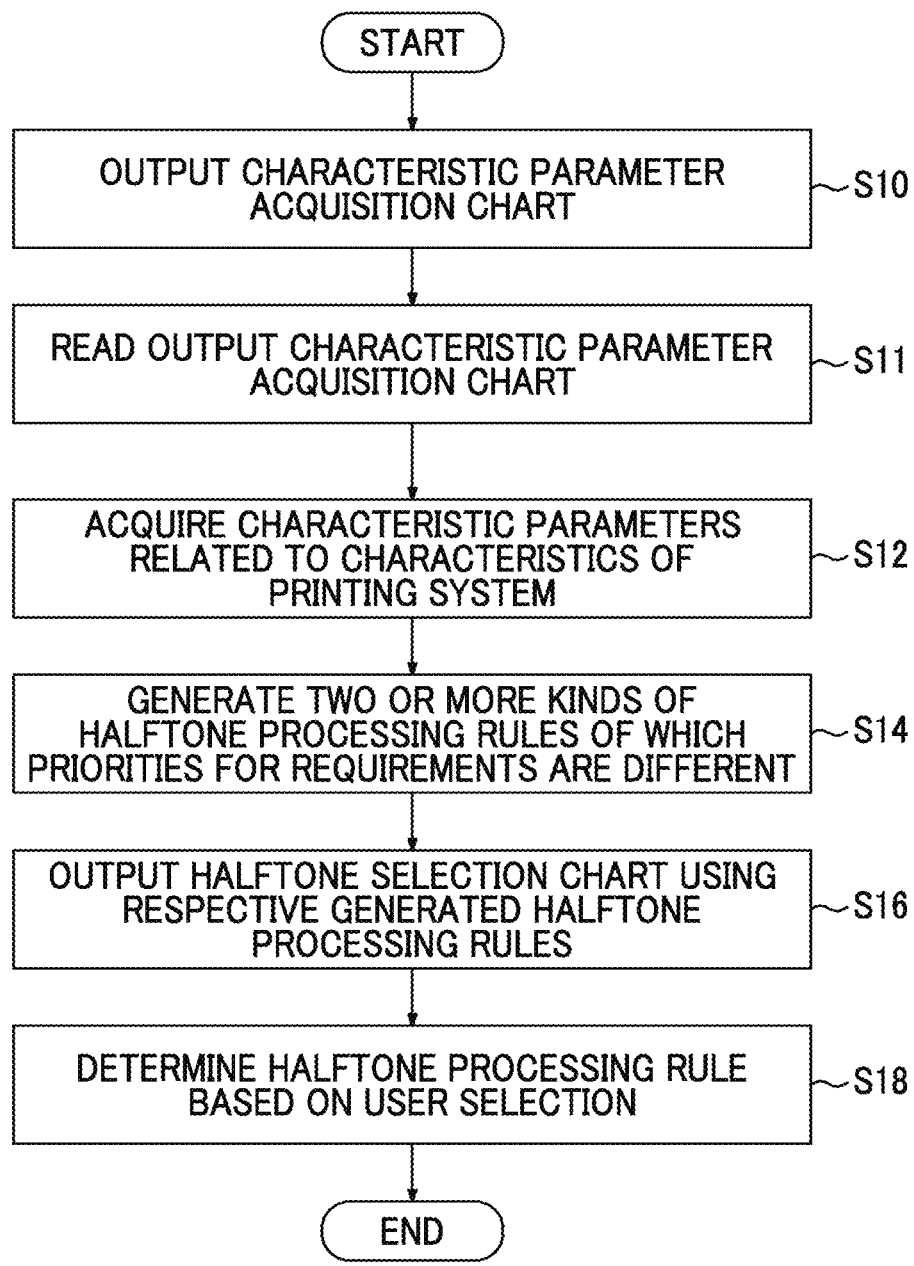
FIG. 4 is a flowchart showing an example of a method of generating a halftone processing rule.

A method of determining the halftone processing rule in the printing system 10 according to the present embodiment will be described in detail. FIG. 4 is a flowchart showing an example of a method of generating the halftone processing rule according to the present embodiment.

Initially, in order to acquire the characteristic parameters related to the characteristics of the printing system 10, the characteristic parameter acquisition chart is generated, and the characteristic parameter acquisition chart is output by the printing device 24 (see FIG. 1) (step S10 of FIG. 4). Step S10 corresponds to one example of a "characteristic-parameter-acquisition-chart output step".

Subsequently, the characteristic parameter acquisition chart output in step S10 is read (step S11). In step S11, the printed material of the characteristic parameter acquisition chart is read by the image reading device 26 (sec FIG. 1), and the read image of the characteristic parameter acquisition chart is acquired. Step S11 of FIG. 4 corresponds to one example of an "image reading step".

Subsequently, the read image acquired in step S1 is analyzed, and the characteristic parameters related to the characteristics of the printing system are acquired (step S12). Step S12 is one example of a "characteristic parameter acquisition step".

Subsequently, the two or more kinds of halftone processing rules of which the priorities for the requirements of the halftone process are different are generated (step S14). When the halftone processing rule is generated, multiple kinds of halftone processing rules are generated based on the priority parameter and the characteristic parameter. Step S14 is one example of a halftone process generation step.

The halftone selection chart is output using the respective generated halftone processing rules (step S16). Steps S16 is one example of a "halftone-selection-chart output step".

The user can select any one halftone processing rule while viewing the output result of the halftone selection chart. The halftone processing rule used in the printing is determined based on the selection operation of the user (step S18). That is, in step S18, the user operation for allowing the user to select the kind of any one halftone process from the two or more kinds of halftone processes used to generate the halftone selection chart is received, and the halftone processing rule is determined based on the selection operation by the user. Step S18 is one example of a halftone selection operating step.

<Example of Characteristic Parameter Acquisition Chart>

A specific example of the characteristic parameter acquisition chart used in the characteristic parameter acquisition step described in step S12 of FIG. 4 will be described.

Figure 5:
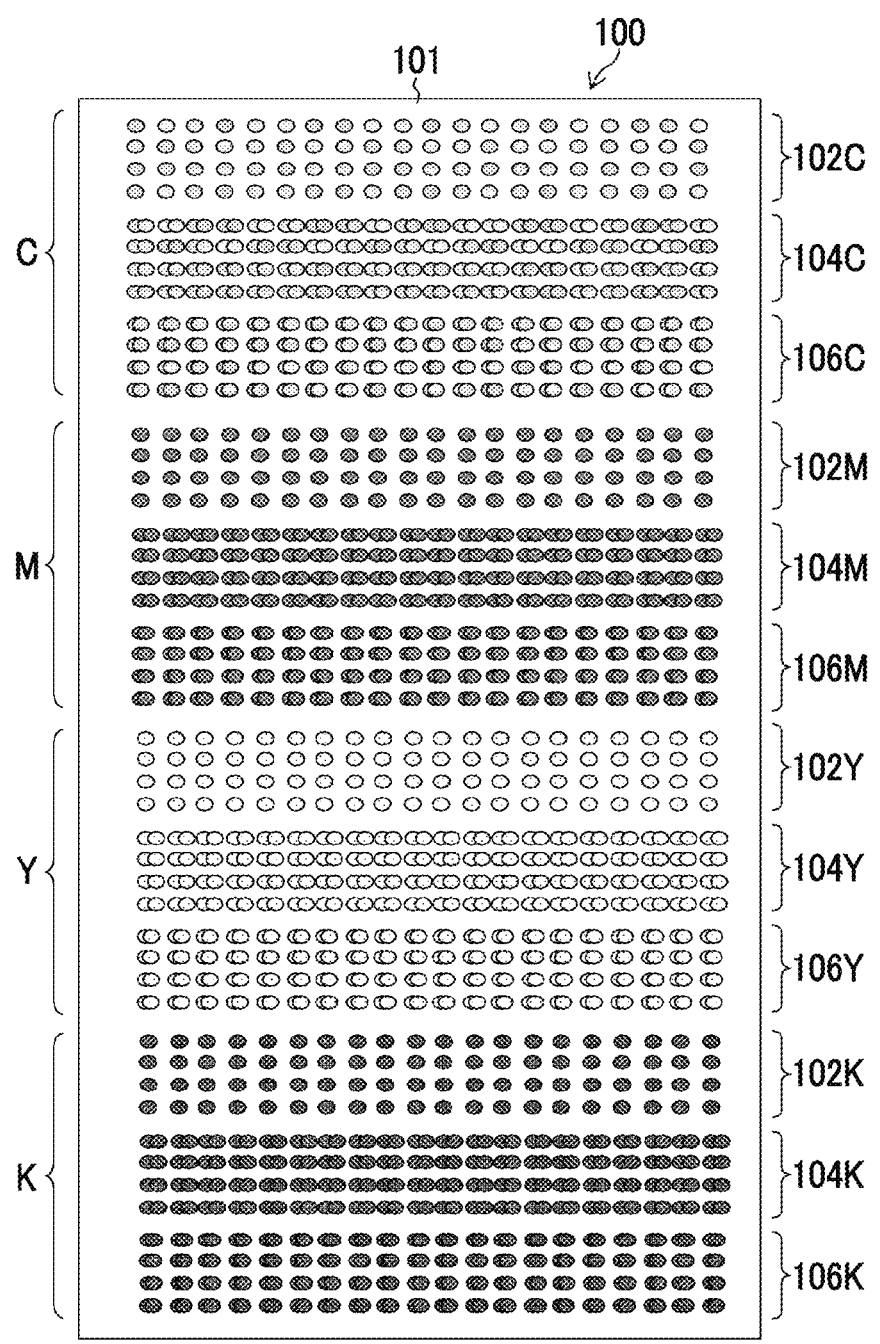
FIG. 5 is a diagram showing an example of a characteristic parameter acquisition chart.

FIG. 5 is a diagram showing an example of a characteristic parameter acquisition chart 100. Here, an example in which single dot patterns 102C, 102M, 102Y and 102K, first continuous dot patterns 104C, 104M, 104Y and 104K and second continuous dot patterns 106C, 106M 106Y and 106K on a printing medium 101 are jetted by the nozzles which are the printing elements in the recording heads of the respective colors of cyan, magenta, yellow and black is illustrated. The single dot patterns 102C, 102M, 102Y and 102K are discrete dot patterns in which dots are discretely recorded in an isolation state in which the single dot is isolated from another dot. The first continuous dot patterns 104C, 104M 104Y and 104K and the second continuous dot patterns 106C, 106M, 106Y and 106K are continuous dot patterns in which two or more dots are recorded so as to be in contact.

The single dot patterns 102C, 102M, 102Y and 102K, the first continuous dot patterns 104C, 104M, 104Y and 104K and the second continuous dot patterns 106C, 106M, 106Y and 106K correspond to one example of a "pattern for acquiring the characteristic parameters". The single dot patterns 102C, 102M, 102Y and 102K correspond to one example of a "discrete dot pattern". The first continuous dot patterns 104C, 104M, 104Y and 104K and the second continuous dot patterns 106C, 106M, 106Y and 106K correspond to one example of a "continuous dot pattern".

Figure 6:
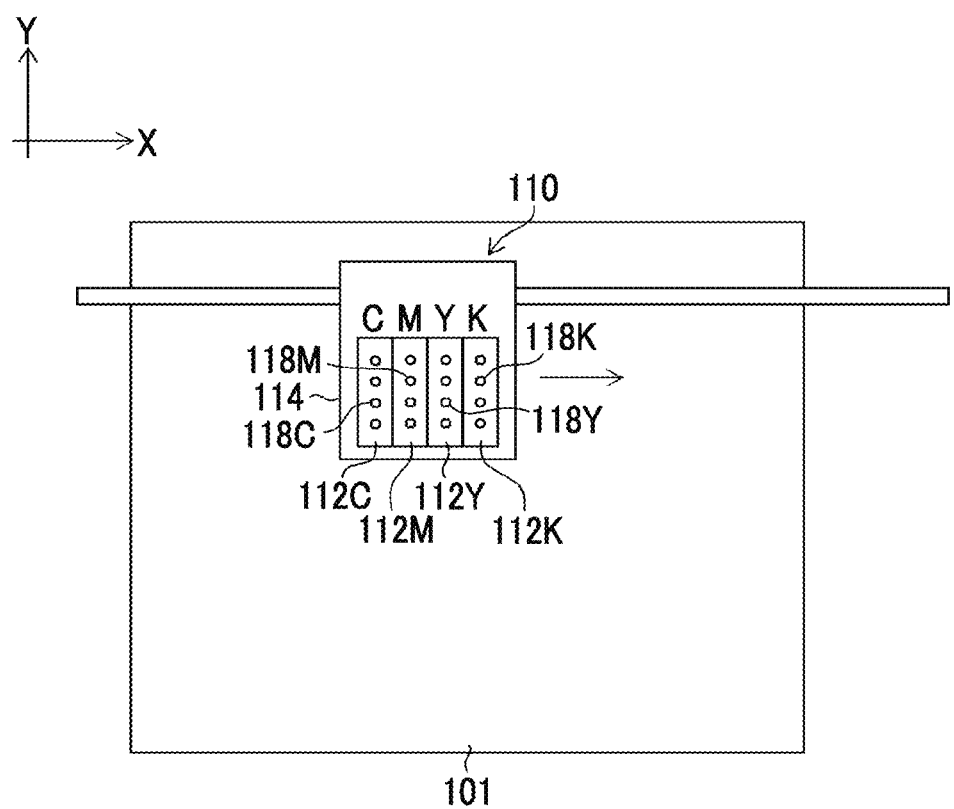
FIG. 6 is a schematic plan view of a serial scan type ink jet printing device used to draw the characteristic parameter acquisition chart of FIG. 5.

FIG. 6 is a schematic plan view of a serial scan type ink jet printing device used to draw the characteristic parameter acquisition chart of FIG. 5. In FIG. 6, for the sake of convenience in the illustration, only four nozzles of the respective colors are illustrated by reducing the number of nozzles of the recording heads of the respective colors. The number of nozzles, the arrangement form of nozzles, and the nozzle density may be variously designed.

As shown in FIG. 6, a head unit 110 of the serial scan type ink jet printing device is configured such that a cyan recording head 112C that jets an cyan ink, a magenta recording head 112M that jets a magenta ink, an yellow recording head 112Y that jets a yellow ink and a black recording head 112K that jets a black ink are mounted on a carriage 114 and can be moved in reciprocating motion in an X direction of FIG. 6. A Y direction perpendicular to the X direction is a transport direction of the printing medium 101. The X direction corresponds to a "main scanning direction", and the Y direction corresponds to a "sub scanning direction".

The detailed structure of the respective recording heads of the cyan recording head 112C, the magenta recording head 112M, the yellow recording head 112Y and the black recording head 112K are not shown. However, each of the ink jet type recording heads includes jetting energy generating elements (for example, piezoelectric elements or heat generating elements) that generate jetting energy required to jet the inks depending on the respective nozzles. The respective recording heads (112C, 112M, 112Y and 112K) jet ink liquid droplets on demand in response to driving signals and jetting control signals applied from the printing control device 22 (see FIG. 1).

The droplets are jetted from the respective nozzles 118C of the cyan recording head 112C in an appropriate timing while moving the carriage 114 of FIG. 6 in the X direction, and thus, the single dot pattern denoted by reference numeral 102C of FIG. 5 can be formed. After the single dot pattern 102C is drawn using the cyan ink, a recording region in the printing medium 101 is changed by transporting the printing medium 101 in the Y direction, and the droplets are jetted from the respective nozzles 118C of the cyan recording head 112C in an appropriate timing while moving the carriage 114 in the X direction. Thus, the first continuous dot pattern denoted by reference numeral 104C of FIG. 5 can be formed. After the first continuous dot pattern 104C is drawn using the cyan ink, the recording region in the printing medium 101 is changed by transporting the printing medium 101 in the Y direction, and the droplets are jetted from the respective nozzles 118C of the cyan recording head 112C in an appropriate timing while moving the carriage 114 in the X direction. Thus, the second continuous dot pattern denoted by reference numeral 106C of FIG. 5 can be formed.

In the first continuous dot pattern 104C and the second continuous dot pattern 106C, the inter-dot distances between the dots overlapping each other are differently set. Multiple kinds of continuous dot patterns are recorded by changing the inter-dot distances, and thus, the characteristic parameter related to the relationship between an inter-dot distanced and the deformation amount due to the influence of the landing interference can be comprehended.

Although it has been described in FIG. 5 that two kinds of continuous dot patterns (104C and 106C) in which the inter-dot distances are different are used, three or more kinds of continuous dot patterns may be formed by changing the inter-dot distances.

Subsequently to the recording of the dot patterns (102C, 104C and 106C) using the cyan ink, the droplets from the respective nozzles 118M of the magenta recording head 112M, the droplets from the respective nozzles 118Y of the yellow recording head 112Y, and the droplets from the respective nozzles 118K of the black recording head 112K are sequentially jetted in a similar manner. Thus, the characteristic parameter acquisition chart 100 shown in FIG. 5 is generated.

Information items related to the dot density, the dot diameter, the dot shape, the dot forming position shift and the non-jetting of each printing element of each color may be acquired from each of the single dot patterns 102C, 102M, 102Y and 102K of the respective colors. A statistical process is performed on the measurement results of a plurality of single dots, and thus, it is possible to acquire the average dot density, the average dot diameter, the average dot shape and the standard deviation a (square root of the variation $\sigma^2$) thereof. The standard deviation a or the variance a calculated for at least one item of the dot density, the dot diameter, the dot shape or the dot forming position shift of each printing element corresponds to one example of "dispersion information related to dispersion of a dot".

Information of the characteristic parameter related to the landing interference can be acquired from the first continuous dot patterns 104C, 104M, 104Y and 104K and the second continuous dot patterns 106C, 106M, 106Y and 106K of the respective colors. The characteristic parameter related to the landing interference refers to information related to a change in inter-dot distance, a change in dot density or a change in dot shape due to the influence of the landing interference which is the interaction between the dots overlapping each other.

<Characteristic Parameter related to Landing Interference>

Figures 8, 9:
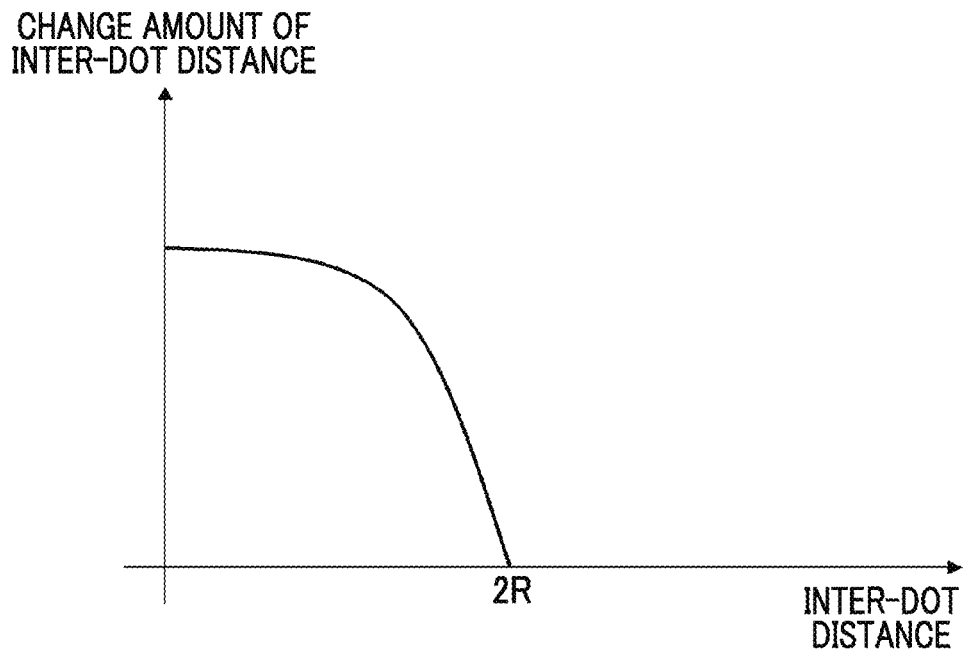
FIG. 8 is a diagram showing a landing interference parameter expressed by a function of an inter-dot distance.
FIG. 9 is a table showing the advantages and disadvantages of various halftone algorithms for a plurality of requirements.

FIGS. 7 and 8 are explanatory diagrams of the characteristic parameter related to the landing interference. The left fields of FIG. 7 represent that the set value of the inter-dot distance between two dots when two dots are continuously jetted by partially overlapping the two dots is differently set in three steps of d1, d2 and d3, and the right fields of FIG. 7 represent that the inter-dot distance is changed due to the influence of the landing interference in a case where the droplets are jetted in the set values of the inter-dot distances d1, d2 and d3. The inter-dot distance means a distance between the centers of the dots.

As shown in the drawings, it is assumed that actual inter-dot distances are u1, u2 and u3 (u1>u2>u3) for the inter-dot distances d1, d2 and d3 (d1>d2>d3) as the set values. Since the dots are drawn due to the landing interference, the relationships of d1>u1, d2>u2, and d3>u3 are satisfied.

The data of the change in the inter-dot distance due to the influence of the landing interference is acquired by changing the setting of the inter-dot distance, and thus, it is possible to acquire landing interference data shown in FIG. 8. A horizontal axis of FIG. 8 denotes a set value of the inter-dot distance, and "R" represents a radius of the dot. A vertical axis of FIG. 8 denotes the change amount by which the inter-dot distance is changed due to the influence of the landing interference, and represents an absolute value of di−ui of FIG. 7 (i=1, 2 and 3). "2R" on the horizontal axis of FIG. 8 represents a position in which two dots are circumscribed. If the inter-dot distance is greater than 2R, since the dots do not overlap each other, there is no influence of the landing interference. In a case where the inter-dot distance is set to be smaller than 2R, the dots overlap each other, and the dots are drawn due to the landing interference. Thus, the inter-dot distance is changed.

Although it has been described in FIG. 8 that the influence of the landing interference is the "change amount of the inter-dot distance", the influence of the landing interference may be measured as a change in dot density or a change in dot shape.

The landing interference data parameterized as a function of the inter-dot distance d can be acquired from the reading result of the first continuous dot patterns 104C, 104M, 104Y and 104K and the second continuous dot patterns 106C, 106M, 106Y and 106K in the characteristic parameter acquisition chart 100 described in FIG. 5.

The parameters related to the landing interference are calculated for the respective printing elements (in this example, the respective nozzles), and are averaged. The value acquired by averaging the parameters for each color may be retained, or the value acquired by averaging the parameters for all the colors may be retained as a common parameter.

It has been described in FIG. 5 that the single dot pattern and the continuous dot pattern are used in a case where it is assumed that the droplet kind is one for each color of CMYK. However, in a case where the droplet kind is plural, it is assumed that the single dot pattern is formed by independently jetting the respective kinds of dots and the continuous dot pattern is formed by jetting the combination of the respective kinds of dots so as to overlap each other. The parameters related to the landing interference for the combination of the respective droplet kinds are acquired. The continuous dot pattern may be formed by jetting the combination of the dots of the respective CMYK colors so as to overlap each other, and the parameters related to the landing interference may be acquired for the combination of the dots of the respective colors.

As the chart for acquiring the parameters related to the landing interference, the chart in which the inter-dot distance between the plurality of dots is changed and a recording time difference between the plurality of dots is changed may be output. For example, in the condition in which a time difference when the plurality of dots is recorded is one path, two paths, 3 paths, . . . , the chart in which the time difference is set in a plurality of levels and the dots are in contact in the time difference in the plurality of levels may be output. The recording time difference corresponds to a jetting time difference.

For example, in the condition in which two dots jetted so as to overlap each other in the first continuous dot pattern and the second continuous dot pattern of the respective CMYK colors of FIG. 5 are respectively Dot 1 and Dot 2, the continuous dot pattern in which Dot 1 and Dot 2 are continuously jetted by moving the carriage 114 in the X direction once is formed and the continuous dot pattern in which after Dot 1 is jetted by moving the carriage 114 in the X direction once and Dot 2 is jetted by moving the carriage 114 in the X direction twice without transporting the printing medium 101 in the Y direction is formed, and the continuous dot pattern in which after Dot 1 is jetted by moving the carriage 114 in the X direction once, Dot 2 is jetted by moving the carriage 114 in the X direction three times without transporting the printing medium 101 in the Y direction is formed, the continuous dot pattern in which Dot 1 and Dot 2 are in contact in the time difference (path difference) at multiple levels may be formed.

<Requirements for Halftone Process>

For example, as the requirements required in the halftone process, there are the following requirements. That is, as a first classification (a) of the requirement, there are image quality, system cost, halftone generating time, and halftone processing time. As a second classification (b) of the requirement, there are "granularity" and "tolerance to a system error" which are related to the image quality. The plurality of requirements has the trade-off relationship. As the tolerance to the system error, there is "tolerance to environment change". For example, since the density of the ink and the spread amount of the dot are changed due to the influence of temperature or humidity, it is considered that the halftone processing rule is designed by simulating the influence thereof as the tolerance to the environment change.

In the present embodiment, the two or more kinds of halftone processing rules of the halftone process of which the balances of priority for the plurality of requirements required in the halftone processing are different are generated. However, the "plurality of requirements" includes at least two items of the image quality, the system cost, the halftone generating time, the halftone processing time, the tolerance to the system error or the tolerance to the environment change, which are described above.

<Advantages and Disadvantages of Halftone Algorithm and Each Requirement>

The advantages and disadvantages of various halftone algorithms for the respective requirements such as the image quality, the system cost, the halftone generating time and the halftone processing time of the first classification (a) are represented in the table of FIG. 9. Here, as the halftone algorithm, three kinds of methods including the dither method, the error diffusion method, and the direct binary search (DBS) method are compared.

The system cost includes cost related to another system specification such as central processing unit (CPU) performance or memory capacity required to realize the function of the halftone process. The halftone generating time is time necessary to generate the halftone processing rule, and includes, for example, time necessary for calculation for determining the halftone parameter. The halftone processing time is time necessary for process of converting the data of the continuous-tone image into the data of the halftone image by using the generated halftone processing rule.

If three kinds of halftone algorithms including the dither method, the error diffusion method and the DBS method are compared, as for the image quality, the image quality is relatively low in the dither method, the image quality is relatively high quality in the DBS method, and the image quality is medium image quality therebetween in the error diffusion method. As for the system cost, the cost is relatively low in the dither method, and the cost is relatively high in the DBS method. The system cost in the error diffusion method is a medium level between the dither method and the DBS method. The halftone generating time and the halftone processing time are relatively short in the dither method, and are relatively longer time in the DBS method. The halftone generating time and the halftone processing time are medium levels between the dither method and the DBS method.

The advantages and disadvantages for the respective requirements are changed by the setting of the halftone parameter even in the same halftone algorithm in addition to the relative advantages and disadvantages due to the kind of the halftone algorithm shown in FIG. 9. For example, in a case where the halftone algorithm is the dither method, the image quality becomes higher as the dither size becomes larger, but the system cost becomes higher and the halftone generating time or the halftone processing time becomes longer.

In a case where the halftone algorithm is the error diffusion method, the image quality becomes higher as an error diffusion matrix size becomes larger or as the number of gradation sections to which an error diffusion matrix is applied becomes greater, but the system cost becomes higher for another requirement, and the halftone generating time and the halftone processing time becomes longer.

In a case where the halftone algorithm is the DBS method, the image quality becomes higher as the number of times pixels are updated becomes greater or as an exchange pixel range becomes wider, but the system cost becomes higher for another requirement, and the halftone generating time or the halftone processing time becomes longer.

As for the second classification (b) of the requirement, the error occurs in the characteristic parameters such as the dot density, the dot diameter, the dot shape, the dot forming position shift and the non-jetting due to the printing order, the drawing path or the jetting timing, and the tolerance design to the system error can be performed such that a deterioration in granularity or stripe occurrence is suppressed, but the granularity in a state in which there is no error by the tolerance design is deteriorated. That is, the tolerance to the system error and the granularity have the trade-off relationship.

For example, the printing order as the cause of the system error is the order in which the ink colors overlap each other. The printing order may include the order of an outward path and an inward path in serial scan type head scanning. The path is the order of the paths in a drawing mode in which the drawing is completed multipath by the serial scan type ink jet head. In the case of a single path printer, a line in the main scanning direction corresponds to the "path". For example, in a case where the jetting is performed while sending the printing medium, the timing is taken on the assumption that the error occurs in the landing position or the dot shape by the jetting timing due to the influence of the transport error of the printing medium.

Since the characteristic parameters such as the dot density, the dot diameter, the dot forming position shift or the non-jetting are changed by the temporal state change of the printing element, these errors are regarded as the system error. It is difficult to reproduce the simulation by accurately acquiring the change of the dot density, the shape or the position due to the landing interference as the parameter from only the characteristic parameter acquisition chart shown in FIG. 5, and such a difference from the reality is regarded as the system error.

That is, the tolerance deign is performed by regarding the restrictions of the temporal state change of the system, the characteristic parameter acquisition chart or the image reading device 26 and the difference between the simulation image and the reality occurring by the limitation of the simulation model as the system error, optimizing the granularity in a state in which there is no difference and suppressing the deterioration in granularity of a real image or the occurrence of the streak even though there are such differences.

In the dither method, for example, in the printing system such as a single path printer in which the respective printing elements are independently present in a range in which the width direction of the printing medium is wide, it is difficult to perform the halftone design such that the granularity is optimized by reflecting the characteristics such as the dot density, the dot diameter, the dot shape, the dot forming position shift or the non-jetting of each printing element.

Accordingly, in this case, the design is also performed such that the granularity is optimized based on the information of the average dot density, the dot diameter or the dot shape for each ink droplet and the tolerance to the error such as the dot density, the dot diameter, the dot shape, the dot forming position shift or the non-jetting due to the individual characteristic of the plurality of printing elements is given.

Description using Specification Example

In the image processing device 20 of the present example, two or more halftone processing rules are set depending on the priorities of the respective requirements based on the advantages and disadvantages of the respective requirements. The halftone processing rule is specified by the combination of the halftone algorithm and the halftone parameter.

Setting Example 1

For example, as a setting example of the priority, in a case where the setting is performed such that the image quality is important for the first classification (a) and the granularity is important for the second classification (b), the following halftone processing rule may be determined as the halftone processing rule corresponding to the setting (Setting Example 1) of the priority.

Halftone algorithm: DBS method
Halftone parameter number of times pixel is updated=large, and exchange pixel range=large
Tolerance design to system error: no An appropriate value belonging to a relatively large value of a plurality of value candidates capable of being selected on the system is set to a specific value that specifies the number of times the pixel related to the halftone parameter is updated or a specific value that specifies the exchange pixel range.

In the DBS method, the halftone processing rule is determined by simply designating the number of times the pixel is updated and the exchange pixel range as the halftone parameter.

Setting Example 2

For example, as another setting example of the priority, in a case where the setting is performed such that the halftone processing time is important for the first classification (a) and the tolerance to the system error is important for the second classification (b), the following halftone processing rule can be determined as the halftone processing rule corresponding to the setting (Setting Example 2) of the priority.

Halftone algorithm: dither method
Halftone parameter: dither mask size=small
Tolerance design to system error error of ±10 micrometers [μm] is added, and tolerance to "streaks" is considered
Setting is performed such that granularity evaluation parameter α=1 and streak evaluation parameter β=1.

An appropriate value belonging to a relatively small value of a plurality of value candidates capable of being selected on the system is set to a specific value that specifies a dither mask size related to the halftone parameter. In the illustrated Setting Example 2, as for the second classification (b), since the extent of the system error is not understood in some cases and how much the system error influences the streak quality or granularity of a real image is not still understood, a plurality of values may be set depending on the priority of the tolerance to the system error. For example, a plurality of values such as "±10 micrometers [μm]", "±20 micrometers [μm]", . . . may be set to the error amount. As for the simulation of the landing interference, a plurality of settings such as "non-execution setting", "execution setting", "setting in which only dot movement due to the landing interference is simulated at the time of execution", and "setting in which a change in dot density or shape as well as the dot movement is simulated" may be performed. As for the setting of the dot movement due to the landing interference or the change in the density or shape, a plurality of settings may be performed by changing the values using the parameter acquired from the characteristic parameter acquisition chart as its reference.

In a case where the simulation in consideration of the landing interference is performed, the dot movement and/or dot deformation due to the landing interference may be given as a function of time as well as a function of an inter-dot distance.

The setting example is not limited to Setting Examples 1 and 2 described above, and the halftone processing rule corresponding to various settings of the priority may be generated.

Figure 10:
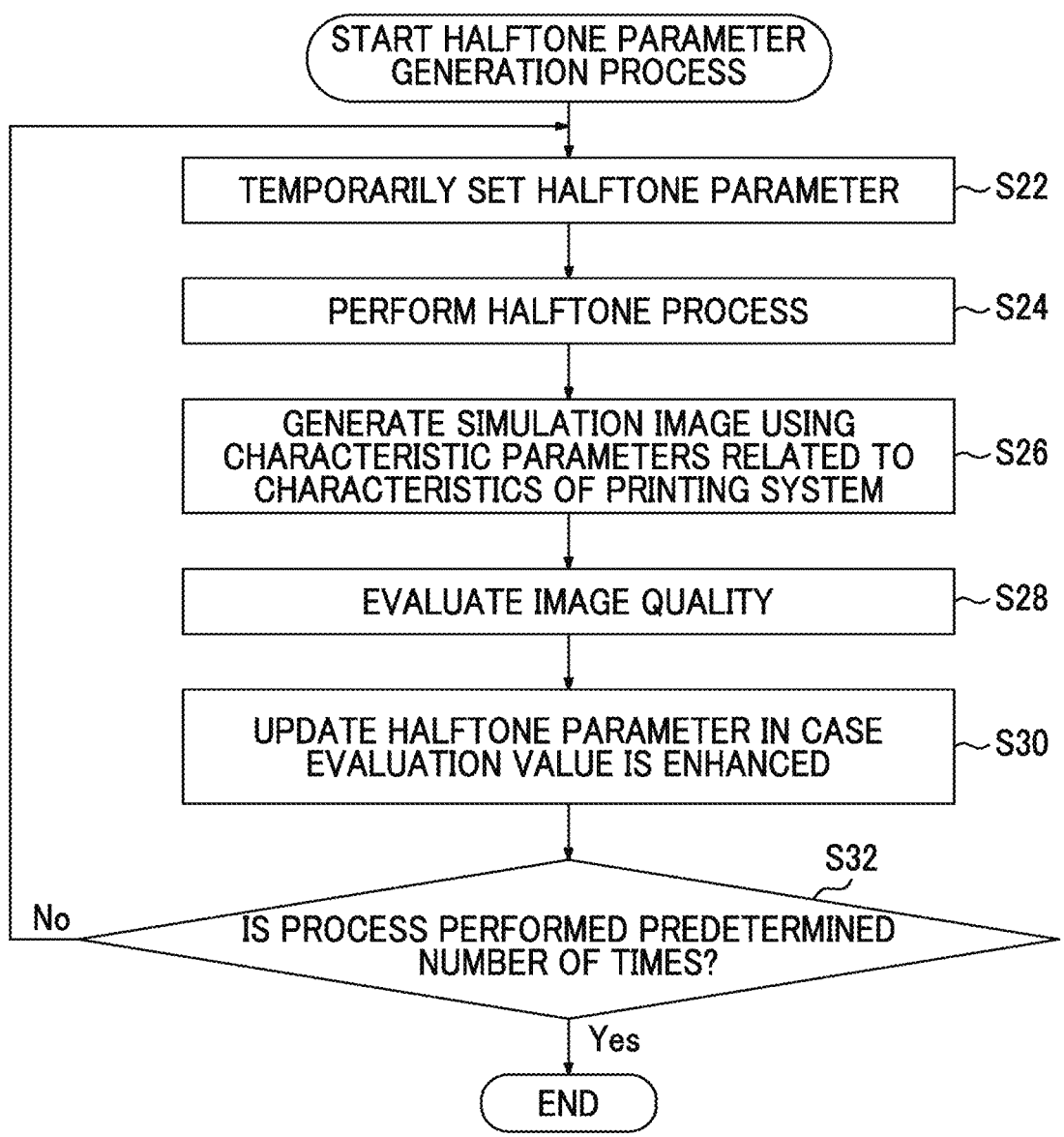
FIG. 10 is a flowchart related to a process of generating a halftone parameter.

In a case where the dither method or the error diffusion method is selected as the halftone algorithm, a process of generating the halftone parameter corresponding to each halftone algorithm is performed by a flowchart shown in FIG. 10.

FIG. 10 is a flowchart related to the process of generating the halftone parameter. The flowchart of FIG. 10 is a common flowchart in both the dither method and the error diffusion method. Here, the dither method will be described as an example.

Initially, the halftone parameter is temporarily set (step S22). In the dither method, the matrix size (that is, dither mask size) of the dither mask and each threshold value being determined corresponds to the halftone parameter being determined. Various sizes such as 32×32, 64×64, 128×128 and 256×256 may be used as the dither mask size. The halftone parameter in a case where the dither mask size is designated represents the threshold value of the dither mask, and the flowchart of FIG. 10 is repeated from 0 to the maximum value of the threshold value.

After the halftone parameter is temporarily set in step S22, the halftone process is subsequently performed using the temporarily set halftone parameter (step S24). In the dither method, in step S24, dot-ON pixels from a threshold value "0" to a current threshold value are acquired. That is, a halftone image (dot arrangement) on which the halftone process to which the dither mask is applied has been performed is acquired from a single-gradation input image having a gradation of a current threshold value.

Subsequently, a simulation image of a printed image is generated for the halftone image acquired in step S24 by using the characteristic parameters related to the characteristics of the printing system (step S26). In step S26, the dots on which the characteristic parameters related to the dot density, the dot diameter, the dot shape, the dot forming position shift or the non-jetting of each printing element, or an appropriate combination thereof are reflected are arranged so as to overlap the pixels of the halftone image, and thus, the simulation image of the print image is generated from the data of the dot pattern indicated by the halftone image.

Figures 11, 12A:
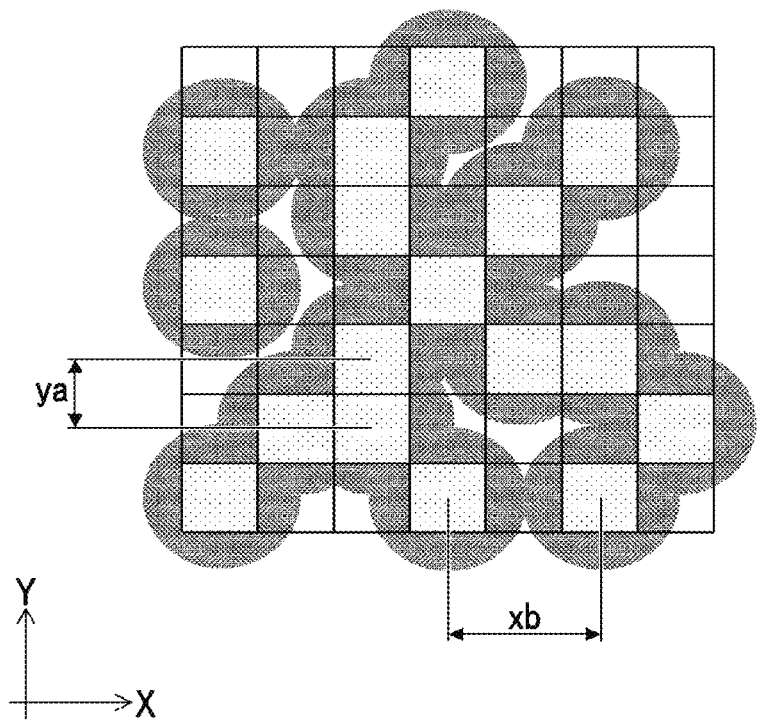
FIG. 11 is a conceptual diagram of the simulation image.
FIG. 12A shows that the jetting order in a drawing mode in which drawing is performed along 8 scanning paths is represented by a path number.

FIG. 11 is a conceptual diagram of the simulation image. In FIG. 11, the respective lattice cells represent the pixels of the image data. In the data of the halftone image, the cells of the "dot-ON" pixels are represented by a screentone pattern, and the "dot-OFF" pixels are represented by a white background.

When the simulation image is generated, the dots on which the recording characteristics such as the dot density, the dot diameter, the dot shape, the dot forming position shift or the non-jetting of each printing element serving to record the dot-ON pixels or the appropriate combination thereof are reflected are arranged on the positions of the dot-ON pixels.

In this case, based on an arrangement state including surrounding dots or an arrangement state after the dots overlap, the dot shape after the landing interference may be calculated from the already acquired deformation parameter of the dot shape due to the landing interference, and the dots may be rearranged. For example, if the dot movement represented by a function of f(ya) is caused in the Y direction due to the influence of the landing interference by an inter-dot distance ya in the "sub scanning direction" (Y direction of FIG. 11) which is a direction parallel to the transport direction of the printing medium and the dot movement represented by a function of f(xb) is caused in the X direction due to the influence of the landing interference by an inter-dot distance xb in the "main scanning direction" (X direction of FIG. 11) which is a direction perpendicular to the transport direction of the printing medium, the dot shape caused by the dot movement of f(ya)+f(xb) is changed, and thus, the dots are rearranged.

Since the surrounding dots that cause the landing interference are present in a diagonal direction as well as the "sub scanning direction" or "main scanning direction" and are influenced by the landing direction, the dot movement represented by a function of $f(c_n)$ is caused in the direction of the dots due to the influence of the landing interference by an inter-dot distance $c_n$ with surrounding dots n in an arbitrary direction as well as the "sub scanning direction" or "main scanning direction", and thus, the dots may be moved by $f(ya)+f(xb)+f(c_1)+f(c_2)+ \ldots +f(c_n)$, and the dots may be rearranged. Of course, since the influence of the landing interference is different by the droplet kind, a function f(*) is different by the kind of surrounding dot. "*" represents a parameter. Due to the landing interference, the dot density or the dot shape as well as the dot movement may be changed, and the dots may be rearranged.

The inter-dot distance $c_n$ and the function f(*) representing the dot movement may be treated as vector. That is, the parameters ya, xb, and $c_1$ to $c_n$ described with reference FIG. 11 are treated as vector having a direction for the functions of f(ya)+f(xb) and f(ya)+f(xb) $f(c_1)+f(c_2)+ \ldots +f(c_n)$. The functions of f(ya)+f(xb) and $f(ya)+f(xb)+f(c_1)+f(c_2)+ \ldots +f(c_n)$ are treated as vector having a direction.

Here, the change of the dot movement, density or shape due to the landing interference may be caused by the function including a jetting time difference between the dots as well as the inter-dot distance. That is, the function f(*) may be a function using the inter-dot distance and the jetting time difference between the dots.

In FIG. 11, since the simulation image is disposed by reflecting the recording characteristics such as the dot diameter, the dot shape, the dot forming position shift and the landing interference, the simulation image needs to have resolution higher than that of the halftone image data. For example, in a case where the resolution of the halftone image data is 1200 dots per inch [dpi] in both the main scanning direction and the sub scanning direction, the size of each cell is about 21 micrometers [μm]×21 micrometers [μm]. However, if the dot forming position shift is about 3 micrometers [μm], the simulation image needs to have the resolution of 8400 dots per inch [dpi] which is at least seven times as large as the resolution of the halftone image data. However, after the dots are arranged on a high-resolution simulation image once, smoothing is performed on the high-resolution simulation image, and the high-resolution simulation image is converted into a low-resolution simulation image through smoothing. Thus, it is possible to reduce memory capacity required for the simulation image. That is, since the high-resolution simulation image is needed only near a region where the dots are arranged and the entire simulation image is maintained with only low resolution, it is possible to reduce the memory capacity.

When the simulation image is generated in step S26 of FIG. 10, in a case where the printing device 24 is a printing system in which each printing element is independently present over a wide range in a width direction of the printing medium as in the single path printer, not the individual dot density, dot diameter and dot shape of each printing element but the average values of the dot densities, dot diameters and dot shapes of each printing element for each ink kind may be used.

Subsequently, the image quality of the simulation image generated in step S26 is evaluated (step S28 of FIG. 10).

The image quality evaluation is performed by calculating at least one evaluation value of a value acquired by applying a low-pass filter such as a Gaussian filter or a visual transfer function (VTF) representing human visual sensitivity to the simulation image, performing frequency conversion and performing integral calculus, root mean square (RMS) granularity, or an error or a standard deviation with the input image. The value calculated in the image quality evaluation step of step S28 is stored as an "image quality evaluation value" in the memory.

Here, in a case where the tolerance design to the system error is performed, the generation (step S26) of the simulation image as described above and the calculation (step S28) of the image quality evaluation value are performed by applying at least one error of a predetermined dot density, a dot diameter, a dot shape, a dot forming position shift or non-jetting to the dots of the pixels belonging to the same condition as at least one condition of the printing order, the path or the timing of the dot-ON pixels corresponding to the current threshold value of the halftone processing result.

In a case where the tolerance design is performed such that the streaks are generated as well as the deterioration in granularity as the tolerance to the system error, a value acquired by performing one-dimensional frequency conversion and integral calculus, or an error or a standard deviation with respect to the value of the integral of the input image in the main scanning direction is calculated as a streak evaluation value by applying the error to the simulation image and performing integral calculus on the simulation image in the main scanning direction after the low-pass filter or VTF is applied. As the method of calculating a quantitative evaluation value of the granularity or streaks, the known method described in JP2006-67423A or JP2007-172512A may be used.

In the present example, the image quality evaluation value is calculated by the following equation, and the acquired value is retained.

Image quality evaluation value=granularity evaluation value[system error absence]+α×{granularity evaluation value(system error presence(+predetermined amount)]+granularity evaluation value[system error presence(−predetermined amount))+β×(streak evaluation value[system error presence(+predetermined amount)]+streak evaluation value[system error presence(−predetermined amount)]}      Expression (1)

The granularity evaluation value [system error absence] in the calculation expression of the image quality evaluation value is a granularity evaluation value calculated from a simulation image to which a system error corresponding to a variation component of the characteristic parameter is not added. The granularity evaluation value [system error presence (+predetermined amount)] is a granularity evaluation value calculated from a simulation image to which a plus (positive) predetermined amount as the system error is added. The granularity evaluation value [system error presence (−predetermined amount) is a granularity evaluation value calculated from a simulation image to which a minus (negative) predetermined amount as the system error is added. The streak evaluation value [system error presence (+predetermined amount) is a streak evaluation value calculated from the simulation image to which a plus (positive) predetermined amount as the system error is added. The streak evaluation value [system error presence (−predetermined amount) is a streak evaluation value calculated from a simulation image to which a minus (negative) predetermined amount as the system error is added. The coefficients α and β are evaluation parameters, the coefficient α is a granularity evaluation parameter, and the coefficient β is a streak evaluation parameter. In a case where there is an attempt to increase the tolerance to the system error, α or β is set to be a larger value. Particularly, in a case where there is an attempt to make the "streaks" inconspicuous as well as the granularity, the value of s is increased. The predetermined amount of an addition error, the kind of the addition error (density, dot diameter, dot shape, dot forming position shift, non-jetting, or landing interference) and the coefficients α and β as the evaluation parameters are determined depending on the priority of the tolerance to the system error described above.

As the predetermined amount of the addition error, the standard deviation a of each item such as the dot densities, the dot diameters, or the dot forming position shifts may be used. As the predetermined amount of the addition error, at least one of the standard deviation of the dot densities, the standard deviation of the dot diameters, the standard deviation of the dot shapes or the standard deviation of the dot forming position shifts may be used, and an appropriate combination thereof may be used.

The image quality evaluation value in step S28 of FIG. 10 is calculated, and the halftone parameter is updated in a case where the image quality evaluation value is enhanced (step S30). In step S32, it is determined whether or not the steps of step S22 to step S30 are repeatedly performed the predetermined number of times. The "predetermined number of times" of step S32 in the dither method is the number of all pixels of candidates corresponding to the threshold value.

If the step is performed the predetermined number of times and the step is not completed in the determination of step S32, the step returns to step S22, and the steps of step S22 to step S30 are repeated. In the determination of step S32, if the step performed the predetermined number of times is completed, the step is ended.

<Case of Error Diffusion Method>

An example in which the flowchart of FIG. 10 is applied to the generating of the halftone parameter in the error diffusion method will be described. In the error diffusion method, the halftone parameter indicates the setting of the size of the error diffusion matrix, the diffusion coefficient and the applied gradation section of each error diffusion matrix. Here, in order to simplify the description, it is assumed that one kind of common size is used as the size of the error diffusion matrix.

The flowchart of FIG. 10 is repeated for all the applied gradation sections, and thus, the diffusion coefficient of the error diffusion matrix of each applied gradation section is determined.

For example, the applied gradation section of the error diffusion matrix can be divided into five levels of 0-50, 51-100, 101-150, 151-200, and 201-255 in the case of an 8-bit gradation. The dividing method of the applied gradation sections may be performed by various determining methods, and the added gradation section may be equally divided into m levels as an integer m of 2 or more or may be divided in arbitrary unequal gradation regions.

In a certain gradation section, the average value of the evaluation values of each gradation is used as the image quality evaluation value by temporarily setting the diffusion coefficient of the error diffusion matrix added to the gradation section (step S22), performing the halftone process on the input image (single-gradation uniform image) of each gradation in the gradation section (step S24 of FIG. 10), generating the simulation image (step S26) and the calculating the image quality evaluation value (step S28).

When the halftone parameter is temporarily set in step S22, it is assumed that the initial value of the diffusion coefficient of the error diffusion matrix is 1/matrix size. When the temporal setting is repeated the predetermined number of items, in the temporal setting of the error diffusion matrix coefficient after the second temporal setting (step S22), the temporal setting is performed by adding "±random numbers in a predetermined range" to the respective coefficients of the best error diffusion matrix and standardizing the summation of coefficients to be "1".

It is preferable that a diffusion coefficient of an error diffusion matrix of an adjacent gradation section which has been already optimized is used as an initial value of a diffusion coefficient related to an error diffusion matrix of an adjacent gradation section.

The simulation image of step S26 is generated as in the dither method. The image quality evaluation (step S28) is performed as in the dither method. However, in a case where the tolerance design to the system error is performed, the simulation image is generated by performing the error addition to the dots of the pixels belonging to the printing order, the path or the timing, the granularity or streak evaluation values are calculated, and the summation thereof is used as the "evaluation value". For example, the granularity evaluation value in the system error presence is represented by the following expression.

Granularity [system error presence]=[granularity evaluation value [system error presence (addition of "+predetermined amount" error to first group)]+granularity evaluation value [system error presence (addition of "+predetermined amount" error to second group)]+ . . . +granularity [system error presence (addition of "−predetermined amount" error to first group)]+ granularity evaluation value [system error presence (addition of "−predetermined amount" error to second group)+ . . . ]   Expression (2)

Here, the group classification such as the first group and the second group indicates a pixel group belonging to the same condition as at least one condition of the printing order, the path or the timing. For example, in the case of a drawing mode in which drawing along 8 inward and outward paths is completed, the group may be sequentially classified such that a pixel group recorded along a first path is a first group and a pixel group recorded along a second path is a second group, and a pixel group recorded in along eight path may be an eighth group.

The "predetermined amount" of the error added to the pixels belonging to each classified group may have the same value between the groups, or may have different values for each group. The "+predetermined amount" and the "−predetermined amount" may have the same absolute value, or may have different absolute values.

Figure 12B:
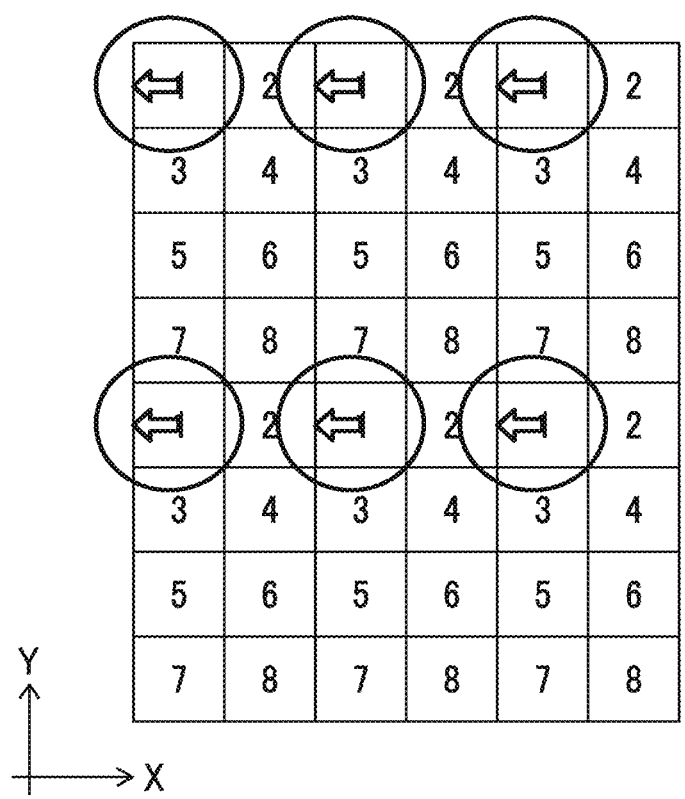
FIG. 12B is a conceptual diagram in a case where a predetermined amount of error is added to dots of pixels of a first path in a case where the drawing is performed in the drawing mode shown in FIG. 12A.

FIG. 12A shows that the jetting order in a drawing mode in which drawing is performed along 8 scanning paths with predetermined recording resolution is represented by a path number. FIG. 12B is a conceptual diagram in a case where a predetermined amount of error is added to the dots of the pixels of the first path in a case where the drawing is performed in the drawing mode shown in FIG. 12A. In FIG. 12B, the error of the dot forming position shift in the X direction is added to the dots of each pixel groups jetted along the first path. The error may be added to the pixel group of another path number.

Figure 13:
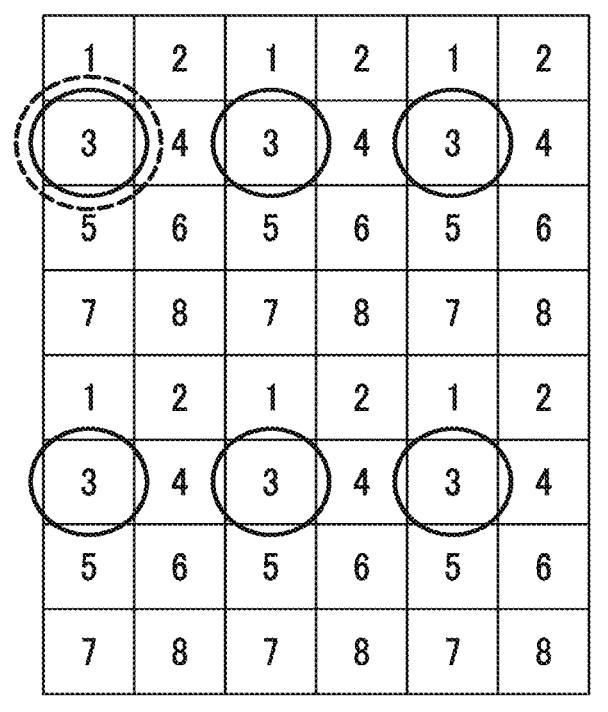

FIG. 13 shows that the error in which the dot diameter is decreased by a predetermined amount is added to the dots of the pixels of the third path in a case where the drawing is performed in the drawing mode shown in FIG. 12A. The dot diameter depicted by a broken line of FIG. 13 indicates an average dot diameter having no error.

<Another Example of Dither Method>

Figure 14:
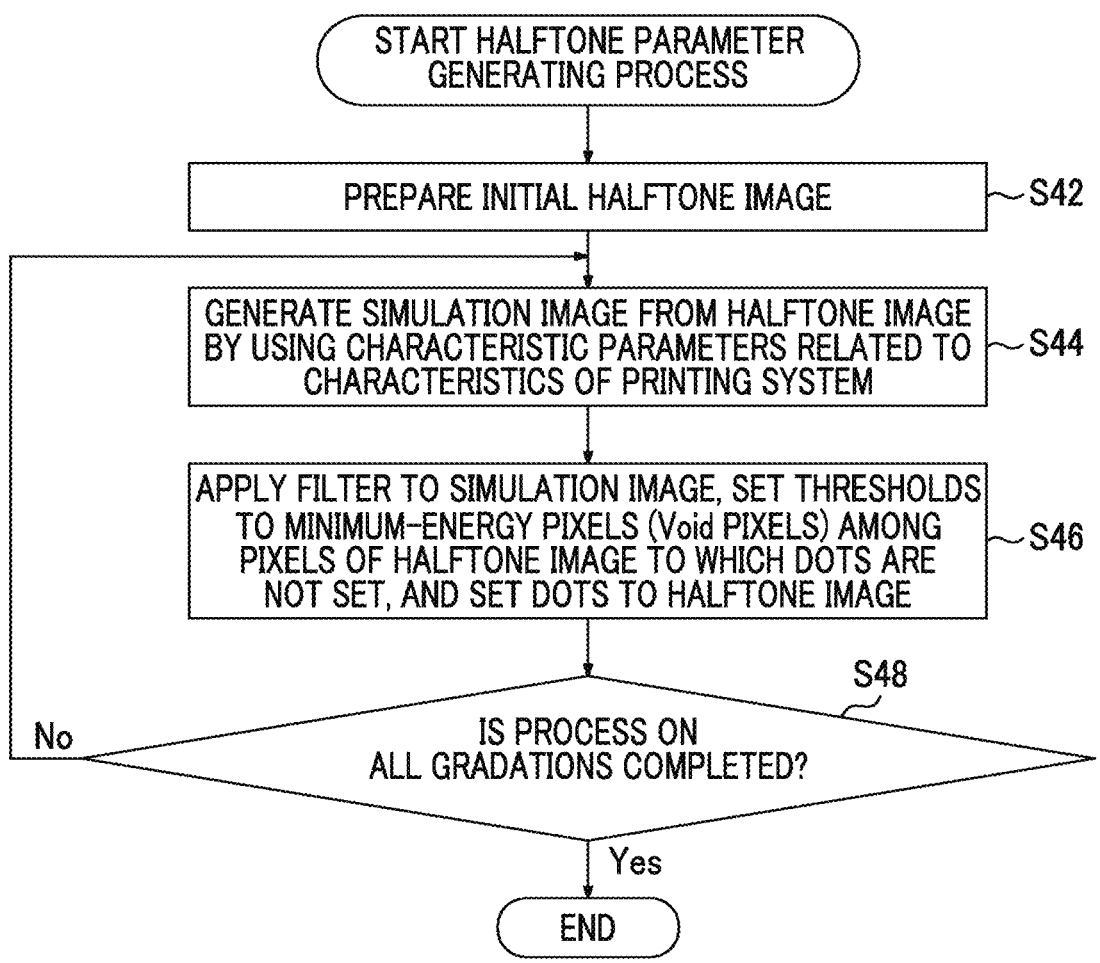
FIG. 14 is a flowchart of an example in which a dither mask is generated using a void-and-cluster method.

The dither method is not limited to the flowchart described in FIG. 10, and a void-and-cluster method may be used. FIG. 14 is a flowchart of the void-and-cluster method.

Initially, a halftone initial image is prepared (step S42). A method of generating the halftone initial image follows the void-and-cluster method. That is, in an energy image acquired by applying a filter to a simulation image having a specific gradation, the initial image is generated by regarding pixels having a maximum energy value as cluster pixels in which dots are dense, regarding minimum-energy pixels as void pixels in which dots are sparse and repeatedly exchanging the cluster pixels and the void pixels. For example, an initial image having a gradation value "128" in image data expressed by gradations from 0 to 255 is generated using a gradation value which is about 50% of a maximum density as the specific gradation.

Subsequently, a simulation image is generated from the halftone image by using the characteristic parameters related to the printing system (step S44). The method of generating the simulation image is the same as that in the example described in FIG. 11. A filter is applied to the simulation image generated in step S44, threshold values are set to the minimum-energy pixels (that is, void pixels) of pixels of the halftone image to which dots are not set, and dots are set to the void pixels of the halftone image (step S46). For example, a Gaussian filter is used as the filter used when the filter is applied.

In step S48, it is determined whether or not the setting (that is, the setting of the dots) of the threshold values to all the gradations is completed, and if the setting is not completed, the step returns to step S44, and the steps of steps S44 and S46 are repeated. That is, in step 46, the simulation image is generated from the halftone image to which dots are newly added (step S44), and the energy image acquired by applying the filter to the simulation image is generated and the threshold values are set to the minimum-energy pixels (step S46).

In step S48, if the step on all the gradations is completed, the step of FIG. 14 is ended.

The flowchart shown in FIG. 14 is the process in a direction in which the threshold values are increased from the initial image, but a method in which the threshold values (that is, gradation values) are decreased from the initial image also follows the void-and-cluster method. That is, a process of setting the threshold values to the cluster pixels among the pixels to which the dots are set by regarding the maximum-energy pixels of the energy image acquired by applying the filter to the simulation image as the cluster pixels in which the dot are dense, a process of generating the simulation image by removing the dots of the pixels, a process of setting the threshold values by applying the filter, and a process of removing the dots are sequentially repeated. For example, a Gaussian filter is used as the filter used when the filter is applied.

Similarly to the example described in FIG. 10, in a case where the tolerance design to the system error is performed, the simulation image is generated by adding at least one kind of error of the error of the predetermined amount of dot density, the error of the dot diameter, the error of the dot shape, the error of the dot forming position shift or the error of the non-jetting to the dots of the pixels belonging to the same condition as at least one condition of the printing order, the path or the timing of the pixels corresponding to the current threshold value (step S44), and the filter is applied (step S46).

In a case where the tolerance design to the streaks is performed, one-dimensional energy (that is, streak energy) is calculated as streak energy by adding the predetermined amount of error to the simulation image, applying the filter to the simulation image, and performing integral calculus on the simulation image in the main scanning direction. As the energy of the entire print image, the pixels which have a minimum image evaluation value to be represented below and include a streak energy component are searched.

$$\text{Image evaluation value} = \text{energy[system error absence]} + \alpha \times \{\text{energy[system error presence(+predetermined amount)]} + \text{energy[system error presence(-predetermined amount)]}\} + \beta \times \{\text{streak energy[system error presence(+predetermined amount)]} + \text{streak energy[system error presence(-predetermined amount)]}\} \quad \text{Expression (3)}$$

Through the method described in FIG. 10 or 14, the halftone parameter of the dither method or the error diffusion method is determined, and the halftone processing rule specified by the combination of the halftone algorithm and the halftone parameter. By doing this, the multiple kinds of halftone processing rules are generated.

<Halftone Selection Chart>

In the printing system 10 according to the present embodiment, the halftone selection chart is output in order to provide determination information when one kind of halftone processing rule used in printing is selected from the multiple kinds of halftone processing rules generated by the image processing device 20 (step S16 of FIG. 4).

For example, as the halftone selection chart, a chart including a gradation patch acquired by arranging a primary color such as cyan, magenta or yellow, a secondary color such as red, green or blue, a tertiary color or a quaternary color in a predetermined gradation level may be used. The halftone selection chart may include a gradation image acquired by continuously changing a gradation value instead of the acquired gradation patch to a patch, which is acquired by discretely changing a gradation value in the predetermined gradation level for each color, or by combining these patches.

The halftone selection chart may include a gradation image or a patch having a uniform density of a predetermined gradation according to a special color such as sky blue or pale orange. As the kind of the "special color", various colors may be set. The sky blue or the pale orange are examples of colors in which the granularity becomes a particularly sensitive issue in the printed material. As stated above, the particularly important color in the printed material is set as the "special color", and may be included in the image of the halftone selection chart.

The halftone selection chart is a chart capable of being used as determination information when an appropriate halftone process is selected by the user through the comparison of the qualities of the respective halftone processes, from the results of the halftone processes represented in the chart.

In order to facilitate the comparison of the qualities of the multiple kinds of halftone processes, it is preferable that a halftone selection chart in which the processing results of the multiple kinds of halftone processes are provided on one printing medium is generated.

Figure 15:
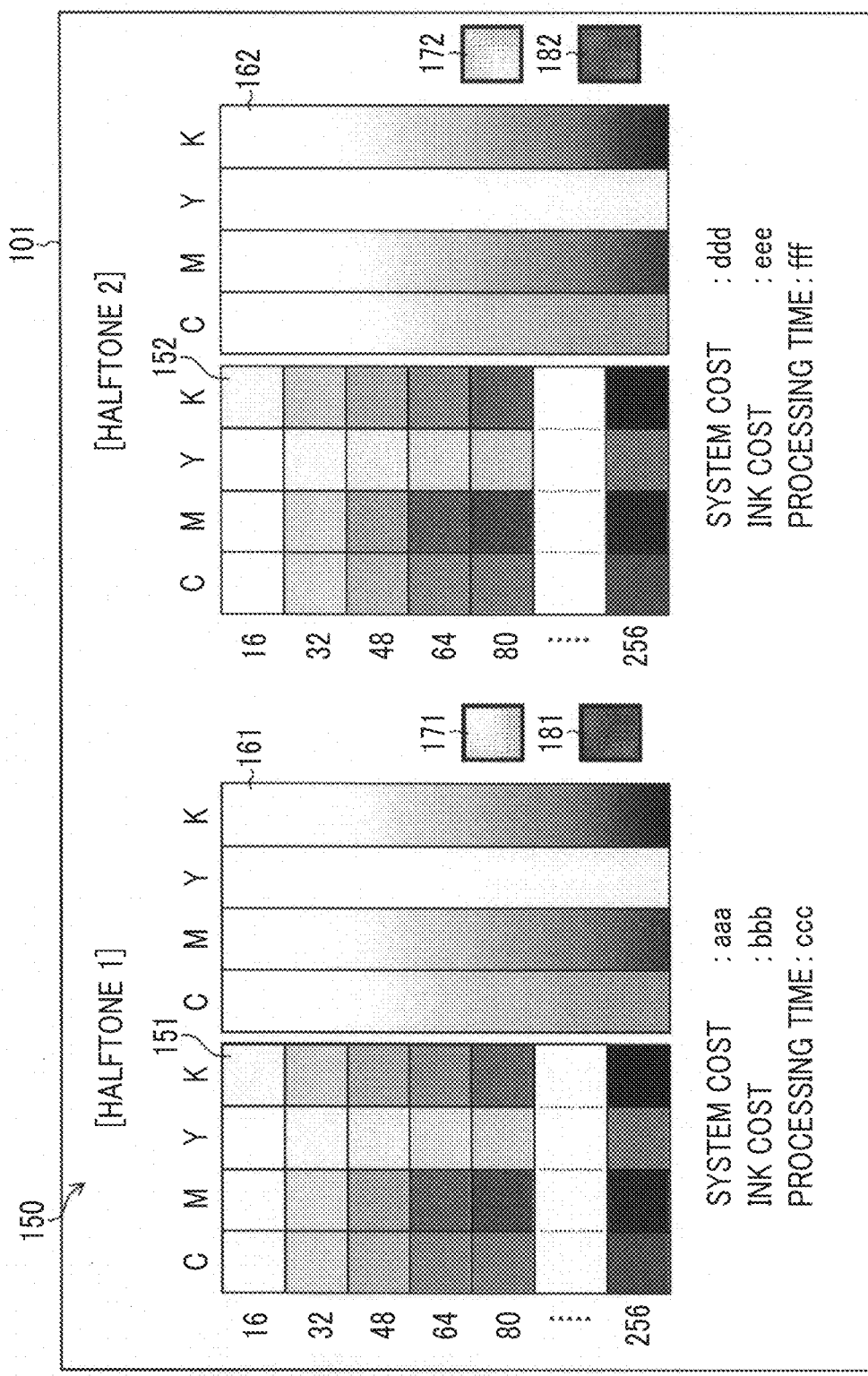
FIG. 15 is a schematic diagram showing an example of a halftone selection chart.

FIG. 15 is a schematic diagram showing an example of the halftone selection chart. In FIG. 15, an example of a halftone selection chart 150 printed by arranging the respective processing rules of the two or more kinds of halftone processing rules on one printing medium 101 is shown.

A chart region shown on the left side of FIG. 15 is a chart that represents the processing result of a first halftone processing rule (referred to as "Halftone"), and a chart region shown on the right side is a chart that represents the processing result of a second halftone processing rule (referred to as "Halftone 2").

In the halftone selection chart 150 of the present example, as for the respective halftone processes of the two or more kinds of halftone processing rules, a total of 32 primary color patches 151 and 152 acquired by dividing a gradation region having gradation values from 0 to 255 into 16 levels of "16" notches are arranged for the respective primary colors of C, M, Y and K.

For the sake of convenience in the illustration, FIG. 15 shows that some of the gradation levels are omitted and the number of patches is reduced. However, the primary color patches 151 and 152 corresponding to the respective gradation values of 16, 32, 48, 64, 80, 96, 112, 128, 144, 160, 176, 192, 208, 224, 240 and 255 are recorded for the respective colors of CMYK. Reference numeral 151 denotes primary color patches according to the processing result of the first halftone processing rule, and reference numeral 152 denotes primary color patches according to the processing result of the second halftone processing rule.

The halftone selection chart 150 includes gradation images 161 and 162 of the respective colors, sky blue patches 171 and 172 according to the a predetermined gradation of sky blue, and pale orange patches 181 and 182 according to a predetermined gradation of pale orange in addition to the arrangement of the primary color patches 151 and 152 of the respective colors of CMYK. Reference numeral 161 denotes gradation images according to the processing result of the first halftone processing rule, and reference numeral 162 denotes gradation images according to the processing result of the second halftone processing rule. The gradation images 161 and 162 are image regions of a shaded image acquired by continuously changing a gradation value in a range of a gradation region from a minimum gradation value to a maximum gradation value for the primary colors of the respective colors of CMYK.

Reference numeral 171 denotes sky blue patches according to the processing result of the first halftone processing rules, and reference numeral 172 denotes sky blue patches according to the processing result of the second halftone processing rule. Reference numeral 181 denotes pale orange patches according to the processing result of the first halftone processing rule, and reference numeral 182 denotes pale orange patches according to the processing result of the second halftone processing rule.

Information items related to system cost, ink cost and processing time for each halftone processing rule are printed on the halftone selection chart 150.

Although not shown in FIG. 15, information items indicating granularity evaluation value and/or streak evaluation value in association with the patches may be printed for some or all of the primary color patches 151 and 152. As a method of printing the information items in association with the patches, there are an aspect in which the information items are printed so as to overlap the patches, or an aspect in which the information items is printed close to the patches.

The same is true of the sky blue patches 171 and 172 or the pale orange patches 181 and 182, and the information items indicating granularity evaluation value and/or streak evaluation value in association with the patches may be similarly printed for some or all of the patches (171, 172, 181 and 182).

The user may compare the chart of the processing result according to the first halftone processing rule and the chart of the processing result according to the second halftone processing rule, and may select a preferable halftone processing rule.

The primary color patches 151 and 152, the gradation images 161 and 162, the sky blue patches 171 and 172 and the pale orange patches 181 and 182 of the halftone selection chart 150 shown in FIG. 15 are image regions for comparing and evaluating the quality of the halftone process, and correspond to one example of a "comparison and evaluation image region".

The chart is not limited to the form of the halftone selection chart 150 illustrated in FIG. 15, and various forms of charts may be used. A gradation image of another color such as the secondary color, the tertiary color or the quaternary color may be formed instead of the gradation images to the gradation images 161 and 162 of the primary colors illustrated in FIG. 15 or by a combination thereof. Various kinds of colors or layouts of patches or gradation images as the comparison and evaluation image region may be used.

When the halftone selection chart is output, in order to evaluate the tolerance (deterioration in granularity or suppression of streak occurrence) to the system error of the halftone process, the same chart may be disposed on the entire surface of the printing medium in a drawing executable range, or the content of the same chart may be output over multiple pages. The configuration in which the same chart is disposed on the entire surface of the printing medium in the drawing executable range is beneficial in a case where the tolerance to the system error depending on the printing position (printing place) within the drawing executable range is evaluated. The configuration in which the content of the same chart is output over multiple pages is beneficial in a case where the tolerance to the temporal system error is evaluated. The "content of the same chart" is one example of "an image of the same halftone processing result". The configuration in which the same chart is output so as to be disposed on the entire surface of the printing medium in the drawing executable range corresponds to one example of a configuration in which "the image of the same halftone processing result is output in different position on the printing medium multiple times". The configuration in which the content of the same chart is output over multiple pages corresponds to one example of a configuration in which the image of the same halftone process is output in different printing timings multiple times.

In the configuration in which the same chart is output over multiple pages, when the same chart is continuously output while temporally shifting the chart, a continuous chart output may be performed on the multiple kinds of halftone processes by switching the halftone process. In this case, it is preferable that the printing place (printing position on the printing medium) of the processing result of the same halftone process is fixed. In a case where the chart of the processing result of the same halftone process is output over multiple pages, the chart is printed in the same place of each printing medium, and thus, the influence of the system error depending on the place can be excluded.

In the configuration in which the same chart is output multiple times while spatially shifting the chart, the halftone processing results adjacent to each other on one printing medium may be processing results of different kinds of halftone processes. In the configuration in which the same chart is output multiple times while spatially shifting the chart, the same halftone processing results may be output on the same one printing medium. Accordingly, the influence of the system error with time can be excluded.

As described in FIG. 15, information beneficial to the determination or selection performed by the user is not limited to the image indicating the processing result of the halftone process, and at least one information item of the quantitative evaluation value of the granularity or streak, the system cost, the ink cost, the halftone generating time or the halftone processing time may be printed on the printed material of the halftone selection chart. For example, the "system cost" is indicated as cost an additional option for functional enhancement required to realize the system specification necessary to be performed within a required halftone processing time. As for the "ink cost", since a slight difference in the usage amount of ink is generated depending on the kind of the halftone, ink cost is calculated from the ink usage amount for each kind of halftone in a case where the same image content is printed over a predetermined sheet of page, and information indicating the ink cost is presented. At least one of the system cost or the ink cost corresponds to "cost".

At least one information item of the quantitative evaluation value of the granularity or streak, the system cost, the ink cost, the halftone generating time or the halftone processing time related to the processing result of the halftone process may be displayed on the screen of the user interface instead of the configuration in which the halftone selection chart is printed and presented at the time of outputting or by a combination thereof. The configuration in which the information of the evaluation value related to such quantitative evaluation together with the halftone selection chart is printed, or the configuration in which the screen of the user interface is displayed corresponds to one example of "information presentation means". That is, the display device 32

(see FIGS. 2 and 3) of the image processing device 20 may function as the "information presentation means".

As for the quantitative evaluation value of the granularity or streak, the simulation image may be generated from the halftone processing result of the halftone selection chart by the above-described method and the granularity evaluation value or the streak evaluation value may be calculated. Alternatively, the output result of the halftone selection chart may be read by the image reading device 26 such as the in-line scanner, and the granularity evaluation value or the streak evaluation value may be calculated from the read image.

In order to evaluate the tolerance to the system error, the generation of the simulation image related to the halftone selection chart includes the generation of the simulation image by adding a predetermined amount of error to the dots of the pixel group belonging to the same condition as at least one condition of the printing order, the path or the timing.

In a case where the quantitative evaluation value of the granularity or streak is calculated from the simulation image, the calculated value may be printed on the printed material of the halftone selection chart.

Meanwhile, in a case where the output result of the halftone selection chart is read and the quantitative evaluation value of the granularity or streak is calculated from the read image, the calculation result may be displayed on the screen of the user interface. The user can select an appropriate halftone process by referring to the quantitative evaluation value displayed on the screen of the user interface and checking the printed material of the halftone selection chart.

As another method, in a case where the output result of the halftone selection chart is read and the quantitative evaluation value of the granularity or streak is calculated from the read image, the calculation result may be additionally printed on the read halftone selection chart. Alternatively, after the read halftone selection chart is output, when the same halftone selection chart is output, the already calculated quantitative evaluation value of the granularity or streak may be printed.

In a case where the information of the quantitative evaluation value of the granularity or streak is presented, an aspect in which a portion of the patch in which a difference in evaluation value or a change in evaluation value necessary to alert the user is generated is highlighted on the screen or the printed material is preferable.

For example, in a case where the halftone selection chart is output over multiple pages with a temporal difference between the printing timings and the change with a change in time is checked, the notification that a change in quantitative evaluation value calculated from the read image of the halftone selection chart exceeds an allowable range and is large may be highlighted so as to alert the user. In this case, the history of the quantitative evaluation value is stored in the memory, and a differentiated display or another highlight display is performed in a case where the change amount of the quantitative evaluation value exceeds the allowable range.

In addition to checking the temporal system error, that is, instability of the system for time using the halftone selection chart, it is possible to check the system error depending on the printing position (place) on the printing medium, that is, the instability of the system for the space (place) by using the halftone selection chart. In this case, the notification that a difference in quantitative evaluation value exceeds the allowable range and is large due to a difference in place may be highlighted so as to alert the user.

After one halftone processing rule is selected by the automatic selection of the system or the selection operation of the user, a plurality of other halftone processing rules of which the priority balances of the first classification (a) and the second classification (b) of the requirements approximate the selected halftone processing rule may be further generated, the image quality evaluation value or the total evaluation value may be calculated based on the priority parameter or the halftone selection chart may be output, and the system or the user may select an optimum halftone processing rule and the calculated values or output halftone selection chart. In a case where the system automatically selects the halftone process, the halftone processing rule may be repeatedly generated until the image quality evaluation value or the total evaluation value is equal to or greater than a predetermined threshold value.

<Method of Generating Halftone Selection Chart Using DBS Method>

Figure 16:
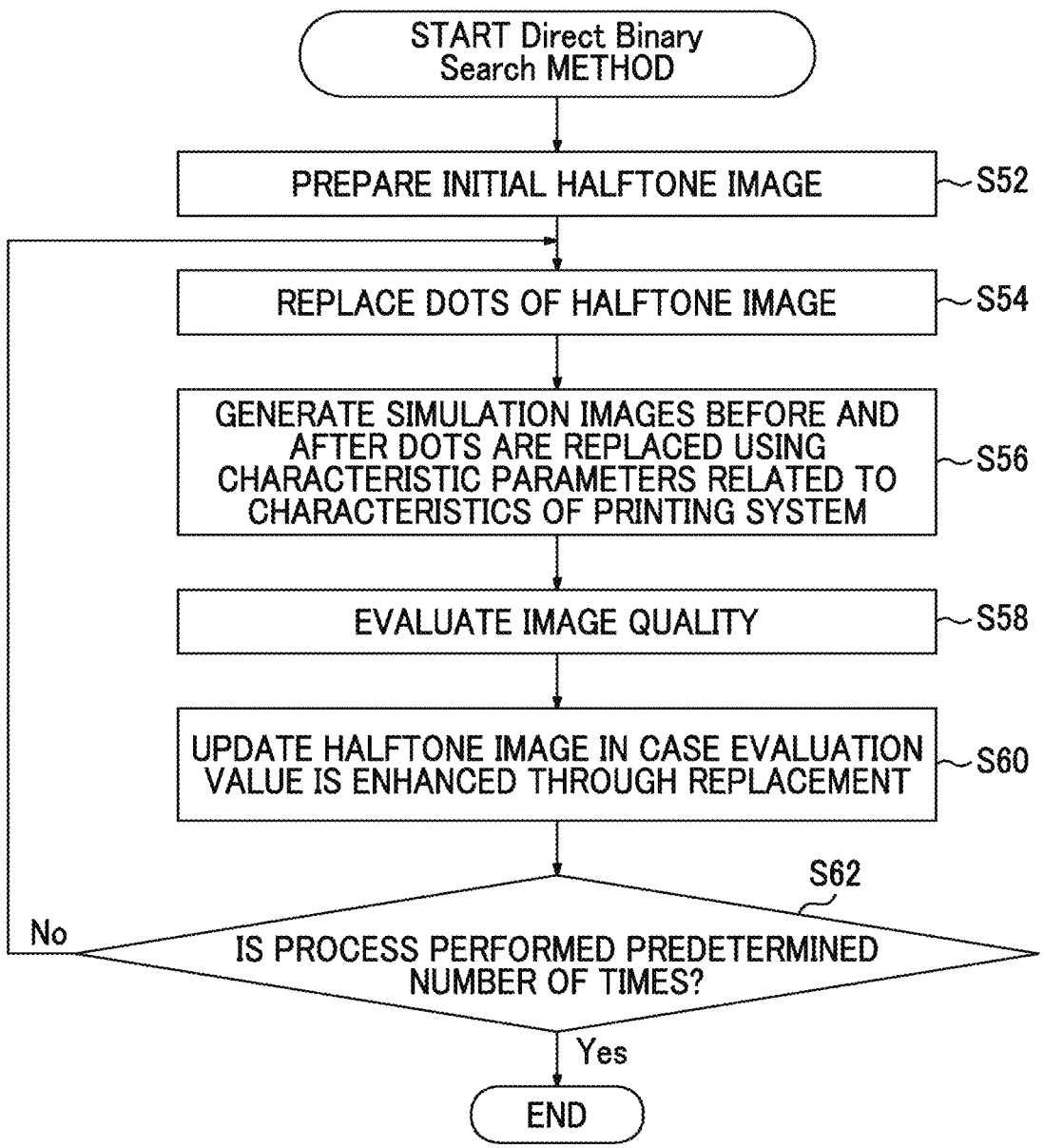
FIG. 16 is a flowchart showing a procedure of generating a halftone image of the halftone selection chart using a DBS method.

FIG. 16 is a flowchart showing a procedure of generating the halftone image of the halftone selection chart using the DBS method. In the DBS method, the halftone image of the halftone selection chart is acquired based on the already determined halftone parameter according to the flowchart of FIG. 16.

Initially, the initial halftone image is prepared (step S52). The initial halftone image is separately generated by performing a dither process using the halftone processing rule of the dither method generated in step S14 of FIG. 4 or a simply generated dither mask on the halftone selection chart.

Subsequently, a process of replacing the dots of the halftone image is performed (step S54 of FIG. 16). The simulation images are generated using the characteristic parameters related to the characteristics of the printing system before and after the dots are replaced (step S56). The image quality is evaluated for the generated simulation images (step S58), and the halftone image is updated in a case where the evaluation value is enhanced before and after the dots are replaced (step S60). The image quality evaluation value calculated when the image quality is evaluated in step S58 is acquired by applying the low-pass filter such as the Gaussian filter or the visual transfer function (VTF) representing the human visual sensitivity and calculating an error (difference) between the input image and the simulation image.

The steps from step S54 to step S60 are repeated by repeatedly replacing dots a predetermined number of times according to the previously set "pixel updating number of times".

In step S62, it is determined whether or not the process of replacing the dots the predetermined number of times is completed. In a case where the process of replacing the dots the predetermined number of times is not completed, the step returns to step S54, and the steps from step S54 to step S60 are repeated. In step S62, in a case where it is determined that the process of replacing the dots the predetermined number of times is completed, this process is ended.

<Means for Compensating for Image Quality Deterioration Due to Influence of Landing Interference>

It has been described that it is assumed that the simulation image including the landing interference is generated in order to acquire a favorable halftone processing result by adding the influence of the landing interference in the generation of the respective halftone parameters of the dither method and the error diffusion method represented by the flowcharts of FIGS. 10 and 14 or the halftone process of the direct binary search (DBS) method represented by the flowchart of FIG. 16. However, since an excessive time necessary to simulate the landing interference and simulation accuracy are problems, it is preferable that image quality deterioration due to the influence of the landing interference can be compensated by a simple method without performing the simulation. From such a viewpoint, a configuration in which means for compensating for the image quality deterioration due to the landing interference when the dots are in contact is provided is one of a desirable form.

For example, in order to compensate for granularity deterioration due to the influence of the landing interference, the moving direction or moving amount may be estimated for the dot of each pixel based on the kind, contact direction or contact amount of surrounding dots, each dot may be classified as a small group having the same moving direction and/or same moving amount based on the moving direction and/or moving amount, and the halftone parameter may be generated or the halftone process may be performed while favorably maintaining the granularity of each small group. In order to compensate for streak, unevenness occurrence and granularity deterioration due to the landing interference in a case where there are the errors of the dot diameter, the dot shape, the dot forming position shift and the non-jetting, at least one error of a predetermined dot diameter, a dot shape, a dot forming position shift or non-jetting may be added to the dots of the pixel group belonging to the same printing order, path or timing, the moving direction or moving amount may be estimated for the dot of each pixel of the group based on the kind, contact direction or contact amount of surrounding dots, each dot may be classified as a small group having the same moving direction and/or moving amount based on the moving direction and/or moving amount, and the halftone parameter may be generated or the halftone process may be performed while favorably maintaining the granularity of each small group.

Alternatively, in order to compensate for the streak, unevenness occurrence and granularity deterioration due to the landing interference in a case where there is at least one error of the dot diameter, the dot shape, the dot forming position shift or the non-jetting, even though at least one error of a predetermined dot diameter, a dot shape, a dot forming position shift or non-jetting is added to the dots of the pixel group belonging to the same printing order, path or timing, the generation of the halftone parameter or the halftone process may be performed such that a change in contact state of the dots of the group with the surrounding dots is decreased.

<Significance of What Halftone Selection Chart is Output>

The halftone selection chart has at least one significance of a first significance of what the halftone selection chart is output to compare the processing results of the two or more kinds of halftone processing rules or a second significance of what the halftone selection chart is output to check the instability of the system. The chart configuration in which the processing results of the two or more kinds of halftone processing rules are provided on one printing medium 101 is beneficial to the first significance. Meanwhile, in a case where the second significance is paid attention to, the processing results of the two or more kinds of halftone processing rules are not necessarily provided on one printing medium 101. In order to check the instability of the system depending on the place or check the instability of the system for the time, the chart form in which only the processing rule of one kind of halftone processing rule is recorded on the printing medium 101 may be used.

<Generation of Two or More Kinds of Halftone Processing Rules and Comparison of These Processing Results>

It has been described in the present embodiment that at least two kinds of halftone processing rules are generated, and more preferably, two or more halftone processing rules are generated.

Figure 17:
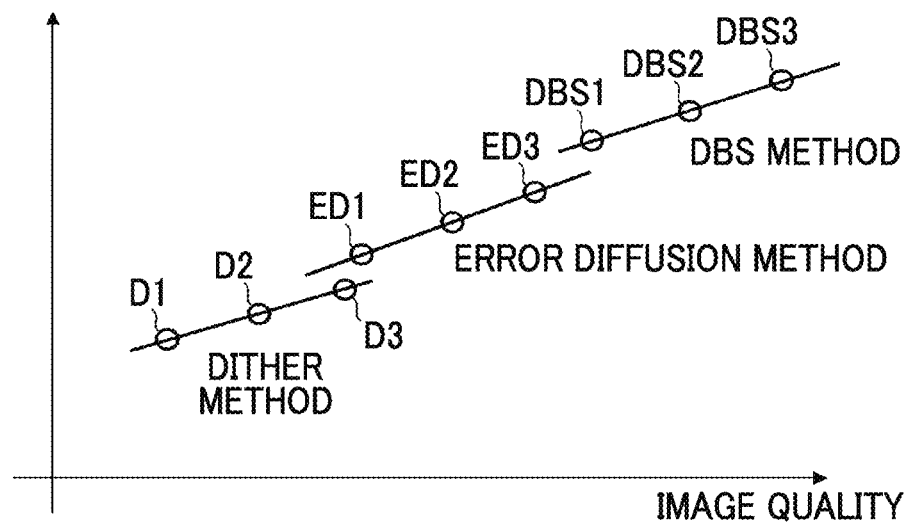
FIG. 17 is a graph showing qualitative tendencies of various halftone processing rules.

FIG. 17 is a graph showing qualitative tendencies of various halftone processing rules in a case where a horizontal axis represents the image quality and a vertical axis represents the system cost or the halftone processing time. If the comparison is relatively performed on the halftone algorithms of the dither method, the error diffusion method and the DBS method, the image quality becomes higher in sequential order of the dither method, the error diffusion method and the DBS method, and the system cost or the halftone processing time becomes higher or longer in sequential order of the dither method, the error diffusion method and the DBS method. However, in all the dither method, the error diffusion method and the DBS method, the balance between the image quality and the system cost or the halftone processing time can be changed depending on the setting of the halftone parameter.

Various kinds of halftone processes of which the balances of the requirements are different may be set. However, in the example shown in FIG. 17, a total of 9 kinds of settings in which the level of the "image quality" is divided into 3 levels of low/medium/high are performed for the dither method, the error diffusion method and the DBS method. In FIG. 17, D1, D2 and D3 represent 3 kinds of settings in the dither method, ED1, ED2 and ED3 represent 3 kinds of settings in the error diffusion method, and DBS1, DBS2 and DBS3 represent 3 kinds of settings in the DBS method.

Figure 18:
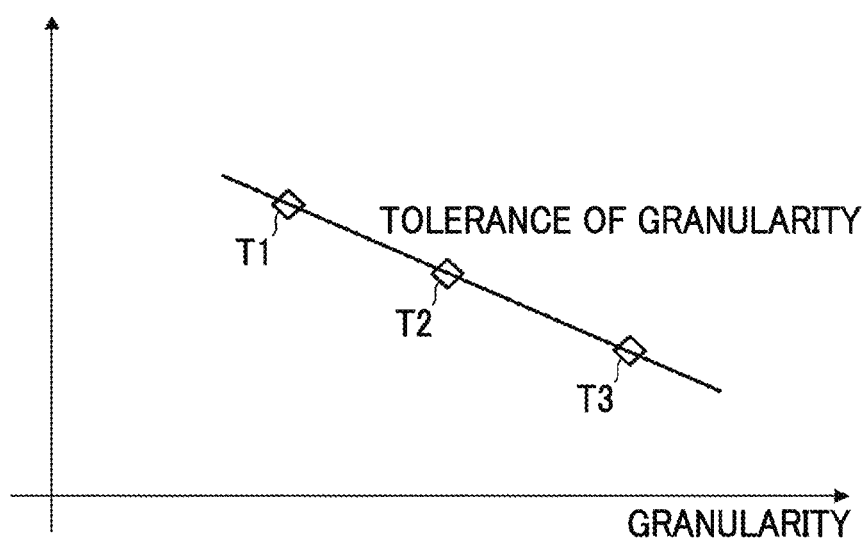
FIG. 18 is a graph showing the relationship between tolerance to instability of the system and granularity.

Unlike the advantages and disadvantages of each requirement depending on the halftone algorithm described in FIG. 17, if the granularity is improved using one parameter irrespective of the halftone algorithm, there is a tendency for the tolerance to the instability of the system to be deteriorated, as shown in FIG. 18.

In FIG. 18, a horizontal axis represents the granularity, and a vertical axis represents the tolerance to the instability of the system. In FIG. 18, as the tolerance to the instability of the system, there are both the tolerance of the granularity and the tolerance of the streaks, but there is the same qualitative tendency in both these tolerances. In FIG. 18, only the tolerance of the granularity is illustrated. That is, as shown in FIG. 18, there is a tendency for the tolerance to the instability of the system to be deteriorated and the tolerance of the streaks to be deteriorated if the granularity is increased. In contrast, there is the relation that the tolerance to the instability of the system is improved and the tolerance of the streaks is also improved if the granularity is sacrificed.

For example, as the setting example of the tolerance to the instability of the system, it is considered that 3 kinds of settings in which the level of the tolerance is divided into 3 levels of high/medium/low are performed. In FIG. 18, T1, T2 and T3 represent 3 kinds of settings performed on the tolerance to the instability of the system.

Two or more kinds of halftone processing rules of which the balances of the plurality of requirements for the halftone process are different are generated based on the qualitative tendency described in FIGS. 17 and 18. For example, a total of 27 kinds of halftone processing rules may be generated as a default by combining 9 kinds of settings described in FIG. 17 with 3 kinds of settings related to the tolerance of the granularity described in FIG. 18.

The halftone selection charts according to the processing results of 27 kinds of halftone processing rules may be output, and one halftone processing rule may be selected from these charts by the user.

As another method, the user may designate the setting of the priority for the requirement, may generate two kinds or several kinds of halftone processing rules which approximate the setting of the priority, may previously reflect the intension of the user, and may narrow the presentation range of the kind of the halftone process.

For example, the kind of the halftone algorithm may be previously restricted and the halftone processing rule may be generated such that the DBS method or the error diffusion method is used in a case where the setting in which the image quality is important is designated, the error diffusion method is used in a case where the setting in which the image quality and the cost balance are important is designated, and the dither method is used in a case where the setting in which the cost is important is designated.

A quantitative requirement value as a target is previously estimated to some extent for the halftone processing time or the cost of the requirements in many cases. That is, in order to meet the requirements such as productivity, the user can previously set a target value to the halftone processing time or the cost in many cases.

Accordingly, a plurality of halftone processing rules may be selected from 27 kinds of halftone processing rules within a range that satisfies the requirements (target value) of the user, and may be actually output as the halftone selection chart.

<Selection of Halftone Process>

The method of selecting one halftone processing rule from the two or more kinds of halftone processing rules is not limited to a form in which the user checks the chart output of the halftone selection chart and selects any one halftone process, and the system may automatically select one halftone process.

In this case, the system previously retains the priority parameters for the plurality of requirements. For example, there is the image quality, the system cost or the halftone generating time as the first classification (a) of the requirement, and there is the granularity or the tolerance to the system error as the second classification (b) of the requirement. The system previously retains the following parameters A, B, C, D, p, q and r, and the total evaluation value is calculated by the following expression.

Total evaluation value=$A$×image quality evaluation value+$B$×system cost+$C$×halftone generating time+$D$×halftone processing time Image quality evaluation value=$p$×granularity evaluation value [system error absence]+$q$×{granularity evaluation value [system error presence (addition of "+predetermined amount" error to first group)]+granularity evaluation value [system error presence (addition of "+predetermined amount" error to second group)]+ . . . +granularity evaluation value [system error presence (addition of "−predetermined amount" error to first group)]+granularity evaluation value [system error presence (addition of "−predetermined amount" error to second group)]+ . . . )+$r$×{streak evaluation value [system error presence (addition of "+predetermined amount" error to first group)]+streak evaluation value [system error presence (addition of "+predetermined amount" error to second group)]+ . . . +streak evaluation value [system error presence (addition of "−predetermined amount" error to first group)]+streak evaluation value [system error presence (addition of "−predetermined amount" error to second group)]+ . . . }    Expression (4)

Here, in order to acquire the image quality evaluation value, the simulation image is generated from the halftone processing result of the halftone selection chart by the above-describe method, the granularity evaluation values or the streak evaluation values are calculated, the values of the evaluation are appropriately averaged values for each color, each gradation, sky blue or pale orange.

The granularity evaluation values or the streak evaluation values may be averaged or may not be average for the ink kind. In order to acquire the granularity or streak evaluation values for the system error, the generation of the simulation image includes the generation of the simulation image by respectively adding the error to the dots of the pixel group belonging to the same condition as the printing order, the path or the timing.

A simulation condition applied when the halftone process generation of generating the two or more kinds of halftone processing rules is performed as a previous stage does not necessarily coincide with a simulation condition applied when the simulation image quality evaluation in the halftone selection of selecting one halftone processing rule from the two or more kinds of halftone processing rules by the user selection or the automatic selection of the system is performed. For example, the simulation in the halftone process generation may be performed in a condition in which the factor of the landing interference is not included or a condition in which the simulation is performed in consideration of only the "dot movement" of the factor of the landing interference in order to promptly generate the halftone processing rule, and the simulation in the automatic halftone selection may be performed including all changes in dot density, dot shape and dot movement due to the landing interference in order to reliably reproduce a reality image if possible. Here, the "halftone process generation" indicates the generation of the halftone parameter in a case where the halftone algorithm is the dither method or the error diffusion method and the generation of the halftone image in a case where the halftone algorithm is the DBS method.

As the predetermined amount of the added error (that is, a predetermined error amount), an appropriate value may be separately determined, or may be a standard deviation calculated from the reading result of the characteristic parameter acquisition chart.

Alternatively, instead of the calculation of the evaluation value based on the simulation image, the halftone selection chart output by the printing device 24 may be read by the image reading device 26, the granularity evaluation value or the streak evaluation value may be calculated from the read image, the values of the evaluation values may be appropriately averaged for each color, each gradation, sky blue or pale orange, and the image quality evaluation value may be acquired by the following expression.

Image quality evaluation value=$p$×granularity evaluation value+$r$×streak evaluation value The respective allowable threshold values may be set to the image quality evaluation value, the system cost, the halftone generating time, the halftone processing time, the granularity evaluation value [system error absence], the granularity evaluation value [system error presence]and the streak evaluation value, the halftone processing rules of which the value is equal to or greater than the threshold value may be initially extracted, and an optimum halftone process may be determined based on the total evaluation value from the extracted halftone processing rules.

For example, in a case where there is an attempt to determine the halftone process in which the system cost is as low as possible, there is a method of acquiring the total evaluation value by initially extracting the halftone processes of which the value is equal to or greater than the allowable threshold value for the image quality evaluation value, the system cost, the halftone generating time, the halftone processing time, the granularity evaluation value [system error absence], the granularity evaluation value [system error presence] and the streak evaluation value and setting the priority parameter B to be a large value.

The total evaluation value is one example of a "determination evaluation value". Real numbers indicating the priorities are respectively set to the priority parameters A, B, C, D, p, q and r.

After one halftone processing rule is selected by the automatic selection of the system or the selection operation of the user, a plurality of other halftone processing rules of which the priority balances of the first classification (a) and the second classification (b) of the requirements approximate the selected halftone processing rule may be further generated, the image quality evaluation value or the total evaluation value may be calculated based on the priority parameter or the halftone selection chart may be output, and the system or the user may select an optimum halftone processing rule and the calculated values or output halftone selection chart. In a case where the system automatically selects the halftone process, the halftone processing rule may be repeatedly generated until the image quality evaluation value or the total evaluation value is equal to or greater than a predetermined threshold value.

<Description Related to Function of Image Processing Device According to Second Embodiment>

Figure 19:
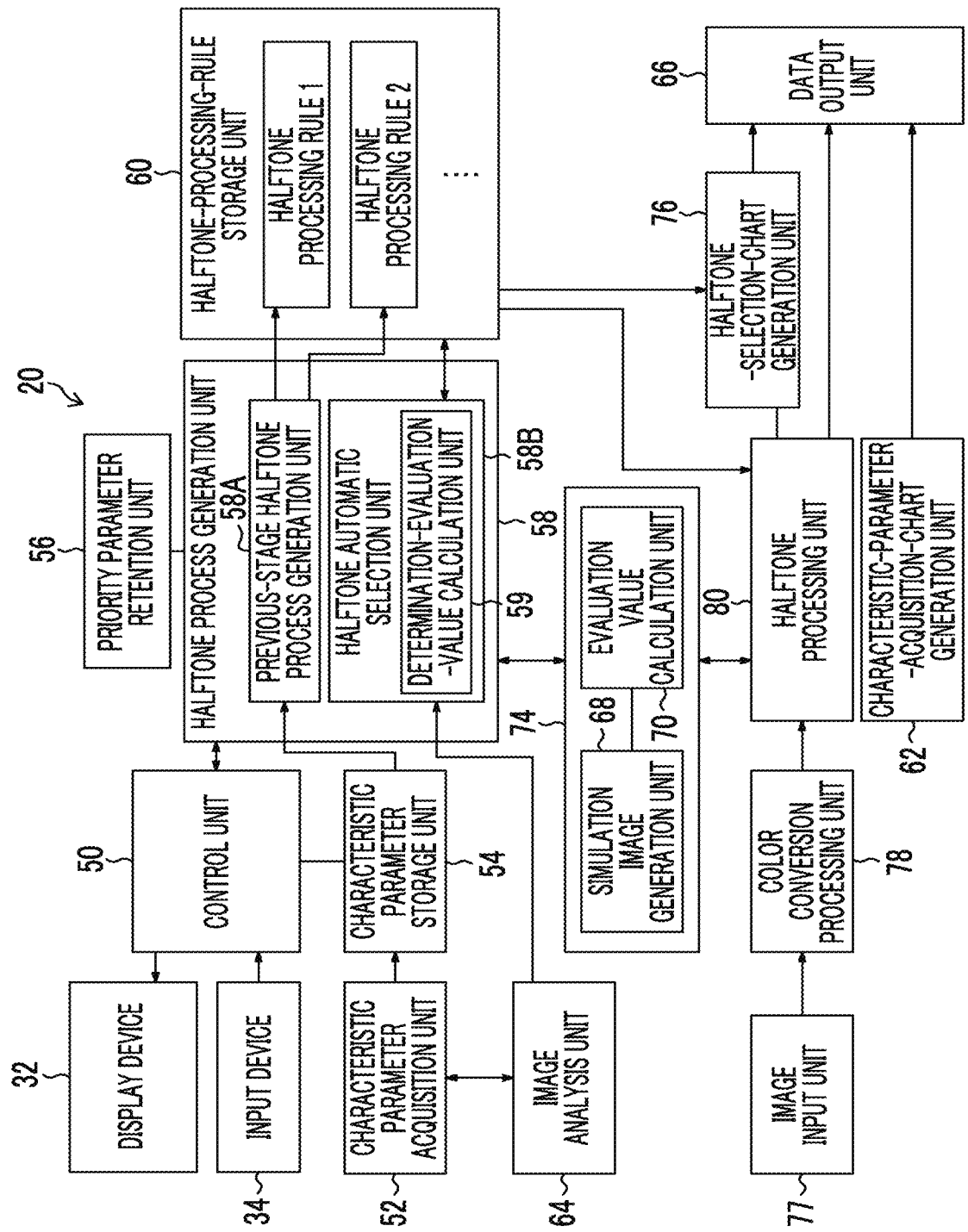
FIG. 19 is a block diagram for describing a function of an image processing device according to a second embodiment.

FIG. 19 is a block diagram for describing a function of an image processing device according to a second embodiment. The image processing device according to the second embodiment shown in FIG. 19 may be used instead of the configuration of the image processing device according to the first embodiment described in FIG. 3. In FIG. 19, the same or similar elements as or to those of the configuration described in FIG. 3 will be assigned the same reference numerals, and the description thereof will be omitted.

The halftone process generation unit 58 of the image processing device 20 according to the second embodiment shown in FIG. 19 includes a previous-stage halftone process generation unit 58A, and a halftone automatic selection unit 58B. The previous-stage halftone process generation unit 58A generates the halftone processing rule that defines the processing contents of the two or more kinds of halftone processes of which the balances of priority for the plurality of requirements required in the halftone process are different based on the characteristic parameters. The halftone automatic selection unit 58B performs a process of automatically selecting the kind of the halftone process used in the printing of the printing system 10 from the kinds of the halftone processes defined by the two or more kinds of halftone processing rules generated by the previous-stage halftone process generation unit 58A based on the priority parameters.

The halftone automatic selection unit 58B corresponds to one example of "halftone automatic selection means". The halftone automatic selection unit 58B includes a determination-evaluation-value calculation unit 59 as one example of "determination-evaluation-value calculation means".

The determination-evaluation-value calculation unit 59 is calculation means for calculating a determination evaluation value that evaluates the adequateness of the halftone process defined by the halftone processing rule generated by the previous-stage halftone process generation unit 58A. The determination-evaluation-value calculation unit 59 calculates the determination evaluation value based on the priority parameter retained by the priority parameter retention unit 56. That is, the determination-evaluation-value calculation unit 59 calculates a total evaluation value which is one example of the determination evaluation value. The specific example of the total evaluation value is already described. The halftone automatic selection unit 58B automatically selects the kind of the halftone process used in the printing of the printing system 10 based on the determination evaluation value calculated by the determination-evaluation-value calculation unit 59.

The priority parameter retention unit 56 stores the priority parameters that designate the balances of priority related to a plurality of requirements. The step of causing the priority parameter retention unit 56 to store the priority parameters corresponds to one example of a priority parameter retention step.

The priority parameter is freely input by the user through the input device 34, and thus, the balances of priority can be set and the setting content can be changed.

The image processing device 20 includes the image quality evaluation processing unit 74 which includes the simulation image generation unit 68 and the evaluation value calculation unit 70, and the halftone process generation unit 58 generates the halftone processing rule in cooperation with the image quality evaluation processing unit 74. The simulation image generation unit 68 corresponds to one example of "simulation image generation means", and the evaluation value calculation unit 70 corresponds to one example of "image-quality-evaluation-value calculation means".

The image quality evaluation processing unit 74 performs an optimum searching process in which the evaluation value is enhanced while repeatedly performing the generation of the simulation image and the calculation of the evaluation value of the image quality for the simulation image. The halftone parameter is determined through the process performed by the image quality evaluation processing unit 74. The simulation image generation unit 68 generates the simulation image in a case where the halftone image acquired by applying the halftone process defined by the halftone processing rule generated by the previous-stage halftone process generation unit 58A is printed, and the evaluation value calculation unit 70 calculates the image quality evaluation value from the simulation image generated by the simulation image generation unit 68. The determination-evaluation-value calculation unit 59 of the halftone automatic selection unit 58B can calculate the determination evaluation value by using the image quality evaluation value calculated by the image quality evaluation processing unit 74.

The multiple kinds of halftone processing rules generated by the previous-stage halftone process generation unit 58A are registered in the halftone-processing-rule storage unit 60.

The image analysis unit 64 shown in FIG. 19 functions as means for calculating a quantitative evaluation value of the halftone image by analyzing the read image of the halftone selection chart output from the printing device 24 in addition to function as means for generating the characteristic parameters by analyzing the read image of the characteristic parameter acquisition chart. The determination-evaluation-value calculation unit 59 of the halftone automatic selection unit 58B may acquire information of at least one quantitative evaluation value of the granularity evaluation value or the streak evaluation value calculated by the image analysis unit 64 based on the output result of the halftone selection chart from the image analysis unit 64, and may calculate the determination evaluation value. The halftone automatic selection unit 58B may perform a process of automatically selecting the optimum halftone processing rule based on the quantitative evaluation value calculated from the read image of the halftone selection chart.

Figure 20:
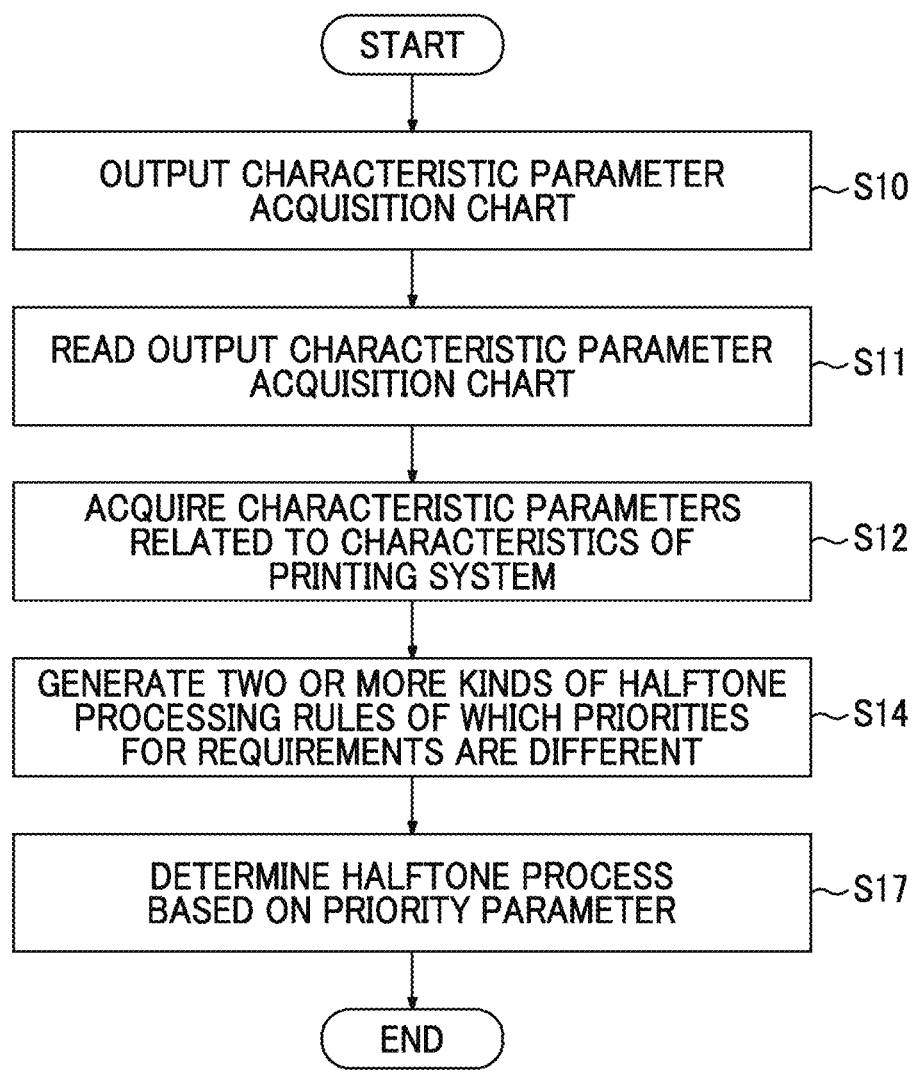
FIG. 20 is a flowchart showing another example of a method of generating the halftone processing rule.

FIG. 20 is a flowchart showing a method of generating the halftone processing rule in the printing system including the image processing device according to the second embodiment.

In FIG. 20, the steps common to the steps of the flowchart described in FIG. 4 will be assigned the same step numbers, and thus, the description thereof will be omitted. In FIG. 20, the steps from step S10 to step S14 are the same as those of the flowchart of FIG. 4.

After the two or more kinds of halftone processing rules are generated based on the characteristic parameters in step S14, one kind of halftone processing rule is determined from the two or more kinds of generated halftone processing rules based on the priority parameter (step S17). That is, the combination of step S14 and step S17 corresponds to one example of a "halftone process generation step". Step S14 is a previous stage for acquiring one optimum halftone process for the system, and the two or more kinds of halftone processing rules are generated. In step S17, a stepwise process of selecting one kind of optimum halftone priority parameter from the two or more kinds of halftone processing rules generated in step S14 is performed.

However, when the present invention is implemented, the present invention is not necessarily limited to the configuration in which the step of the stepwise process shown in FIG. 20 is performed. For example, an evaluation function that reflects the setting of the priority parameter may be defined, and one kind of halftone processing rule may be generated using an optimum method of searching an optimum solution which maximizes or minimizes the evaluation value as the value of the evaluation function for the combination of the halftone algorithm and the halftone parameter.

In this case, the multiple kinds of halftone processing rules may be generated during the calculation process of calculating the optimum solution, but the halftone processing rule generated as the kind of the halftone process capable of being ultimately used in the system may be analyzed to be one kind of halftone processing rule as the optimum solution.

Even in a case where one halftone processing rule is automatically selected (determined) by the system according to the setting of the priority parameter, the halftone processing rule determined by the automatic selection may be appropriately changed by the user. It is preferable that various halftone processing rules generated by the image processing device 20 are registered as a line-up such that the halftone processing rule can be reselected by changing the setting of the priority parameter by the user operation or the program of the system.

It is preferable that information items of the quantitative evaluation value of the granularity or streaks, the halftone generating time, the halftone processing time and the system cost related to the halftone processing rule are stored in association with the halftone processing rule such that these information items are referred to if necessary.

The image quality evaluation value, the system cost, the halftone generating time and the halftone processing time may be calculated for each color of ink used in the printing device 24, that is, for each ink kind, and a different halftone algorithm and halftone parameter may be selected for each ink kind. Alternatively, the image quality evaluation value, the system cost, the halftone generating time and the halftone processing time may be calculated for all colors, and the same common halftone algorithm and halftone parameter may be selected for all colors.

<Another Example of Characteristic Parameter Acquisition Chart>

Figure 21:
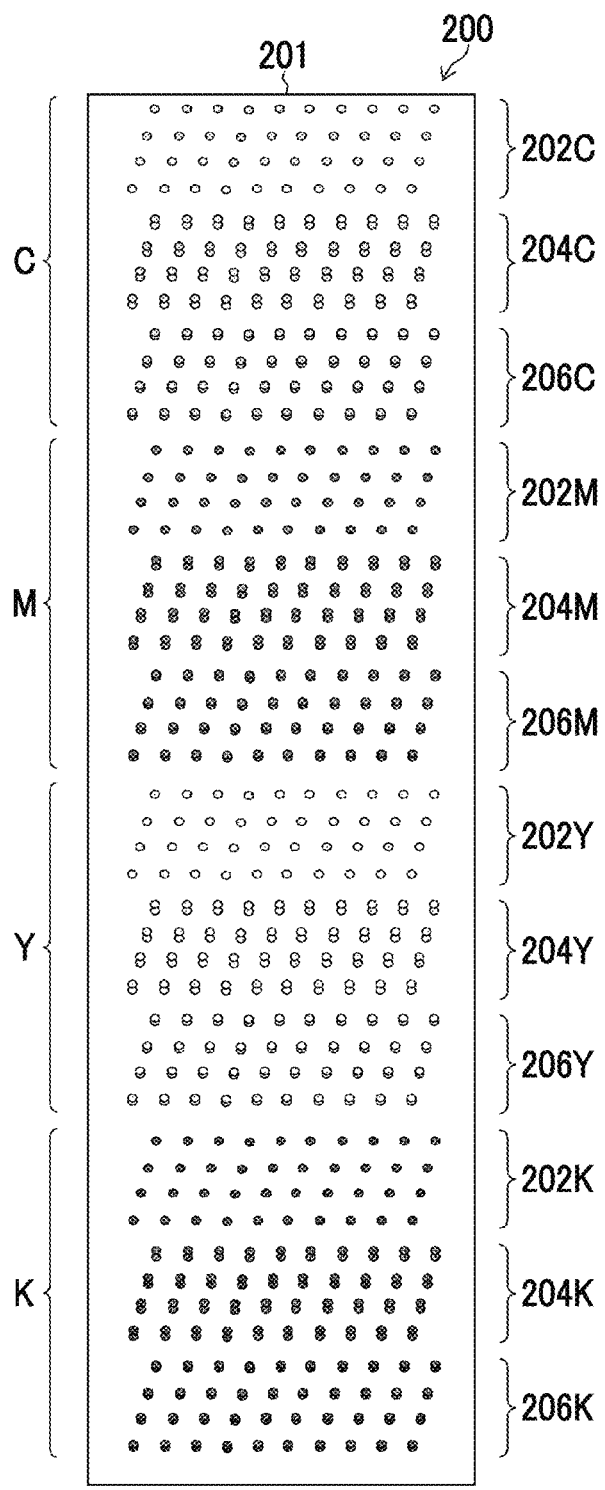
FIG. 21 is a diagram showing another example of the characteristic parameter acquisition chart.

FIG. 21 is a diagram showing another example of the characteristic parameter acquisition chart. A characteristic parameter acquisition chart 200 shown in FIG. 21 is an example of the characteristic parameter acquisition chart output by the single path printer.

The characteristic parameter acquisition chart 200 shown in FIG. 21 includes single dot patterns 202C, 202M, 202Y and 202K, first continuous dot patterns 204C, 204M, 204Y and 204K, and second continuous dot patterns 206C, 206M, 206Y and 206K, which are recorded on a printing medium 201 by nozzles which are printing elements in recording heads of the respective colors of cyan, magenta, yellow and black.

The single dot patterns 202C, 202M, 202Y and 202K are discrete dot patterns in which dots are discretely recorded in an isolation state in which the single dot is isolated from another dot. The first continuous dot patterns 204C, 204M, 204Y and 204K and the second continuous dot patterns 206C, 206M, 206Y and 206K are continuous dot patterns in which two or more dots are recorded so as to be in contact.

The single dot patterns 202C, 202M, 202Y and 202K correspond to the single dot patterns 102C, 102M, 102Y and 102K of the characteristic parameter acquisition chart 100 described in FIG. 5. The first continuous dot patterns 204C, 204M, 204Y and 204K of FIG. 21 correspond to The first continuous dot patterns 104C, 104M, 104Y and 104K of the characteristic parameter acquisition chart 100 described in FIG. 5, and the second continuous dot patterns 206C, 206M, 206Y and 206K of FIG. 21 correspond to the second continuous dot patterns 106C, 106M, 106Y and 106K of the characteristic parameter acquisition chart 100 described in FIG. 5. The first continuous dot patterns 104C, 104M, 104Y and 104K and the second continuous dot patterns 106C, 106M, 106Y and 106K of FIG. 5 in which the plurality of dots in contact with each other are adjacent in the main scanning direction are different from the first continuous dot patterns 204C, 204M, 204Y and 204K and the second continuous dot patterns 206C, 206M, 206Y and 206K of FIG. 21 in which the plurality of dots in contact with each other are adjacent in the sub scanning direction.

In both the single path type and the serial scan type, multiple levels of continuous dot patterns acquired by changing a jetting time difference as well as the distance between two dots jetted so as to overlap in the continuous dot pattern may be similarly formed. In the single path type, the transport speed of the printing medium 201 is changed, and thus, it is possible to change the jetting time difference between two dots of the continuous dot pattern.

Figure 22:
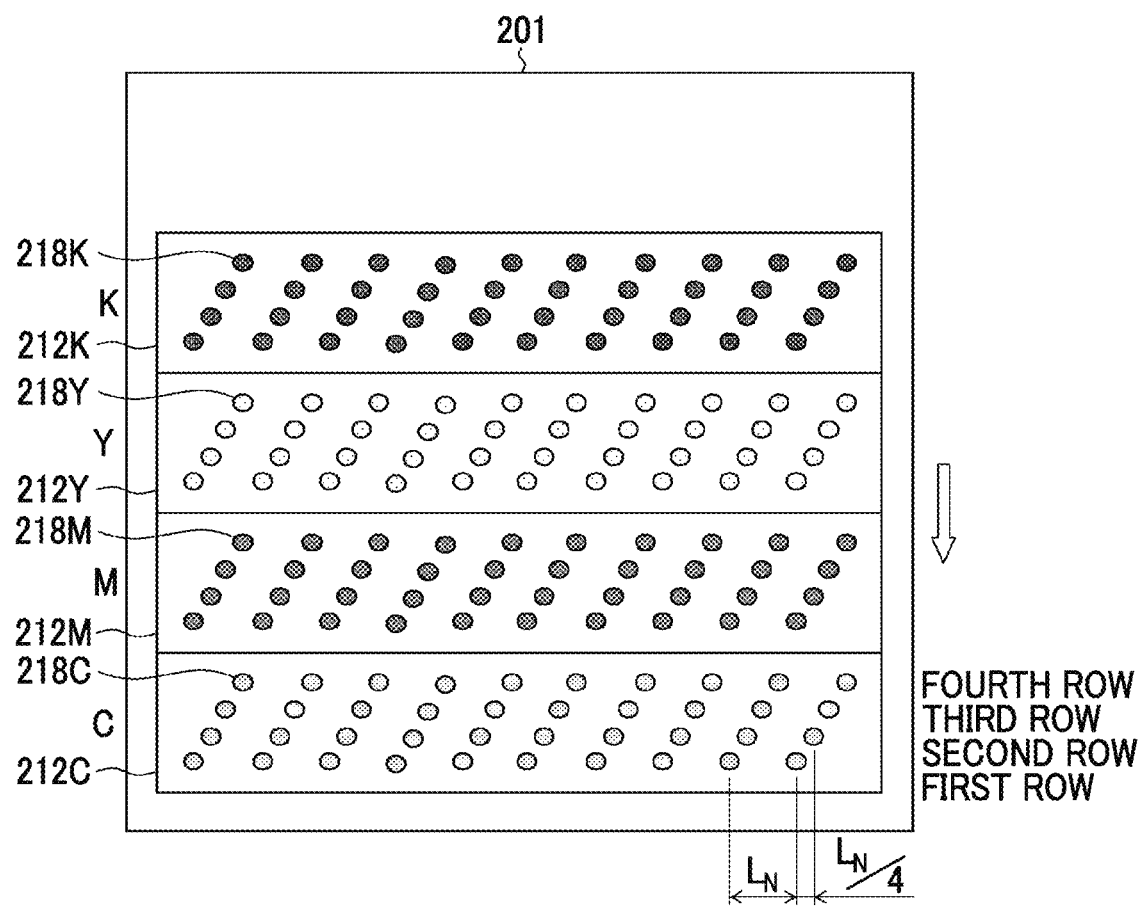
FIG. 22 is a schematic plan view of a single path type inkjet printing device used in the drawing of the characteristic parameter acquisition chart of FIG. 21.

FIG. 22 is a schematic plan view of a recording head portion of an ink jet printing device as the single path printer used in the outputting of the characteristic parameter acquisition chart 200 shown in FIG. 21. In FIG. 22, a longitudinal direction from the top to the bottom is the transport direction of the printing medium 201. As means (medium transport means) for transporting the printing medium 201, various forms such as a drum transport type, a belt transport type, a nip transport type, a chain transport type and a palette transport type may be adopted, or an appropriate combination of these types may be adopted. The transport direction of the printing medium 201 is referred to as a "medium transport direction". In FIG. 22, the medium transport direction is depicted by a white arrow. The medium transport direction corresponds to the "sub scanning direction". A horizontal direction in FIG. 22, that is, a direction which is parallel to the paper surface and is perpendicular to the medium transport direction is referred to as a "medium width direction". The medium width direction corresponds to the "main scanning direction".

The ink jet printing device as the single path printer shown in FIG. 22 includes a cyan recording head 212C that jets a cyan ink, a magenta recording head 212M that jets a magenta ink, a yellow recording head 212Y that jets a yellow ink and a black recording head 212K that jets a black ink.

Each of the cyan recording head 212C, the magenta recording head 212M, the yellow recording head 212Y and the black recording head 212K is a line head having a nozzle array in which a plurality of nozzles is arranged over a length corresponding to the maximum width of an image forming region in the medium width direction perpendicular to the medium transport direction.

The number of nozzles, the arrangement form of nozzles and a nozzle density of the recording heads (212C, 212M, 212Y and 212K) of the respective colors may be variously designed. A head common to all colors may be designed for the recording heads (212C, 212M, 212Y and 212K) of the respective colors, or different heads may be designed for the recording heads of some colors or the respective colors.

Here, in order to simplify the illustration, a common structure in which the head common to all colors is designed for the recording heads (212C, 212M, 212Y and 212K) of the respective recording heads is established, and only 40 nozzles for each of the recording heads (212C, 212M, 212Y and 212K) are shown. In FIG. 22, an example in which the ink jet printing device uses four inks of CMYK is illustrated, and the combination of the ink colors and the number of colors is not limited to the present embodiment. As described in FIG. 6, a light ink, a dense ink or a special color ink may be added if necessary. The arrangement order of the recording heads of the respective colors is not limited to the example of FIG. 22.

On an ink jetting surface of the cyan recording head 212C shown in FIG. 22, a plurality of ink jetting nozzles 218C is arranged in a regular arrangement pattern in both a row direction along the main scanning direction and a diagonal column direction which is not parallel and perpendicular to the main scanning direction and has a predetermined angle. Here, an example of a nozzle arrangement of a matrix arrangement in 4 rows×10 columns in which nozzle arrays in which four nozzles 218C are arranged in the diagonal column direction at a predetermined interval are formed in 10 columns in different positions in the main scanning direction is illustrated.

Such a two-dimensional nozzle arrangement is configured such that row-direction nozzle arrays in which 10 nozzles 218C are arranged in a line along the row direction at an equal interval are formed in 4 rows in different positions in the sub scanning direction. In a case where row numbers are assigned to the row-direction nozzle arrays in 4 rows in the order of a first row, a second row, a third row and a fourth row from the bottom to the top of FIG. 22 (that is, from the downstream to the upstream in the medium width direction), the nozzle positions of the first row and the second row are different in the main scanning direction. Similarly, the nozzle positions in the main scanning direction are different between the second row and the third row, between the third row and the fourth row, and between the fourth row and the first row.

If a nozzle interval between the nozzles 218C, which are arranged in a line at an equal interval, in the main scanning direction within the row-direction nozzle array is $L_N$, the shift amount of the nozzle position in the main scanning direction between the first row and the second row, between the second row and the third row, between the third row and the fourth row, and between the fourth row and the first row is $L_N/4$ which is a value acquired by dividing $L_N$ by the total number of rows. Such a two-dimensional nozzle arrangement may be considered as a nozzle array in which the respective nozzles 218C are arranged at an equal interval (an interval of "$L_N/4$") in the main scanning direction.

The arrangement form of the ink jetting nozzles 218M of the magenta recording head 212M, the arrangement form of the ink jetting nozzles 218Y of the yellow recording head 212Y and the arrangement form of the ink jetting nozzles 218K of the black recording head 212K are the same as the nozzle arrangement form of the cyan recording head 212C.

The present embodiment is not limited to the matrix arrangement illustrated in FIG. 22. In general, in the recording head having the two-dimensional nozzle arrangement, a projection nozzle array projected (orthogonally projected) such that the respective nozzles in the two-dimensional nozzle arrangement are arranged in the medium width direction (corresponding to the main scanning direction) may be considered to be equivalent to a single-row nozzle array in which the nozzles are arranged at an approximately equal interval with a nozzle density capable of achieving a recording resolution in the main scanning direction (medium width direction). The "equal interval" mentioned herein means that a jetting point capable of being recorded in the ink jet printing device are a substantially equal interval. For example, a case where intervals are slightly differentiated in consideration of the movement of the liquid droplets on the medium due to the landing interference or a manufacturing error included in the concept of the "equal interval". If the projection nozzle array (referred to as a "substantial nozzle array".) is considered, the nozzle positions (nozzle numbers) may be associated with the projection nozzles in the order of the arrangement of the projection nozzles arranged in the main scanning direction. The number of nozzles or the arrangement form of nozzles constituting the two-dimensional nozzle arrangement is appropriately designed depending on the recording resolution and a drawing executable width.

When the line head is formed, a plurality of short head modules in which a plurality of nozzles is two-dimensionally arranged is connected, and thus, it is possible to form the line head including a nozzle array having a required length in the medium width direction.

As shown in FIG. 22, the ink jet printing device that uses the recording heads (212C, 212M, 212Y and 212K) as the line head including a nozzle array having a length corresponding to the entire width of the image forming region of the printing medium 201 can record the image in the image forming region of the printing medium 201 by transporting the printing medium 201 at a predetermined speed by medium transport means (not shown), performing jetting from the respective recording heads (212C, 212M, 212Y and 212K) in an appropriate timing according to the transport of the printing medium 201 and performing an operation (that is, single sub scanning) of relatively moving the printing medium 201 and the respective recording heads (212C, 212M, 212Y and 212K) once in the medium transport direction.

According to the configuration of FIG. 22, it is possible to form the single dot patterns 202C, 202M, 202Y and 202K, the first continuous dot patterns 204C, 204M, 204Y and 204K and the second continuous dot patterns 206C, 206M, 206Y and 206K shown in FIG. 21. by transporting the printing medium 201 at a predetermined speed in the medium transport direction by the medium transport means (not shown) and performing jetting the nozzles (218C, 218M, 218Y and 218K) of the respective recording heads (212C, 212M, 212Y and 212K) in an appropriate timing.

That is, it is possible to form the single dot pattern 202C, the first continuous dot pattern 204C and the second continuous dot pattern 206C of FIG. 21 by performing jetting from the respective nozzles 218C of the cyan recording head 212C. An inter-dot distance between two dots overlapping each other is different in the first continuous dot pattern 204C and the second continuous dot pattern 206C. That is, an interval between two times of jetting timings when two dots overlapping each other are recorded is different in the first continuous dot pattern 204C and the second continuous dot pattern 206C.

The same is true of the respective colors of M, Y and K, and it is possible to form the single dot pattern 202M, the first continuous dot pattern 204M and the second continuous dot pattern 206M of FIG. 21 by transporting the printing medium 201 and performing jetting from the respective nozzles 218M of the magenta recording head 212M of FIG. 22 in an appropriate timing.

It is possible to form the single dot pattern 202Y, the first continuous dot pattern 204Y and the second continuous dot pattern 206Y of FIG. 21 by transporting the printing medium 201 and performing jetting from the respective nozzles 218Y of the yellow recording head 212Y of FIG. 22 in an appropriate timing.

Similarly, it is possible to form the single dot pattern 202K, the first continuous dot pattern 204K and the second continuous dot pattern 206K of FIG. 21 by transporting the printing medium 201 and performing jetting from the respective nozzles 218K of the black recording head 212K of FIG. 22 in an appropriate timing.

It is necessary to separate (give a time difference) the jetting timings of the nozzles adjacent to each other in the horizontal direction in FIG. 22 by a predetermined time such that dots adjacent to each other in the horizontal direction (main scanning direction) do not overlap in FIG. 21. The "nozzles adjacent to each other in the horizontal direction" are nozzles adjacent to each other in the projection nozzle array as the "substantial nozzle array" arranged in the horizontal direction.

In the configuration shown in FIG. 22, it is possible to form the pattern shown in FIG. 21 by performing jetting in the order of K→Y→M→C according to the transport of the printing medium 201 and performing jetting in the order of first row→second row→third row→fourth row among the four rows of the two-dimensional nozzle arrangement for the respective colors. However, it is necessary to separate (give a time difference) the jetting timings of the nozzles of the respective colors and the respective rows by a predetermined amount such that dots recorded by different nozzles do not overlap each other.

The above-described jetting timings are controlled by combining the characteristic-parameter-acquisition-chart generation unit 62 (see FIGS. 3 and 19) and the printing control device 22 (see FIG. 2) which are already described above. Instead of the configuration described in FIGS. 5 and 6, the configuration described in FIGS. 21 and 22 may be adopted.

<Inclusion of System Characteristic Parameter by Concept of System Error>

It has been described in the above description that the "system error" within the term "system error absence" or "tolerance to the system error" has the meaning of an error changed temporally and/or for each place as the change component of the characteristic parameter.

Meanwhile, as already described above, errors having reproducibility such as non-jetting due to nozzle failure and an error in nozzle position caused by the manufacturing error are included in the system error. These errors having reproducibility may be comprehended as parameters indicating the characteristics of the system, and may be considered as a parameter of the "system error". That is, the error of the system errors which is capable of being reliably defined by the input from the user or the measurement based on the reading result of a test chart, that is the error having reproducibility may be considered as the characteristic parameter of the system. In the present specification, the error having reproducibility is referred to as a "characteristic error". The characteristic error means an error as the system characteristic. Since the characteristic error of the system errors which is the error having reproducibility is the characteristic parameter of the system, it is possible to generate an optimum halftone processing rule acquired by estimating the characteristic error for the characteristic error.

Meanwhile, in the present specification, the error of the system errors which is changed temporally and/or for each place, that is, the irregularly changed error is referred to as a "random system error". It is possible to design only the halftone to which the tolerance to the error is applied for the random system error.

It is possible to comprehend that the relationship between the characteristic error and the random system error corresponds to the relationship between a representative value such as an expectation value (average value) or a center value related to the distribution of the measurement values of a certain interest error item and "dispersion" such as a variation from the representative value or a change width.

A further specific example of the system error will be described. As an example of a common "system error" for the serial scan type ink jet printing system and the single path type ink jet printing system, there are each nozzle error of the head, non-jetting and a position shift for each droplet kind.

The nozzle error includes an error of a liquid droplet in a flying direction, an error of a jetting speed, an error of a droplet amount or an error of a dot shape in each nozzle. The jetting speed is represented by the term "drop velocity" in some cases. The error of the droplet amount can be comprehended as the error of the dot density. The dot shape is a synonym for a "dot profile". Since the error in the flying direction, the error of the jetting speed, the error of the droplet amount and the error of the dot shape are errors depending on the droplet kind in some cases, it is preferable that these errors are comprehended for each droplet kind.

The nozzle error is the term that comprehensively represents the error of the nozzle position in the main scanning direction and/or sub scanning direction, the error of the dot density, the error of the dot diameter, the error of the dot shape or an error of an appropriate combination thereof.

The droplet kind is the kind of liquid droplet corresponding to a dot size with which the recording can be controlled by the head. For example, in the configuration in which the jetting of a small droplet, a medium droplet and a large droplet corresponding to three kinds of dot sizes of a small dot, a medium dot and a large dot can be controlled, the droplet kind is three. The position shift for each droplet kind means a landing position error for each droplet kind in the main scanning direction and/or sub scanning direction.

The nozzle error of each nozzle may determine a value capable of being treated as a "characteristic error" which is approximately observed on average for each nozzle can be determined, and may be a target of the "random system error" changed temporally and/or for each place.

As an example of the "system error" in the serial scan type ink jet printing system, there is a bidirectional position shift in scanning, a bidirectional position shift for each droplet kind, a head vibration error according to the carriage movement or a paper transport error.

The bidirectional position shift is an error in the main scanning direction of a dot recording position in a case where the jetting is performed during the movement of the carriage in an outward direction in a reciprocating operation of the carriage and a dot recording position in the main scanning direction in a case where the jetting is performed during the movement of the carriage in an inward direction.

The bidirectional position shift for each droplet kind is an error in position in the main scanning direction and the sub scanning direction for each droplet kind in a case where the jetting is performed during the movement in the outward and inward directions of the carriage movement.

The head vibration error is caused by the vibration of the driving belt of the carriage, and is observed as a change in dot position in the main scanning direction and/or the sub scanning direction. The paper transport error is an error in paper sending amount in the sub scanning direction which is the paper transport direction. The paper transport error is observed as a recording position error in the sub scanning direction.

As an example of the "system error" in the single path type ink jet printing system, there is an error (referred to as a "head module vibration error") due to the vibration of the head module constituting the line head, or an error (head module attachment error) of an attachment position of each head module. The head module vibration error is observed as the error in the dot position in the main scanning direction and/or the sub scanning direction. The head module attachment error may also be observed as the error in the dot position in the main scanning direction and/or the sub scanning direction.

The head module attachment error corresponds to the characteristic error.

[Chart for Acquiring System Error Parameter]

In FIG. 5, the "characteristic parameter acquisition chart" for acquiring the characteristic parameter has been described. As mentioned above, since the characteristic parameter can be comprehended as the parameter indicating the characteristic error of the system errors, the characteristic parameter can be understood as a kind of system error parameter.

Accordingly, it is understood that the "characteristic parameter acquisition chart" corresponds to one example of a "system error parameter acquisition chart".

As the system error parameter acquisition chart in the single scan type ink jet printing system, the following charts may be used.

Example 1

As the chart for acquiring each nozzle error or non-jetting parameter among the system errors, the characteristic parameter acquisition chart described in FIG. 5 may be applied.

Example 2

In order to comprehend the nozzle error for each droplet kind such as the position shift (including the bidirectional position shift) for each droplet kind, the characteristic parameter acquisition chart described in FIG. 5 is generated from the outward path and the inward path. For example, in a case where the jetting of three droplet kinds of a small droplet, a medium droplet and a large droplet can be controlled, the respective droplet kinds of the small droplet, the medium droplet and the large droplet, the characteristic parameter acquisition chart described in FIG. 5 may be output and measured for the medium droplet and the large droplet. It is possible to acquire position shift information indicating how much the dot position which is actually recorded is shifted from a target recording position (pixel position) for each droplet kind. The characteristic parameter acquisition chart described in FIG. 5 is generated for the outward path and the inward path for each droplet kind. It is possible to acquire the information of the position shift related to the carriage movement direction (main scanning direction) in the outward path and the inward path for each droplet kind from the measurement results of the charts.

Example 3

Figure 23:
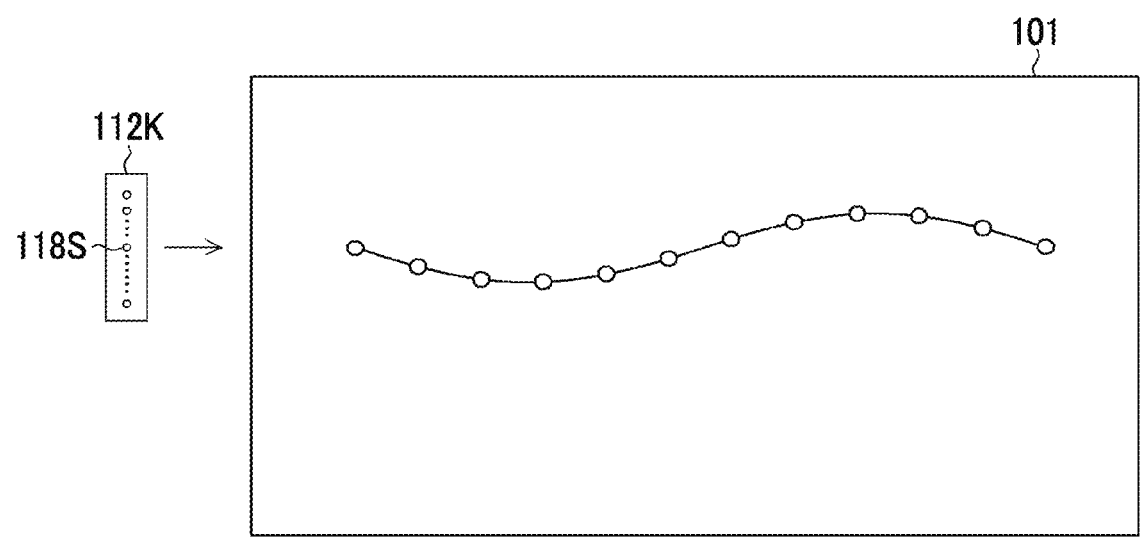
FIG. 23 is a schematic diagram showing an example of a chart for measuring a head vibration error according to carriage movement.

An example of the chart for measuring the head vibration error according to the carriage movement is shown in FIG. 23. Here, in order to simplify the illustration, only the black recording head 112K is schematically shown. As shown in FIG. 23, a continuous jetting operation is performed from a specific nozzle 118S of the recording head while moving the carriage, and thus, the head vibration error measurement chart is generated. The "continuous jetting operation being performed" mentioned herein means that the jetting is repeated at a cycle of time intervals enough to record the dots as independent dots which are individually separated (isolated) from each other so as not to overlap each other.

For the sake of convenience in the description, FIG. 23 shows that the dot interval in the main scanning direction or the head vibration error highlighted (deformed) so as to be extremely increased. The head is vibrated according to the movement of the carriage, and thus, the shift amount in the main scanning direction and/or the sub scanning direction is changed.

Figure 24:
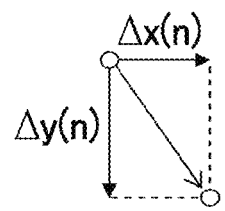
FIG. 24 is an explanatory diagram showing a shift amount of a recording position.

The output result of the chart shown in FIG. 23 is read by the image reading device 26 (see FIG. 1) such as the in-line sensor, and the shift amounts in the main scanning direction and the sub scanning direction from an ideal position to be originally jetted are measured for each dot. How much the actual landing position is shifted from each pixel position is measured. As the ideal position to be originally jetted, the pixel position is determined to be in a line in the main scanning direction. The pixel position to be originally jetted in the main scanning direction is expressed by "n", and a shift amount $\Delta x(n)$ in the main scanning direction and a shift amount $\Delta y(n)$ in the sub scanning direction with respect to each pixel position n may be measured (see FIG. 24). "n" indicates a position coordinate (X coordinate) of the pixel on which the jetting is performed in the main scanning direction. n may be an integer from 0 to N. N in this case indicates an integer corresponding to the number of jetted dots. $\Delta x(n)$ and $\Delta y(n)$ represent the shifts from the ideal landing position.

Figure 25A:
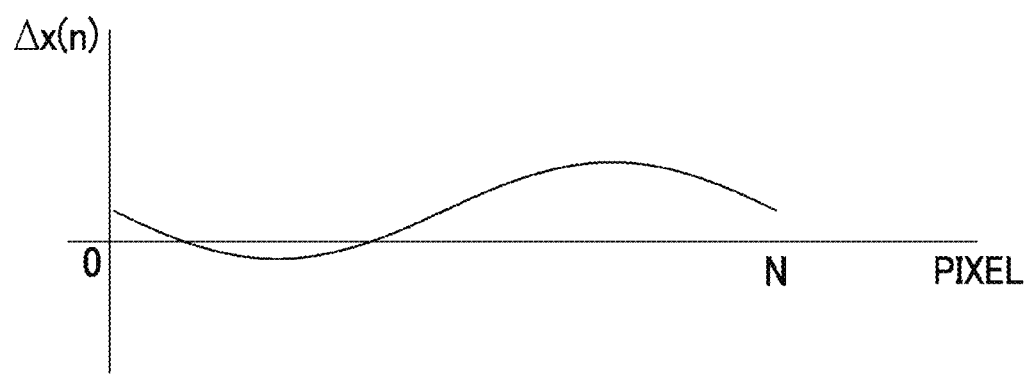
FIG. 25A is a graph showing an example of a head vibration error, and is a graph showing a position shift amount in a main scanning direction.
Figure 25B:
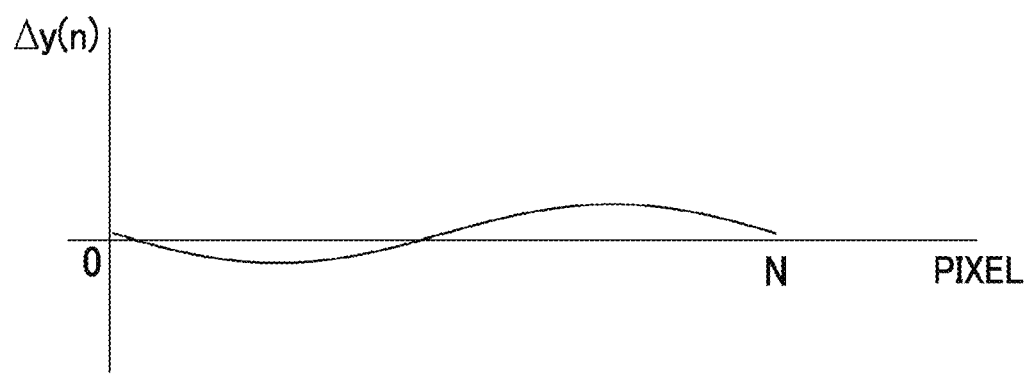
FIG. 25B is a graph showing an example of a head vibration error, and is a graph showing a position shift amount in a sub scanning direction.

FIGS. 25A and 25B show examples of the head vibration error. In FIG. 25A, a horizontal axis represents the pixel position n in the main scanning direction, and a vertical axis represents the position shift amount in the main scanning direction. In FIG. 25B, a horizontal axis represents the pixel position n in the main scanning direction, and a vertical axis represents the position shift amount in the sub scanning direction.

By doing this, the shift amount $\Delta x(n)$ in the main scanning direction and the shift amount $\Delta y(n)$ in the sub scanning direction are calculated as the function of the pixel position n.

Although the example in which the continuous jetting operation is performed from the specific single nozzle 118S has been described in FIG. 23, the continuous jetting operation may be performed from a plurality of specific nozzles in a similar manner, the statistical process is performed on the shift amounts $\Delta x(n)$ and $\Delta y(n)$ acquired from the measurement, and the parameter of the head vibration error may be generated.

Example 4

Figure 26:
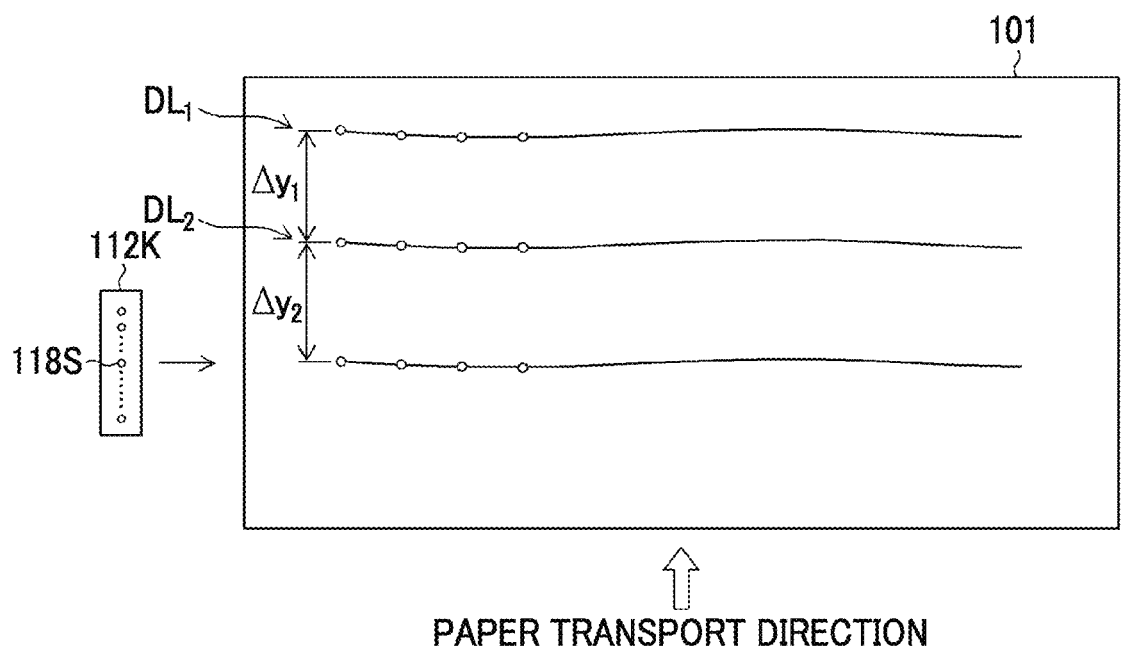
FIG. 26 is a schematic diagram showing an example of a chart for measuring a paper transport error.

The paper transport error is an error indicating a variation in paper sending amount. The paper transport error is an error with which the dot position is shifted due to a paper transport mechanism in the printing system. FIG. 26 is an example of a chart for acquiring information of the paper transport error. Here, in order to simplify the illustration, only the black recording head 112K is schematically shown. Similarly to the example of FIG. 23, in a case where the parameter of the paper transport error is acquired, the continuous jetting operation is performed in the specific nozzle 118S of the recording head, and a line of a dot array according to the main scanning direction is drawn. The specific nozzle 118S of FIG. 23 and the specific nozzle 118S of FIG. 26 may be the same nozzle, or may be different nozzles.

As shown in FIG. 26, if a first-row dot array DL1 is drawn, a predetermined amount of paper transport in the sub scanning direction is performed. The "paper transport" is a synonym for "paper sending" or "sheet sending". It is assumed that the control amount of the predetermined of paper transport is $\Delta y_0$. A second-row dot array DL2 is similarly drawn. The predetermined amount $\Delta y_0$ of paper transport and the continuous jetting operation are repeated, and thus, a plurality of dot arrays DL1, DL2, DL3, . . . is drawn. It is preferable that this chart is recorded by performing scanning only in the outward path of the carriage movement, or only in the inward path thereof, or in any one thereof.

A pixel position as a jetting command position of each dot in a k-th-row dot array is represented as (n, k). k is an integer from 1 to m, and m is an integer of 2 or more. A difference $y_{av(k+1)} - y_{av(k)}$ between an average value $y_{av(k)}$ of sub-scanning-direction positions of the respective dots in the k-th-row dot array and an average value $y_{av(k+1)}$ of sub-scanning-direction positions of the respective dots in a (k+1)-th-row dot array is measured as a k-th paper sending amount $\Delta y_k$. An error of the k-th paper transport may be expressed as $\Delta y_k - \Delta y_0$.

Figure 27:
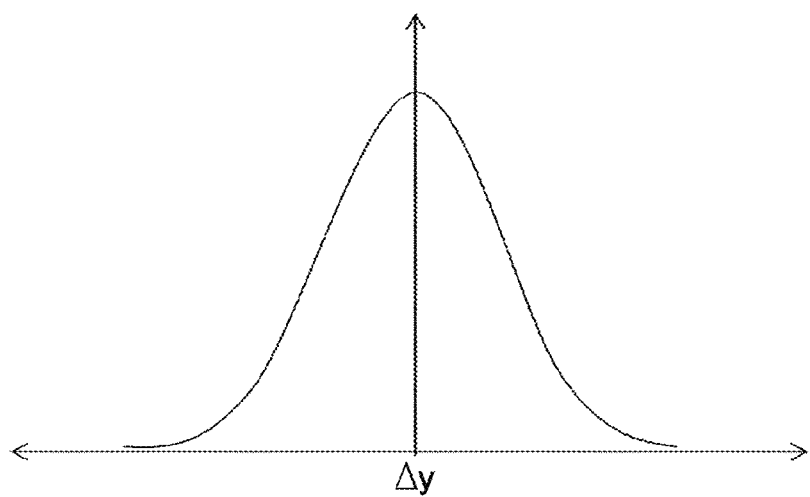
FIG. 27 is a distribution diagram showing an example of the distribution of the measurement values of the paper transport error.

FIG. 27 shows an example of the distribution of the measurement values of $\Delta y_k$ (k=1, 2, . . . , m−1) measured from a paper transport error measurement chart. A horizontal axis represents a paper transport error $\Delta y$. The illustrated distribution of the paper sending amount is a distribution according to the normal distribution.

As the system error parameter acquisition chart in the single path type ink jet printing system, the following charts may be used.

Example 5

As the chart for acquiring each nozzle error or non-jetting parameter among the system errors, the characteristic parameter acquisition chart described in FIG. 21 may be applied.

Example 6

In order to comprehend the nozzle error for each droplet kind such as the position shift (including the bidirectional position shift) for each droplet kind, the characteristic parameter acquisition chart described in FIG. 21 is generated for each droplet kind. For example, in a case where the jetting of three droplet kinds of the small droplet, the medium droplet and the large droplet can be controlled, the characteristic parameter acquisition chart described in FIG. 5 may be output and may be measured for the small droplet, the medium droplet and the large droplet. It is possible to acquire position shift information indicating how much the dot position which is actually recorded is shifted from a target recording position (pixel position) for each droplet kind.

Example 7

Figure 28:
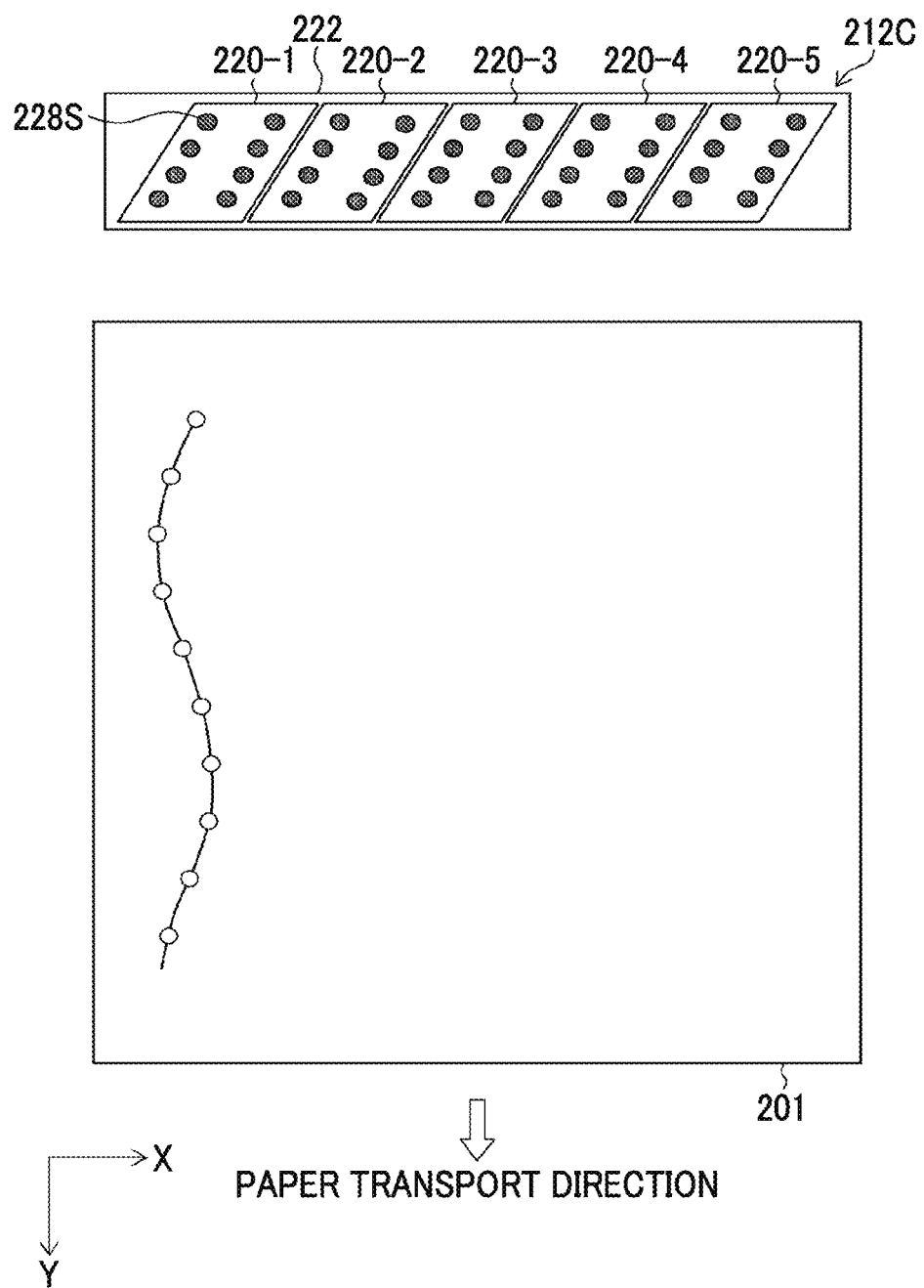
FIG. 28 is a schematic diagram showing an example for acquiring a head vibration error parameter in the single path type.

An example of the chart for the head vibration error parameter in the single path type is shown in FIG. 28. For the sake of convenience in the description, FIG. 28 shows only the cyan recording head 212C. The cyan recording head 212C of FIG. 28 is a line head formed by connecting a plurality of head modules 220-j (j=1, 2, . . . , and Nm). Although an example in which Nm=5 as an example of the number of connected head modules is illustrated in this drawing, the number of connected head modules is not particularly limited, and may be arbitrarily designed.

The plurality of head modules 220-j (j=1, 2, . . . , and Nm) is fixed to a common supporting frame 222, and is formed as one head bar as a whole. The dot recording position is changed due to the vibration of the head bar. As shown in FIG. 28, the jetting is continuously performed form the single specific nozzle 228S while the printing medium 201 is transported in the sub scanning direction at a predetermined speed, and the dot array arranged in the sub scanning direction is recorded. Similarly to the example described in FIG. 23, the "jetting being continuously performed" means that the jetting is repeated at a cycle of time intervals enough to record the dots as independent dots which are individually separated (isolated) from each other so as not to overlap each other.

Similarly to FIG. 23, for the sake of convenience in the description, FIG. 28 shows that the dot interval in the sub scanning direction or the head vibration error highlighted (deformed) so as to be extremely increased. The shift amount in the main scanning direction and/or the sub scanning direction is changed due to the vibration of the head bar.

The output result of the chart shown in FIG. 28 is read by the image reading device 26 (see FIG. 1) such as the in-line sensor, and the shift amounts in the main scanning direction and the sub scanning direction from an ideal position to be originally jetted are measured for each dot. How much the actual landing position is shifted from each pixel position is measured. As the ideal position to be originally jetted, the pixel position is determined to be in a line in the sub scanning direction. The pixel position to be originally jetted in the sub scanning direction is expressed by "n", and a shift amount $\Delta x(n)$ in the main scanning direction and a shift amount $\Delta y(n)$ in the sub scanning direction with respect to each pixel position n may be measured. Here, "n" indicates a position coordinate (Y coordinate) of the pixel on which the jetting is performed in the sub scanning direction.

Similarly to the example described in FIG. 23, it is possible to acquire the head vibration error parameter in the single path type from the measurement result of the chart of FIG. 28.

Example 8

Figure 29:
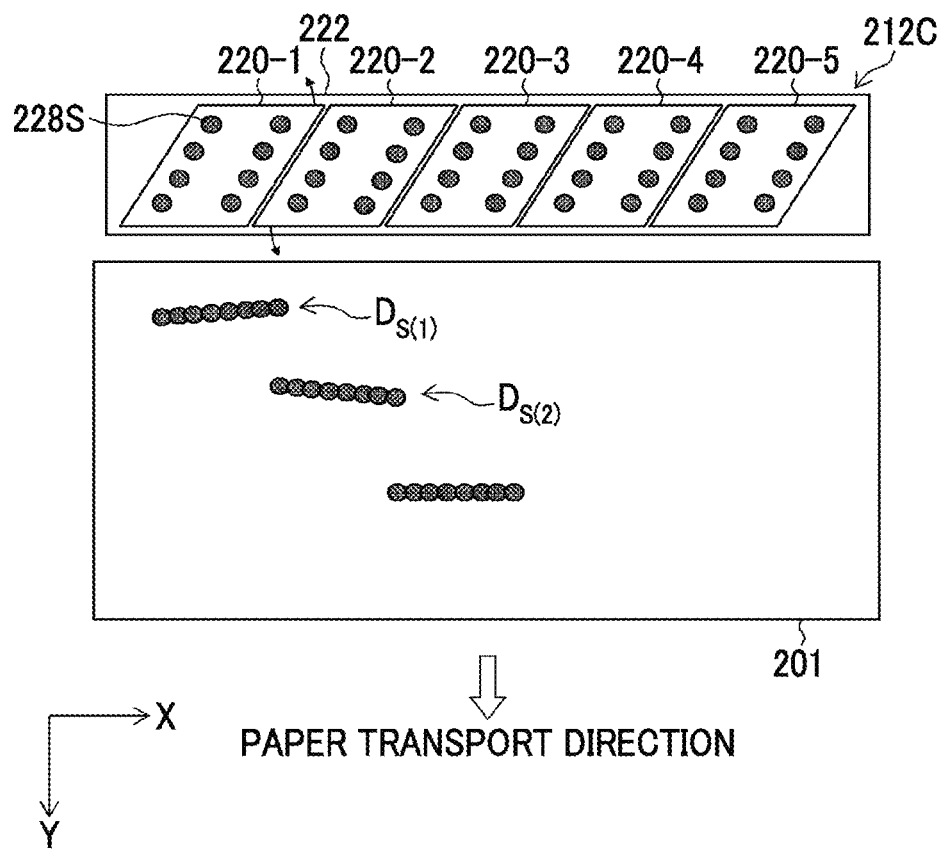
FIG. 29 is a schematic diagram showing an example of a chart for acquiring a head module attachment error parameter.

As the system error specific to the single path type, there is the head module attachment error. FIG. 29 is an example of the chart for acquiring the head module attachment error parameter. The respective head modules **220-*j* (j=1, 2, ..., and Nm) are attached so as to be shifted from attachment positions (ideal attachment positions) in the design. The attachment positions of the respective head modules 220-*j*** (j=1, 2, ..., and Nm) may include a main scanning direction error, a sub scanning direction error and an in-surface rotation direction error. The dot recording position is shifted from the ideal position due to the head module attachment error.

In the chart shown in FIG. 29, in the respective nozzle groups of the head modules **220-*j* (j=1, 2, ..., and Nm), the jetting is performed on a pixel array arranged in a line in the main scanning direction, and a dot array $D_s(j)$ for each of the head modules 220-*j*** (j=1, 2, ..., and Nm) is recorded.

Figure 30A:
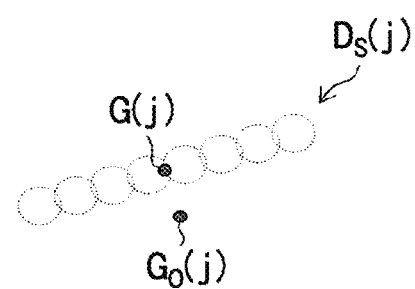
FIG. 30A is a schematic diagram for describing a shift of a central position of gravity of a dot array.
Figure 30B:
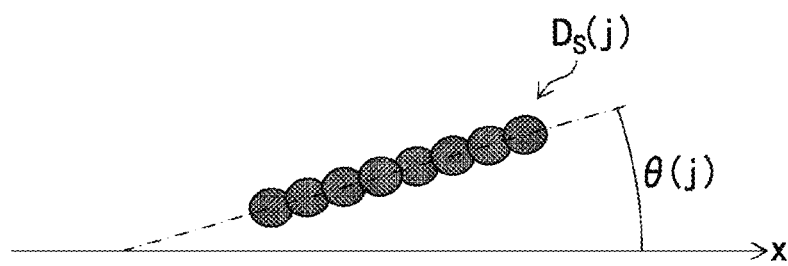
FIG. 30B is an explanatory diagram of an inclination angle of the dot array.

A central position of gravity G(j) of a group of dot arrays $D_s(j)$ and an angle of inclination $\theta(j)$ with respect to the main scanning direction are calculated from the density distributions thereof for the dot array D(j) for each of the head modules **220-*j*** (j=1, 2, ..., and Nm) from the read image of the chart (see FIGS. 30A and 30B).

A central position of gravity $G_0(j)$ is determined for each originally intended (that is, ideally designed) dot array $D_s(j)$. Accordingly, as shown in FIG. 30(A), it is possible to comprehend the shift of the central position of gravity indicating how much the central position $G_0(j)$ of gravity of the dot array$_s(j)$ calculated by reading the chart in both directions of the main scanning direction and the sub scanning direction is shifted from the ideal central position $G_0(j)$ of gravity. It is possible to comprehend the main scanning direction error and the sub scanning direction error from the shift of the central position of gravity. Since it is assumed that the head modules **220-*j*** (j=1, 2, ..., and Nm) are attached while being rotated in the surface, the angle of inclination $\theta(j)$ of the dot array $D_s(j)$ with respect to the main scanning direction is also measured as shown in FIG. 30B. The angle of inclination $\theta(j)$ indicates the in-surface rotation direction error.

[Accumulation and Utilization of System Error Parameter]

The "head module attachment error" described above is not temporally changed, and corresponds to the characteristic error which is reliably determined due to the attachment of the head module. Meanwhile, the respective error items such as each nozzle error (including each nozzle error for each droplet kind), bidirectional position shift (including the bidirectional position shift for each droplet kind), the head vibration error and the paper transport error may be temporally changed.

Accordingly, it is preferable that the tolerance design to the system error is performed by accumulating the acquiring results of the system error parameters acquired from the respective charts in a storage unit other than the memory, updating the distribution data of the system errors including accumulation data of the system error parameters acquired in the past and the newly acquired system error parameters and determining the "random system error" based on the latest updated system error distribution.

As for the characteristic errors included in the system errors, it is preferable that the value of the "characteristic error" is updated from the data distribution including the accumulation data of the system error parameters acquired in the past and the newly acquired system error parameters.

[Simulation Image Generation and Image Quality Evaluation in Designing Tolerance to System Error]

A total evaluation value (weighted sum) for each level is used as an image quality evaluation value by performing the simulation image generation and image quality evaluation in a case where the system errors are classified in terms of the characteristic error and the random system error and in a case where the tolerance design to the system error is performed when the halftone processing rule is generated for each level of the plurality of random system errors. A total evaluation value (weighted sum) for each level is used as an image quality evaluation value by performing the simulation image generation and the image quality evaluation in a case where the tolerance design to the system error is performed when the halftone processing rule is generated for each level of the plurality of random system errors.

The "plurality of levels" of the random system error added when the simulation image is generated follows the system error distribution of the printing system.

Figure 31:
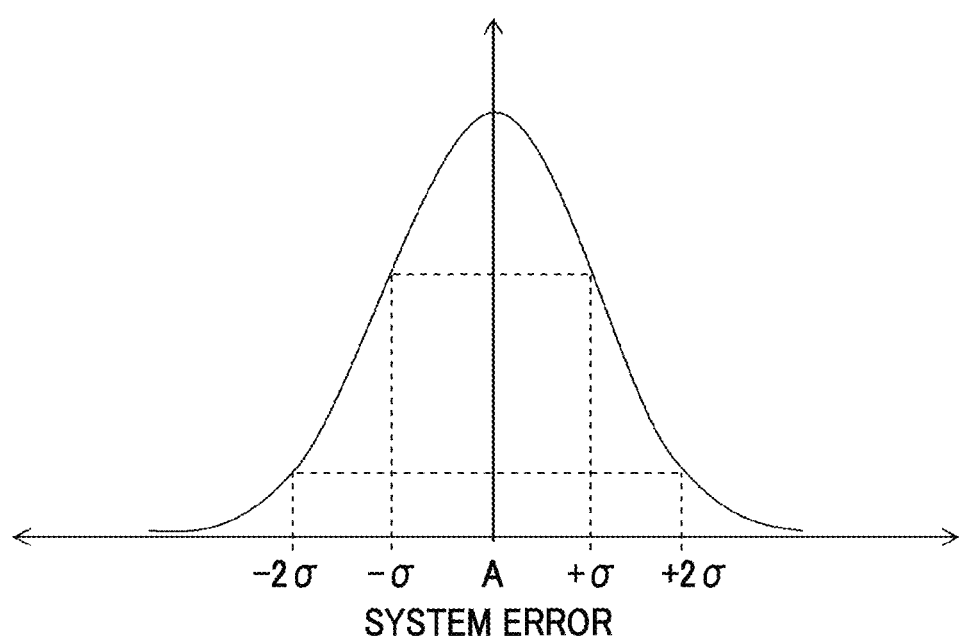
FIG. 31 is a graph showing the relationship between a system error distribution and a level of a random system error reflected on the generation of the simulation image.

FIG. 31 is a graph showing the relationship between the system error distribution and the level of the random system error reflected on the generation of the simulation image.

A horizontal axis of FIG. 31 represents the system error. A specific item of the system error may be each nozzle error, the bidirectional position shift, the head vibration error, or the paper transport error.

As shown in FIG. 31, the system errors are distributed so as to be shifted in a plus direction and a minus direction with the value A of the characteristic error as its center. The plurality of levels of the random system error is determined within a spreading range of the system error distribution. In the example of FIG. 31, an example in which four levels of $\pm\sigma$ and $\pm 2\sigma$ are determined using the standard deviation a of the system error distribution is illustrated. The value A of the characteristic error corresponds to an average value in the system error distribution. The present embodiment is not limited to the configuration in which the levels are defined using the standard deviation a, and the levels may be determined using an arbitrary value.

In a case where the four levels of "$-2\sigma$", "$-\sigma$", "$+\sigma$" and "$+2\sigma$" are determined as the error amount added as the random system error when the simulation image is generated, the simulation image for each level is generated by adding the errors of the respective levels, and the image quality is evaluated for the simulation image.

The image quality evaluation value as the total value is calculated by performing the evaluation on the simulation image for each level. In this case, the frequency of giving each random system error having the plurality of levels may follow the distribution shown in FIG. 31. The "frequency" following the system error distribution means that more simulation images are generated near the center value of the distribution and the evaluation values of the simulation images are calculated.

Alternatively, a weighted sum may be calculated by multiplying weighting factors following the distribution shown in FIG. 31 to the simulation images of the random system errors of the respective levels or the evaluation values.

Figure 32:
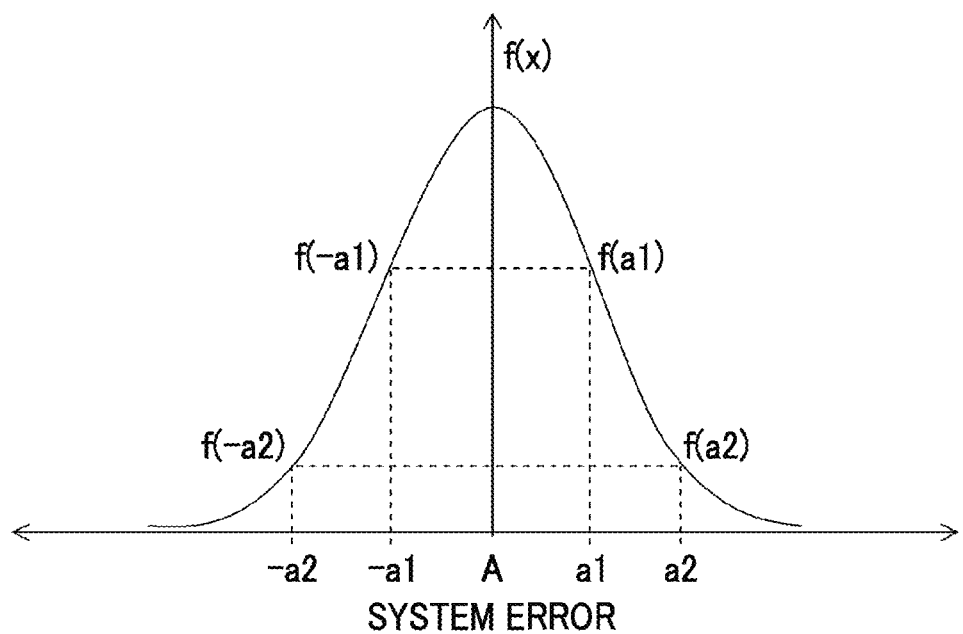
FIG. 32 is an explanatory diagram for describing the relationship between levels of a plurality of random system errors and a weighting factor.

For example, a case where four levels of "+a1", "+a2", "−a1" and "−a2" are determined as the plurality of levels of the random system error from the system error distribution will be described as shown in FIG. 32. However, the a1 and a2 are values that satisfy "0<a1<a2".

In order to simplify the description, in a case where it is assumed that the center value (average value) of the system error distribution is "0" and a distribution function f(x) is the normal distribution, the levels are symmetrically set with respect to the plus and minus directions.

In this case, if the evaluation values of the respective simulation images to which the random system error of each level is added are respectively represented as Val[+a1], Val[+a2], Val[−a1] and Val[−a2], the image quality evaluation value Total_Value as the total evaluation value which is the total evaluation value of the simulation image to which the system error of each level is added is expressed by the following expression.

$$\text{Total\_Value}=A1\times\text{Val}[+a1]+A2\times\text{Val}[+a2]+A3\times\text{Val}[-a1]+A4\times\text{Val}[-a2] \quad \text{Expression (5)}$$

The weighting factors A1, A2, A3 and A4 follow the system error distribution of FIG. 32. That is, if the distribution function of the system error distribution is expressed by f(x), f(−a1)=f(a1) and f(−a2)=f(a2), and A1=A3=u×f(a1) and A2=A4=u×f(a2) by using a positive proportionality constant u.

In order to simplify the description, although it has been described in FIG. 32 that the four levels are symmetrically set in the plus and minus directions in a case where the center value (average value) of the system error distribution is "0" and the distribution function f(x) is the normal distribution, the distribution function may be determined based on the actual chart measurement value, and it is possible to arbitrarily set the plurality of levels within the spreading range of the distribution.

[Application to Expression for Calculating Image Quality Evaluation Value]

If the expressions (1) to (4) for image quality evaluation already described above are corrected in terms of the characteristic error and the random system error as the change component, the following expressions are acquired. That is, the description of granularity evaluation value [system error absence] described in Expressions (1) to (4) may be comprehended to be replaced with granularity evaluation value [system error presence (characteristic error presence)], and the description of granularity evaluation value [system error presence] may be comprehended as granularity evaluation value [random system error presence]. The description of streak evaluation value [system error presence] may be comprehended as streak evaluation value [random system error presence]. Hereinafter, the correction expressions corrected by introducing the viewpoint described in Expression (5) and FIG. 32 to each of Expressions (1) to (4) will be described.

[1] Dither Method

The following Expression (6) may be used as the correction expression of Expression (1).

$$\begin{aligned}&\text{Image quality evaluation value}=\text{granularity evaluation value [random system error absence (characteristic error presence)]}\\&+\alpha\times\{A1\times(\text{granularity evaluation value [system error presence }(+a1)]\\&+\text{granularity evaluation value [system error presence }(-a1)])\\&+A2\times(\text{granularity evaluation value [system error presence }(+a2)]\\&+\text{granularity evaluation value [system error presence }(-a2)])+\ldots\}\\&+\beta\times\{A1\times(\text{streak evaluation value [system error presence }(+a1)]\\&+\text{streak evaluation value [system error presence }(-a1)])\\&+A2\times(\text{streak evaluation value [system error presence }(+a2)]\\&+\text{streak evaluation value [system error presence }(-a2)])+\ldots\}\end{aligned} \quad \text{Expression (6)}$$

a1, a2, A1 and A2 follow the relationship described in FIG. 32. The evaluation may be performed using Expression (6) instead of Expression (1).

[2] Error Diffusion Method

Similarly to the dither method, as for the error diffusion method, the following Expression (7) may be used as the correction expression of Expression (2) in the already described error diffusion method.

$$\begin{aligned}&\text{Granularity evaluation value [system error presence]}\\&=\alpha\times\{A1\times(\text{granularity evaluation value [system error presence (addition of ``+}a1\text{'' error to first group)]}\\&+\text{granularity evaluation value [system error presence (addition of ``+}a1\text{'' error to second group)]}+\ldots\\&+\text{granularity evaluation value [system error presence (addition of ``−}a1\text{'' error to first group)]}\\&+\text{granularity evaluation value [system error presence (addition of ``−}a1\text{'' error to second group)]}+\ldots\}\\&+A2\times\{\text{granularity evaluation value [system error presence (addition of ``+}a2\text{'' error to first group)]}\\&+\text{granularity evaluation value [system error presence (addition of ``+}a2\text{'' error to second group)]}+\ldots\\&+\text{granularity evaluation value [system error presence (addition of ``−}a2\text{'' error to first group)]}\\&+\text{granularity evaluation value [system error presence (addition of ``−}a2\text{'' error to second group)]}+\ldots)+\ldots\}\\&+\beta\times(A1\times(\text{streak evaluation value [system error presence (addition of ``+}a1\text{'' error to first group)]}\\&+\text{streak evaluation value [system error presence (addition of ``+}a1\text{'' error to second group)]}+\ldots\\&+\text{streak evaluation group [system error presence (addition of ``−}a1\text{'' error to first group)]}\\&+\text{streak evaluation value [streak error presence (addition of ``−}a1\text{'' error to second group)]}+\ldots\}\\&+A2\times(\text{streak evaluation value [system error presence (addition of ``+}a2\text{'' error to first group)]}\\&+\text{streak evaluation value [system error presence (addition of ``+}a2\text{'' error to second group)]}+\ldots\\&+\text{streak evaluation value [system error presence (addition of ``−}a2\text{'' error to first group)]}\\&+\text{streak evaluation value [system error presence (addition of ``−}a2\text{'' error to second group)]}+\ldots\}+\ldots\}\end{aligned} \quad \text{Expression (7)}$$

The evaluation may be performed using Expression (7) instead of Expression (2).

[3] Case where Void-and-Cluster Method is Used for Dither Method

The following Expression (8) may be used as the correction expression of Expression (3) in the void-and-cluster method.

$$\begin{aligned}&\text{Image quality evaluation value}=\text{energy [random error absence (characteristic error presence)]}\\&+\alpha\times\{A1\times(\text{energy [system error presence }(+a1)]\\&+\text{energy [system error presence }(-a1)])+A2\times(\text{energy [system error presence }(+a2)]\\&+\text{energy [system error presence }(-a2)])+\ldots\}+\beta\times\{A1\times(\text{streak energy [system error presence }(+a1)]\\&+\text{streak energy [system error presence }(-a1)])+\end{aligned}$$

$A2\times$(streak energy [system error presence $(+a2)$]+streak energy [system error presence $(-a2)$])+ ... } Expression (8)

The evaluation may be performed using Expression (8) instead of Expression (3).

[4] DBS Method

In the DBS method, the same evaluation method as the example described in Expressions (6) to (8) described above when the simulation image may be evaluated.

[5] Evaluation Expression in Automatic Selection of Halftone Process

The following Expression (9) may be used as the correction expression of Expression (4) described using the image quality evaluation in a case where the system automatically selects one halftone processing rule from the two or more kinds of halftone processing rules.

Image quality evaluation value=$p\times$granularity evaluation value [random system error absence (characteristic error presence)]+$q\times\{A1\times$(granularity evaluation value [system error presence (addition of "+$a1$" error to first group)]+granularity evaluation value [system error presence (addition of "+$a1$" error to second group)]+ ... +granularity evaluation value [system error presence (addition of "−$a1$" error to first group)]+granularity evaluation value [system error presence (addition of "−$a1$" error to second group)]+ ... }+$A2\times\{$granularity evaluation value [system error presence (addition of "+$a2$" error to first group)]+granularity evaluation value [system error presence (addition of "+$a2$" error to second group)]+ ... +granularity evaluation value [system error presence (addition of "−$a2$" error to first group)]+granularity evaluation value [system error presence (addition of "−$a2$" to second group)]+ ... } ... )+$r\times(A1\times\{$streak evaluation value [system error presence (addition of "+$a1$" error to first group)]+streak evaluation value [system error presence (addition of "+$a1$" error to second group)]+ ... +streak evaluation value [system error presence (addition of "−$a1$" error to first group)]+streak evaluation value [system error presence (addition of "−$a1$" error to second group)]+ ... } +$A2\times\{$streak evaluation value [system error presence (addition of "+$a2$" error to first group)]+streak evaluation value [system error presence (addition of "+$a2$" error to second group)]+ ... +streak evaluation value [system error presence (addition of "−$a2$" error to first group)]+streak evaluation value [system error presence (addition of "−$a2$" error to second group)]+ ... }+ ... } Expression (9)

Here, in order to simplify the description, the case where it is assumed that a one-dimensional distribution is used as the system error distribution as in FIG. 31 or 32 and it is assumed that the calculation expression of the image quality evaluation value is also the one-dimensional error has been described. However, each nozzle error or the head vibration error actually represents a two-dimensional error distribution in the main scanning direction and the sub scanning direction as shown in FIGS. 33 to 35.

Figure 33:
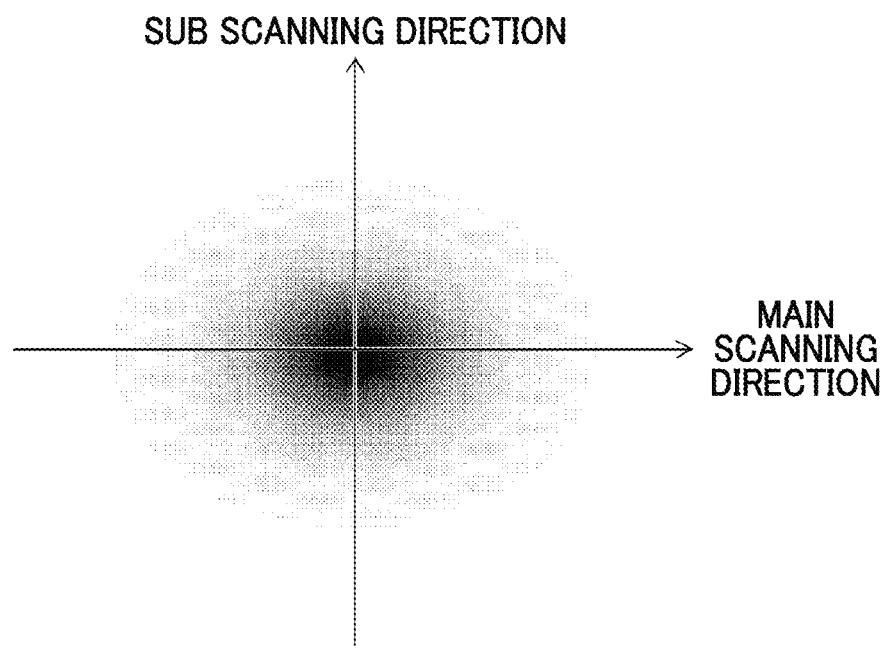
FIG. 33 is a diagram showing that a two-dimensional error distribution in the main scanning direction and the sub scanning direction is represented as shades.

FIG. 33 is a diagram showing that the two-dimensional error distribution in the main scanning direction and the sub scanning direction is represented as shades. FIG. 34 is a sectional view of the error distribution along the main scanning direction in the two-dimensional error distribution shown in FIG. 33. FIG. 35 is a sectional view of the error distribution along the sub scanning direction in the two-dimensional error distribution shown in FIG. 33.

Figure 34:
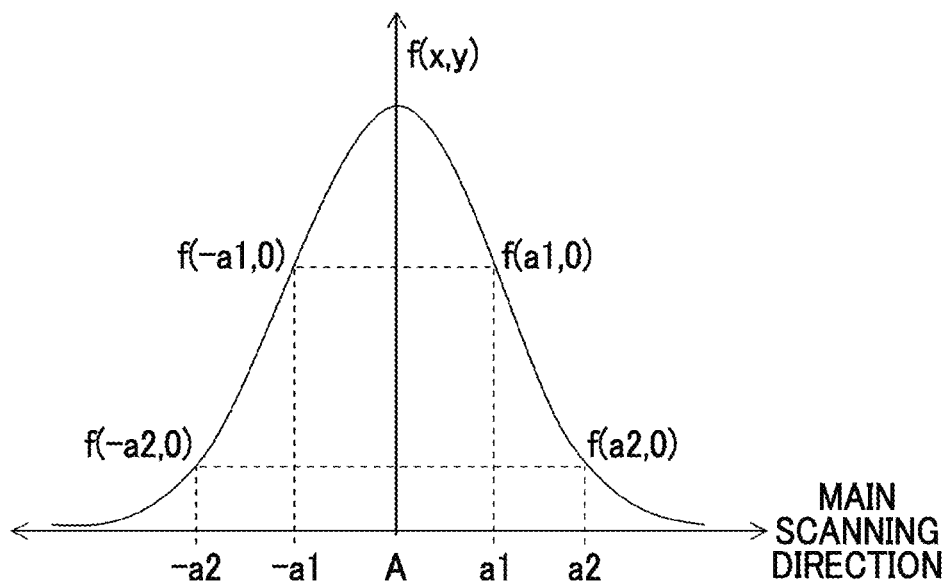
FIG. 34 is a sectional view of the error distribution along the main scanning direction in the two-dimensional error distribution shown in FIG. 33.
Figure 35:
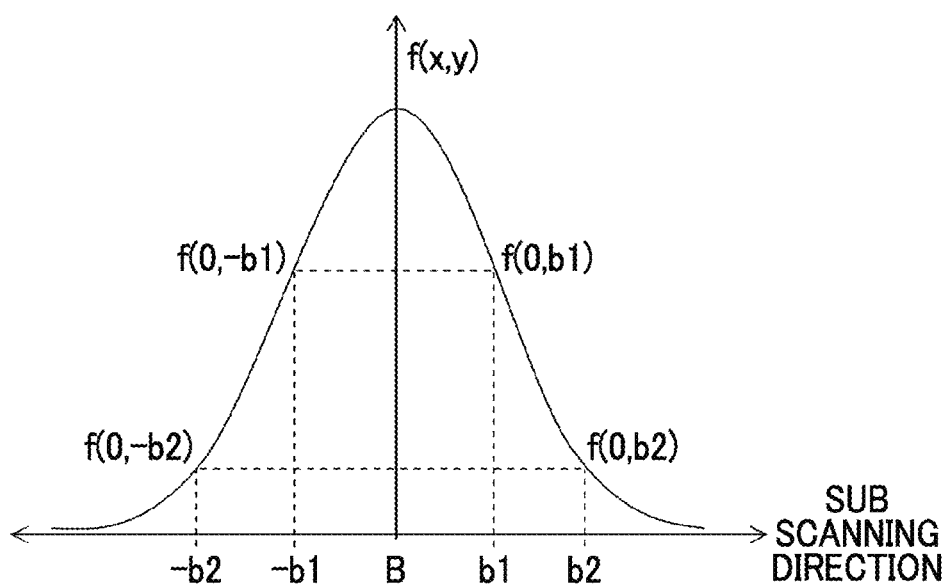
FIG. 35 is a sectional view of the error distribution along the sub scanning direction in the two-dimensional error distribution shown in FIG. 33.

For example, as shown in FIGS. 34 and 35, in a case where four levels "+$a$", "+$a2$", "−$a1$" and "−$a2$" are determined in the main scanning direction, four levels "+$b1$", "+$b2$", "−$b1$" and "−$b2$" are determined in the sub scanning direction as the plurality of levels of the random system error from the system error distribution, the image quality evaluation value Total_Value as an example is expressed by the following Expression (10) instead of Expression (5).

Total_Value=$A1\times$Val[+$a1$,0]+$A2\times$Val[+$a2$,0]+$A3\times$Val[−$a1$,0]+$A4\times$Val[−$a2$,0]+$B1\times$Val[0,+$b1$]+$B2\times$Val[0,+$b2$]+$B3\times$Val[0,−$b1$]+$B4$ Val[0,−$b2$]+$C1\times$Val[+$a1$,+$b1$]+$C2\times$Val[+$a1$,−$b1$]+$C3\times$Val[−$a1$,+$b1$]+$C4\times$Val[−$a1$,−$b1$]+$D1\times$Val[+$a2$,+$b2$]+$D2\times$Val[+$a2$,−$b2$]+$D3\times$Val[−$a2$,+$b2$]+$D4\times$Val[−$a2$,−$b2$]   Expression (10)

Here, the evaluation value of the simulation image to which the random system error having the error amounts of x in the main scanning direction and y in the sub scanning direction is added are expressed as Val[x,y]. The weighting factors A1 to A4, B1 to B4, Expression (6) C1 to C4 and D1 to D4 follow the system error distribution shown in FIGS. 33 to 35. That is, if the distribution function of the system error distribution is expressed as f(x,y), A1=A3=$u\times$f($a1$,0), A2=A4=$u\times$f($a2$,0), B1=B3=$u\times$f(0,$b1$), B2=B4=$u\times$f(0,$b2$), C1=C2=C3=C4=$u\times$f($a1$,$b1$), and D1=D2=D3=D4=$u\times$f($a2$,$b2$). Here, u indicates a positive proportionality constant.

In the generation of the described simulation image and the image quality evaluation expressed as Expressions (1) to (10), the method of generating the simulation image having the system error and evaluating the image quality corresponds to the embodiment in which the simulation image is generated by independently adding the predetermined system error to each pixel group of the halftone image, which belongs to the printing order, the path and timing, and the evaluation value is calculated. However, the simulation image acquired by adding the predetermined system error to all the pixel groups belonging to the printing order, the path and the timing may be generated, and the image quality may be evaluated. The simulation image may be generated by independently adding the system errors of the respective items of each nozzle error (including the position shift for each droplet kind), the non-jetting, the bidirectional position shift (including the bidirectional position shift for each droplet kind), the head vibration error and the paper transport error to the halftone image, and the image quality may be evaluated. Alternatively, the simulation image may be generated by simultaneously adding the system errors of all the items to the halftone image, and the image quality may be evaluated.

In addition, the method of generating the simulation image having the system error (including the setting of the error level) and evaluating the image quality may be realized as various embodiments without departing the gist of the present invention.

[Configuration of Image Processing Device According to Third Embodiment]

Figure 36:
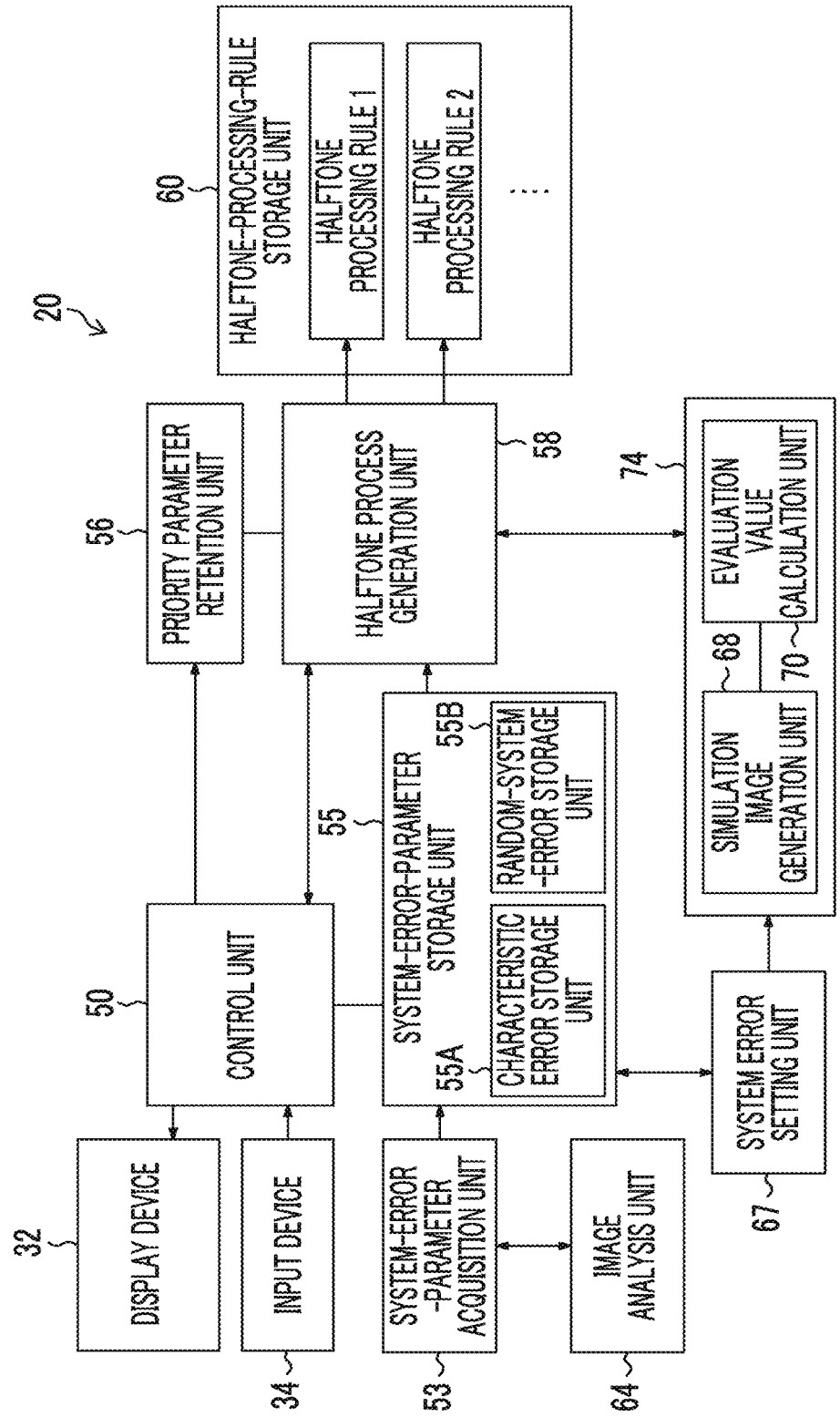
FIG. 36 is a block diagram showing major parts of an image processing device according to a third embodiment.

FIG. 36 is a block diagram of major parts for describing the function of an image processing device according to a third embodiment. In FIG. 36, the same or similar elements as or to those of the configuration described in FIG. 3 will be assigned to the same reference numerals, and the description thereof will be omitted.

The image processing device 20 according to the third embodiment shown in FIG. 36 includes a system-error-parameter acquisition unit 53, a system-error-parameter storage unit 55, and a system error setting unit 67. The system-error-parameter acquisition unit 53 is means for acquiring parameters related to the system errors. The system-error-parameter acquisition unit 53 corresponds to one example of "parameter acquisition means". The system-error-parameter acquisition unit 53 has the same function as that of the characteristic parameter acquisition unit 52 described in FIG. 3, and has a function of the characteristic parameter acquisition unit 52.

The system-error-parameter storage unit 55 is means for storing system error parameters acquired from the system-error-parameter acquisition unit 53. The system-error-parameter storage unit 55 includes a characteristic error storage unit 55A, and a random-system-error storage unit 55B. The characteristic error storage unit 55A is a storage unit that stores characteristic error parameters of the system errors. The random-system-error storage unit 55B is a storage unit that stores random-system-error parameters of the system errors. The system-error-parameter storage unit 55 accumulates data of parameter acquired in the past. The control unit 50 performs the calculation of a statistical process from the distribution of a data group of the system errors stored in the system-error-parameter storage unit 55, and determines a value of the characteristic error corresponding to the center value of the system error distribution and a plurality of levels of the random system errors.

The system-error-parameter storage unit 55 has a function of the characteristic parameter storage unit 54 described in FIG. 3. The system-error-parameter storage unit 55 corresponds to one example of storage means.

The system error setting unit 67 is means for setting the parameters related to the system errors assumed in a case where the printing is performed by the printing system 10 (see FIG. 1). The system error setting unit 67 sets a parameter as a simulation condition for generating a simulation image by the simulation image generation unit 68. The system error setting unit 67 corresponds to one example of "setting means". The process of causing the system error setting unit 67 to set the system error corresponds to one example of a "system error setting step". The control unit 50 may have the function of the system error setting unit 67.

The simulation image generation unit 68 reflects the system error indicated by the parameter set by the system error setting unit 67 on the halftone processing result, and generates a high-resolution simulation image by the halftone processing result. The simulation image generation unit 68 generates the high-resolution simulation image once, performs smoothing on the generated simulation image, and generates the simulation image by converting the smoothed simulation image into a low-resolution simulation image. The step of causing the simulation image generation unit 68 to generate the simulation image corresponds to one example of a "simulation image generation step". The evaluation value calculation unit 70 calculates an evaluation value for evaluating the image quality of the simulation image generated by the simulation image generation unit 68. The evaluation value calculation unit 70 functions as calculation means for calculating the summation of the evaluation values of the simulation image for the respective levels or a weighted sum by multiplying the weighting factors to the evaluation values of the simulation image for the respective levels.

The image processing device 20 allows the user to directly input the characteristic parameters related to the characteristics of the printing system 10 by using the input device 34. That is, the aspect of the characteristic parameter acquisition unit 52 of the image processing device 20 may be a configuration in which the user directly inputs the characteristic parameters related to the characteristics of the printing system 10 by using the input device 34, may be a configuration in which the characteristic parameters are automatically acquired from the measurement result of the characteristic parameter acquisition chart (system error parameter acquisition chart), or may be a combination of these configurations. The input device 34 corresponds to one example of "information input means". The image processing devices 20 described in the FIGS. 3 and 19 may have the configuration in which the parameters can be directly input from the input device 34.

The image processing device 20 shown in FIG. 36 has the configuration in which the generation and evaluation of the simulation image described in Expressions (6) to (9) can be performed.

The processing contents performed by the image processing devices 20 according to the respective embodiments described above can be comprehended as an image processing method.

[Description of Updating of Characteristic Parameter According to Fourth Embodiment]

Hereinafter, the updating of the characteristic parameter according to a fourth embodiment will be described.

<Entire Configuration>

Figure 37:
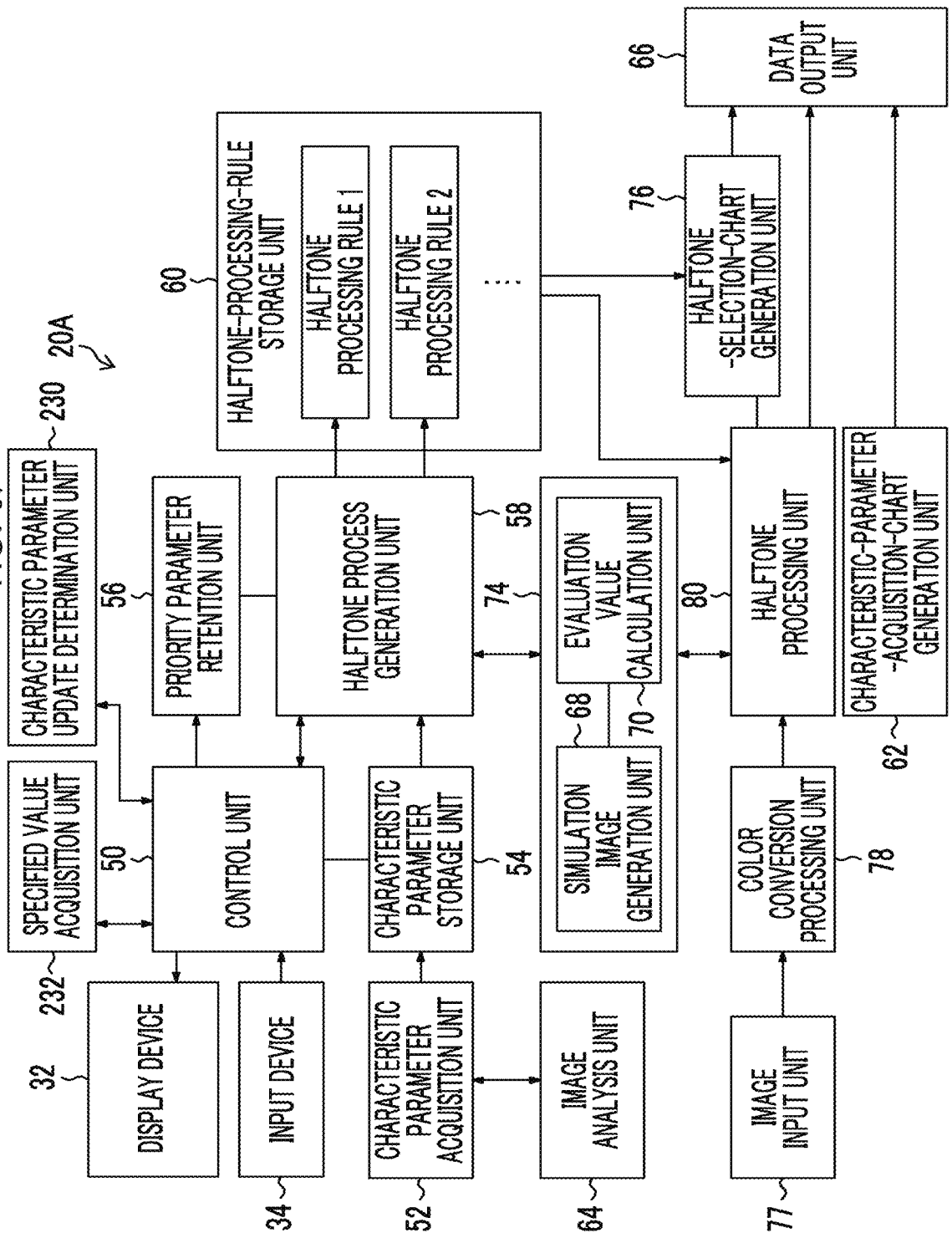
FIG. 37 is a block diagram showing the configuration of a printing system according to a fourth embodiment.

FIG. 37 is a block diagram showing the configuration of a printing system according to a fourth embodiment. In FIG. 37, the same configurations as those of FIG. 3 will be assigned to the same reference numerals, and the description thereof will be appropriately omitted.

The updating of the characteristic parameter according to the fourth embodiment, to be described below, means that the characteristic parameter is updated in a case where a difference between an existing characteristic parameter which is a characteristic parameter acquired in the past and a new characteristic parameter newly acquired exceeds a specified value previously acquired.

That is, an image processing device 20A shown in FIG. 37 has a configuration in which a characteristic parameter update determination unit 230 and a specified value acquisition unit 232 are added to the image processing device 20 shown in FIG. 3.

The characteristic parameter update determination unit 230 functions as characteristic parameter update determination means for determining whether or not to update the characteristic parameter. The determination of whether or not to update the characteristic parameter is performed based on the specified value acquired by the specified value acquisition unit 232.

The specified value acquisition unit 232 functions as specified value acquisition means for acquiring the specified value used to determine whether or not to update the characteristic parameter of the characteristic parameter update determination unit 230.

As an example of the aspect in which the specified value is acquired, there are an aspect in which the specified value is calculated by a specified value calculation unit (not shown) functioning as specified value calculation means, an aspect in which a specified value table which is a specified value table (not shown) functioning as specified value storage means and stores the specified values which are acquired and accumulated in the past is referred to, and an aspect in which the specified value input (designated) using the input device 34 is acquired.

As the existing characteristic parameter, the characteristic parameter stored in the characteristic parameter storage unit 54 shown in FIG. 37 may be applied. As the existing characteristic parameter, the latest acquired characteristic parameter of the characteristic parameters acquired in the past may be applied, or a representative value of the characteristic parameters acquired in the past such as an average value of the characteristic parameters acquired in the past may be used.

As the difference between the existing characteristic parameter and the new characteristic parameter, a difference between the existing characteristic parameter and the new characteristic parameter, which is calculated by subtracting the existing characteristic parameter from the new characteristic parameter, or an absolute value of the difference between the existing characteristic parameter and the new characteristic parameter may be used.

As the difference between the existing characteristic parameter and the new characteristic parameter, a ratio of the new characteristic parameter to the existing characteristic parameter, which is calculated by dividing the new characteristic parameter by the existing characteristic parameter may be used.

The specified value may be constant (fixed value), or may be changed whenever the characteristic parameter is acquired. That is, the specified value acquisition unit 232 may acquire the fixed value as the specified value once, or may acquire the specified value multiple times.

In the aspect in which the specified value is updated, it is preferable that the past specified value (the history of the specified value) is retained (stored). In a case where the history of the specified value is not retained, the specified value may be retained within the printing system, or the user may designate (input) the specified value. In an aspect in which the user designates the specified value, a specified value designation unit (specified value input unit) is provided in the printing system. The input device 34 may be used as the specified value designation unit (specified value input unit).

<Description of Method of Generating Halftone Processing Rule to which Updating of Characteristic Parameter According to Fourth Embodiment is Applied>

Figure 38:
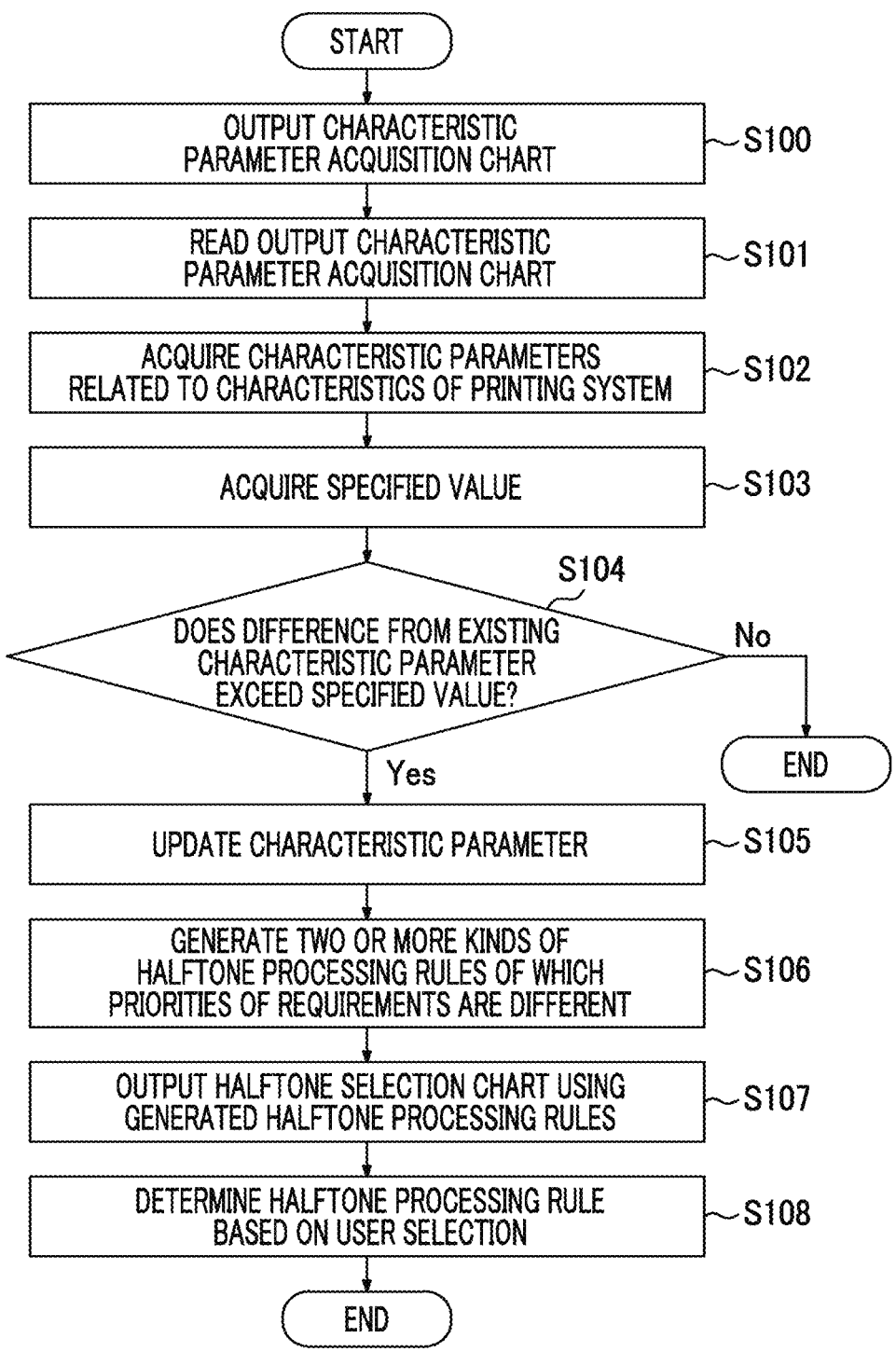
FIG. 38 is a flowchart of a method of generating a halftone processing rule to which the updating of the characteristic parameter according to the fourth embodiment is applied.

FIG. 38 is a flowchart of a method of generating the halftone processing rule to which the updating of the characteristic parameter according to the fourth embodiment is applied. A characteristic-parameter-acquisition-chart output step S100, an image reading step S101 and a characteristic parameter acquisition step S102 shown in FIG. 38 are the same as the characteristic-parameter-acquisition-chart output step S10, the image reading step S11 and the characteristic parameter acquisition step S12, and thus, the description thereof will be omitted.

The specified value acquisition step S103 shown in FIG. 38 acquires the specified value. The specified value acquisition step S103 is performed by the specified value acquisition unit 232 shown in FIG. 37. As an aspect of the specified value acquisition step, there are a specified value calculation step of calculating the specified value, a specified-value-table referring step of referring to the table that stores the specified value, or a specified value acquisition step of acquiring the specified value input through the specified value input step of acquiring the input specified value.

If the specified value through the specified value acquisition step S103 shown in FIG. 38 is acquired, the step proceeds to a characteristic parameter update determination step S104.

In the characteristic parameter update determination step S104, it is determined whether or not to update the characteristic parameter depending on whether or not the difference between the existing characteristic parameter and the new characteristic parameter acquired through the characteristic parameter acquisition step S102 exceeds the specified value.

In a case where it is determined as No in the characteristic parameter update determination step S104, that is, the difference between the existing characteristic parameter and the new characteristic parameter acquired through the characteristic parameter acquisition step S102 is equal to or less than the specified value, the step proceeds to an ending step.

Meanwhile, in a case where it is determined as Yes in the characteristic parameter update determination step S104, that is, the difference between the existing characteristic parameter and the new characteristic parameter exceeds the specified value, the step proceeds to a characteristic parameter updating step S105.

In the characteristic parameter updating step S105, the characteristic parameter applied to the generation of the halftone processing rule is updated. That is, the existing characteristic parameter is updated to the new characteristic parameter, and the step proceeds to a halftone-processing-rule generation step S106.

In the halftone-processing-rule generation step S106, the two or more kinds of halftone processing rules of which the priorities of the requirements for the halftone process are different are generated by using the characteristic parameter updated through the characteristic parameter updating step S105.

A halftone-selection-chart output step S107 and a halftone selection operating step S108 have the same contents as those of the halftone-selection-chart output step S16 and the halftone selection operating step S18 shown in FIG. 4, and thus, the description thereof will be omitted.

The updating of the characteristic parameter may be performed when an arbitrary printing job is started, may be performed during the execution of an arbitrary printing job (for example, at a regular interval such as once every 100 pages or once every 1000 pages), or may be performed when the user inputs (for example, the user brings the image quality into question). The updating of the characteristic parameter may be performed when the printing system (device) is started.

<Description of Updating of Characteristic Parameter in a Case where System Error is Applied to Specified Value>

Figure 39:
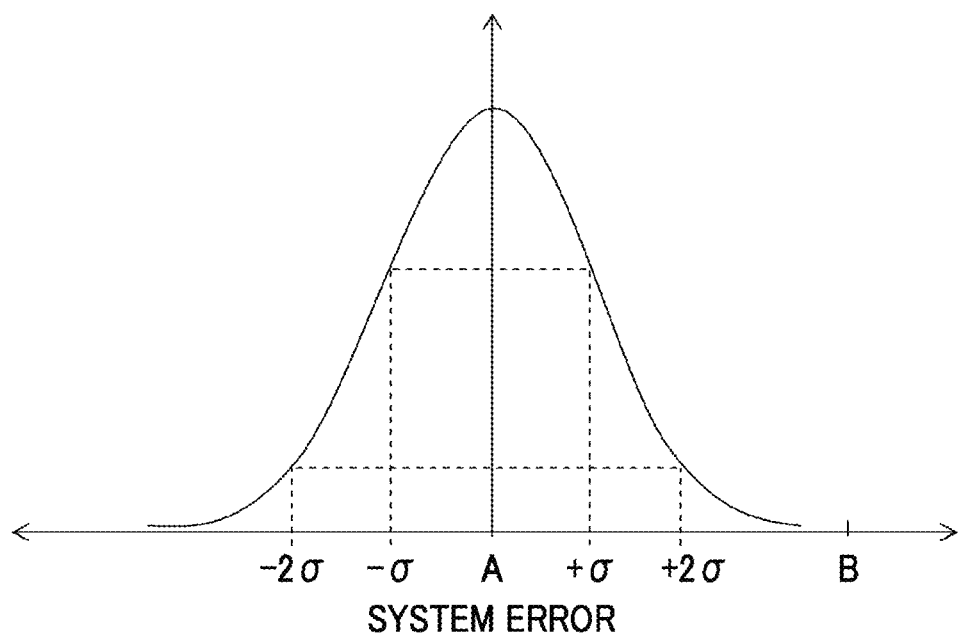
FIG. 39 is an explanatory diagram of an example of the updating of the characteristic parameter in a case where the system error is applied to a specified value.

FIG. 39 is an explanatory diagram of an example of the updating of the characteristic parameter in a case where the system error is applied to the specified value. The image processing device 20A shown in FIG. 37 may determine the specified value based on the random characteristic error. That is, the specified value acquisition unit 232 shown in FIG. 37 and the specified value acquisition step S103 shown in FIG. 38 may acquire the specified value determined based on the random system error which is the irregularly changed error as the characteristics of the printing system.

±σ and ±2σ shown in FIG. 39 are examples of the specified values determined based on the random system error with characteristic error A its center. σ indicates a standard deviation of the random system errors, and it is possible to determine whether or not to update the characteristic parameter by determining±σ, ±2σ or σ×σ as the specified value. a is an arbitrary positive real number excluding 0. For example, in a case where the specified value is ±2σ, if the difference between the existing characteristic parameter and the new characteristic parameter is B shown in FIG. 39, since the difference B between the existing characteristic parameter and the new characteristic parameter exceeds the specified 2σ, the characteristic parameter is updated.

In a case where the random system error is changed by performing the acquiring (updating) of the characteristic parameter multiple times, it is preferable that the specified value is updated depending on the change of the random system error.

The updating of the characteristic parameter may be performed by updating the existing characteristic parameter to the new characteristic parameter, or may be performed by updating the existing characteristic parameter to the average value of the existing characteristic parameter and the new characteristic parameter. The characteristic parameter may be updated to the latest existing characteristic parameter of the existing characteristic parameters or as much of the existing characteristic parameters as the previously determined number from the newest parameter and the value calculated using the new characteristic parameter. In this case, it is not necessary to store all the characteristic parameters acquired in the past, and the latest existing characteristic parameter or as much of the existing characteristic parameters as the previously determined number from the newest parameters may be stored, and it is possible to reduce the storage capacity of the characteristic parameter storage unit 54 (see FIG. 3) that stores the existing characteristic parameters.

Even in a case where the difference between the existing characteristic parameter and the new characteristic parameter is equal to or less than the specified value, that is, even in the characteristic parameter is not updated, the random system error may be changed based on the new characteristic parameter. The specified value may be changed according to the change of the random system error.

It is possible to use the characteristic error (shown by reference numeral A in FIG. 39) as the characteristic parameter. That is, in a case where the difference between the characteristic error of the existing characteristic parameter and the error characteristics of the new characteristic parameter exceeds the specified value (for example, ±σ or ±2σ described in FIG. 39), it is possible to update the characteristic parameter.

<Specific Example of Characteristic Parameter to be Updated>

Hereinafter, a specific example of a characteristic parameter to be updated will be described. The description of the already described characteristic parameters among the characteristic parameters to be illustrated below will be appropriately omitted.

As the characteristic parameters to be updated, there are the average dot density of the plurality of printing elements, the average dot diameter in the plurality of printing elements, the average dot shape in the plurality of printing elements and the landing interference in the plurality of printing elements, which are the characteristic parameters common to the plurality of printing elements.

The specified value in a case where the characteristic parameters to be updated are the average dot density in the plurality of printing elements, the average dot diameter in the plurality of printing elements and the average dot shape in the plurality of printing elements may be an absolute value, or may be a ratio between the existing average dot density in the plurality of printing elements, the existing average dot diameter in the plurality of printing elements and the existing average dot shape in the plurality of printing elements.

In a case where the tolerance design is performed while the average dot density, the average dot diameter and the average dot shape in the plurality of printing elements are regarded as the characteristic errors and a variation in dot density, a variation in dot diameter and a variation in dot shape in the individual printing element with respect to the average dot density, the average dot diameter and the average dot shape in the plurality of printing elements are regarded as the random system errors, the characteristic errors or the random system errors are updated or the characteristic errors and the random system errors are updated according to the following order.

Initially, the new characteristic errors (the average dot density, the average dot diameter, the average dot shape in the plurality of printing elements) and the new random system errors (a variation in dot density, a variation in dot diameter and a variation in dot shape in the individual printing element) are acquired from the new characteristic parameters. Subsequently, the difference between the existing characteristic error and the new characteristic error is calculated, and it is determined whether or not the difference between the existing characteristic error and the new characteristic error exceeds the specified value. In a case where the difference between the existing characteristic error and the new characteristic error exceeds the specified value, the characteristic error is updated.

The difference between the existing random system error and the new random system error is calculated, it is determined whether or not the difference between the existing random system error and the new random system error exceeds the specified value, and in a case where the difference between the existing random system error and the new random system error exceeds the specified value, the random system error is updated.

Figure 40:
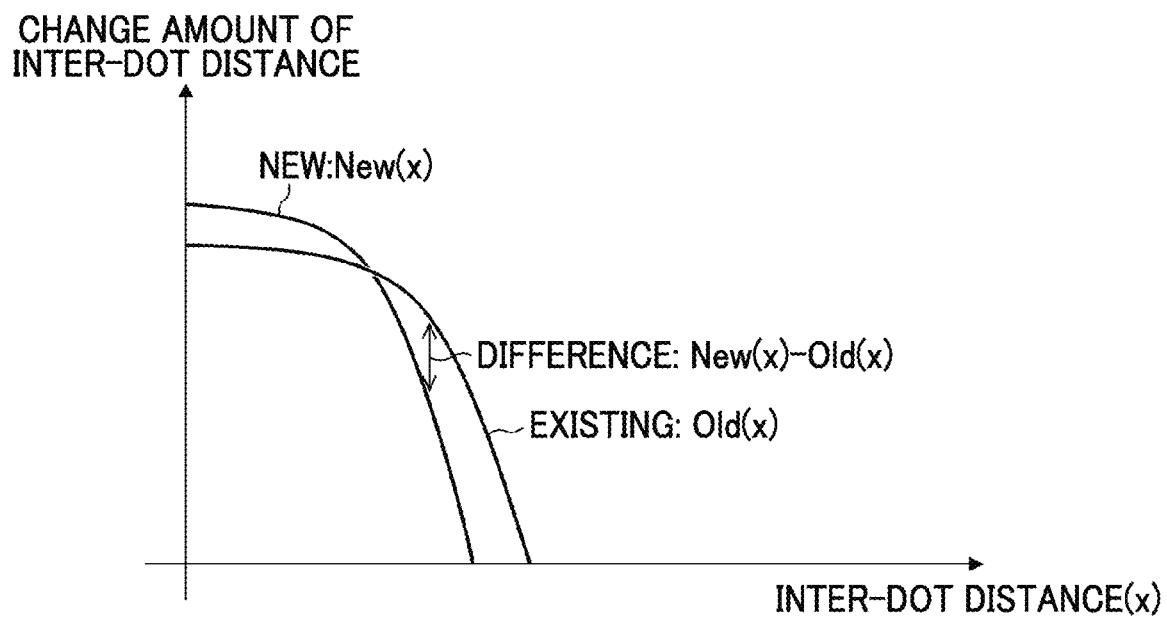
FIG. 40 is an explanatory diagram of a difference between an existing change amount of an inter-dot distance and a new change amount of an inter-dot distance.

As the specified value in a case where the characteristic parameter to be updated is the landing interference, an index indicating the difference such as the summation of the absolute values of New(x)–Old(x) which are the differences between Old(x) which are the existing change amounts of the inter-dot distance and New(x) which are the new change amounts of the inter-dot distance in the relationship between the inter-dot distance and the change amount of the inter-dot distance shown in FIG. 40, the summation of squares thereof, the summation of New(x)/Old(x) which are ratios between the existing change amounts of the inter-dot distance and the new change amounts of the inter-dot distance, or the summation of squares thereof, or an index indicating similarity such as a correlation coefficient may be applied.

The summation of the absolute values of the differences between the existing change amounts of the inter-dot distance and the new change amounts of the inter-dot distance is expressed by $\Sigma|\text{New}(x)-\text{Old}(x)|$. The summation of squares of the distances between the existing change amounts of the inter-dot distance and the new change amounts of the dot-inter distance is expressed by $\Sigma(\text{New}(x)-\text{Old}(x))^2$. The summation of the ratios between the existing change amounts of the inter-dot distance and the new change amounts of the inter-dot distance is expressed by $\Sigma(\text{New}(x)/\text{Old}(x))$. The summation of squares of ratios between the existing change amounts of the inter-dot distance and the new change amounts of the inter-dot distance is expressed by $\Sigma(\text{New}(x)/\text{Old}(x))^2$. AveNew represents the average of the new change amount of the inter-dot distance, AveOld represents the average of the existing change amount of the inter-dot distance, and the correlation coefficient is expressed by $\Sigma\{(\text{New}(x)-\text{AveNew})\times(\text{Old}(x)-\text{AveOld})\}/\{\Sigma(\text{New}(x)-\text{AveNew})^2\times\Sigma(\text{Old}(x)-\text{AveOld})^2\}$.

The relationship between an inter-dot recording time difference and the change amount of the inter-dot distance is schematically represented in the drawing in which a horizontal axis in FIG. 40 represents the inter-dot recording time difference instead of the inter-dot distance. The inter-dot recording time difference is a landing time difference between arbitrary two dots or a jetting time difference between arbitrary two dots. As the specified value in a case where the characteristic parameter is the landing interference, an index such as the summation of the absolute values of the differences between the existing change amounts of the inter-dot distance and the new change amounts of the inter-dot distance in the relationship between the inter-dot recording time difference and the change amount of the inter-dot distance, the summation of squares of the differences between the existing change amounts of the inter-dot distance and the new change amounts of the inter-dot distance, the summation of the ratios between the existing change amounts of the inter-dot distance and the new change amounts of the inter-dot distance, or the summation of squares of ratios between the existing change amounts of the inter-dot distance and the new change amounts of the inter-dot distance, or an index indicating similarity such as a correlation coefficient may be applied.

As another example of the characteristic parameter to be updated, there are the dot density for each printing element, the dot diameter for each printing element, the dot shape for each printing element, the dot forming position shift for each printing element, the non-jetting for each printing element and the dot position shift for each droplet kind for each printing element which are the characteristics of the individual printing element. The dot forming position shift for each printing element corresponds to a dot recording position error for each printing element. The non-jetting for each printing element corresponds to recording inexecutable abnormality for each printing element.

The specified value in a case where the dot density for each printing element, the dot diameter for each printing element and the dot shape for each printing element are the characteristic parameters may be the absolute value, or may be the ratio between the existing dot density for each printing element, the existing dot diameter for each printing element and the existing dot shape for each printing element. One specified value may be determined using an arbitrary printing element group such as the printing element array and the plurality of printing element arranged adjacent to each other as its target.

As the specified value in a case where the non-jetting for each printing element is the characteristic parameter, the characteristic parameter may be immediately updated in a case where the non-jetting occurs in the printing element, or the characteristic parameter may be updated in a case where there are as much of the printing elements of the printing element group (the plurality of printing elements arranged so as to be adjacent to each other) such as the printing element array as the previously determined number. For example, there is an aspect in which the characteristic parameter is updated in a case where the non-jetting occurs in 10% of printing elements using the one-row printing element array as its target.

In a case where the dot position shift for droplet kind for printing element is the characteristic parameter, since the characteristics of the dot position shift may be different for each droplet kind even in the same printing element, the specified value may be determined for each droplet kind.

As another example of the characteristic parameter to be updated, there are a paper transport error difference, a head vibration error according to the carriage movement, a printing position shift in scanning for each droplet kind, a bidirectional printing position shift in scanning, and which are the characteristic parameters specific to the serial scan type. The bidirectional printing position shift in scanning corresponds to a bidirectional printing position shift. The bidirectional printing position shift in scanning for each droplet kind corresponds to a bidirectional printing position shift for each droplet kind. The head vibration error according to the carriage movement corresponds to a vibration error of the image forming unit. The paper transport error corresponds to a transport error of the printing medium.

As the specified value in a case where the head vibration error according to the carriage movement is the characteristic parameter, an index indicating a difference between an existing head vibration error according to the carriage movement and a new head vibration error according to the carriage movement may be applied. As the index indicating the difference between the existing head vibration error according to the carriage movement and the new head vibration error according to the carriage movement, the summation of the absolute values of the differences between the existing position shift amounts in the main scanning direction and the new position shift amounts in the main scanning direction in the shift amount $\Delta x(n)$ in the main scanning direction with respect to a pixel position n shown in FIG. 25A, or the summation of squares of the differences between the existing position shift amounts in the main scanning direction and the new position shift amounts in the main scanning direction may be applied. The difference between the existing position shift amount in the main scanning direction and the new position shift amount in the main scanning direction may be calculated by subtracting the existing position shift amount in the main scanning direction from the new position shift amount in the main scanning direction.

As the index indicating the difference between the existing head vibration error according to the carriage movement and the new head vibration error according to the carriage movement, the summation of the ratios between the existing position shift amounts in the main scanning direction and the new position shift amounts in the main scanning direction in the shift amount $\Delta x(n)$ in the main scanning direction in the pixel position n shown in FIG. 25A, or the summation of squares of the ratios between the existing position shift amounts in the main scanning direction and the new position shift amounts in the main scanning direction may be applied. The ratio between the existing position shift amount in the main scanning direction and the new position shift amount in the main scanning direction may be calculated by dividing the new position shift amount in the main scanning direction by the existing position shift amount in the main scanning direction.

A shift amount $\Delta y(n)$ in the sub scanning direction with respect to a pixel position n shown in FIG. 25B may be applied instead of the shift amount $\Delta x(n)$ in the main scanning direction with respect to the pixel position n or together with the shift amount $\Delta x(n)$ in the main scanning direction with respect to the pixel position n.

As the specified value in a case where the head vibration error according to the carriage movement is the characteristic parameter, an index indicating similarity may be applied. As the similarity, a correlation coefficient may be applied. The specified value in a case where the head vibration error according to the carriage movement is the characteristic parameter may be determined based on the magnitude of the head vibration error according to the carriage movement. As the magnitude of the head vibration error according to the carriage movement, a standard deviation or a variance of the magnitude of the head vibration error according to the carriage movement may be applied. The head vibration error according to the carriage movement corresponds to the head vibration error.

As another example of the characteristic parameter to be updated, there is a head module (denoted by reference numeral 220-*j* (=1, 2, . . . , and Nm) in FIG. 28) vibration error which is the characteristic parameter specific to the single path type.

As the specified value in a case where the head module vibration error in the single path type is the characteristic parameter, an index indicating the difference between the existing head module vibration error and the new head module vibration error may be applied. As the index indicating the difference between the existing head module vibration error and the new head module vibration error, the summation of the absolute values of the difference between the existing position shift amounts in the main scanning direction and the new position shift amounts in the main scanning direction, or the summation of squares of the differences between the existing position shift amounts in the main scanning direction and the new position shift amounts in the main scanning direction in the position shift amount (dot position shift amount) in the main scanning direction (denoted by reference numeral x) with respect to the position in the paper transport direction (sub scanning direction, denoted by reference numeral y) shown in FIG. 28 may be applied.

The difference between the existing position shift amount in the main scanning direction and the new position shift amount in the main scanning direction may be calculated by subtracting the existing position shift amount in the main scanning direction from the new position shift amount in the main scanning direction.

As the index indicating the difference between the existing head module vibration error and the new head module vibration error, the summation of the ratios between the existing position shift amounts in the main scanning direction and the new position shift amounts in the main scanning direction or the summation of squares of the ratios between the existing position shift amounts in the main scanning direction and the new position shift amounts in the main scanning direction in the position shift amount (dot position amount) in the main scanning direction (denoted by reference numeral x) with respect to the position in the paper transport direction (sub scanning direction, denoted by reference numeral y) shown in FIG. 28 may be applied.

The ratio between the existing position shift amount in the main scanning direction and the new position shift amount in the main scanning direction may be calculated by dividing the new position shift amount in the main scanning direction by the existing position shift amount in the main scanning direction.

As the specified value in a case where the head module vibration error in the single path type is the characteristic parameter, the index indicating the similarity between the existing head module vibration error and the new head module vibration error may be applied. As the index indicating the similarity between the existing head module vibration error and the new head module vibration error, the correlation coefficient may be applied. The head module vibration error corresponds to the head module vibration error in the head including by a plurality of head modules.

The specified value in a case where the head module vibration error is the characteristic parameter may be determined based on the magnitude of the head module vibration error. As the magnitude of the head module vibration error, a standard deviation or a variance of the magnitude of the head module vibration error may be applied.

In the printing system according to the present embodiment, at least any one characteristic parameter of the above-described characteristic parameters may be updated.

<Modification Example of Printing System According to Fourth Embodiment>

Figure 41:
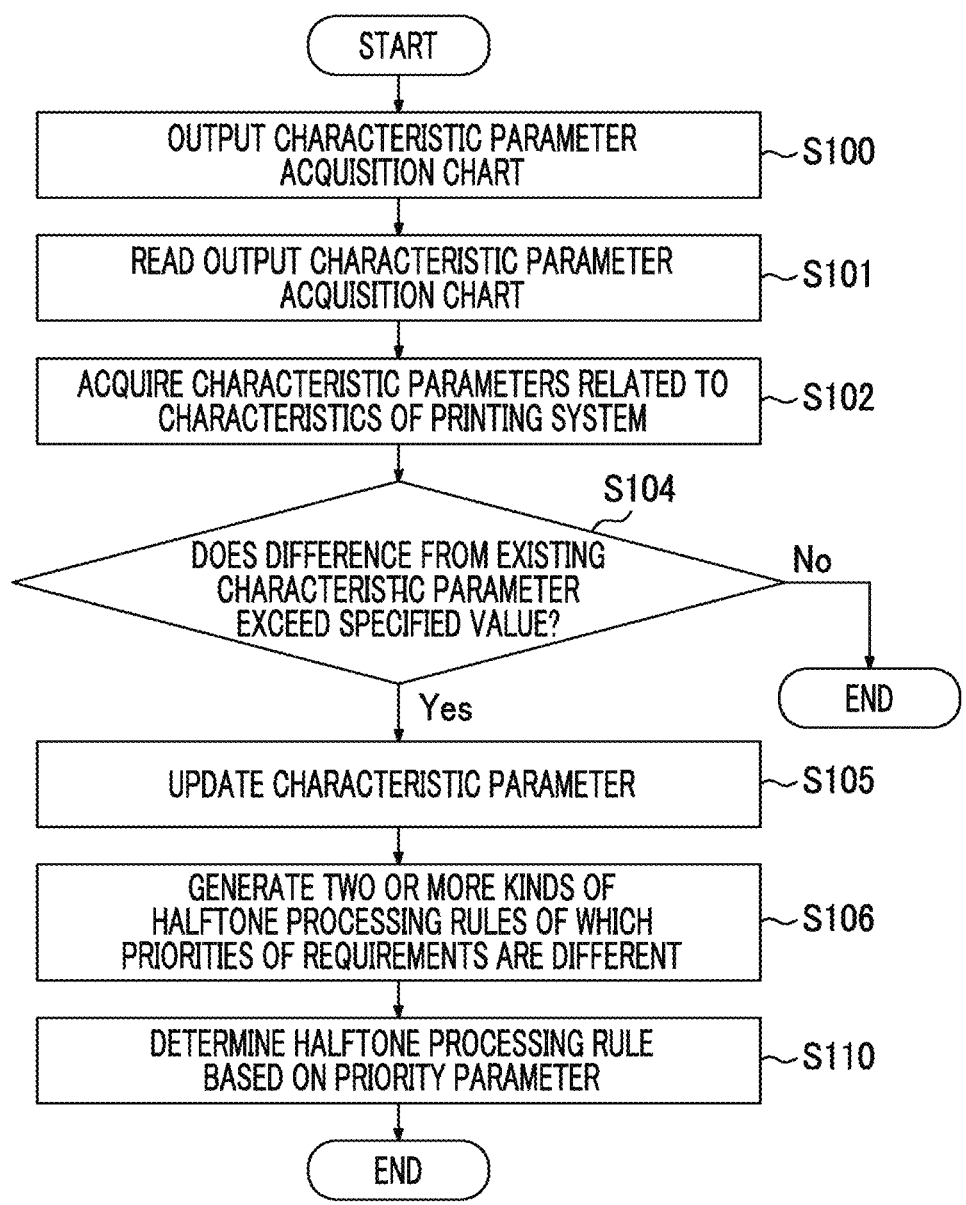
FIG. 41 is a flowchart of a method of generating a halftone processing rule applied to a modification example of the printing system according to the fourth embodiment.

FIG. 41 is a flowchart of a method of generating the halftone processing rule applied to a modification example of the printing system according to the fourth embodiment. In FIG. 41, the same steps as those of FIG. 38 will be assigned the same reference numerals, and the description thereof will be appropriately omitted.

The characteristic parameter in the method of generating the halftone processing rule shown in FIG. 38 may be updated whenever the print job is executed. The characteristic parameter shown in the flowchart of FIG. 38 may be updated during the execution of the print job. However, in a case where the characteristic parameter is updated during the execution of the print job, it is preferable that the halftone processing rule is determined such that the printing is not stopped when the user selects the halftone processing rule.

The flowchart shown in FIG. 41 includes a halftone-processing-rule determination step S110 of determining the halftone processing rule based on the priority parameter, instead of the halftone-selection-chart output step S107 and the halftone selection operating step S108 in the flowchart shown in FIG. 38.

The halftone-processing-rule determination step S10 shown in FIG. 41 has the same content as that of the step (step S17) of determining one kind of halftone processing rule from the two or more kinds of generated halftone processing rules based on the priority parameter after the two or more kinds of halftone processing rules are generated as shown in FIG. 20, and thus, the description thereof will be omitted.

That is, in the flowchart shown in FIG. 37, if there is no user selection in the halftone selection operating step S108, there is a concern that the printing is stopped without determining the halftone processing rule to be applied to the printing. Meanwhile, in the flowchart shown in FIG. 41, since the halftone processing rule is determined from the two or more kinds of halftone processing rules based on the priority parameter in the halftone-processing-rule determination step S110, the phenomenon in which the printing is stopped without determining the halftone processing rule to be applied to the printing does not occur.

According to the printing system having the above-described configuration, since the characteristic parameter is updated according to the difference between the existing characteristic parameter and the new characteristic parameter, the characteristic parameter may be updated according to the change of the characteristics of the printing system.

Since the halftone processing rule is generated using the updated characteristic parameter, the printing using the halftone processing rule corresponding to the change of the characteristics of the printing system can be performed.

[Description of Output of Characteristic Parameter Acquisition Chart and Generation of Halftone Processing Rule According to Fifth Embodiment]

Hereinafter, the output of the characteristic parameter acquisition chart and the generation of the halftone processing rule according to a fifth embodiment will be described.

<Flowchart of Method of Generating Halftone Processing Rule to which Output of Characteristic Parameter Acquisition Chart and Generation of Halftone Processing Rule are Applied According to Fifth Embodiment>

Figure 42:
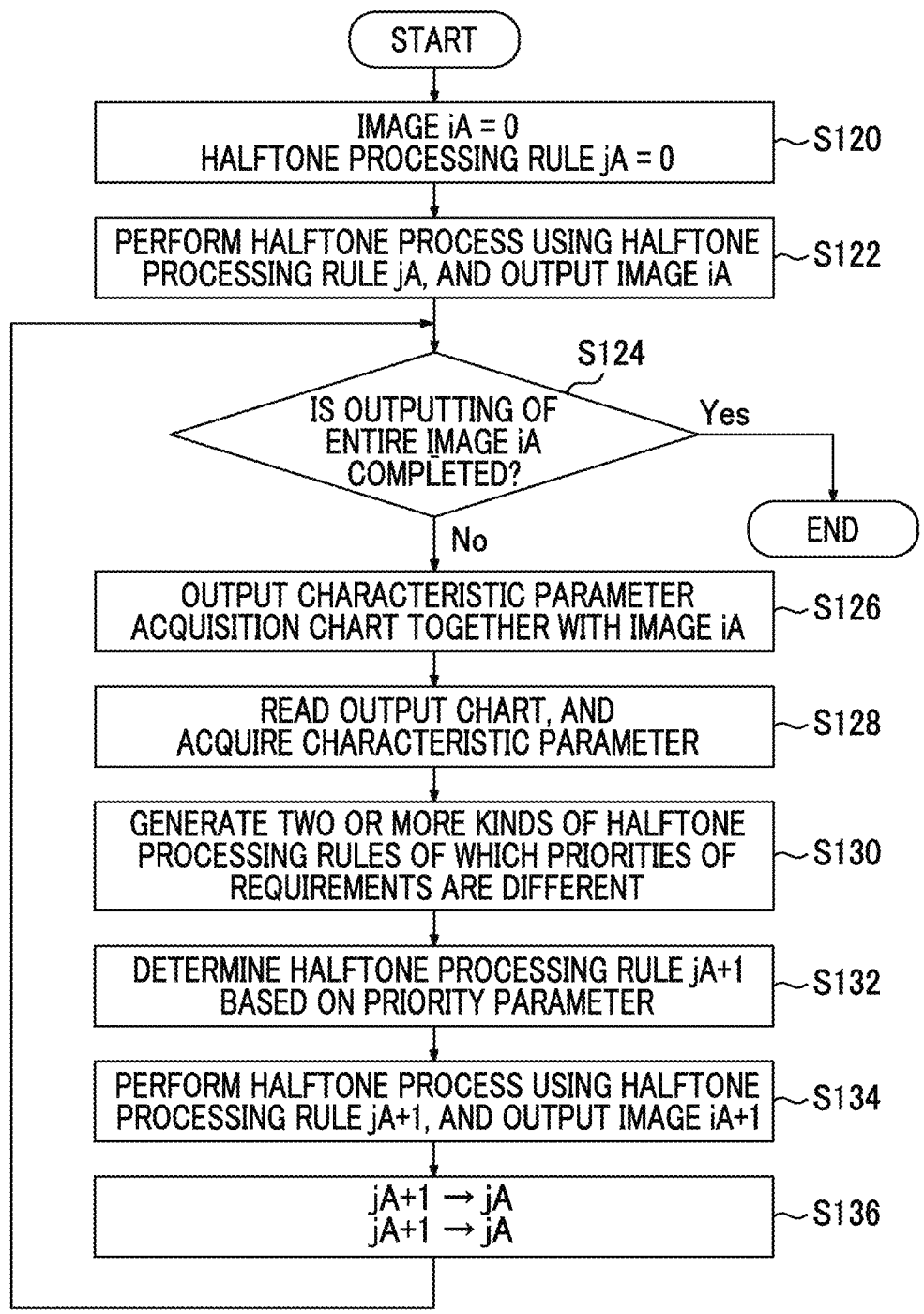
FIG. 42 is a flowchart of a method of generating a halftone processing rule according to a fifth embodiment.

FIG. 42 is a flowchart of a method of generating the halftone processing rule according to the fifth embodiment. The method of generating the halftone processing rule of the flowchart shown in FIG. 42 may be applied to the image processing device 20 shown in FIG. 3 and the image processing device 20A shown in FIG. 37. In the following description, it is assumed that the characteristic parameter acquisition chart is output and the halftone processing rule is generated during the execution of an arbitrary print job.

In the method of generating the halftone processing rule show in the flowchart of FIG. 42, the halftone processing rule used in the outputting of the subsequent image to the image which is output together with the characteristic parameter acquisition chart is generated based on the characteristic parameter acquisition chart which is output together with the image. The image subsequent to the image which is output together with the characteristic parameter acquisition chart may be the next image of the plurality of images which is continuously output, or may be an image subsequent to the next image. The plurality of images may have the same content, or may have different contents.

In an initialization step S120, zero is substituted for iA indicating an image number, and zero is substituted for jA indicating a halftone processing rule number. That is, a first image of an arbitrary print job is determined, and a halftone processing rule applied to the first image is determined.

In the present embodiment, the values substituted for the image number iA, the halftone processing rule number jA and a chart number kA are zero and a positive integer. In the following description, an iA-th image is described as the image iA, a jA-th halftone processing rule is described as the halftone processing rule jA, and a kA-th characteristic parameter acquisition chart is described as the characteristic parameter acquisition chart kA (chart kA). In FIG. 42, the characteristic parameter acquisition chart kA (chart kA) is not shown.

In an image output step S22, the halftone process is performed on image data indicating the image iA using the halftone processing rule jA, and the image iA is output. The halftone process is performed by the halftone processing unit 80 shown in FIG. 3. The image is output by the image processing device 20 shown in FIG. 1. The halftone processing unit 80 corresponds to halftone processing means.

In a determination step S124, it is determined whether or not the outputting of the entire image iA is completed. In a case where it is determined as Yes in the determination step S124, that is, the outputting of the entire image iA is completed, the step proceeds to an ending step. In a case where it is determined as No in the determination step S124, that is, the outputting of the entire image iA is not completed, the step proceeds to a characteristic-parameter-acquisition-chart output step S126.

In the characteristic-parameter-acquisition-chart output step S126, the characteristic parameter acquisition chart is output together with the image iA. As the aspect in which the characteristic parameter acquisition chart is output together with the image iA, there is an aspect in which the characteristic parameter acquisition chart is output on a part of the paper on which the image iA is printed (see FIG. 43A).

If the characteristic parameter acquisition chart is output, the step proceeds to a characteristic parameter acquisition step S128 of acquiring the output characteristic parameter by reading the output characteristic parameter acquisition chart and analyzing the read image of the characteristic parameter acquisition chart. The characteristic parameter acquisition step S128 shown in FIG. 42 has the same contents as those of the step (step S1) of reading the characteristic parameter acquisition chart shown in FIG. 4 and the step (step S12) of analyzing the read image acquired in step S11 and acquiring the characteristic parameters related to the characteristics of the printing system, and thus, the description thereof will be omitted.

If the characteristic parameter is acquired, two or more kinds of halftone processing rules of which priorities of the requirements for the halftone process are different are generated in a halftone process generation step S130. Ina halftone-processing-rule determination step S132, a halftone processing rule jA+1 is determined based on the priority parameter.

The halftone process generation step S130 shown in FIG. 42 is the same as the step (step S14) of generating the two or more kinds of halftone processing rules of which the priorities of the requirements for the halftone process shown in FIG. 4 are different. The halftone-processing-rule determination step S132 shown in FIG. 42 has the same content as that of the step (step S17) of determining one kind of halftone processing rule based on the priority parameter shown in FIG. 20.

In an updating step S136, the image number is updated from iA to iA+1. The halftone processing rule number is updated from jA to jA+1. The updating of the image number includes both a case where the content of the image is changed and a case where the content of the image is not changed. In a case where the halftone processing rule number is updated from jA to jA+1, the halftone processing rule jA and the halftone processing rule jA+1 may have the same content.

If the image number and the halftone processing rule number are updated, the step proceeds to the determination step S124, and the steps from the determination step S124 to the updating step S136 are repeatedly performed.

Although the aspect in which the determination step S124 is performed in the next step to the image output step S122 has been described in FIG. 42, the determination step S124 may be the next step to the characteristic-parameter-acquisition-chart output step S126, or may be the next step to the halftone-processing-rule determination step S132.

Figure 43A:
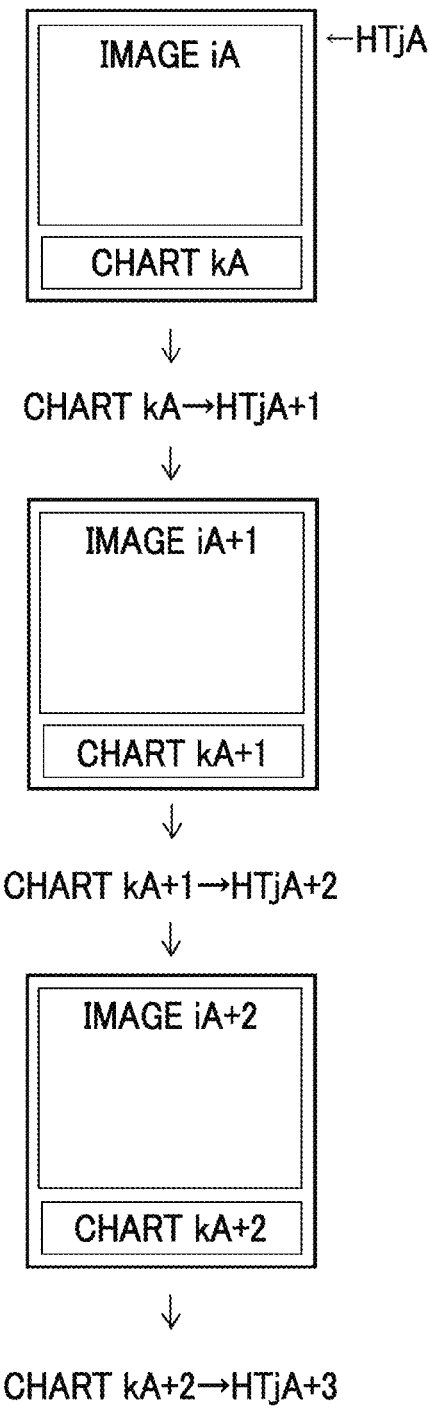
FIG. 43A is a conceptual diagram of the method of generating a halftone processing rule according to the fifth embodiment.

FIG. 43A is a conceptual diagram of the method of generating the halftone tone processing rule according to the fifth embodiment. HT in FIG. 43A denotes the halftone processing rule. The same is true of FIG. 43B.

On the uppermost portion of FIG. 43A, the image iA output together with the characteristic parameter acquisition chart (chart kA) is represented. The halftone process is performed on the image iA by using a halftone processing rule jA(HTjA). A halftone processing rule jA+1(HTjA+1) is generated based on the characteristic parameter acquisition chart kA shown in FIG. 43A through the characteristic parameter acquisition step S128 and the halftone process generation step S130 shown in FIG. 42. The halftone processing rule jA is generated based on a characteristic parameter acquisition chart (chart kA−1) output together with an image iA−1 (not shown).

On the middle portion of FIG. 43A, an image iA+1 output together with a characteristic parameter acquisition chart (chart kA+1) is represented. The halftone process is performed on the image iA+1 by using the halftone processing rule jA+1(HTjA+1) generated based on the characteristic parameter acquisition chart kA.

A halftone processing rule jA+2(HTjA+2) is generated based on the characteristic parameter acquisition chart kA+1 shown in FIG. 43A through the characteristic parameter acquisition step S128 and the halftone process generation step S130 shown in FIG. 42.

On the bottommost portion of FIG. 43A, an image iA+2 output together with the characteristic parameter acquisition chart (chart kA+2) is represented. The halftone process is performed on the image iA+2 by using the halftone processing rule jA+2(HTjA+2) generated based on the characteristic parameter acquisition chart kA+1.

A halftone processing rule jA+3(HTjA+3) is generated based on the characteristic parameter acquisition chart kA+2 shown in FIG. 43A through the characteristic parameter acquisition step S128 and the halftone process generation step S130 shown in FIG. 42.

According to the method of generating the halftone processing rule according to the fifth embodiment, since a characteristic parameter acquisition chart used to generate a halftone processing rule used in a subsequently output image is output together with the image during the execution of an arbitrary print job, it is possible to determine the change of the characteristics of the printing system whenever the image is output (whenever the characteristic parameter acquisition chart is output), and it is possible to generate the halftone processing rule corresponding to the change of the characteristics of the printing system.

Accordingly, the image is output using the halftone processing rule corresponding to the change of the characteristics of the printing system, and thus, it is possible to prevent the image quality from being deteriorated even in a case where the characteristics of the printing system are changed.

In FIG. 43A, the aspect in which the characteristic parameter acquisition chart is output on the same paper as the paper on which the image is output has been described as the aspect in which the characteristic parameter acquisition chart is simultaneously output with the image output. However, the characteristic parameter acquisition chart may be output on a paper which is the subsequent paper to the paper on which the image is output and is the paper before the next image is output.

<Application Example of Method of Generating Halftone Processing Rule According to Fifth Embodiment>

Hereinafter, an application example of the method of generating the halftone processing mule according to the fifth embodiment will be described. Any one or more processes of the process (output process) of outputting the characteristic parameter acquisition chart, the process of reading the characteristic parameter acquisition chart and acquiring the characteristic parameter and the process of generating the halftone processing rule, and the halftone process are performed in parallel by applying the method of generating the halftone processing rule described with reference to FIGS. 42 and 43A. By doing this, it is possible to perform any one or more processes of the process of outputting the characteristic parameter acquisition chart, the process of reading the characteristic parameter acquisition chart and acquiring the characteristic parameter and the process of generating the halftone processing rule and the halftone process within the same period of time.

Figure 43B:
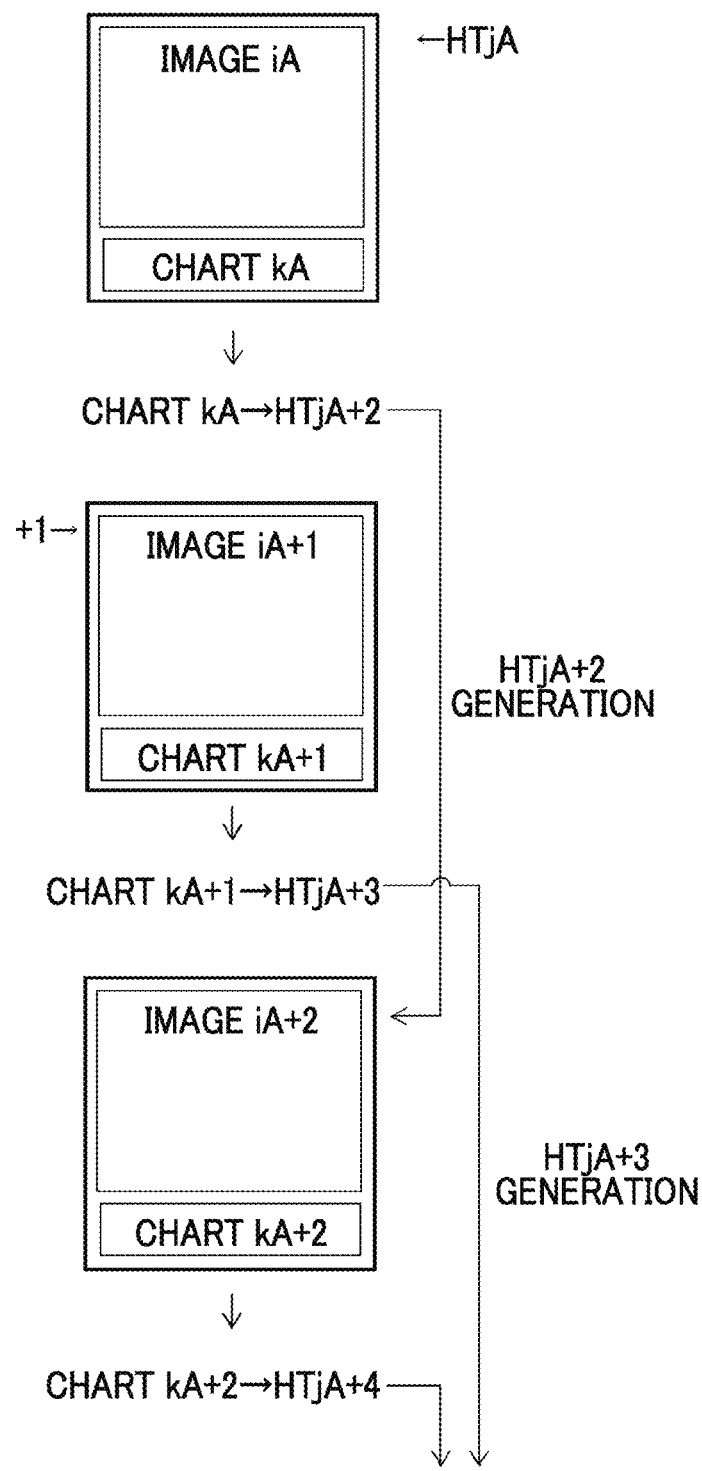
FIG. 43B is a conceptual diagram of a method of generating a halftone processing rule according to an application example of the fifth embodiment.

FIG. 43B is a conceptual diagram of the method of generating the halftone processing rule according to the application example of the fifth embodiment. In FIG. 43B, the same parts as those of FIG. 43A will be assigned the same reference numerals, and the description thereof will be appropriately omitted.

On the uppermost portion of FIG. 43B, the image iA output together with the characteristic parameter acquisition chart (chart kA) is represented. The halftone process is performed on the image iA by using the halftone processing rule jA(HTjA). The characteristic parameter acquisition chart kA output together with the image iA is a characteristic parameter acquisition chart used when the halftone processing rule applied to the halftone process of the image iA+2 output two images later than the image iA is generated.

The halftone processing rule jA+2(HTjA+2) is generated based on the characteristic parameter acquisition chart kA shown in FIG. 43B through the characteristic parameter acquisition step S128 and the halftone process generation step S130 shown in FIG. 42.

On the middle portion of FIG. 43B, the image iA+1 output together with the characteristic parameter acquisition chart (chart kA+1) is represented. The halftone process is performed on the image iA+1 by using the halftone processing rule jA+1(HTjA+1) generated based on the characteristic parameter acquisition chart kA−1 (not shown).

The halftone processing rule jA+3(HTjA+3) is generated based on the characteristic parameter acquisition chart kA+1 shown in FIG. 43B through the characteristic parameter acquisition step S128 and the halftone process generation step S130 shown in FIG. 42.

On the bottom portion of FIG. 43B, the image iA+2 output together with the characteristic parameter acquisition chart (chart kA+2) is represented. The halftone process is performed on the image iA+2 by using the halftone processing rule jA+2(HTjA+2) generated based on the characteristic parameter acquisition chart kA.

A halftone processing rule jA+4(HTjA+4) is generated based on the characteristic parameter acquisition chart kA+2 shown in FIG. 43B through the characteristic parameter acquisition step S128 and the halftone process generation step S130 shown in FIG. 42.

That is, in the method of generating the halftone processing rule shown in FIG. 43B, the characteristic parameter acquisition chart used to generate the halftone processing rule used in the halftone process is output together with an image output two images earlier than the image on which the halftone process is performed. In other words, the halftone process generation unit 58 (see FIG. 37) generates the halftone processing rule by using the characteristic parameter acquisition chart together with an image output two images earlier than the image on which the halftone process is performed.

In FIG. 43B, the aspect in which the characteristic parameter acquisition chart used to generate the halftone processing rule used in the halftone process is output together with an image output two images earlier than the image on which the halftone process is performed has been described. However, the characteristic parameter acquisition chart used to generate the halftone processing rule used in the halftone process may be output together with an image output two or more images earlier than the image on which the halftone process is performed.

Accordingly, it is possible to generate the halftone processing rule jA+2 applied to the halftone process of the image iA+2 based on the characteristic parameter acquisition chart kA during a period of time when the halftone process is performed on the image iA+1.

As in the method of generating the halftone processing rule shown in FIG. 43B, in a case where the halftone processing rule used in the halftone process of an image output two or more images later than the image output together with the characteristic parameter acquisition chart is generated, the halftone process of an image output one image later than the image and the generation of the halftone processing rule used in the halftone process of an image output two or more images later than the image may be simultaneously performed as parallel processes.

In other words, in a case where nB is an integer of 2 or more, and also in a case where a halftone processing rule jA+nB is generated from the characteristic parameter acquisition chart kA output together with the image iA which is the processing result of the halftone process by using the halftone processing rule jA, it is possible to simultaneously perform the halftone process and the generation of the halftone processing rule as the parallel processes, and it is possible to improve productivity. However, since the halftone processing rule is not generated based on the characteristic parameter acquisition chart output together with the image from Halftone Processing Rule 1 to Halftone Processing Rule nB−1, Halftone Processing Rule 0 (initially set halftone processing rule) is applied.

FIG. 44 is a flowchart of the method of generating the halftone processing rule according to the application example of the fifth embodiment. In FIG. 44, the same steps as those of FIG. 42 will be assigned the same reference numerals, and the description thereof will be appropriately omitted.

In an initialization step S121 shown in FIG. 44, zero is substituted for iA indicating the image number, zero is substituted for jA indicating the halftone processing rule number, and zero is substituted for the characteristic parameter acquisition chart number kA.

An image output step S122 and a determination step S124 shown in FIG. 44 are the same as the image output step S122 and the determination step S124 shown in FIG. 42, and the description thereof will be omitted.

In a case where it is determined as No in the determination step S124 shown in FIG. 44 (the outputting of the entire image iA is not completed), the step proceeds to a characteristic-parameter-acquisition-chart output step S140 and a halftone processing step S148. In the characteristic-parameter-acquisition-chart output step S140, the characteristic parameter acquisition chart kA is output together with the image iA.

In a characteristic parameter acquisition step S142, the characteristic parameter acquisition chart kA output in the characteristic-parameter-acquisition-chart output step S140 is read, and the characteristic parameter is acquired.

In a halftone process generation step S144, two or more kinds of halftone processing rules of which the requirements are different are generated based on the characteristic parameter acquired in the characteristic parameter acquisition step S142.

In a halftone-processing-rule determination step S146, the halftone processing rule jA+2 applied to the halftone process of the image iA+2 is determined from the two or more kinds of halftone processing rules of which the requirements are different and which are generated in the halftone process generation step S144 based on the priority parameter. The halftone processing rule jA+2 is stored in the halftone-processing-rule storage unit shown in FIG. 3 or 37 (halftone-processing-rule storing step).

In a halftone processing step S148, the halftone process is performed using the halftone processing rule jA+1, and the image iA+1 is output. The halftone processing rule jA+1 is an initially set halftone processing rule (Halftone Processing Rule 0) in a case where jA=0, and is a halftone processing rule generated based on the characteristic parameter acquisition chart kA−1 output together with the image iA−1 in a case where jA>0.

In the method of generating the halftone processing rule shown in FIG. 44, the halftone processing step S148 may be performed within the same period of time as that of the characteristic-parameter-acquisition-chart output step S140, the characteristic parameter acquisition step S142, the halftone process generation step S144 and the halftone-processing-rule determination step S146, which are a series of steps of generating the halftone processing rule, and the halftone processing rule jA+2 applied to the halftone process of the image iA+2 in parallel with the halftone process of the image iA+1 may be generated.

In an updating step S150, the image number is updated from iA to iA+1. The halftone processing rule number is updated from jA to jA+1. The characteristic parameter acquisition chart number is updated from kA to kA+1.

According to the method of generating the halftone processing rule according to the application example of the fifth embodiment having the above-described configuration, the halftone process and the generating of the halftone processing rule are performed in parallel, and thus, it is possible to improve the productivity of the printing system unlike a case where the generation of the halftone processing rule that reflects the change of the characteristics of the printing system and the halftone process to which the halftone processing rule that reflects the change of the characteristics of the printing system is applied are successively performed.

<Description of Modification Example of Method of Generating Halftone Processing Rule According to Application Example of Fifth Example>

Figure 46:
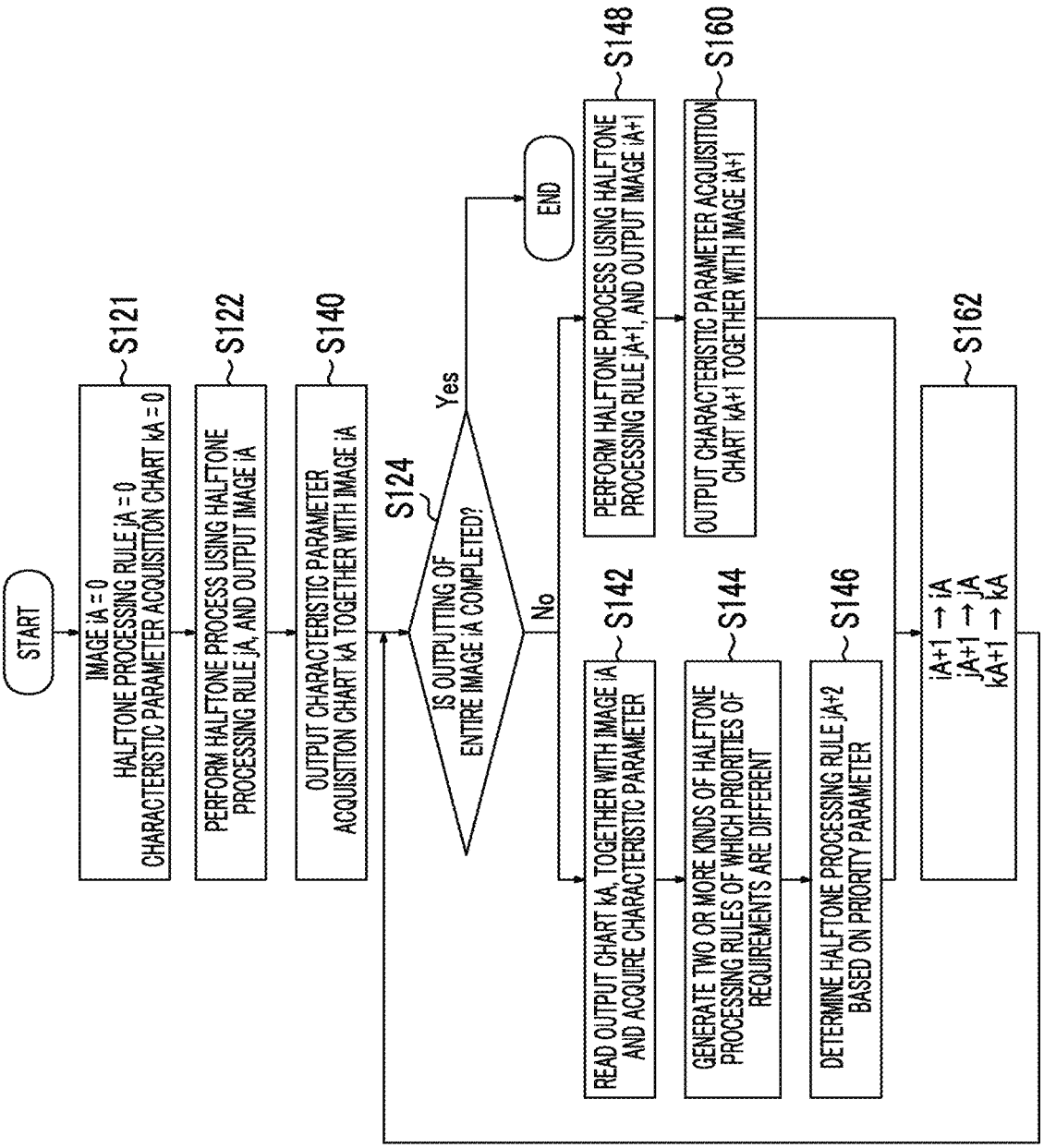
FIG. 46 is a flowchart of a second modification example of the method of generating a halftone processing rule according to the application example of the fifth embodiment.

FIG. 45 is a flowchart of a first modification example of the method of generating the halftone processing rule according to the application example of the fifth embodiment. FIG. 46 is a flowchart of a second modification example of the method of generating the halftone processing rule according to the application example of the fifth embodiment. In FIGS. 45 and 46, the same steps as those of FIG. 44 will be assigned the same reference numerals, and the description thereof will be approximately omitted.

As shown in FIGS. 45 and 46, the methods of generating the halftone processing rule shown in FIG. 44 may be changed in consideration of the balance of parallel processes. As the balance of parallel processes, there are the balance of processing time and the balance of processing load.

In the method of generating the halftone processing rule according to the first modification example shown in FIG. 45, the halftone process generation step S144 and the halftone-processing-rule determination step S146 of the method of generating the halftone processing rule shown in FIG. 44 are removed, a characteristic parameter storing step S143 is added after the characteristic parameter acquisition step S142, and a halftone process generation step S154 and a halftone-processing-rule determination step S156 are added before the halftone processing step S148.

In the method of generating the halftone processing rule shown in FIG. 45, if the characteristic parameter used when the halftone processing rule jA+2 is generated is acquired based on the characteristic parameter acquisition chart kA in the characteristic parameter acquisition step S142, the characteristic parameter is stored in the characteristic parameter storing step S143, and the step proceeds to an updating step S150. The characteristic parameter is stored in the characteristic parameter storage unit 54 shown in FIG. 3.

In a case where it is determined as No (the outputting of the entire image iA is not completed) in the determination step S124 shown in FIG. 45, the step proceeds to the characteristic-parameter-acquisition-chart output step S140 and the halftone process generation step S154. In the halftone process generation step S154, two or more kinds of halftone processing rules of which the priorities of the requirements are different are generated based on the characteristic parameter acquired from the characteristic parameter acquisition chart kA−1 output together with the image iA−1 (the previous image of the image iA).

In the halftone-processing-rule determination step S156, the halftone processing rule jA+1 applied to the halftone process of the image iA+1 is generated from two or more kinds of halftone processing rules of which the priorities of the requirements are different and which are generated in the halftone process generation step S154 based on the priority parameter.

In the halftone processing step S148, the halftone process is performed using the halftone processing rule jA+1 determined in the halftone-processing-rule determination step S156, and the image iA+1 is output. If the image iA+1 is output in the halftone processing step S148 and the characteristic parameter used when the halftone processing rule jA+2 is generated is stored in the characteristic parameter storing step S143, the step proceeds to the updating step S150.

In a case where the first image is output, the halftone process generation step S154 and the halftone-processing-rule determination step S156 are omitted, and a process of "performing the halftone process by using Halftone Processing Rule 0 and outputting Image 1" is performed instead of the halftone processing step S148.

In the method of generating the halftone processing rule according to the second modification example shown in FIG. 46, the characteristic-parameter-acquisition-chart output step S140 of outputting the characteristic parameter acquisition chart kA together with the image iA is performed as the step which is performed after the image output step S122 of the method of generating the halftone processing rule shown in FIG. 44 and is performed before the determination step S124.

In the method of generating the halftone processing rule shown in FIG. 46, the characteristic parameter acquisition chart is output together with the first image. The image output step S122 and the characteristic-parameter-acquisition-chart output step S140 shown in FIG. 46 may be performed as one step.

In a case where it is determined as No in the determination step S124 shown in FIG. 46 (the outputting of the entire image iA is not completed), the step proceeds to the characteristic parameter acquisition step S142 and the halftone processing step S148.

If the image iA+1 is output in the halftone processing step S148, the step proceeds to the characteristic-parameter-acquisition-chart output step S160. In the characteristic-parameter-acquisition-chart output step S160, the characteristic parameter acquisition chart kA+1 is output together with the image iA+1.

In the updating step S162 which is provided instead of the updating step S150 shown in FIG. 44 and is shown in FIG. 46, the image number is updated from iA to iA+1. The halftone processing rule number is updated from jA to jA+1. The characteristic parameter acquisition chart number is updated from kA to kA+1.

The method of generating the halftone processing rule shown in FIGS. 44, 45 and 46 is a method of generating the halftone processing rule for performing the halftone process on an image output two images later than the image output together with the characteristic parameter acquisition chart based on the characteristic parameter acquisition chart. However, an integer of 2 or more is expressed as nB, and a halftone processing rule for performing the halftone process on an image output later than an nB-th image may be similarly generated.

Specifically, in the halftone-processing-rule determining step S146 shown in FIGS. 44 and 46, a "halftone processing rule jA+nB" may be determined instead of the "halftone processing rule jA+2". In the method of generating the halftone processing rule shown in FIG. 45, a "halftone processing rule jA+nB-1" may be determined instead of the "halftone processing rule jA+1" in the halftone-processing-rule determining step S156. The same is not true of the halftone processing step S148 shown in FIGS. 44, 45 and 46.

However, in the method of generating the halftone processing rule shown in FIGS. 44, 45 and 46, since the halftone processing rule is not generated from Halftone Processing Rule 1 (jA=1) to Halftone Processing Rule nB-1 based on the characteristic parameter acquisition chart output together with the image output, the halftone process is performed using Halftone Processing Rule 0 (initially set halftone processing rule) instead of the halftone processing rule jA+1 in the halftone processing step S148. In the method of generating the halftone processing rule shown in FIG. 45, the halftone process generation step S154 and the halftone-processing-rule determining step S156 are omitted.

In the method of generating the halftone processing rule shown in FIGS. 42, 44, 45 and 46, the images and the halftone processing rules are in one-to-one correspondence. That is, if the image is changed, the halftone processing rule is changed. However, it is not necessary to necessarily perform such a change. One halftone processing rule may be applied to a plurality of images. For example, Halftone Processing Rule 1 may be applied to Image 1, Image 2, Image 3 and Image 4, and Halftone Processing Rule 2 may be applied to Image 5, Image 6, Image 7 and Image 8.

That is, the halftone processing rule is updated once at a time whenever the plurality of images is output, and thus, it is possible to improve the productivity. In a case where the halftone processing rule is updated once at a time whenever the plurality of images is output, the characteristic parameter acquisition chart may be output together with any one of the plurality of images.

Since the image together with the characteristic parameter acquisition chart and the image on which the halftone process is performed using the halftone processing rule generated based on this characteristic parameter acquisition chart are separated with two or more images interposed therebetween, the halftone process and the generation of the halftone processing rule are simultaneously performed as the parallel processes, and thus, it is possible to further improve the productivity as described above.

According to the methods of generating the halftone processing rule according to the first modification and the second modification, it is possible to obtain the same effects as those of the method of generating the halftone processing rule according to the application example of the fifth embodiment, and it is possible to optimize the allocation of the processing time of the parallel processes and the allocation of the processing load of the parallel processes depending on the configuration of the printing system.

[Description of Outputting of Characteristic Parameter Acquisition Chart According to Sixth Embodiment]

<Configuration of Image Processing Device>

Figure 47:
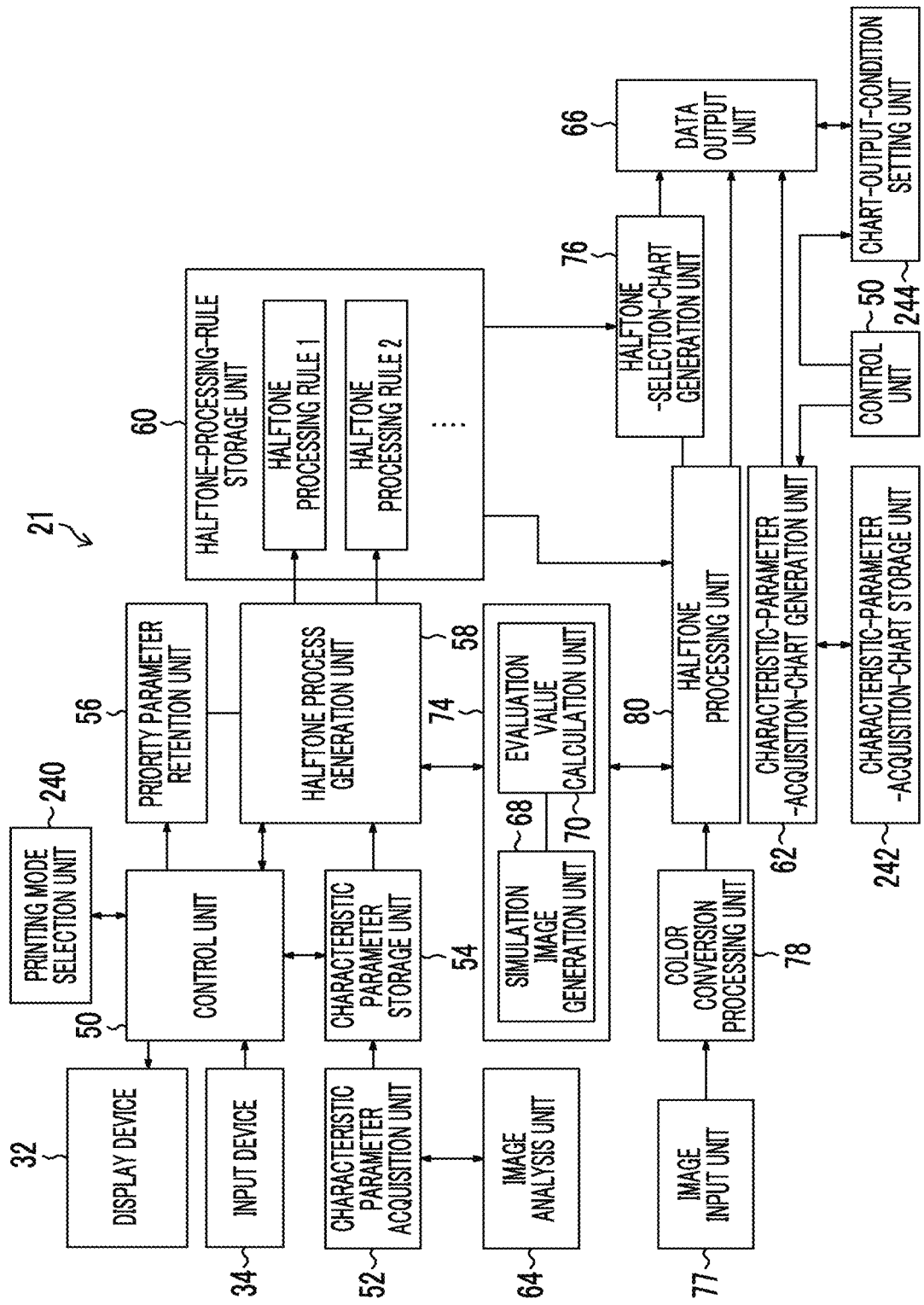
FIG. 47 is a block diagram showing the configuration of an image processing device applied to a printing system according to a sixth embodiment.

FIG. 47 is a block diagram showing the configuration of an image processing device applied to a printing system according to a sixth embodiment. For the sake of convenience in the illustration, in FIG. 47, control units 50 are shown in two places. The functions and structures of the control units 50 in two places shown in FIG. 47 are not limited. In the acquisition of the characteristic parameter according to the sixth embodiment, a new characteristic parameter is acquired by generating the characteristic parameter acquisition chart based on the characteristic parameter related to the system specification retained in a characteristic parameter storage unit 54, outputting the characteristic parameter acquisition chart, reading the characteristic parameter acquisition chart and analyzing the read image of the characteristic parameter acquisition chart.

The characteristic parameters related to the system specifications are determined based on the system specification. In other words, this characteristic parameter is a characteristic parameter acquired without using the characteristic parameter acquisition chart.

As an example of the characteristic parameter related to the system specification, there are a droplet kind, unidirectional scanning, or bidirectional scanning in addition to the resolution, the number of nozzles (number of used nozzles) and the ink kind which are already described.

In the present embodiment, the characteristic parameters related to the system specifications are described as system specification parameters.

Among the characteristic parameters, the characteristic parameter other than the system specification parameter is a characteristic parameter acquired using the characteristic parameter acquisition chart.

As an example of the characteristic parameter other than the system specification parameter, there are a dot density, a dot diameter, a dot shape, a dot forming position shift, and non-jetting of each printing element. As another example of the characteristic parameter other than the system specification parameter, an average dot density, an average dot diameter and an average dot shape of the plurality of printing elements. As another example of the characteristic parameter other than the system specification parameter, a dot forming position shift for each droplet kind, a bidirectional printing position shift, a head vibration error, a transport error of the printing medium, a head module vibration error in a head formed using a plurality of head modules, and landing interference.

Here, the characteristic parameter acquisition chart corresponding to the acquired system specification parameter may be selected from the characteristic parameter acquisition charts stored in a characteristic-parameter-acquisition-chart storage unit 242 instead of generating the characteristic parameter acquisition chart.

The characteristic parameter storage unit 54 corresponds to characteristic parameter storage means. A characteristic-parameter-acquisition-chart generation unit 62 corresponds to characteristic-parameter-acquisition-chart generation means. The configuration in which the characteristic parameter acquisition chart is selected instead of generating the characteristic parameter acquisition chart using the characteristic-parameter-acquisition-chart generation unit 62 corresponds to characteristic-parameter-acquisition-chart selection means. The characteristic-parameter-acquisition-chart storage unit 242 corresponds to characteristic-parameter-acquisition-chart storage means.

In the following embodiment, an aspect in which the characteristic parameter acquisition chart is generated or selected according to the selection of a printing mode will be described.

An image processing device 21 shown in FIG. 47 is configured such that a printing mode selection unit 240, the characteristic-parameter-acquisition-chart storage unit 242, and a chart-output-condition setting unit 244 are added to the image processing device 20 shown in FIG. 3.

The printing mode selection unit 240 selects a printing mode in the printing executed by a data output unit 66 and the printing device 24 shown in FIG. 1. As a selection example of the printing mode, there are an aspect in which an operator selects the printing mode through the input device 34 shown in FIG. 3, and an aspect in which the printing mode is automatically selected from information such as the kind of printing medium or input image data.

If the printing mode is selected, the system specification parameter corresponding to the selected printing mode is read and acquired from the system specification parameters stored in the characteristic parameter storage unit 54. The characteristic-parameter-acquisition-chart generation unit 62 generates the characteristic parameter acquisition chart based on the acquired system specification parameter.

If the characteristic parameter acquisition chart is generated, a chart output condition for the printing mode selected by the chart-output-condition setting unit 244 is set, and the characteristic parameter acquisition chart is output by the data output unit 66 and the printing device 24 shown in FIG. 1.

Instead of generating the characteristic parameter acquisition chart, the characteristic parameter acquisition chart corresponding to the acquired system specification parameter may be selected from the characteristic parameter acquisition charts previously stored in the characteristic-parameter-acquisition-chart storage unit 242.

<Specification Example of Generation and Selection of Characteristic Parameter Acquisition Chart>

Hereinafter, a specific example of the selection of the characteristic parameter acquisition chart will be described. Unit charts each including the single dot pattern and the continuous dot pattern are generated by the characteristic-parameter-acquisition-chart generation unit 62 shown in FIG. 47. The unit chart is a unit chart constituting the characteristic parameter acquisition chart, and is a necessity minimum chart. As an example of the single dot pattern in the serial scan type, there are the single dot patterns 102C, 102M, 102Y and 102K shown in FIG. 5. As an example of the single dot pattern in the single path type, the single dot patterns 202C, 202M, 202Y and 202K shown in FIG. 21.

As an example of the continuous dot pattern in the serial scan type, there are the first continuous dot patterns 104C, 104M, 104Y and 104K and the second continuous dot patterns 106C, 106M, 106Y and 106K shown in FIG. 5. As an example of the continuous dot pattern in the single path type, there are the first continuous dot patterns 204C, 204M, 204Y and 204K and the second continuous dot patterns 206C, 206M, 206Y and 206K shown in FIG. 21.

If the printing mode is selected by the printing mode selection unit 240 shown in FIG. 47, the characteristic parameter acquisition chart appropriate for the system specification parameter corresponding to the printing mode is generated by generating the unit charts by the characteristic-parameter-acquisition-chart generation unit 62 and arranging the unit charts generated based on the system specification parameter corresponding to the selected printing mode.

The generated characteristic parameter acquisition chart is stored in the characteristic-parameter-acquisition-chart storage unit 242 by using the printing mode or the system specification parameter as an index. When the printing mode is selected, in a case where there is the characteristic parameter acquisition chart capable of being applied to the selected printing mode or the characteristic parameter acquisition chart capable of being applied to the system specification parameter corresponding to the selected printing mode, the characteristic parameter acquisition chart capable of being applied to the selected printing mode or the characteristic parameter acquisition chart capable of being applied to the system specification parameter corresponding to the printing mode is selected instead of generating the characteristic parameter acquisition chart described above.

<Specific Example of Printing Mode and System Specification Parameter Corresponding to Printing Mode>

(1) In a case where a high-quality mode is selected, the ink kinds used in the high-quality mode are cyan, magenta, yellow, black, light cyan and light magenta, the used droplet kind is only the small droplet, and the scanning direction is the unidirectional scanning, a chart is generated by arranging the unit charts of the small droplet of the cyan ink, the small droplet of the magenta ink, the small droplet of the yellow ink, the small droplet of the black ink, the small droplet of the light cyan ink and the small droplet of the light magenta ink are generated only in the outward scanning direction. A continuous dot pattern acquired by combining the small droplet of the cyan ink, the small droplet of the magenta ink, the small droplet of the yellow ink, the small droplet of the black ink, the small droplet of the light cyan ink and the small droplet of the light magenta ink may be generated.

In a case where the characteristic parameter acquisition chart in a case where the ink kinds in the high-quality mode are cyan, magenta, yellow, black, light cyan and light magenta, the droplet kind is only the small droplet and the scanning direction is the unidirectional scanning is stored in the characteristic-parameter-acquisition-chart storage unit 242, the characteristic parameter acquisition chart in a case where the ink kinds in the high-quality mode are cyan, magenta, yellow, black, light cyan and light magenta, the droplet kind is only the small droplet and the unidirectional scanning is used is selected.

(2) In a case where a standard-quality mode is selected, the ink kinds used in the standard-quality mode are cyan, magenta, yellow and black, the used droplet kinds are the small droplet, the medium droplet and the large droplet and the scanning direction is the bidirectional scanning, the unit charts for the small droplets, the medium droplets and the large droplets of the respective color inks of cyan, magenta, yellow and black are generated, and the characteristic parameter acquisition chart acquired by arranging the generated unit charts in the outward scanning direction and the inward scanning direction is generated. A continuous dot pattern acquired by combining the small droplets, the medium droplets and the large droplets of the respective color inks of cyan, magenta, yellow and black may be generated.

In a case where the characteristic parameter acquisition chart in a case where the ink kinds in the standard-quality mode are cyan, magenta, yellow and black, the used droplet kinds are the small droplet, the medium droplet and the large droplet and the scanning direction is the bidirectional scanning is stored in the characteristic-parameter-acquisition-chart storage unit 242, the characteristic parameter acquisition chart in a case where the ink kinds in the standard-quality mode are cyan, magenta, yellow and black, the used droplet kinds are the small droplet, the medium droplet and the large droplet and the scanning direction is the bidirectional scanning is selected.

(3) In a case where a monochrome mode is selected, the ink kind used in the monochrome mode is only black, the used droplet kinds are the small droplet, the medium droplet and the large droplet and the scanning direction is the bidirectional scanning, the characteristic parameter acquisition chart acquired by generating the unit charts of the small droplet, the medium droplet and the large droplet of the black ink and arranging the generated unit charts in the outward scanning direction and the inward scanning direction is generated. A continuous dot pattern acquired by combining the small droplet, the medium droplet and the large droplet of the black ink may be generated.

In a case where the characteristic parameter acquisition chart in a case where the ink kind in the monochrome mode is black, the used droplet kinds are the small droplet, the medium droplet and the large droplet and the scanning direction is the bidirectional scanning is stored in the characteristic-parameter-acquisition-chart storage unit 242, the characteristic parameter acquisition chart in a case where the ink kind in the monochrome mode is black, the used droplet kinds are the small droplet, the medium droplet and the large droplet and the scanning direction is the bidirectional scanning is selected.

In a case where the nozzles used by the printing mode are different, the contents of the unit charts are different for the respective printing modes. When the characteristic parameter acquisition chart is output, the chart-output-condition setting unit 244 sets a scanning speed, a paper transport amount and a jetting frequency corresponding to the selected printing mode, as the chart output condition. The scanning speed is a speed of the recording head when the recording head scans in the main scanning direction. The transport amount of the printing medium is a distance at which the printing medium is moved while transport in the sub scanning direction is performed once, and is a value by representing an inverse number of a substantial resolution in the sub scanning direction as a unit.

<Relationship Between Generation and Selection of Characteristic Parameter Acquisition Chart>

In a case where the storage capacity of the characteristic-parameter-acquisition-chart storage unit 242 shown in FIG. 47 is sufficient, the charts corresponding to the system specification parameters may be previously generated and stored for the respective printing modes.

Meanwhile, in a case where the storage capacity of the characteristic-parameter-acquisition-chart storage unit 242 shown in FIG. 47 is insufficient, in a case where there is a heavy cost burden for what the characteristic-parameter-acquisition-chart storage unit 242 has the sufficient storage capacity, and in a case where a period of time when the characteristic parameter acquisition chart is generated is a short period of time, the characteristic parameter acquisition chart may be generated.

The characteristic parameter acquisition chart may be previously generated and stored for the frequently selected printing mode, and the characteristic parameter acquisition chart may be generated sometimes for the infrequently selected printing mode.

For example, in a printing mode selected when the printing is arbitrarily executed, the characteristic parameter acquisition chart for the selected printing mode may be generated, and the generated characteristic parameter acquisition chart may be stored in the characteristic-parameter-acquisition-chart storage unit 242 shown in FIG. 47 for a predetermined period of time. In a case where the same printing mode is reselected for a predetermined period of time, the characteristic parameter acquisition chart for the printing mode which is stored in the characteristic-parameter-acquisition-chart storage unit 242 is selected, and the characteristic parameter acquisition chart for the printing mode is stored for a predetermined period of time from a point of time when the printing mode is reselected. After the predetermined period of time elapses, the characteristic parameter acquisition chart is deleted. After the characteristic parameter acquisition chart is deleted, the characteristic parameter acquisition chart is newly generated when the printing mode is subsequently set, and is stored for a predetermined period of time. As mentioned above, a period of time during which the characteristic parameter acquisition chart is stored may be determined, and the generation and selection of the characteristic parameter acquisition chart may be switched depending on the period of time during which the characteristic parameter acquisition chart is stored.

[Description of Acquisition of Characteristic Parameter According to Seventh Embodiment]

Hereinafter, the acquisition of a characteristic parameter according to a seventh embodiment will be described.

<Entire Configuration>

Figure 48:
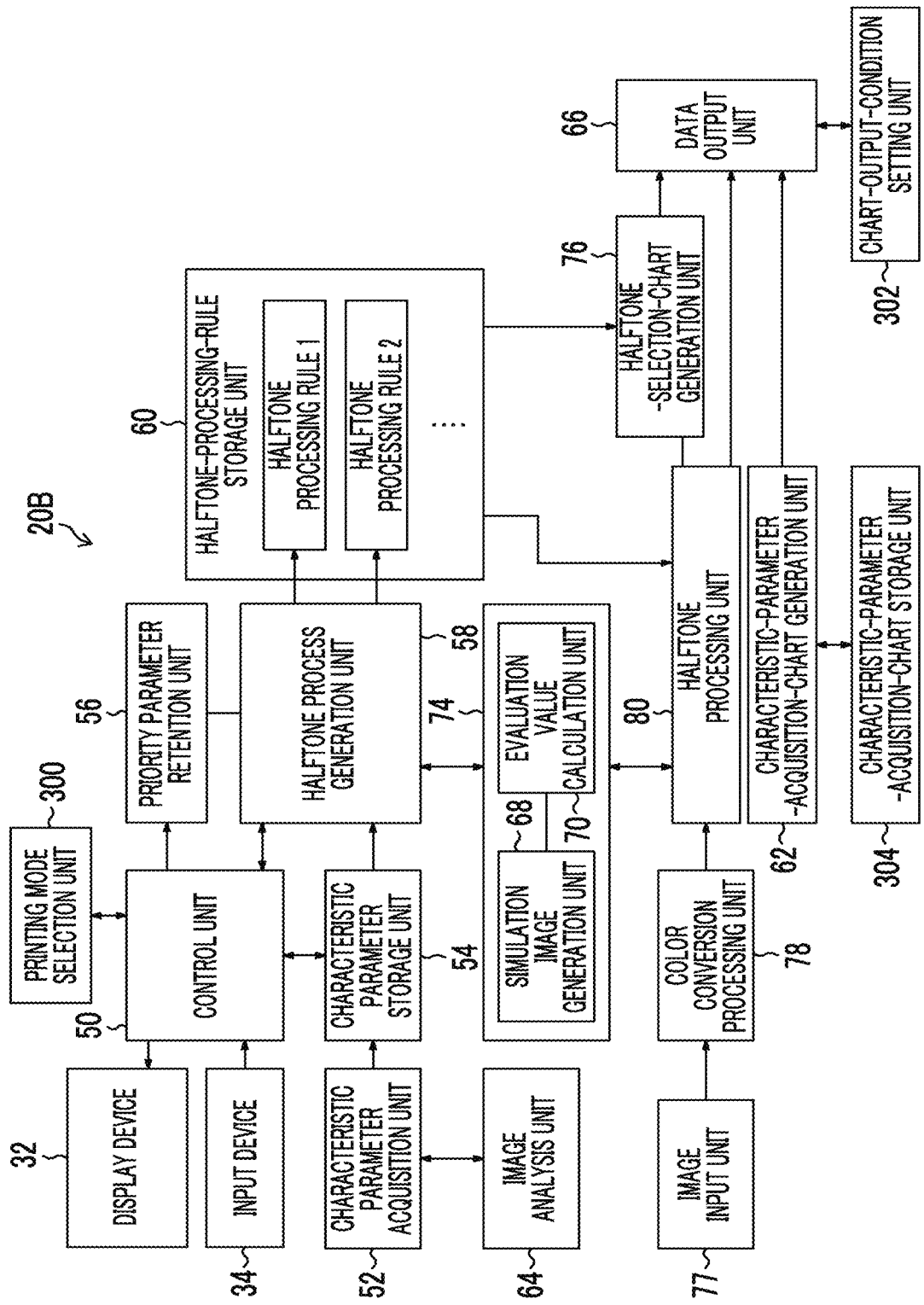
FIG. 48 is a block diagram showing the configuration of an image processing device applied to a printing system according to a seventh embodiment.

FIG. 48 is a block diagram showing the configuration of an image processing device applied to a printing system according to the seventh embodiment. In FIG. 48, the same configurations as those of FIG. 3 will be assigned the same reference numerals, and the description thereof will be appropriately omitted.

An image processing device 20B shown in FIG. 48 is configured such that a printing mode selection unit 300, a chart-output-condition setting unit 302, and a characteristic-parameter-acquisition-chart storage unit 304 are added to the image processing device 20 shown in FIG. 3.

The printing mode selection unit 300 selects the printing mode in the printing executed by the data output unit 66 and the printing device 24 shown in FIG. 1. As a selection example of the printing mode, there are an aspect in which the printing mode manually input by the operator through the input device 34 shown in FIG. 3 is selected, and an aspect in which the printing mode is automatically selected from information such as the kind of printing medium or input image data. The printing mode selection unit 300 corresponds to printing mode selection means.

The chart-output-condition setting unit 302 shown in FIG. 48 sets a chart output condition of the selected printing mode. The chart output condition includes at least one of a chart item related to the content of the characteristic parameter acquisition chart or a scanning condition related to the operations of the data output unit 66 and the printing device 24 shown in FIG. 1. The details of the relationship between the printing mode and the chart item and the relationship between the printing mode and the scanning condition will be described below. The chart-output-condition setting unit 302 corresponds to chart-output-condition setting means.

A characteristic-parameter-acquisition-chart generation unit 62 shown in FIG. 48 generates the characteristic parameter acquisition chart based on the chart item set depending on the selected printing mode. The characteristic parameter acquisition chart generated by the characteristic-parameter-acquisition-chart generation unit 62 is stored in the characteristic-parameter-acquisition-chart storage unit 304. When the characteristic parameter acquisition chart is output, the characteristic parameter acquisition chart corresponding to the set chart output condition may be selectively read from the characteristic-parameter-acquisition-chart storage unit 304.

That is, in the acquisition of the characteristic parameter according to the seventh embodiment, the chart output condition when the characteristic parameter acquisition chart is acquired depending on the printing mode is set. As the chart output condition, at least any one of the chart item related to the content of the characteristic parameter acquisition chart or a scanning condition related to the operation of the printing device 24 which functions as a part of a characteristic-parameter-acquisition-chart output means and is shown in FIG. 1 is set.

<Description of Printing Mode>

FIG. 49 is an explanatory diagram of the printing mode. In the present embodiment, an example in which the printing device 24 shown in FIG. 1 is an ink jet recording device including serial scan type recording heads will be described. The serial scan type recording heads are assigned the reference numerals 112C, 112M, 112Y and 112K in FIG. 6.

The recording head applied to the present embodiment has a structure in which 50 nozzles are arranged with an arrangement density of 150 nozzles per inch. The nozzles are assigned the reference numerals 118C, 118M, 118Y and 118K in FIG. 6. However, the number of nozzles and the nozzle density described above are examples, and the printing system according to the present embodiment is not limited thereto.

As shown in FIG. 49, the printing system according to the present embodiment may select 7 kinds of printing modes. If the printing mode is selected, the chart output condition is set. In FIG. 49, as an example of the chart output condition, the ink kind, the resolution, the droplet kind, the number of paths in the main scanning direction, the scanning speed, the frequency, the unidirectional scanning or the bidirectional scanning, the nozzle, and the transport amount are illustrated. As the names of a horizontal series of items shown in FIG. 49, abbreviation terms are used. For example, uni/bi shown in FIG. 49 represents the unidirectional scanning or the bidirectional scanning. The chart output condition is not limited to the condition shown in FIG. 49, and may be added, deleted and changed depending on the specification of the printing system.

The ink kind as the chart output condition shown in FIG. 49 represents the kind of ink used in each printing mode. C represents the cyan ink, Lc represents the light cyan ink, M represents the magenta ink, Lm represents the light magenta ink, Y represents the yellow ink, and K represents the black ink. The ink is one aspect of a liquid.

In Printing Mode A, only the black ink is used. In Printing Mode B, Printing Mode C and Printing Mode D, 4 kinds of inks such as the cyan ink, the magenta ink, the yellow ink and the black ink are used. In Printing Mode E, Printing Mode F and Printing Mode G, 6 kinds of inks such as the cyan ink, the light cyan ink, the magenta ink, the light magenta ink, the yellow ink and the black ink are used.

If Printing Mode A is selected, the characteristic parameter acquisition chart is output using only the black ink. If Printing Mode B, Printing Mode C and Printing Mode D are selected, the characteristic parameter acquisition chart is output using 4 kinds of inks such as the cyan ink, the magenta ink, the yellow ink and the black ink. If Printing Mode E, Printing Mode F and Printing Mode G are selected, the characteristic parameter acquisition chart is output using 6 kinds of inks such as the cyan ink, the light cyan ink, the magenta ink, the light magenta ink, the yellow ink and the black ink.

In a case where the ink kind shown in FIG. 49 is limited by the printing mode, it is possible to output the characteristic parameter acquisition chart by using the used ink, and it is possible to appropriately acquire the characteristic parameter for each used ink kind.

Since the characteristic parameter acquisition chart can be output without using the unused ink kind, in a case where the content of the characteristic parameter acquisition chart is reduced, it is possible to reduce the usage amount of ink in the outputting of the characteristic parameter acquisition chart, it is possible to reduce the usage amount of printing medium, and it is possible to reduce the processing time until the characteristic parameter is acquired after the characteristic parameter acquisition chart is output.

The resolution as the chart output condition shown in FIG. 49 represents printing resolution. In Printing Mode A and Printing Mode B, low resolution is applied. As an example of the low resolution, there is an aspect in which the resolution in the main scanning direction is 150 dots per inch and the resolution in the sub scanning direction is 150 dots per inch.

In Printing Mode C and Printing Mode E, medium resolution is applied. As an example of the medium resolution, there is an aspect in which the resolution in the main scanning direction is 300 dots per inch and the resolution in the sub scanning direction is 300 dots per inch.

In Printing Mode D and Printing Mode F, high resolution is applied. As an example of the high resolution, there is an aspect in which the resolution in the main scanning direction is 600 dots per inch and the resolution in the sub scanning direction is 600 dots per inch.

In Printing Mode G, super-high resolution is applied. As an example of the super-high resolution, there is an aspect in which the resolution in the main scanning direction is 1200 dots per inch and the resolution in the sub scanning direction is 1200 dots per inch.

In a case where the resolution shown in FIG. 49 is determined by the printing mode, it is possible to output the characteristic parameter acquisition chart by using the determined resolution, and it is possible to appropriately acquire the characteristic parameter for the determined resolution.

Since the characteristic parameter acquisition chart can be output without using the unused ink kind, in a case where the content of the characteristic parameter acquisition chart is reduced, it is possible to reduce the usage amount of ink in the outputting of the characteristic parameter acquisition chart, it is possible to reduce the usage amount of printing medium, and it is possible to reduce the processing time until the characteristic parameter is acquired from the outputting of the characteristic parameter acquisition chart.

The droplet kind as the chart output condition shown in FIG. 49 represents the kind of liquid droplet classified by a volume ratio. In the printing system shown in the present embodiment, 5 kinds of liquid droplets such as extra-large, large, medium, small and extra-small are used. As an example of the droplet kind, there is an example in which a volume ratio of the extra-small droplet kind is 1, a volume ratio of the small droplet kind is 2, a volume ratio of the medium droplet kind is 4, a volume ratio of the large droplet kind is 8 and a volume ratio of the extra-large kind is 16.

The droplet kind is determined by the resolution in most cases. In Printing Mode A and Printing Mode B to which the low resolution is applied, 3 kinds of droplet kinds of medium, large and extra large are used. In Printing Mode C and Printing Mode E to which the medium resolution is applied, 3 kinds of droplet kinds of small, medium and large are used. In Printing Mode D and Printing Mode F to which the high resolution is applied, 3 kinds of droplet kinds of extra-small, small and medium are used. In Printing Mode G to which the super-high resolution is applied, one kind of droplet kind of extra-small is used. In FIG. 49, extra-large represents the extra-large droplet kind, and extra-small represents the extra-small droplet kind.

If Printing Mode A and Printing Mode B are selected, the characteristic parameter acquisition chart is output using 3 kinds of droplet kinds of medium, large and extra-large. If Printing Mode C and Printing Mode E are selected, the characteristic parameter acquisition chart is output using 3 kinds of droplet kinds of small, medium and large. If Printing Mode D and Printing Mode F are selected, the characteristic parameter acquisition chart is output using 3 kinds of droplet kinds of extra-small, small and medium. If Printing Mode G is selected, the characteristic parameter acquisition chart is output using one kind of droplet kind of extra-small.

In a case where the droplet kind shown in FIG. 49 is different by the printing mode, it is possible to output the characteristic parameter acquisition chart by using the used droplet kind, and it is possible to appropriately acquire the characteristic parameter for the used droplet kind.

Since the characteristic parameter acquisition chart can be output without using the unused ink kind, in a case where the content of the characteristic parameter acquisition chart is reduced, it is possible to reduce the usage amount of ink in the outputting of the characteristic parameter acquisition chart, it is possible to reduce the usage amount of printing medium, and it is possible to reduce the processing time until the characteristic parameter is acquired from the outputting of the characteristic parameter acquisition chart.

The number of paths as the chart output condition shown in FIG. 49 represents the number of paths which is the number of times the recording head is moved in the main scanning direction which is required to arrange as much dots as one raster in the main scanning direction. The one raster in the main scanning direction is referred to as one line in the main scanning direction in some cases. In a case where the number of paths is 2, as much of the dots as one raster are arranged by performing the scanning in the main scanning direction twice. The error of the landing position for each nozzle or the transport error of the printing medium is diffused as the number of paths is increased, and thus, the high image quality is achieved.

As an example of the number of paths, the number of paths is 1 in Printing Mode A and Printing Mode B to which the low resolution is applied, and the number of paths is 2 in Printing Mode C and Printing Mode E to which the medium resolution is applied. In Printing Mode D and Printing Mode F to which the high resolution is applied, the number of paths is 2. In Printing Mode G to which the super-high resolution is applied, the number of paths is 4.

If Printing Mode A and Printing Mode B are selected, the characteristic parameter acquisition chart is output by setting the number of paths to be 1. If Printing Mode C, Printing Mode D, Printing Mode E and Printing Mode F are selected, the characteristic parameter acquisition chart is output by setting the number of paths to be 2. If Printing Mode G is selected, the characteristic parameter acquisition chart is output by setting the number of paths to be 4.

In a case where the number of paths shown in FIG. 49 is determined by the printing mode, it is possible to output the characteristic parameter acquisition chart by using the determined number of paths, and it is possible to appropriately acquire the characteristic parameter for the determined number of paths.

Since the characteristic parameter acquisition chart can be output without using the unused ink kind, in a case where the content of the characteristic parameter acquisition chart is reduced, it is possible to reduce the usage amount of ink in the outputting of the characteristic parameter acquisition chart, it is possible to reduce the usage amount of printing medium, and it is possible to reduce the processing time until the characteristic parameter is acquired from the outputting of the characteristic parameter acquisition chart.

The scanning speed as the chart output condition shown in FIG. 49 represents a scanning speed of the recording head in the main scanning direction. The scanning speed shown in FIG. 49 represents a relative scanning speed ratio using a scanning speed in Printing Mode A and Printing Mode B to which the low resolution is applied as a standard scanning speed. In FIG. 49, the standard scanning speed is represented as 1.

In Printing Mode C and Printing Mode E to which the medium resolution is applied, a scanning speed of 1, that is, the standard scanning speed is applied. In Printing Mode D and Printing Mode F to which the high resolution is applied, a scanning speed of 2, that is, a scanning speed which is twice as high as the standard scanning speed is applied. In Printing Mode G to which the super-high resolution is applied, a scanning speed of 4, that is, a scanning speed which is four times as high as the standard scanning speed is applied.

If Printing Mode A, Printing Mode B, Printing Mode C and Printing Mode E are selected, the characteristic parameter acquisition chart is output at the standard scanning speed. If Printing Mode D and Printing Mode F are selected, the characteristic parameter acquisition chart is output at a scanning speed which is twice as high as the standard scanning speed. If Printing Mode G is selected, the characteristic parameter acquisition chart is output at a scanning speed which is four times as high as the standard scanning speed.

The dot density, the dot diameter, the dot shape and the dot forming position shift for each printing element, the position shift for each droplet kind, the landing interference, the bidirectional scanning position shift of scanning in the serial scanning, and a bidirectional printing position shift of scanning for each droplet kind, and the head vibration error according to the carriage movement, which are acquired as the characteristic parameters, are influenced by the scanning speed.

In a case where the scanning speed shown in FIG. 49 is determined by the printing mode, it is possible to output the characteristic parameter acquisition chart by using the determined scanning speed, and it is possible to appropriately acquire the characteristic parameter for the determined scanning speed.

Since the characteristic parameter acquisition chart can be output without using the unused ink kind, in a case where the content of the characteristic parameter acquisition chart is reduced, it is possible to reduce the usage amount of ink in the outputting of the characteristic parameter acquisition chart, it is possible to reduce the usage amount of printing medium, and it is possible to reduce the processing time until the characteristic parameter is acquired from the outputting of the characteristic parameter acquisition chart.

The frequency as the chart output condition shown in FIG. 49 represents a jetting frequency of the recording head. The jetting frequency is determined by the resolution in the main scanning direction in most cases, the number of paths in the main scanning direction, and the scanning speed in the main scanning direction. The frequency shown in FIG. 49 represents a relative jetting frequency ratio using a jetting frequency in Printing Mode A and Printing Mode B to which the low resolution is applied.

As a jetting frequency in Printing Mode C and Printing Mode E to which the medium resolution is applied, a standard jetting frequency is applied. As a jetting frequency in Printing Mode D and Printing Mode F to which the high resolution is applied, a jetting frequency which is four times as high as the standard jetting frequency is applied. As a jetting frequency in Printing Mode G to which the super-high resolution is applied, a jetting frequency which is eight times as high as the standard jetting frequency is applied.

It is assumed that the printing resolution in the main scanning direction in Printing Mode C and Printing Mode E is 300 dots per inch. Since the number of paths in Printing Mode C and Printing Mode E is 2, as much dots as one raster may be arranged in the main scanning direction with a printing resolution of 150 dots per inch by performing the scanning of the recording head in the main scanning direction once.

Since the scanning speed in Printing Mode C and Printing Mode E is the standard speed, the standard jetting frequency is applied in Printing Mode C and Printing Mode E, similarly to Printing Mode A and Printing Mode B in which as much dots as one raster are arranged in the main scanning direction with the printing resolution of 150 dots per inch in the main scanning direction at the standard scanning speed.

It is assumed that the printing resolution in the main scanning direction in Printing Mode D and Printing Mode F to which the high resolution is applied is 600 dots per inch. Since the number of paths in Printing Mode D and Printing Mode F is 2, as much dots as one raster may be arranged in the main scanning direction with a printing resolution of 300 dots per inch, that is, with a printing resolution which is twice as high as that in Printing Mode A and Printing Mode B by performing the scanning of the recording head in the main scanning direction once.

Since the scanning speed in Printing Mode D and Printing Mode F is twice as high as the standard scanning speed, a jetting frequency which is four times as high as the standard jetting frequency applied to Printing A and Printing B in which the dots are arranged in the main scanning direction with the printing resolution of 150 dots per inch at the standard scanning speed is applied to a jetting frequency in Printing Mode D and Printing Mode F.

It is assumed that the printing resolution in the main scanning direction in Printing Mode G to which the super-high resolution is applied is 1200 dots per inch. Since the number of paths in Printing Mode G is 4, as much dots as one raster may be arranged in the main scanning direction with a printing resolution of 300 dots per inch, that is, with a printing resolution which is twice as high as that of Printing Mode A and Printing Mode B by performing the scanning of the recording head in the main scanning direction once.

Since the scanning speed in Printing Mode G is four times as high as the standard scanning speed, a jetting frequency which is eight times as high as the standard jetting frequency applied to Printing Mode A and Printing B in which the dots are arranged in the main scanning direction with the printing resolution of 150 dots per inch at the standard scanning speed is applied to a jetting frequency in Printing Mode G.

If Printing Mode A, Printing Mode B, Printing Mode C and Printing Mode E are selected, the characteristic parameter acquisition chart is output at the standard jetting frequency. If Printing Mode D and Printing Mode F are selected, the characteristic parameter acquisition chart is output at a jetting frequency which is four times as high as the standard jetting frequency. If Printing Mode G is selected, the characteristic parameter acquisition chart is output at a jetting frequency which is eight times as high as the standard jetting frequency.

If the jetting frequency is different, the characteristic parameters such as the dot density, the dot diameter, the dot shape and the dot forming position shift for each printing element, and the position shift for each droplet kind are influenced.

In a case where the frequency shown in FIG. 49 is determined by the printing mode, it is possible to output the characteristic parameter acquisition chart by using the determined jetting frequency, and it is possible to appropriately acquire the characteristic parameter for the determined jetting frequency.

Since the characteristic parameter acquisition chart can be output without using the unused ink kind, in a case where the content of the characteristic parameter acquisition chart is reduced, it is possible to reduce the usage amount of ink in the outputting of the characteristic parameter acquisition chart, it is possible to reduce the usage amount of printing medium, and it is possible to reduce the processing time until the characteristic parameter is acquired from the outputting of the characteristic parameter acquisition chart.

The unidirectional scanning or the bidirectional scanning as the chart output condition shown in FIG. 49 represents whether or not to perform the printing for only a period of time during which the recording head scans in one direction of the main scanning direction, and whether or not to perform the printing for both a period of time during which the recording head scans in the one direction of the main scanning direction and a period of time during which the recording head scans in the other direction of the main scanning direction.

In FIG. 49, uni represents the unidirectional scanning, and bi represents the bidirectional scanning. In the unidirectional scanning, a printing speed is slower than that in the bidirectional scanning, but since the position shift caused by the bidirectional scanning, which may occur when the bidirectional scanning is performed, does not occur, it is possible to perform the printing with high quality. In the present embodiment, the unidirectional scanning is applied to Printing Mode G to which the super-high resolution is applied, and the bidirectional scanning is applied to Printing Mode A to Printing Mode F. The printing speed mentioned herein is an index indicating a printing time per unit sheet of the printing medium.

If Printing Mode A to Printing Mode F are selected, the characteristic parameter acquisition chart is output both in the outward path and the inward path through the bidirectional scanning. If Printing Mode G is selected, the characteristic parameter acquisition chart is output in only the outward path through the unidirectional scanning.

In a case where the scanning type indicating whether or not to perform the unidirectional scanning or the bidirectional scanning shown in FIG. 49 is determined by the printing mode, it is possible to output the characteristic parameter acquisition chart by using the determined scanning type, and it is possible to appropriately acquire the characteristic parameter for the determined scanning type.

Since the characteristic parameter acquisition chart can be output without using the unused ink kind, in a case where the content of the characteristic parameter acquisition chart is reduced, it is possible to reduce the usage amount of ink in the outputting of the characteristic parameter acquisition chart, it is possible to reduce the usage amount of printing medium, and it is possible to reduce the processing time until the characteristic parameter is acquired from the outputting of the characteristic parameter acquisition chart.

The nozzle as the chart output condition shown in FIG. 49 represents a usage nozzle range. As an aspect of the usage nozzle range, there is the number of nozzle to be used. The usage nozzle range is determined by the number of paths in most cases, and a pitch between nozzles. In the present embodiment, some of the nozzles are used in Printing Mode G to which the super resolution is applied, and all the nozzles are used in Printing Mode A to Printing Mode F.

As an example of the number of nozzles of some of the nozzles applied to Printing Mode G, the number of nozzles of some of the nozzles is 44 in a case where the number of nozzles provided at the recording head is 50.

If Printing Mode A to Printing Mode F are selected, the characteristic parameter acquisition chart is output using all the nozzles. If Printing Mode G is selected, the characteristic parameter acquisition chart is output using some of the nozzles.

In a case where the nozzles shown in FIG. 49 is determined by the printing mode, it is possible to output the characteristic parameter acquisition chart by using the determined nozzles, and it is possible to appropriately acquire the characteristic parameter for the determined nozzles.

Since the characteristic parameter acquisition chart can be output without using the unused ink kind, in a case where the content of the characteristic parameter acquisition chart is reduced, it is possible to reduce the usage amount of ink in the outputting of the characteristic parameter acquisition chart, it is possible to reduce the usage amount of printing medium, and it is possible to reduce the processing time until the characteristic parameter is acquired from the outputting of the characteristic parameter acquisition chart.

The transport amount as the chart output condition shown in FIG. 49 represents the transport amount of the printing medium which is a distance at which the printing medium is moved by transporting the printing medium in the sub scanning direction once. The transport amount is determined by the resolution in the sub scanning direction in most cases, the pitch between the nozzles in the sub scanning direction, the number of nozzles and the number of paths in the main scanning direction. In the present embodiment, the distance at which the printing medium is moved by transporting the printing medium in the sub scanning direction once is represented as a multiple of a unit movement amount using an inverse number of a substantial resolution in the sub scanning direction as the unit movement amount. The substantial resolution in the sub scanning direction is calculated by dividing the pitch between the nozzles by the number of paths in the sub scanning direction.

As for the resolution in the sub scanning direction in each printing mode, the low resolution is applied to Printing Mode A and Printing Mode B, and the medium resolution is applied to Printing Mode C and Printing Mode E. The high resolution is applied to Printing Mode D and Printing Mode F, and the super-high resolution is applied to Printing Mode G.

As an example of the resolution in the sub scanning direction, there is an aspect in which the low resolution is 150 dots per inch, the medium resolution is 300 dots per inch, the high resolution is 600 dots per inch, and the super-high resolution is 1200 dots per inch. The low resolution in the main scanning direction and the low resolution in the sub scanning direction may be the same resolution, or may be different resolutions. The medium resolution in the main scanning direction and the medium resolution in the sub scanning direction may be the same resolution, or may be different resolution. The high resolution in the main scanning direction and the high resolution in the sub scanning direction may be the same resolution, or may be different resolution. The super-high resolution in the main scanning direction and the super-high resolution in the sub scanning direction may be the same resolution, or may be different resolution.

As the transport amount shown in FIG. 49, a transport amount which is 50 times as large as the unit movement amount is applied to Printing Mode A and Printing Mode B to which the low resolution in the sub scanning direction is applied, a transport amount which is 25 times as large as the unit movement amount is applied to Printing Mode C and Printing Mode E to which the medium resolution is applied, a transport amount which is 25 times as large as the unit movement amount is also applied to Printing Mode D and Printing Mode F to which the high resolution is applied, and a transport amount which is 11 times as large as the unit movement amount is applied to Printing Mode G to which the super-high resolution is applied.

If Printing Mode A and Printing Mode B are selected, the characteristic parameter acquisition chart is output by applying the transport amount which is 50 times as large as the unit movement amount. If Printing Mode C, Printing Mode D, Printing Mode E and Printing Mode F are selected, the characteristic parameter acquisition chart is output by applying the transport amount which is 25 times as large as the unit movement amount. If Printing Mode G is selected, the characteristic parameter acquisition chart is output by applying the transport amount which is 11 times as large as the unit movement amount.

if the transport amount is different, the characteristic parameter such as the paper transport error is influenced.

In a case where the transport amount shown in FIG. 49 is determined by the printing mode, it is possible to output the characteristic parameter acquisition chart by using the determined transport amount, and it is possible to appropriately acquire the characteristic parameter for the determined transport amount.

Since the characteristic parameter acquisition chart can be output without using the unused ink kind, in a case where the content of the characteristic parameter acquisition chart is reduced, it is possible to reduce the usage amount of ink in the outputting of the characteristic parameter acquisition chart, it is possible to reduce the usage amount of printing medium, and it is possible to reduce the processing time until the characteristic parameter is acquired from the outputting of the characteristic parameter acquisition chart.

Among the setting items shown in FIG. 49, the items of the ink kind, the droplet kind and the nozzle are classified as the chart items related to the contents of the characteristic parameter acquisition chart. The number of paths, the scanning speed, the frequency, the unidirectional scanning or the bidirectional scanning, and the transport amount are classified as the scanning conditions related to the operations of the printing device. The ink kind corresponds to the kind of liquid used to output the characteristic parameter acquisition chart. The droplet kind corresponds to the kind of liquid droplet of the liquid used to output the characteristic parameter acquisition chart. The nozzle corresponds to the printing element used to output the characteristic parameter acquisition chart. The number of paths is an aspect of the scanning type applied to the outputting of the characteristic parameter acquisition chart. The scanning speed corresponds to the scanning speed applied to the outputting of the characteristic parameter acquisition chart. The frequency corresponds to the jetting frequency applied to the outputting of the characteristic parameter acquisition chart. The unidirectional scanning or the bidirectional scanning is an aspect of the scanning type applied to the outputting of the characteristic parameter acquisition chart. The transport amount corresponds to the transport amount of the printing medium applied to the outputting of the characteristic parameter acquisition chart.

Although it has been described in the present embodiment that if the printing mode is selected, both the chart items and the scanning conditions are set, the scanning conditions may be set depending on the selected printing mode in the printing system in which the chart items are fixed. In the printing system in which the scanning conditions are fixed, the chart items may be set depending on the selected printing mode. In other words, at least any one of the chart items or the scanning conditions may be set depending on the selected printing mode so as to correspond to the configuration of the printing system, and the characteristic parameter acquisition chart may be output depending on the setting.

Although the plurality of chart items has been described in the present embodiment that the plurality of chart items is collectively set depending on the selected printing mode, at least any one chart item of the plurality of chart items may be set.

Although the plurality of scanning conditions has been described in the present embodiment that the plurality of scanning conditions is collectively set depending on the selected printing mode, at least any one scanning condition of the plurality of scanning conditions may be set. However, it is preferable that the plurality of scanning conditions is collectively set depending on the selected printing mode.

Printing Mode A shown in FIG. 49 may be applied to a monochrome mode using plain paper as the printing medium. Printing Mode B may be applied to a four-color fast mode using the plain paper as the printing medium. Printing Mode C may be applied to a four-color standard mode using the plain paper as the printing medium. Printing Mode D may be applied to a four-color high-quality mode using the plain paper as the printing medium.

Printing Mode E may be applied to a six-color standard mode using coated paper as the printing medium. Printing Mode F may be applied to a six-color high-quality mode using the coated paper as the printing medium. Printing Mode G may be applied to a six-color super-high-quality mode using the coated paper as the printing medium.

<Description of Method of Acquiring Characteristic Parameter>

Figure 50:
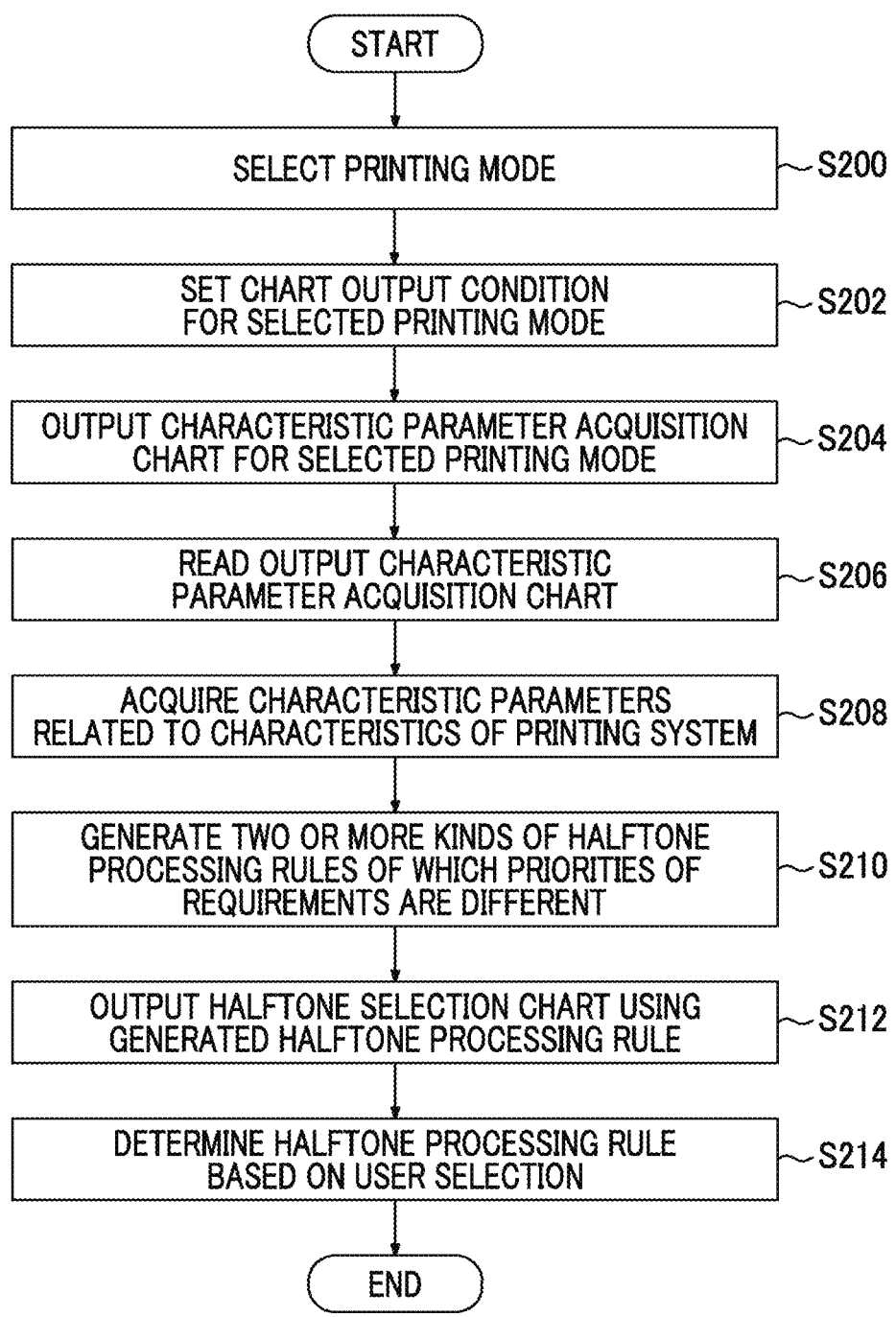
FIG. 50 is a flowchart of a method of acquiring a characteristic parameter according to the seventh embodiment.

FIG. 50 is a flowchart of a method of acquiring the characteristic parameter according to the seventh embodiment. In FIG. 50, the same steps as those of FIG. 4 will be assigned the same reference numerals, and the description thereof will be appropriately omitted.

In a printing mode selection step S200 shown in FIG. 50, the printing mode is selected. The printing mode is selected in a printing mode selection unit 300 shown in FIG. 48.

If the printing mode is selected in the printing mode selection step S200 shown in FIG. 50, the output condition of the characteristic parameter acquisition chart is set in a chart-output-condition setting step S202. The output condition of the characteristic parameter acquisition chart is set by the chart-output-condition setting unit 302 shown in FIG. 48.

If the chart output condition is set in the chart-output-condition setting step S202 shown in FIG. 50, the characteristic parameter acquisition chart is generated or selected and the generated or selected characteristic parameter acquisition chart is output in a chart output step S204.

The characteristic parameter acquisition chart is generated by the characteristic-parameter-acquisition-chart generation unit 62 shown in FIG. 48. The characteristic-parameter-acquisition-chart generation unit 62 of FIG. 48 may select the characteristic parameter acquisition chart stored in the characteristic-parameter-acquisition-chart storage unit 304. The characteristic parameter acquisition chart is output by the data output unit 66 shown in FIG. 48 and the printing device 24 shown in FIG. 1.

If the characteristic parameter acquisition chart is output in the chart output step S204 shown in FIG. 50, the output characteristic parameter acquisition chart is read in an image reading step S206. The image reading step S206 is performed by the image reading device 26 shown in FIG. 1.

If the characteristic parameter acquisition chart is read in the image reading step S206 shown in FIG. 50, the characteristic parameter is acquired by analyzing the read image of the characteristic parameter acquisition chart in a characteristic parameter acquisition step S208.

The characteristic parameter is acquired depending on the printing mode through the printing mode selection step S200, the chart-output-condition setting step S202, the chart output step S204, the image reading step S206 and the characteristic parameter acquisition step S208 shown in FIG. 50.

That is, the printing mode selection step S200, the chart-output-condition setting step S202, the chart output step S204, the image reading step S206 and the characteristic parameter acquisition step S208 shown in FIG. 50 constitute the method of acquiring the characteristic parameter according to the present embodiment.

A halftone-processing-rule generation step S210, a halftone-selection-chart output step S212 and a halftone selection operating step S214 shown in FIG. 50 are the same as the halftone-processing-rule generation step S14, the halftone-selection-chart output step S16 and the halftone selection operating step S18 the shown in FIG. 4, and the description thereof will be omitted.

Figure 51:
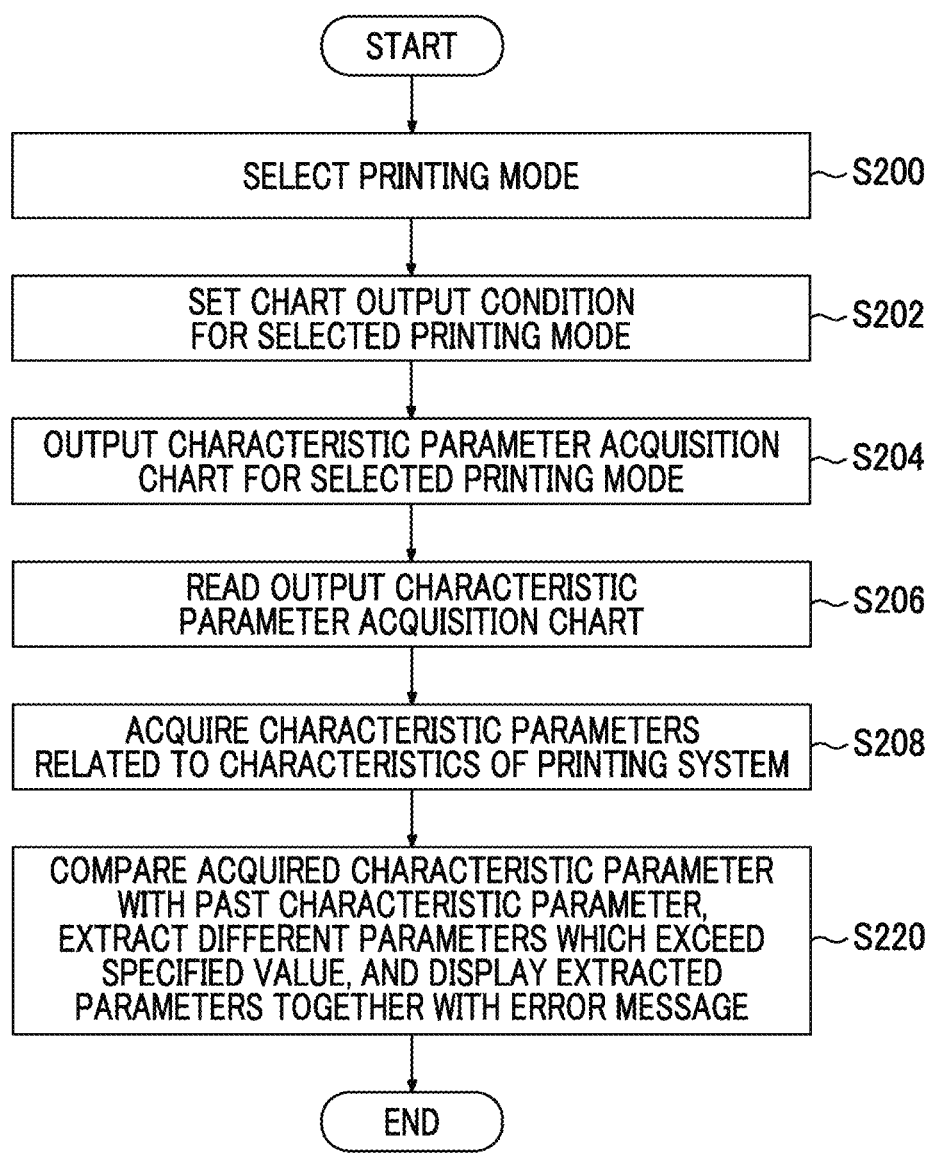
FIG. 51 is a flowchart of a method of acquiring a characteristic parameter according to a modification example of the seventh embodiment.

FIG. 51 is a flowchart of a method of acquiring the characteristic parameter according to a modification example of the seventh embodiment. In FIG. 51, the same steps as those of FIG. 50 will be assigned the same reference numerals, and the description thereof will be appropriately omitted.

In the flowchart shown in FIG. 50, it is not necessary to necessarily generate the halftone processing rule after the characteristic parameter. For example, as shown in FIG. 51, after the characteristic parameter may be acquired, the acquired characteristic parameter may be applied for the error analysis of the printing system.

That is, in the method of acquiring the characteristic parameter shown in FIG. 51, an error message display step S220 is performed after the characteristic parameter acquisition step S208. The error message display step S220 compares the existing characteristic parameter acquired in the past with the new characteristic parameter newly acquired, extracts the characteristic parameter in a case where the characteristic parameter having a difference which exceeds a predetermined specified value is present between the existing characteristic parameter and the new characteristic parameter, displays the extracted characteristic parameter, and displays an error message. An error occurrence determination unit that determines whether or not an error occurs in the image processing device 20B shown in FIG. 48 is provided. The error occurrence determination unit functions as error occurrence determination means.

The error message may be displayed on the display device 32 shown in FIG. 48. The display device 32 shown in FIG. 48 may function as error message display means for displaying the error message.

When the image defect such as unevenness or streak occurs, the user may perform the error analysis according to the flowchart shown in FIG. 51, or the error analysis may be regularly performed irrespective of whether or not the image defect occurs. As an example in which the error analysis is regularly performed, there are a point of time when the print job is started, or a point of time when the printing system is started. The error analysis may be irregularly performed based on the determination of the user.

The specified value may be a constant value, or may be updated when the new characteristic parameter is acquired. The specified value may be determined based on a variation in characteristic parameter calculated according to the acquisition of the characteristic parameter over multiple times. As an example in which the variation is used as the specified value, there is an aspect in which to or ±2a shown in FIG. 31 is used as the specified value. The aspect shown in FIG. 51 may be combined with the aspect shown in FIG. 50.

<Description of Characteristic Parameter>

As an example of the characteristic parameter applied to the printing system according to the present embodiment, there is a dot density, a dot diameter, a dot shape, a dot forming position shift and non-jetting for each printing element, and a position shift for each droplet kind. The specified value of the dot density, the dot diameter or the dot shape of FIG. 40 may be an absolute value, or may be determined as a ratio with respect to the existing dot density, dot diameter and dot shape.

The specified value shown in FIG. 51 may be determined with a range including the plurality of nozzles such as a nozzle array or a plurality of neighboring nozzles as a target.

Since change characteristics are different for each droplet kind, the specified value shown in FIG. 40 may be determined for each droplet kind.

As for the non-jetting, in the error message display step S220 of FIG. 51, the error message may be displayed in a case where the non-jetting occurs in one nozzle, or the error message may be displayed in a case where the non-jetting occurs in the plurality of nozzles that exceeds a predetermined specified value in an arbitrary range.

As the characteristic parameter specific to the serial scanning, there are a bidirectional scanning position shift of scanning, a bidirectional printing position shift of scanning for each droplet kind, a head vibration error according to carriage movement, and a paper transport error. The bidirectional scanning position shift of scanning corresponds to a bidirectional printing position shift. The bidirectional printing position shift of scanning for each droplet kind corresponds to a bidirectional scanning position shift for each droplet kind. The head vibration error according to the carriage movement corresponds to a vibration error of the image forming unit. The paper transport error corresponds to a transport error of the printing medium.

As the specified value in a case where the head vibration error according to the carriage movement is the characteristic parameter, an index indicating a difference between the existing head vibration error according to the carriage movement and the new head vibration error may be applied. As the index indicating the difference between the existing head vibration error according to the carriage movement and the new head vibration error, the summation of the absolute values of the differences between the existing position shift amounts in the main scanning direction and the new position shift amounts in the main scanning direction in the shift amount $\Delta x(n)$ in the main scanning direction with respect to the pixel position n shown in FIG. 25A or the summation of squares of the differences may be applied. The difference between the existing position shift amount in the main scanning direction and the new position shift amount in the main scanning direction may be calculated by subtracting the existing position shift amount in the main scanning direction from the new position shift amount in the main scanning direction.

As the index indicating the difference between the existing head vibration error according to the carriage movement and the new head vibration error according to the carriage movement, the summation or summation of squares of ratios between the existing position shift amounts in the main scanning direction and the new position shift amounts in the main scanning direction in the shift amount $\Delta x(n)$ in the main scanning direction with respect to the pixel position n shown in FIG. 25A may be applied. The ratio between the existing position shift amount in the main scanning direction and the new position shift amount in the main scanning direction may be calculated by dividing the new position shift amount in the main scanning direction by the existing position shift amount in the main scanning direction.

The shift amount $\Delta y(n)$ in the sub scanning direction with respect to the pixel position n shown in FIG. 25B may be applied instead of or together with the shift amount $\Delta x(n)$ in the main scanning direction with respect to the pixel position n.

As the specified value in a case where the head vibration error according to the carriage movement, the index indicating similarity may be applied. As the similarity, a correlation coefficient may be applied. The specified value in a case where the head vibration error according to the carriage movement is the characteristic parameter may be determined based on the magnitude of the head vibration error according to the carriage movement. As the magnitude of the head vibration error according to the carriage movement, a standard deviation or a variance of the magnitude of the head vibration error according to the carriage movement may be applied. The head vibration error according to the carriage movement corresponds to the head vibration error.

As the characteristic parameter specific to the single path type, there is the vibration error of the head module (denoted by reference numeral 220-$j$ (=1, 2, . . . , and Nm) in FIG. 28).

As the specified value shown in FIG. 40 in a case where the head module vibration error in the single path type is the characteristic parameter, the index indicating the difference between the existing head module vibration error and the new head module vibration error may be applied. As the index indicating the difference between the existing head module vibration error and the new head module vibration error, the summation of the absolute values of the differences between the existing position shift amounts in the main scanning direction and the new position shift amounts in the main scanning direction in the position shift amounts (dot position shift amounts) of the main scanning direction (denoted by reference numeral x) with respect to the position in the paper transport direction (sub scanning direction, denoted by reference numeral y) shown in FIG. 28 or the summation of squares of the differences may be applied.

The difference between the existing position shift amount in the main scanning direction and the new position shift amount in the main scanning direction may be calculated by subtracting the existing position shift amount in the main scanning direction from the new position shift amount in the main scanning direction.

As the index indicating the difference between the existing head module vibration error and the new head module vibration error, the summation or summation of squares of the ratios between the existing position shift amount in the main scanning direction and the new position shift amount in the main scanning direction in the position shift amounts (dot position shift amounts) in the main scanning direction (denoted by reference numeral x) with respect to the position in the paper transport direction (sub scanning direction, denoted by reference numeral y) shown in FIG. 28 may be applied.

The ratio between the existing position shift amount in the main scanning direction and the new position shift amount in the main scanning direction may be calculated by dividing the new position shift amount in the main scanning direction by the existing position shift amount in the main scanning direction.

As the specified value in a case where the head module vibration error in the single path type is the characteristic parameter, the index indicating the similarity between the existing head module vibration error and the new head module vibration error may be applied. As the index indicating the similarity between the existing head module vibration error and the new head module vibration error, a correlation coefficient may be applied. The head module vibration error corresponds to a head module vibration error in a head formed using the plurality of head modules.

The specified value in a case where the head module vibration error is the characteristic parameter may be determined based on the magnitude of the head module vibration error. As the magnitude of the head module vibration error, a standard deviation or a variance of the magnitude of the head module vibration error may be applied.

According to the printing system having the above-described configuration and the method of acquiring the characteristic parameter, it is possible to appropriately comprehend the characteristic parameters indicating the characteristics of the printing system for the respective printing modes.

Since the characteristic parameter acquisition chart is optimized, in a case where the characteristic parameter acquisition chart is reduced, it is possible to reduce the processing time until the characteristic parameter is acquired after the characteristic parameter acquisition chart is output. It is possible to reduce the usage amount of used ink and the usage amount of the printing medium until the characteristic parameter is acquired after the characteristic parameter acquisition chart is output.

In the printing system and the method of acquiring the characteristic parameter described in the present embodiment, the plurality of printing modes may be selected, the chart output conditions may be respectively set to the plurality of selected printing modes, the characteristic parameter acquisition charts may be respectively output for the plurality of selected printing modes, and the characteristic parameter may be acquired for the plurality of selected printing modes. The plurality of printing modes may be all the printing modes, or may be some of the printing modes.

According to such as aspect, in a case where the plurality of printing modes is changed in one job, it is possible to acquire the optimum characteristic parameters appropriate for the plurality of printing modes for the plurality of printing modes by outputting the characteristic parameter acquisition charts once.

<Eighth Embodiment: Another Example of Method of Generating Halftone Processing Rule>

[Example in User Input Characteristic Parameter]

Figure 52:
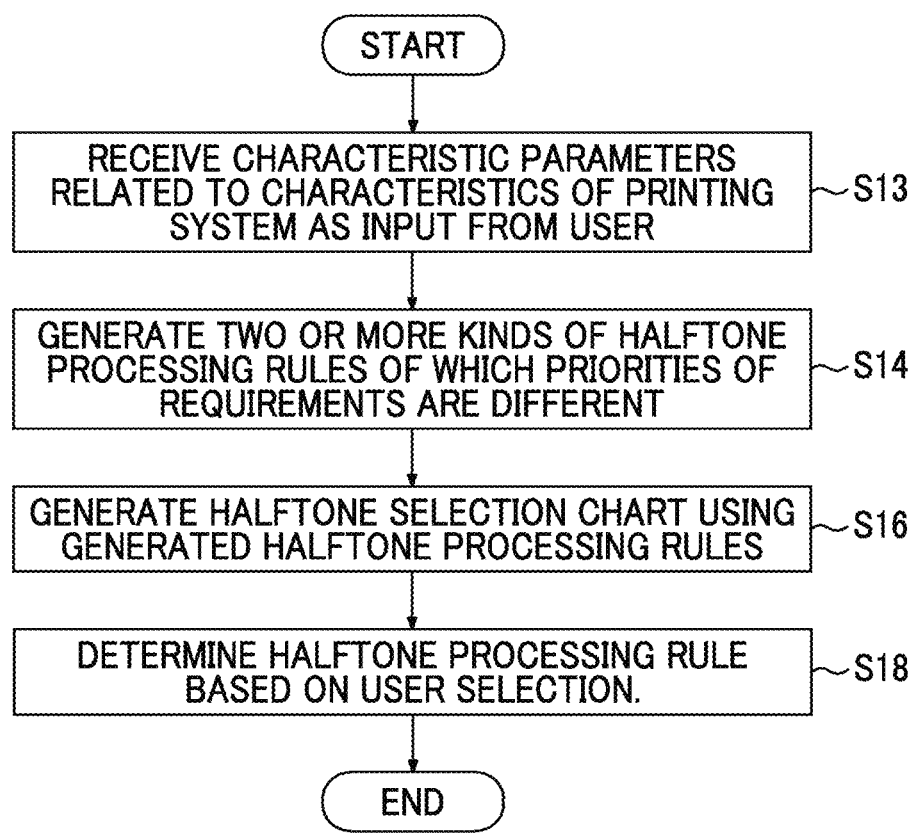
FIG. 52 is a flowchart according to an eighth embodiment showing another example of the method of generating a halftone processing rule shown in FIG. 4.

FIG. 52 is a flowchart showing another example of the method of generating the halftone processing rule shown in FIG. 4. The flowchart shown in FIG. 52 includes a process (step S13) of allowing the user to input the characteristic parameters related to the characteristics of the printing system instead of the process (step S10) of outputting the characteristic parameter acquisition chart, the process (step S11) of reading the characteristic parameter acquisition chart output in step S10 and the process (step S12) of acquiring the characteristic parameters related to the characteristics of the printing system in the flowchart shown in FIG. 4.

As means for allowing the user to input the characteristic parameters related to the characteristics of the printing system, the display device 32 and the input device 34 shown in FIGS. 2 and 3 may be applied. That is, the user can input the characteristic parameters related to the characteristics of the printing system by using the input device 34 while seeing the content displayed on the screen of the display device 32 shown in FIGS. 2 and 3.

As the characteristic parameters related to the characteristics of the printing system, in the ink jet printing system, there are a droplet kind and a jetting order in addition to the resolution, the number of nozzles and the ink kind already described. As the characteristic parameter specific to the serial scan type, there is bidirectional printing or unidirectional printing. These characteristic parameters are characteristic parameters related to the specifications of the printing system.

As common characteristic parameters to the plurality of printing elements, there are an average dot forming position shift and an average position shift for each droplet kind, in addition to the average dot density, the dot diameter, the average dot shape and the landing interference already described.

As the characteristic parameter of an individual printing element, there is a position shift for each droplet kind in addition to the dot density, the dot diameter, the dot shape, the dot forming position shift and the non-jetting for each printing element.

As the characteristic parameter specific to the serial scanning, there are a position shift between the outward path and the inward path in the bidirectional printing, a position shift between the outward path and the inward path in the bidirectional printing for each droplet kind, and a paper transport error.

As the characteristic parameter specific to the single path type, there is a recording head attachment error.

As another characteristic parameter which does not belong to the above-described classifications, there is an error caused by the vibration of the recording head.

In a case where the user inputs an appropriate value for the characteristic parameter of the individual printing element among the characteristic parameters, an operation load becomes high. However, as for the non-jetting, since the user may input such that the non-jetting occurs in a limited number of printing elements, the above-described configuration is applied to the inputting of the characteristic parameter of the individual printing element other than the non-jetting.

When the user inputs the characteristic parameter of the individual printing element, the image processing device 20 described in the present embodiment is configured to input an average value of the plurality of printing elements or an average equivalent value which is a value equivalent to the average value. The image processing device is configured to input a deviation from the average value or the average equivalent value. As for the characteristic parameters other than the characteristic parameter of the individual printing element, the image processing device may be configured to input an average value or an average equivalent value and a deviation from the average value or the average equivalent value for the characteristic parameters for which the average value or the average equivalent value and the deviation from the average value or the average equivalent value can be input.

The average equivalent value is a value equivalent to the average value capable of being substantially treated as an average value. As an example of the average equivalent value, there are a center value and a representative value (representative value capable of being treated to be equivalent to the average value).

When a target range of the average value or the average equivalent value and the deviation from the average value or the average equivalent value are defined, all the printing elements which are provided as the plurality of printing elements at the recording head may be used as targets, or some printing elements of the printing elements provided at the recording head may be used as targets.

As an example of some printing elements of the printing elements provided at the recording head, there are printing elements for the head modules 220-j shown in FIG. 28. That is, an average value of the characteristic parameters or an average equivalent value and a deviation from the average value or the average equivalent value may be input for each of the head modules 220-j shown in FIG. 28.

Some printing elements of the printing elements provided at the recording head may be appropriately set so as to correspond to the aspect in which the halftone processing rule is generated.

For the dot density, the dot diameter, the dot forming position shift and the position shift for each droplet kind, an average value or an average equivalent value and a deviation from the average value or the average equivalent value of values (a density value, a diameter value, a distance of the dot forming position shift, and a distance of the position shift) indicating the degrees or quantities thereof in the plurality of printing elements.

A value acquired by digitizing the degree of collapse of the dot shape from an ideal dot shape (perfect circle) may be used an input value of the dot shape, and an average value of the plurality of printing elements or an average equivalent value and a deviation (an average value of values indicating the degrees of collapse of the respective dots formed using the plurality of printing elements or an average equivalent value, and a deviation from the average value or the average equivalent value) from the average value or the average equivalent value may be input as an average value of the dot shapes or an average equivalent value and a deviation from the average value or the average equivalent value.

For example, a radius from the origin of the dot to the circumference is a/2 in all directions of 360 degrees in a case where the dot has an ideal dot shape (perfect circle) of which the dot diameter is a, and difference radiuses are varied by a radius different from a/2 in the respective directions of 360 degrees in a case where the dot has the collapsed dot shape. Accordingly, the standard deviation of variations in ratios of the radiuses in the respective directions of 360 degrees to a/2 may be used as an index indicating the degree of collapse of the dot, and may be input as the average value of the plurality of printing elements or the average equivalent value and the deviation from the average value or the average equivalent value.

The process (step S13) of causing the user to input characteristic parameters related to the characteristics of the printing system, which is shown in FIG. 52 functions as an information input process of causing the user to input the characteristic parameter. The information input process includes an average input process of causing the user to input an average value of the characteristic parameters or an average equivalent value and a deviation input process of causing the user to input a deviation from the average value of the characteristic parameters or the average equivalent value.

Figure 53:
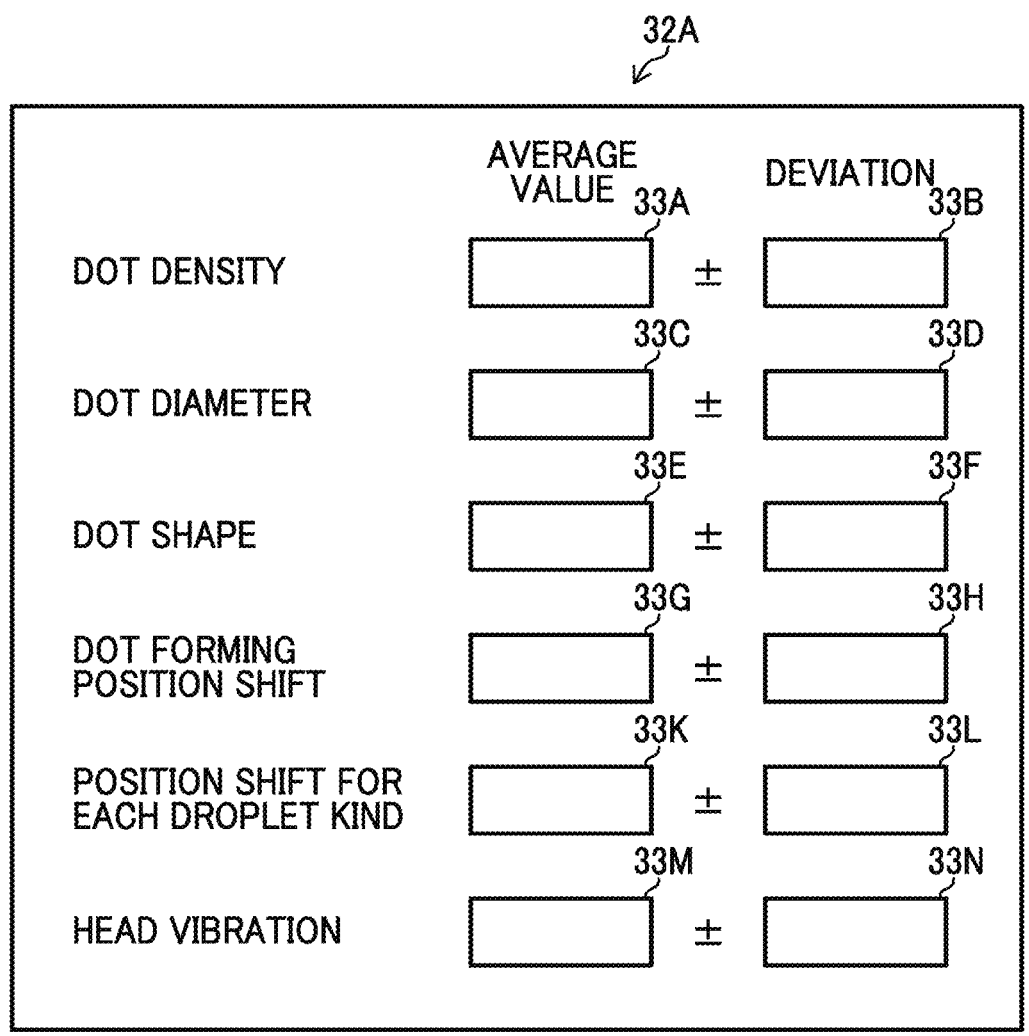
FIG. 53 is an explanatory diagram showing an example of an input screen used in an input step of the flowchart shown in FIG. 52.

FIG. 53 is an explanatory diagram showing an example of an input screen used in the input process of the flowchart shown in FIG. 52. An input screen 32A shown in FIG. 53 is displayed on the display device 32 shown in FIG. 3.

The input screen 32A shown in FIG. 53 includes an input field 33A of the average value (or average equivalent value) of the dot density, an input field 33B of the deviation of the dot density, an input field 33C of the average (or average equivalent value) of the dot diameter, an input field 33D of the deviation of the dot diameter, an input field 33E of the average value (or average equivalent value) of the dot shape, an input field 33F of the deviation of the dot shape, an input field 33G of the average value (or average equivalent value) of the dot forming position shift, an input field 33H of the deviation of the dot forming position shift, an input field 33K of the average value (or average equivalent value) of the position shift for each droplet kind, an input filed 33L of the position shift for each droplet kind, an input field 33M of the average value (or average equivalent value) of the recording head vibration (head vibration), and an input field 33N of the deviation of the recording head.

However, it is not necessary to input all the items, and it is possible to select the input target item depending on the characteristics of the printing system. That is, among of the items shown in FIG. 53, at least a group of average values or average equivalent values and deviations from the average value or the average equivalent value may be input.

The inputting of the average value or the average equivalent value corresponds to the determination of Value A (average value) of the characteristic error of the graph showing the relationship between the system error distribution and the level of the random system error shown in FIG. 31. That is, as the average equivalent value, Value A of the characteristic err shown in FIG. 31 may be adopted.

The inputting of the deviation corresponds to the determination of ±a or a ±2 which is the standard deviation of the graph showing the relationship between system error distribution and the level of the random system error shown in FIG. 31.

The vibration error of the recording head is not the characteristic parameter of the individual printing element, but since the vibration error of the recording head has high reproducibility, the vibration error of the recording head can be treated as the same error as the characteristic error. The image processing device described in the present embodiment is configured to input the average value (or the average equivalent value) of the recording head positions, and the deviation of the recording head positions as the recording head vibration error.

Figure 54:
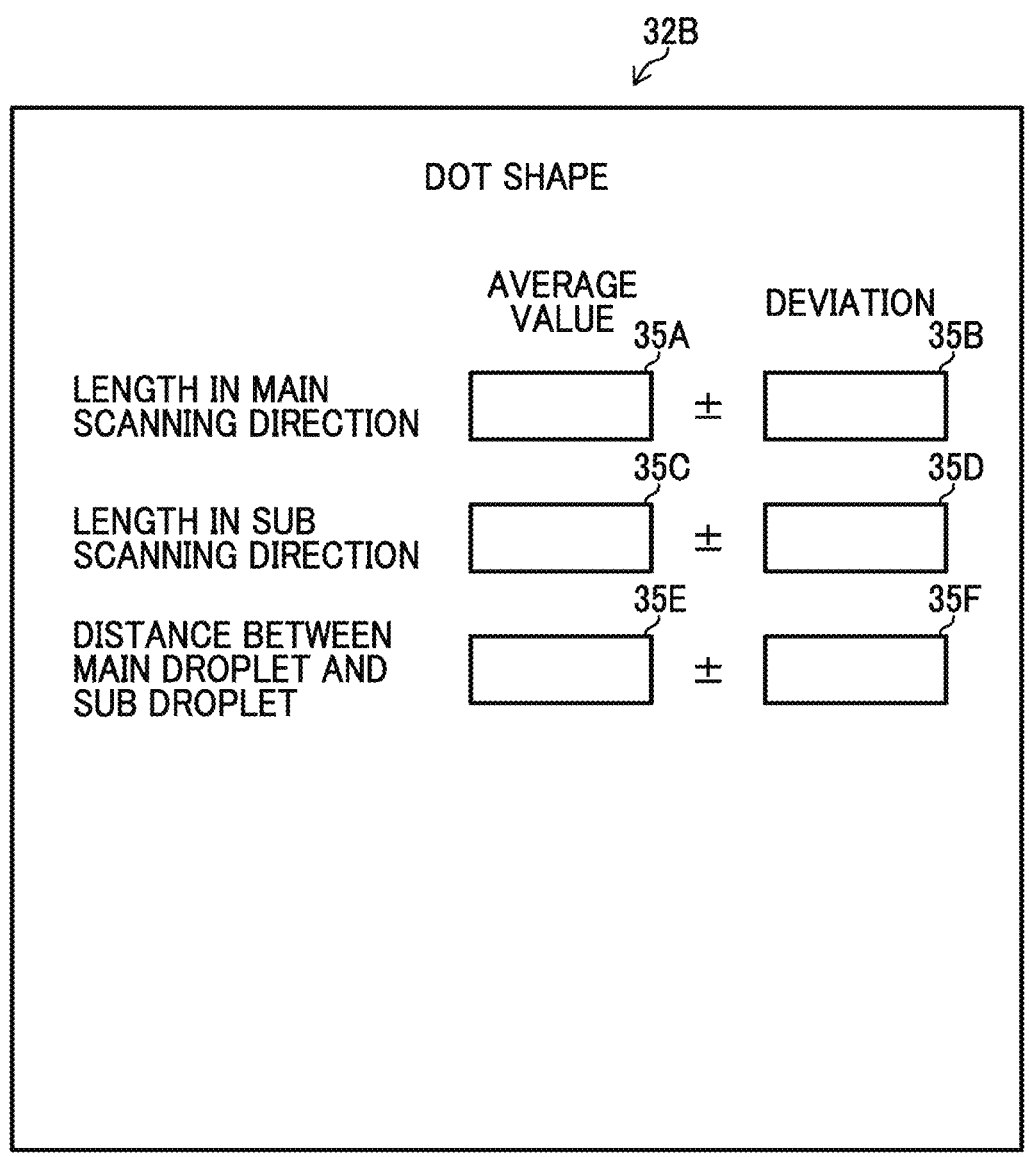
FIG. 54 is an explanatory diagram showing another example of a dot shape item on the input screen shown in FIG. 53.

FIG. 54 is an explanatory diagram showing another example of the dot shape item on the input screen shown in FIG. 53. In the ink jet type printing system, the shape of the dot generated from one liquid droplet may be an elliptical shape, or the one liquid droplet may be divided into a plurality of liquid droplets (a main droplet and sub droplets are generated).

The input screen 32B of the dot shape shown in FIG. 54 includes an input field 35A of an average value (or average equivalent value) of the lengths in the main scanning direction, an input field 35B of a deviation of the lengths in the main scanning direction, an input field 35C of an average value (or average equivalent value) of the lengths in the sub scanning direction, and an input field 35D of a deviation of the lengths in the sub scanning direction so as to correspond to a case where the shape of the dot has the elliptical shape.

An input field 35E of an average value (or average equivalent value) of the distances between the main droplet and the sub droplet, and an input field 35F of a deviation of the distances between the main droplet and the sub droplets so as to correspond to a case where the liquid droplet jetted as one liquid droplet is divided into the plurality of liquid droplets.

As the length in the main scanning direction on the input screen 32B of the dot shape shown in FIG. 54, the length (dot diameter) of the dot in the main scanning direction may be applied. As the length in the sub scanning direction, the length (dot diameter) of the dot in the sub scanning direction may be applied.

The distance between the main droplet and the sub droplet may be a distance between a center of the main droplet and a center of the sub droplet, or may be the shortest distance between the outer circumference of the main droplet and the circumference of the sub droplet. Although not shown in FIG. 54, the input fields of the average value (or average equivalent value) and the deviation of the lengths in the main scanning direction and the lengths of the sub scanning direction may be provided for the main droplet and the sub droplet. In a case where the input screen 32B of the dot shape is provided, the input field of the dot diameter is omitted.

By doing this, in a case where the user inputs the characteristic parameters related to the characteristics of the printing system, since the average value of the characteristic parameters of the plurality of printing elements or an average equivalent value and a deviation from the average value or the average equivalent value are input, the characteristic parameter for the individual printing element is prevented from being input, and an excessive load is prevented from being given to the inputting of the characteristic parameter.

Although it has been described in the present embodiment that the input device 34 and the input screens 32A and 32B are individual components, the input device 34 and the input screens 32A and 32B may be integrally formed using a touch panel type display device.

As an aspect of the information input means, a configuration in which input screens displayed on the input device 34 and the display device 32 shown in FIG. 2 are included may be adopted. The input device 34 shown in FIG. 2, the input screen 32A shown in FIG. 53 and the input screen 32B shown in FIG. 54 function as average value input means for causing the user to input the average value of the parameters of the plurality of printing elements provided in the printing system or the average equivalent value, or the average value of the errors due to the vibration of the recording head provided in the printing system or the average equivalent value.

The input device 34 shown in FIG. 2, the input screen 32A shown in FIG. 38 and the input screen 32B shown in FIG. 54 function as deviation input means for inputting the deviation from the average value or the average equivalent value. That is, an aspect of the information input means, an aspect in which the average value input means and the deviation input means are included may be adopted.

Figure 55:
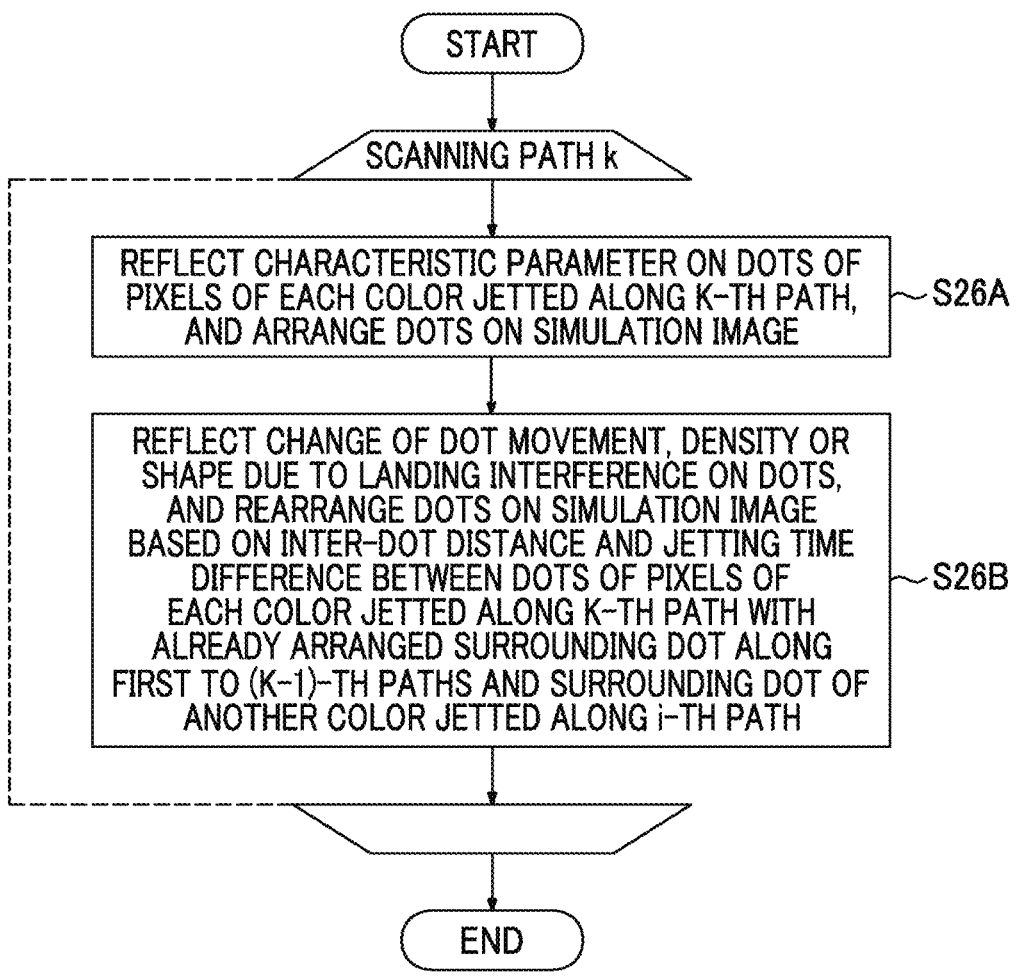
FIG. 55 is a flowchart of an aspect (ninth embodiment) in which the influence of the landing interference when the simulation image shown in FIG. 11 is generated is reflected.

Ninth Embodiment: Example of Halftone Processing Rule Generation Due to Landing Interference Simulation FIG. 55 is a flowchart of the aspect in which the influence of the landing interference when the simulation image shown in FIG. 11 is generated is reflected. The simulation image generation to be described below is to generate the simulation image in which the influence of the landing interference is reflected, is applied to the serial scan type ink jet printing system shown in FIG. 6, and is applied to an operation mode in which the drawing is completed through multipath. The printing type in the serial scan type ink jet printing device functions as the printing system that executes the serial scan type printing.

In the present embodiment, the influence of the landing interference is simulated in consideration of an inter-dot jetting time difference as well as the inter-dot distance. In the present embodiment, inter-color landing interference and a difference in landing interference according to the liquid kind are simulated.

That is, the image processing device applied to the printing system described in the present embodiment generates the simulation image in which the influence of the landing interference is reflected and which includes a plurality of colors, the simulation image in which the inter-color landing interference is reflected and which includes dots corresponding to the plurality of droplet kinds, the simulation image in which the influence of the landing interference caused by the droplet kind is reflected, the simulation image in which the influence of the landing interference caused by the inter-dot distance is reflected and the simulation image in which the influence of the landing interference caused by the jetting time difference is reflected.

The simulation image generated shown in the flowchart of FIG. 55 is performed by repeating step S26A (dot arrangement process) for each scanning path and step S26B (dot rearranging process) for each scanning path.

In the dot arrangement process shown in step S26A, the characteristic parameter is reflected on the dots of the respective pixels of the respective colors jetted along a k-th path, and the dots are arranged on the simulation image.

In the dot arrangement step S26A, if the dots are arranged on the simulation image, the process proceeds to the dot rearranging step S26B. In the dot rearranging step S26B, at least any one of the dot movement due to the landing interference with the already arranged surrounding dots and the surrounding dots of another color jetted along the same path, a density change of the dots or a shape change of the dots is reflected on the dots of the respective pixels of the respective colors jetted along the k-th path, and the dots are rearranged on the simulation image. The already arranged dots are dots arranged from a first scanning path to a (k−1)-th path.

The surrounding dots are dots in which the landing interference with the dots (given dots) as rearranging targets may occur, and are counterpart dots of the white dots constituting the pixels different from the given dots.

The given dot is a target dot (rearranging target dot) on which the influence of the landing interference is reflected, and refers to a target dot on which the determination of whether or not the influence of the landing interference is influenced is performed. The surrounding refers to a range in which the counterpart dots (surrounding dots) are present when the determination of whether or not the given dots are influenced by the influence of the landing interference is performed.

In a case where the landing interference occurs, one or more surrounding dots are present for one given dot. The dot movement, the density change of the dots or the shape change of the dots due to the influence of the landing interference are simulated based on the inter-dot distance and the jetting time difference.

In the dot rearranging step S26B, if the dots are rearranged on the simulation image along the k-th path and the dot arrangement on which the influence of the landing interference is reflected is determined, the process proceeds to the next scanning path ((k+1)-th path).

If the dot arrangement step S26A and the dot rearranging step S26B are performed on the (k+1)-th path and the dot arrangement on which the influence of the landing interference of the (k+1)-th path is reflected is determined, the process proceeds to the next scanning path ((k+2)-th path). By doing this, the dot arrangement of the simulation image in which the influence of the landing interference is determined along all the scanning paths.

Figures 56, 57:
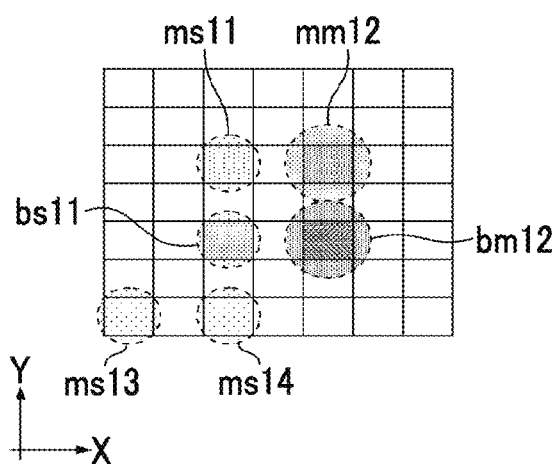
FIG. 56 is a conceptual diagram in which the jetting order of a drawing mode in which drawing is performed along 8 scanning paths is denoted by a path number.
FIG. 57 is a conceptual diagram of a simulation image showing the arrangement of dots jetted along a first path in the generation of the simulation image.

FIG. 56 is a conceptual diagram in which the jetting order of the drawing mode in which the drawing is performed along 8 scanning paths is denoted by a path number. The number of scanning paths and the jetting order shown in FIG. 56 are acquired by adding one row is added in a row direction and one column is added in a column to the number of scanning paths and the jetting order shown in FIGS. 12 and 13. The number of scanning paths and the jetting order shown in FIG. 56 are substantially the same as those of the number of scanning paths and the jetting order shown in FIGS. 12 and 13, and the description thereof is omitted.

A dot patch in FIG. 56 represents a difference in droplet kind. That is, a light dot patch represents that a small droplet (small dot) is jetted. A dark dot patch represents that a medium droplet (medium dot) is jetted.

FIG. 57 is a conceptual diagram of the simulation image showing the arrangement of the dots jetted along the first path in the generation of the simulation image. In the following description, a simulation image using two colors of magenta and black will be described. It is assumed that the positions where magenta dots are jetted and the positions where black dots are jetted in the same path are shifted in the sub scanning direction by two pixels. The same is true of FIGS. 58A, 58B, 59A and 59B.

In the simulation image generation (dot arrangement and dot rearrangement) to be described below, the dot density for each droplet kind, the dot diameter for each droplet kind and the dot shape (circle) for each droplet kind as the characteristic parameters are reflected on the dots jetted along the respective scanning paths. Meanwhile, the error such as the dot forming position shift is not reflected. As the influence of the landing interference, the dot movement is reflected. The dot movement is the concept including the movement distance and the movement direction.

In FIG. 57, alphabets of the reference numeral assigned to the dot represent the droplet kind and color of the dot. mm represent magenta and medium droplet. ms represent magenta and small droplet. bm represent black and medium droplet. bs represent black and small droplet. In FIG. 57, among numbers of the reference numerals assigned to the dot, the tens digit represents the number of scanning paths, and the ones digit represents a serial number assigned to the dot.

For example, dot mm12 represents the magenta, medium and second dot jetted along the first path. The same is true of FIGS. 58A, 58B, 59A and 59B.

As shown in FIG. 57, the magenta dots ms11, mm12, ms13 and ms14 and the black dots bs11 and bm12 which are jetted along the first path are not in contact with each other, and the landing interference does not occur in these dots. In the simulation image generation described in the present embodiment, in a case where the inter-dot distance and the sum of radiuses of two dots are the same value, these dots are treated as being not in contact with each other. That is, the contact in the simulation image generation described in the present embodiment refers to a state in which there is a region where two dots overlap each other. The dot arrangement shown in FIG. 57 refers to dot arrangement in which the dots are arranged in the dot arrangement step S26A shown in FIG. 55.

Figure 58A:
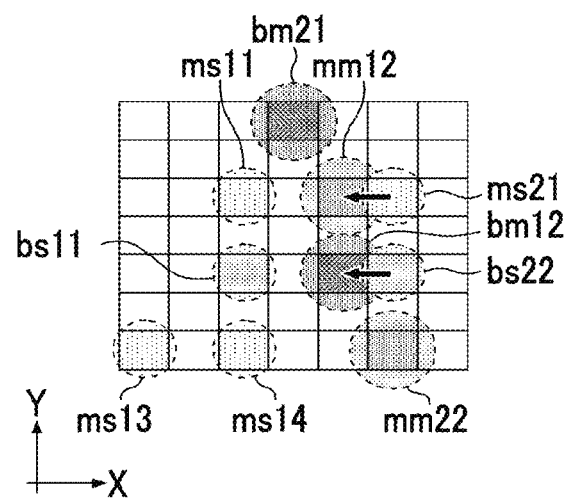
FIG. 58A is a conceptual diagram of a simulation image showing the arrangement of dots jetted up to a second path in the generation of the simulation image.
Figure 58B:
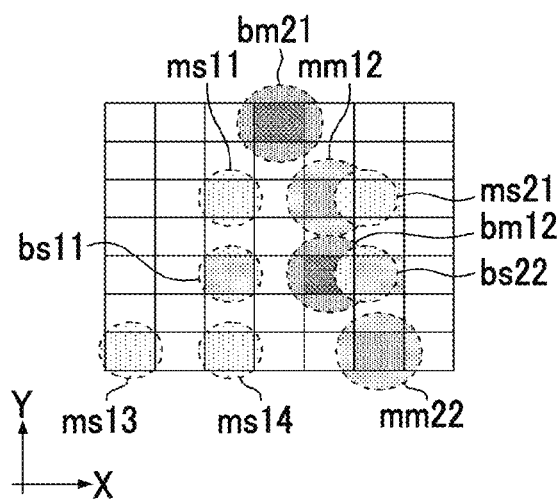
FIG. 58B is a conceptual diagram of a simulation image showing the dot arrangement in which the dots are rearranged by reflecting the influence of the landing interference.

FIG. 58A is a conceptual diagram of the simulation image showing the arrangement of the dots jetted up to the second path in the generation of the simulation image. FIG. 58B is a conceptual diagram of the simulation image showing the dot arrangement in which the dots are rearranged by reflecting the influence of the landing interference.

As shown in FIG. 58A, the magenta dots ms21 and mm22 and the black dots bm21 and bs22 are jetted along the second path. Since the magenta dot ms21 jetted along the second path is in contact with the magenta dot mm12 jetted along the first path, the landing interference occurs between these dots. The magenta dot ms21 jetted along the second path is moved toward the magenta dot mm12 jetted along the first path due to the influence of the landing interference.

Similarly, since the black dot bs22 jetted along the second path is in contact with the black dot bm12 jetted along the first path, the landing interference occurs between these dots. The black dot bs22 jetted along the second path is moved toward the black dot bm12 jetted along the first path due to the influence of the landing interference. A thick arrow line shown in FIG. 58A represents the movement direction of the dot due to the influence of the landing interference.

The dot arrangement shown in FIG. 58B is dot arrangement in which the dots are rearranged by reflecting the influence of the landing interference. The magenta dot ms21 of FIG. 58B is rearranged so as to be shifted toward the magenta dot mm12 by reflecting the influence of the landing interference. Similarly, the magenta dot bs22 is rearranged so as to be shifted toward the black dot bm12 by reflecting the influence of the landing interference.

Figure 59A:
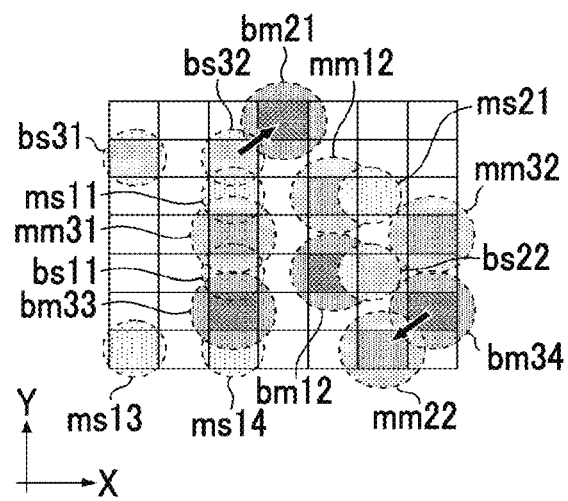
FIG. 59A is a conceptual diagram of a simulation image showing the arrangement of dots jetted up to a third path in the generation of the simulation image.
Figure 59B:
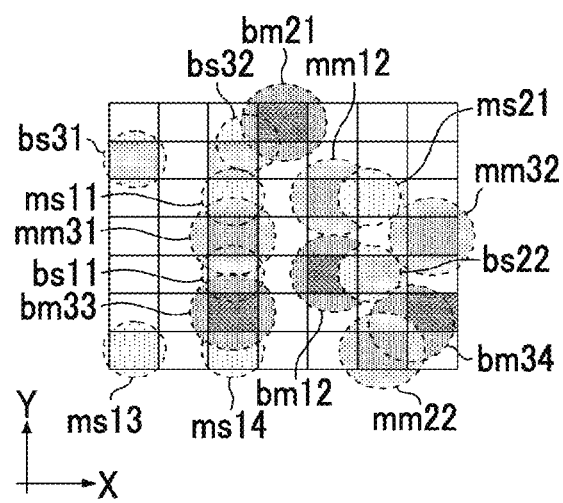
FIG. 59B is a conceptual diagram of a simulation image showing the dot arrangement in which the dots are rearranged by reflecting the influence of the landing interference.

FIG. 59A is a conceptual diagram of the simulation image showing the arrangement of the dots jetted along the third path in the generation of the simulation image. FIG. 59B is a conceptual diagram of the simulation image showing the arrangement of the dots in which the dots are rearranged by reflecting the influence of the landing interference.

As shown in FIG. 59A, the magenta dots mm31 and mm32 and the black dots bs31, bs32, bm33 and bm34 are jetted along the third path. The dots jetted along the third path are arranged on the simulation image in which the dots are rearranged in the jetting along the second path shown in FIG. 58B.

Since the black dot bs32 jetted along the third path is in contact with the black dot bm21 jetted along the second path, the landing interference occurs between these dots. The black dot bs32 jetted along the third path is moved toward the black dot bm21 jetted along the second path due to the influence of the landing interference.

Similarly, since the black dot bm34 jetted along the third path is in contact with the magenta dot mm22 jetted along the second path, the landing interference occurs between these dots. The black dot bm34 jetted along the third path is moved toward the magenta dot mm22 jetted along the second path due to the influence of the landing interference. A thick arrow line shown in FIG. 59A represents the movement direction of the dot due to the influence of the landing interference.

In the simulation image generation described in the present embodiment, it is assumed that in a case where there is a jetting time difference which is equal to or greater than two scanning paths between the dots being in contact, the landing interference does not occur. That is, the magenta dot mm31 jetted along the third path is in contact with the magenta dot ms11 and the black dot bs11 jetted along the first path, but the landing interference does not occur between the magenta dot mm31 jetted along the third path and the magenta dot ms11 jetted along the first path and between the magenta dot mm31 jetted along the third path and the black dot bs11 jetted along the first path.

Similarly, the black dot bm33 jetted along the third path is in contact with the black dot bs11 and the magenta dot ms14 jetted along the first path, but the landing interference does not occur between the black dot bm33 jetted along the third path and the black dot bs11 jetted along the first path and between the black dot bm33 jetted along the third path and the magenta dot ms14 jetted along the first path.

The dot movement due to the influence of the landing interference may be expressed by a function $f(c,p)$ using an inter-dot distance c and a jetting time difference p as the parameters.

Since the landing interference occurs between the surrounding dots in an arbitrary direction, the inter-dot distance c may be considered as a vector using the center of the given dot as a start point and the center of the surrounding dot as an end point. In a case where the inter-dot distance c is considered as the vector, the function $f(c,p)$ is also treated a vector having a direction indicated by the inter-dot distance c.

In the following description, it is assumed that the inter-dot distance c and the function $f(c, p)$ indicating the dot movement are treated as the vectors. It is assumed that the dot movement in the following description is treated as the vector having the movement distance and the movement direction.

Figures 60, 61:
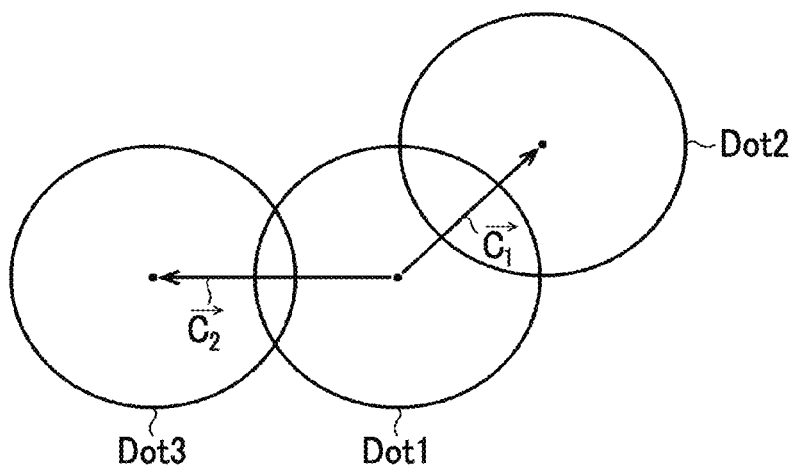
FIG. 60 is an explanatory diagram of the inter-dot distance.
FIG. 61 is an explanatory diagram of the function used in Expression (11) to Expression (14).

FIG. 60 is an explanatory diagram of the inter-dot distance. Dot1 shown in FIG. 60 is a given dot. Dot2 and Dot3 are surrounding dots. An inter-dot distance c1 between the given dot Dot1 and the surrounding dot Dot2 is expressed as a vector using the center of the given dot Dot1 as a start point and the center of the surrounding dot Dot2 as an end point. Similarly, an inter-dot distance c2 between the given dot Dot1 and the surrounding dot Dot3 is expressed as a vector using the center of the given dot Dot1 as a start point and the center of the surrounding dot Dot3 as an end point.

In a case where the given dot is moved between the given dot and the plurality of surrounding dots due to the influence of the landing interference, the movement of the given dot due to the influence of the landing interference may be calculated as the summation of vectors of the movement due to the influence of the landing interference between the given dot and the respective surrounding dots.

That is, if the landing interference occurs between the given dot Dot1 and the surrounding dot Dot2 and the given dot and the surrounding dot Dot3 shown in FIG. 60, the given dot Dot1 is moved in a direction from the center of the given dot Dot1 toward the center of the surrounding dot Dot2, and is moved in a direction from the center of the given dot Dot1 toward the center of the surrounding dot Dot3. As a result, the given dot is moved toward a position where the movement is balanced in both the directions.

A distance at which the given dot Dot1 is moved is determined by the balance of surface tension between the given dot Dot1 and the surrounding dot Dot2 and surface tension between the given dot Dot1 and the surrounding dot Dot3. There is a tendency for the distance at which the given dot Dot1 is moved to become longer as the inter-dot distance (scalar quantity) becomes shorter, and there is a tendency for the distance at which the given dot Dot1 is moved to become shorter as the inter-dot distance (scalar quantity) becomes longer.

In the example described in FIGS. 57 to 59B, the movement of each dot due to the landing interference is expressed by Expression (11) to Expression (14).

$$\Sigma f_{bs\_bs}(c,p) + \Sigma f_{bs\_bm}(c,p) + \Sigma f_{bs\_ms}(c,p) + \Sigma f_{bs\_mm}(c,p) \quad \text{Expression (11)}$$

$$\Sigma f_{bm\_bs}(c,p) + \Sigma f_{bm\_bm}(c,p) + \Sigma f_{bm\_ms}(c,p) + \Sigma f_{bm\_mm}(c,p) \quad \text{Expression (12)}$$

$$\Sigma f_{ms\_bs}(c,p) + \Sigma f_{ms\_bm}(c,p) + \Sigma f_{ms\_ms}(c,p) + \Sigma f_{ms\_mm}(c,p) \quad \text{Expression (13)}$$

$$\Sigma f_{mm\_bs}(c,p) + \Sigma f_{mm\_bm}(c,p) + \Sigma f_{mm\_ms}(c,p) + \Sigma f_{mm\_mm}(c,p) \quad \text{Expression (14)}$$

Expression (11) corresponds to a case where the given dot is the black dot and the small droplet. The movement of the dot bs22 shown in FIG. 58A and the movement of the dot bs32 shown in FIG. 59A due to the influence of the landing interference are calculated using Expression (11).

Expression (12) corresponds to a case where the given dot is the black dot and the medium droplet. The movement of the dot bm34 shown in FIG. 59A due to the influence of the landing interference is calculated using Expression (12). Expression (13) corresponds to a case where the given dot is the magenta dot and the small droplet. The movement of the dot ms21 shown in FIG. 58A due to the influence of the landing interference is calculated using Expression (13). Expression (14) corresponds to a case where the given dot is the magenta dot and the medium droplet.

FIG. 61 is an explanatory diagram of the function fused in Expression (11) to Expression (14). In FIG. 61, the description of the parameters (the inter-dot distance c and the jetting time difference p) of the function f indicating the dot movement is omitted.

In Expression (11) to Expression (14), among suffixes assigned to the function f, suffixes on the left side of the underbar represent the color and droplet kind of the given dot in order from the left, and suffixes on the right side of the underbar represent the color and droplet kind of the surrounding dot in order from the left. For example, a first term of Expression (11) represents the summation of the movement of the given dots in a case where the given dot is the black dot, the small droplet and the surrounding dot is the black dot and the small droplet.

That is, the given dots are classified according to each color and each droplet kind, the surrounding dots are classified according to each color and each droplet kind, and the movement of each dot due to the influence of the landing interference is calculated using a vector summation acquired by adding a vector function indicating the movement for each classification of the surrounding dot to each classification of the given dot.

When the movement of the dot due to the influence of the landing interference is calculated using Expression (11) to Expression (14), it may be determined whether or not the landing interference occurs from the condition of the inter-dot distance c and the condition of the jetting time difference p, and the dot movement due to the influence of the landing interference may be calculated in only a case where the landing interference occurs.

The surrounding dots which are not in contact with the given dots may be excluded from the targets using the inter-dot distance c. In a case where the diameter of the white dot is DA and the diameter of the surrounding dot is DB, the surrounding dots that satisfy the condition of $|c| \geq (DA+DB)/2$ may be excluded from the targets. That is, in a case where the inter-dot distance c satisfies the condition of $|c| \geq (DA+DB)/2$, $f(c,p)=0$ may be achieved irrespective of the value of the jetting time difference p.

The surrounding dots of which the jetting time difference is equal to or greater than two scanning paths may be excluded from the targets using the jetting time difference p. That is, in a case where p is equal to or greater than two scanning paths, $f(c,p)=0$ may be achieved irrespective of the value of the inter-dot distance c. As the jetting time difference, a scanning path difference may be used.

That is, inter-dot contact determination means for determining whether or not the dots are in contact with each other based on at least any one of the inter-dot distance c or the jetting time difference p may be provided, and the simulation image generation functioning as simulation image generation means may generate the simulation image acquired by reflecting the influence of the landing interference on the dots determined to be in contact with each other by the inter-dot contact determination means.

As the reflection of the landing interference, at least any one of the density change of the dot or the shape change of the dot in addition to the dot movement or instead of the dot movement may be adopted. Hereinafter, the reflection of the influence of the landing interference including the shape of the dot and the density of the dot will be described.

Figure 62A:
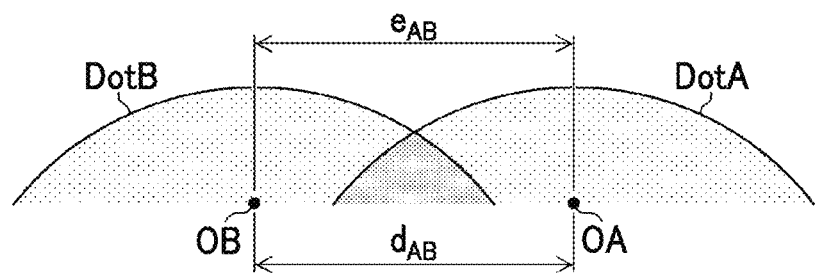
FIG. 62A is a conceptual diagram showing a change due to the landing interference including a dot shape, and is a diagram showing the relationship between an inter-density-maximum-point distance and an inter-center distance of two dots in a case where the landing interference does not occur.
Figure 62B:
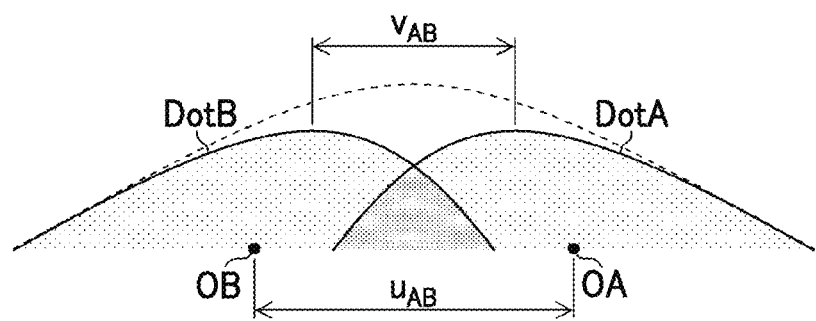
FIG. 62B is a conceptual diagram showing a change due to the landing interference including a dot shape, and is a diagram showing the relationship between an inter-density-maximum-point distance and an inter-center distance of two dots in a case where the landing interference occurs.

FIG. 62A is a conceptual diagram showing the change due to the landing interference including the shape of the dot, and is a diagram showing the relationship between an inter-density-maximum-point distance and an inter-center distance of two dots in a case where the landing interference does not occur. FIG. 62B is a conceptual diagram showing the change due to the landing interference including the shape of the dot, and is a diagram showing the relationship between an inter-density-maximum-point distance and an inter-center distance of two dots in a case where the landing interference occurs.

Figure 63:
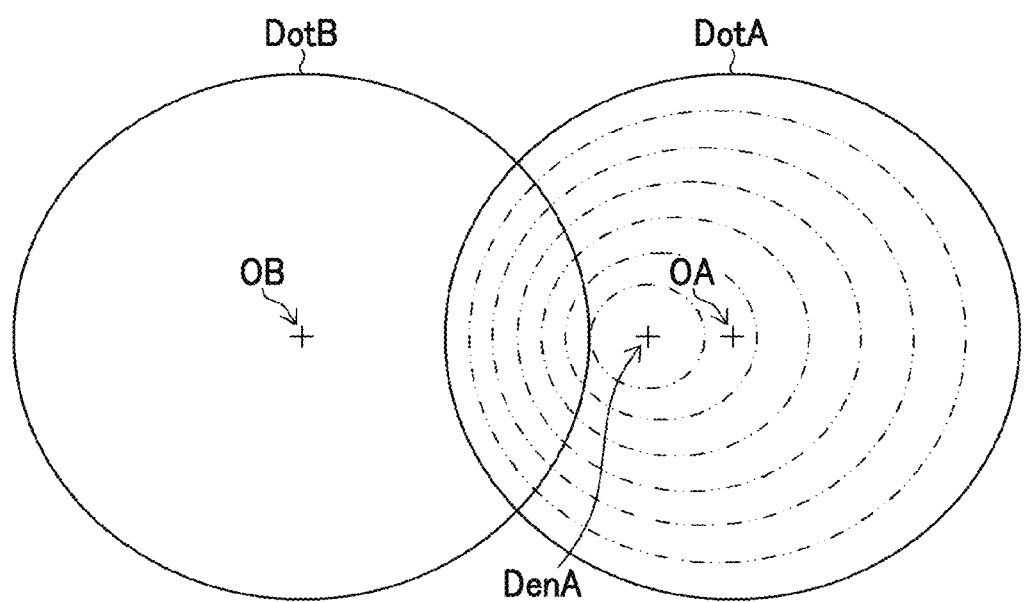
FIG. 63 is a schematic diagram of the dot when the dot of FIG. 62B is viewed from the top.

FIG. 63 is a schematic diagram of the dot when the dot of FIG. 62B is viewed from the top.

As shown in FIG. 62A, an inter-center distance $d_{AB}$ between two dots DotA and DotB jetted at the same jetting timing in a case where the landing interference does not occur is substantially the same as a distance $e_{AB}$ between a maximum density point of the dot DotA and a maximum density point of the dot DotB.

It is assumed that the maximum density point of the dot is a position indicating the maximum density in a case where the dot is viewed from the top and is equal to the center of the dot in a case where the deformation of the dot does not occur. That is, in a case where the dots DotA and DotB are viewed from the top, the densities of the dots DotA and DotB are uniformly distributed on the concentric circles from the centers OA and OB of the dots with the centers OA and OB of the dots as the maximum densities.

In contrast, as shown in FIG. 62B, if the dots DotA and DotB are deformed due to the occurrence of the landing interference, the other dot is drawn toward one dot. By doing this, the inter-center distance of the dot is changed to $u_{AB}$ ($u_{AB} < d_{AB}$) shown in FIG. 62B from $d_{AB}$ shown in FIG. 62A.

The inter-density-maximum-point distance between the dots DotA and DotB is changed to $v_{AB}$ ($v_{AB} < e_{AB}$, $v_{AB} < u_{AB}$) shown in FIG. 62B from CAB shown in FIG. 62A. A position denoted by reference numeral DenA in FIG. 63 is the maximum density point of the dot DotA in a case where the landing interference occurs.

If the other dot is drawn toward the one dot due to the occurrence of the landing interference, the density maximum positions of both dots are also drawn toward each other, and the density distribution is changed. In FIG. 63, the density distribution (equi-density position) of the dot DotA is schematically shown using a dashed double-dotted line. In FIG. 63, since the maximum density point and density distribution of the dot DotB are the same as those of the dot DotA, the illustration of the maximum density point and density distribution of the dot DotB is omitted.

That is, if the other dot is drawn toward one dot due to the occurrence of the landing interference, the density of the region where both the dots overlap each other is relatively high, and the density of a region opposite to the region where both the dots overlap each other is relatively low.

The generation of the simulation image in which the density change of the dot and the shape change of the dot are reflected may be performed through the following procedures.

Initially, the movement of the maximum density point due to the landing interference is defined by a function g(c,p) using the inter-dot distance c and the jetting time difference p as the parameters. Similarly to the function f(c,p), the functions g(c,p) are classified for each color and each droplet kind of the given dot and each color and each droplet kind of the surrounding dot. Since the inter-dot distance c is the vector having the direction, the function g(c,p) is the vector having the direction.

The movement of the dot due to the landing interference is calculated using Expression (11) to Expression (14), and the dots are rearranged. The movement of the maximum density point is calculated as the summation of the functions g(c,p), and the dots are rearranged. If the movement of the dot and the movement of the maximum density point of the dot are determined, since the shape of the dot is acquired, the shape of the dot is replaced with the acquired dot shape. The shape of the dot mentioned herein refers to a three-dimensional shape acquired by adding a shape in a thickness direction to a planar shape when viewed from the top.

The rearrangement of the dots due to the movement of the dot and the rearrangement of the dots due to the movement of the density maximum position of the dot may be changed.

By doing this, the simulation image in which the shape change of the dot due to the influence of the landing interference and the density change of the dot are reflected may be generated.

As for the movement of the dot due to the influence of the landing interference, after the jetting is performed along the k-th scanning path, the landing interference due to the dots jetted along the first scanning path to the (k−1)-th scanning path is reflected on the dots jetted along the k-th scanning path, the landing interference due to the dots jetted along the k-th scanning path is not reflected on the dots jetted along the first scanning path to the (k−1)-th scanning path.

In other words, after the jetting is performed along the k-th scanning path, the dots jetted along the k-th scanning path are moved, but the dots jetted along the first scanning path to the (k−1)-th scanning path are not moved. This is because the drying and fixing of the dots jetted along the first scanning path to the (k−1)-th scanning path progress at a jetting timing of the k-th scanning path.

However, among the dots jetted along the first path to the (k−1)-th path, the landing interference due to the dots jetted along the k-th scanning path may be reflected on the dots jetted along the scanning path (for example, the (k−1)-th scanning path or the (k−2)-th scanning path) close to the k-th scanning path.

That is, among the dots jetted along the first scanning path to the (k−1)-th scanning path, the movement of the dot may be calculated for the dots jetted the scanning path close to the k-th scanning path by using Expression (11) to Expression (14), and the dots may be rearranged.

It has been described in the present embodiment that the dots are arranged by reflecting the characteristic parameter other than the landing interference, the movement of the dot in which the influence of the landing interference is reflected on the dot arrangement is calculated, and the dots are rearranged. However, the reflection of the characteristic parameter other than the landing interference and the reflection of the landing interference may be collectively performed without performing the dot arrangement in which the characteristic parameter other than the landing interference is reflected.

Although it has been described in the present embodiment that the magenta and the black are taken into consideration, the light ink such as cyan, yellow, light cyan or light magenta, and the special color ink such as orange, green or violet may be taken into consideration.

As an example in which the color is expanded, there is an aspect in which the functions f(c,p) indicating the movement of the dot shown in Expression (11) to Expression (14) and the functions g(c,p) indicating the movement of the maximum density point of the dot are expanded.

The dots may be rearranged using only color in which the influence of the landing interference, the dot density change and the dot shape change is strong as a target. Among a plurality of processes of reflecting the influence of the landing interference described above, at least one process may be performed according to the state of the landing interference and the state of the printing system.

[Specific Example of Means for Appling Tolerance to Landing Interference]

A specific example of a configuration in which the halftone design or the halftone process of controlling the image quality deterioration due to the landing interference is realized will be described.

In the present specification, the outline of the "means for compensating for the image quality deterioration due to the influence of the landing interference" has been already described, and the generation of the halftone parameter or the method of the halftone process of suppressing the image quality deterioration due to the dot movement at the time of the landing interference has been mentioned. Here, a specific example of means for applying the tolerance to the landing interference will be described in more detail.

Means for suppressing the image quality deterioration due to the landing interference analyzes the contact state of each dot with another adjacent dot (that is, surrounding dot) from the data of the dot image indicating the dot arrangement form of the plurality of pixels, evaluates the influence of the landing interference, and performs the generation (that is, the halftone design) of the halftone parameter or the halftone process such that the tolerance to the landing interference based on the evaluating result.

As the form for realizing such a function, some forms are considered. Here, the processing content of the halftone design or the halftone process performed such that the movement amount of the dot due to the landing interference is estimated based on the contact direction and the contact amount of each dot with the surrounding dot and the movement amount (that is, the influence of the landing interference) is decreased as a whole will be described. Even though the landing interference occurs, the halftone image in which the movement of the dot due to the influence is relatively less is acquired by performing the halftone design or the halftone process.

Three examples of an example of the process of generating the halftone parameter in the dither method or the error diffusion method, an example of the process of generating the halftone parameter by the void-and-cluster with respect to the dither method, and an example of the halftone process in the direct binary search method will be described by referring to FIGS. 10, 14 and 16 already described.

Figure 64:
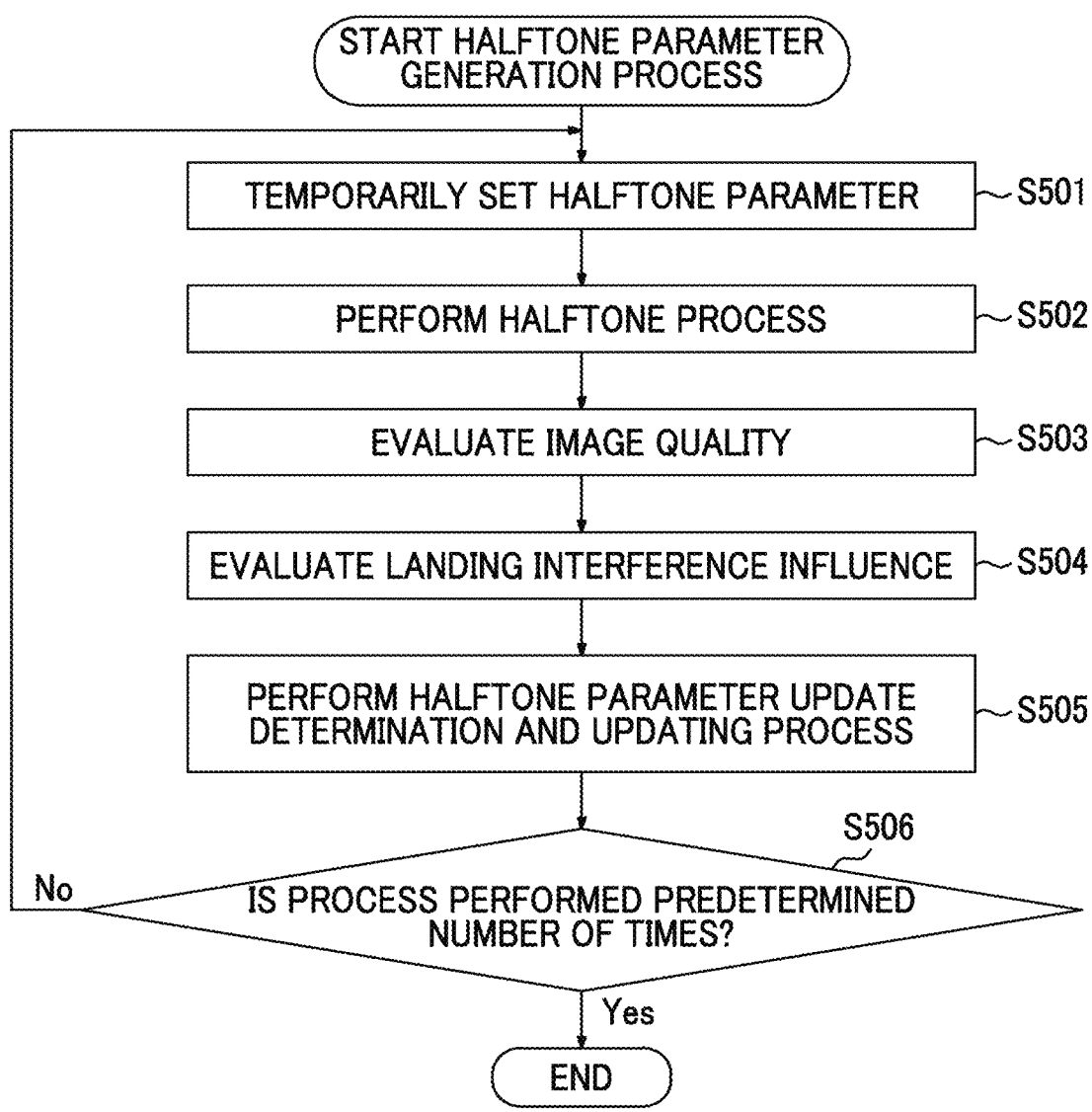
FIG. 64 is a flowchart related to the process of generating the halftone parameter as an example of means for suppressing image quality deterioration due to the landing interference.

FIG. 64 is a flowchart related to the process of generating the halftone parameter in the dither method or the error diffusion method.

The flowchart shown in FIG. 64 may be adopted instead of the flowchart described in FIG. 10.

The flowchart shown in FIG. 64 is a common flowchart in both the dither method and the error diffusion method. Here, the dither method will be described as an example.

Initially, the halftone parameter is temporarily set (step S501). In the dither method, the setting of the respective threshold values of the dither mask corresponds to the determination of the halftone parameter. The flowchart of FIG. 64 is repeatedly performed with a threshold value from 0 to maximum value.

In step S501, after the halftone parameter is temporarily set, the halftone process is subsequently performed using the temporarily set halftone parameter (step S502). In the dither method, step S502 corresponds to the acquisition of the dot-ON pixels from a threshold value "0" to a current threshold value. That is, this step corresponds to the acquisition of the halftone image (dot arrangement) acquired by performing the halftone process of applying the dither mask to the input image of a single gradation having a current-threshold value gradation.

Subsequently, the image quality of the halftone image generated in step S502 is evaluated (step S503). Although it has been described in the flowchart of FIG. 10 that the simulation image is generated using the characteristic parameters related to the characteristics of the printing system when the image quality is evaluated (step S28) (step S26 of FIG. 10).

However, the generation of the simulation image is not an essential process when the image quality is evaluated (step S503) in the flowchart shown in FIG. 64. That is, the image quality of the halftone image generated by the halftone process of step S502 may be evaluated.

It is assumed that when the image quality is evaluated in step S503, even in a case where the simulation is performed in consideration of the characteristic parameters of the system as shown in the example of FIG. 10, the simulation related to the influence of the landing interference described in FIG. 11 is not performed. This is because the influence of the landing interference is separately evaluated in step S504 of FIG. 64.

The image quality evaluation of step S503 is performed by calculating at least one evaluation value of a value acquired by applying a low-pass filter such as a Gaussian filter or a visual transfer function (VTF) representing human visual sensitivity to the halftone image, performing frequency conversion and performing integral calculus, root means square (RMS) granularity, or an error or a standard deviation with the input image. The value calculated in the image quality evaluating process of step S503 is stored as an "image quality evaluation value" in the memory.

Subsequently, the landing interference influence is evaluated (step S504). Based on the evaluating result of the landing interference influence and the evaluating result of the image quality evaluation acquired in step S503, it is determined whether or not the halftone parameter is updated, and the halftone parameter is updated (step S505).

The flowchart of FIG. 64 is greatly different from the flowchart of FIG. 10 in that the steps of step S504 and step S505 are performed. The more detailed processing contents of step S504 and step S505 of FIG. 64 are described below.

In step S506 of FIG. 64, it is determined whether or not the steps of step s501 to step S505 are repeatedly performed a predetermined number of times. The "predetermined number of times" of step S506 in the dither method is the number of all pixels of candidates corresponding to the threshold value.

If the process is performed the predetermined number of times and the process is not completed in the determination of step S506, the step returns to step S501, and the steps of step S501 to step S505 are repeated. In the determination of step S506, if the process is performed the predetermined number of times and the process is completed, the process is ended.

Figure 65:
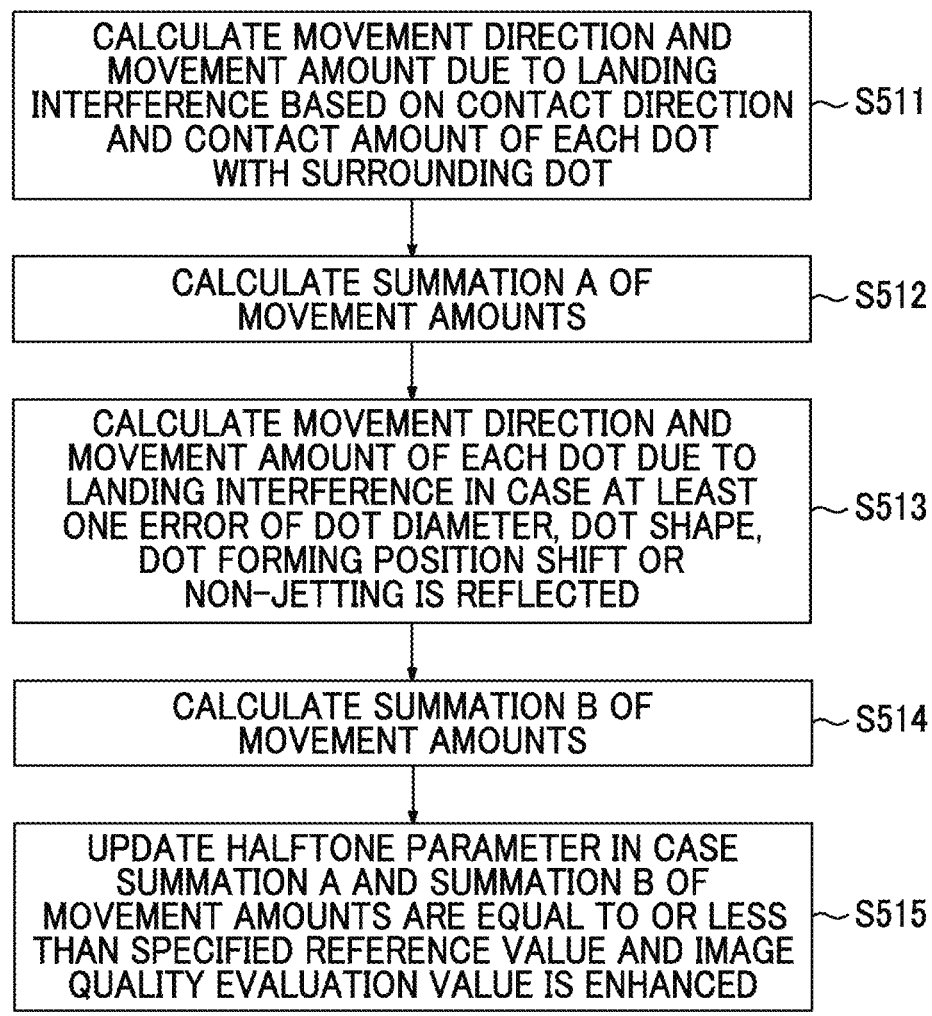
FIG. 65 is a flowchart showing an example of the more detailed processing contents of step S504 and step S505 of FIG. 64.

FIG. 65 is a flowchart showing an example of the more detailed processing contents of step S504 and step S505 of FIG. 64.

Step S511 to step S514 of FIG. 65 correspond to the process of step S504 of FIG. 64, and step S515 of FIG. 65 corresponds to the process of step S505 of FIG. 64.

As shown in FIG. 65, the movement direction and the movement amount due to the landing interference are initially calculated based on the contact direction and contact amount of each dot of the plurality of dots included in the halftone image with the surrounding dot (step S511).

Figure 66:
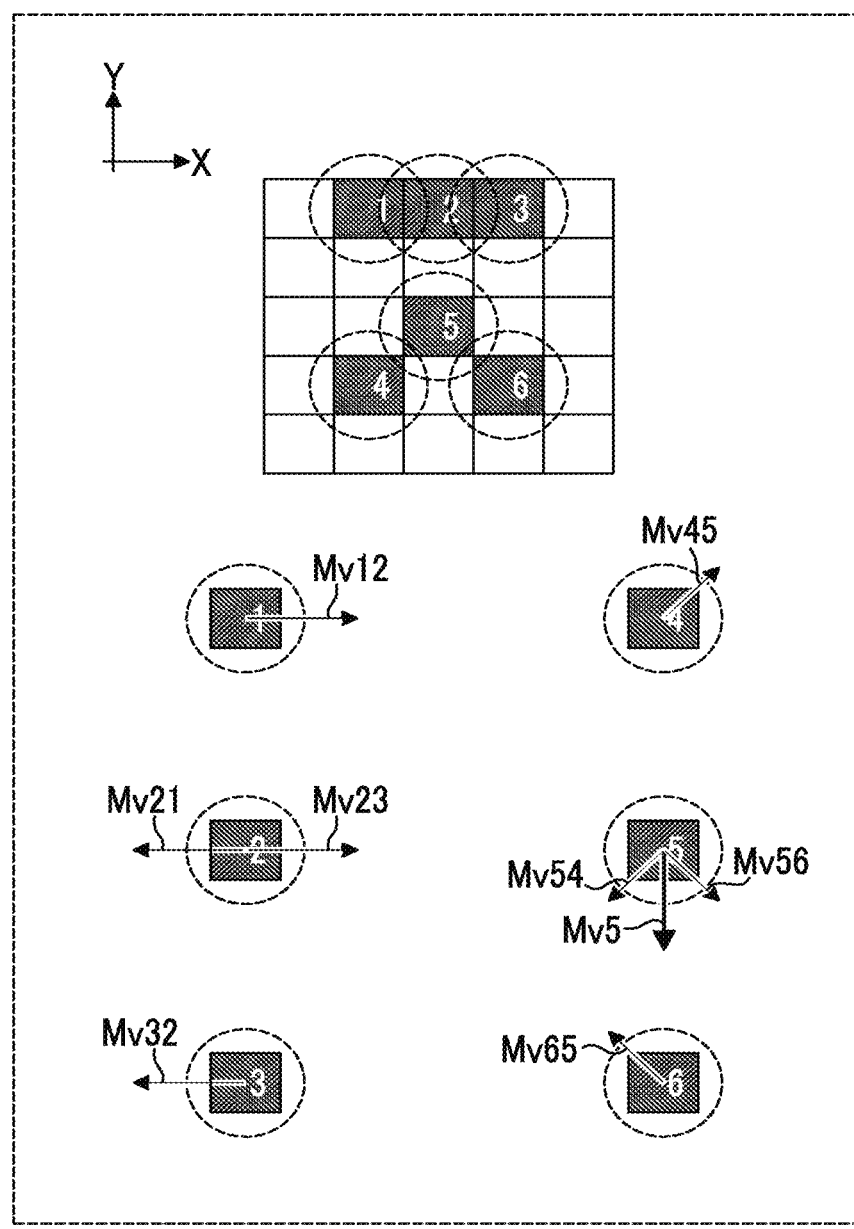
FIG. 66 is an explanatory diagram for describing a method of calculating a movement direction and a movement amount of dot movement due to the landing interference.

FIG. 66 is an explanatory diagram for describing the method of calculating the movement direction and movement amount of the dot movement due to the landing interference. Each cell of a grid of FIG. 66 represents a pixel. A rectangular coordinate system is introduced into a two-dimensional grid shown in FIG. 39, a horizontal direction of FIG. 66 is described an X direction, and a vertical direction is described as a Y direction. Here, the Y direction corresponds to the paper transport direction.

A circle denoted by a broken line of FIG. 66 represents a spreading region of the dot. In FIG. 66, the numerals "1" to "6" described in the cells represent dot numbers. The respective dots are assigned the dot numbers in such a manner that the dot having a number of 1 is "Dot1" and the dot having a number of 2 is "Dot2".

The movement directions and the movement amounts of the dots calculated based on the contact directions and the contact amounts of the dots having the dot number from 1 to 6 shown in FIG. 66 with the surrounding dots are represented for the dots by arrows. The direction indicated by the arrowhead of the arrow represents the movement direction of the dot, and the length of the arrow represents the magnitude of the movement amount. The movement direction and the movement amount of the dot due to the landing interference may be treated as the vectors. That is, the movement amount of each dot due to the landing interference may be expressed as a vector quantity having the magnitudes of the movement direction and the movement amount.

The range of the surrounding dot is a range in which the landing interference may occur, that is, a range in which there is a possibility that the adjacent dots will overlap each other. The larger the dot, the wider the range of the surrounding dot.

For example, the "contact direction" may be classified into any one of 8 directions of a left direction, a right direction, an up direction, a down direction, an upper left direction, a lower left direction, an upper right direction and a lower right direction. Of course, the contact direction may be classified into directions more minutely or roughly than 8 directions.

The "contact amount" depends on the size of the dot and the distance between the centers of the dots. The contact amount may be simply expressed by the distance between the centers of the dots. The "contact amount" may be expressed by the distance at which the dots overlap in a line that connects the centers of the dots, or may be expressed by the area with which the dots overlap. For example, in a case where the diameter of Dot 1 is $D_1$, the diameter of Dot 2 is $D_2$, and the size of one pixel in the X direction is $p_x$, the distance between the centers of Dot 1 and Dot 2 is $p_x$, and the distance at which the dots overlap in the line that connects the centers of Dot 1 and Dot 2 may be expressed by $(D_1/2)+(D_2/2)-p_x$.

The dot arrangement form in the given halftone image is analyzed, and thus, it is possible to comprehend the contact direction and the contact amount of each dot with the surrounding dot. It is possible to estimate the movement direction and the movement amount of the dot due to the landing interference based on information of the contact direction and the contact amount of each dot with the surrounding dot.

Since Dot 1 is in contact with Dot 2 formed by the adjacent pixel on the right, the movement direction of Dot 1 with Dot 2 due to the landing interference is a right direction of FIG. 66, and the movement amount due to the landing interference is the magnitude depending on the contact amount. In FIG. 66, the moving vector indicating the movement direction and the movement amount of Dot 1 due to the landing interference is expressed by Mv12. In a case where i and j are integers indicating the dot numbers, the movement vector of Dot i with Dot j due to the landing interference is described as Mvij. The magnitude of the movement vector Mvij is described as |Mvij|. The |Mvij| refers to the absolute value of the movement amount of Dot i with Dot j due to the landing interference.

In the case of Dot 2, the landing interference with Dot 1 and the landing interference with Dot 3 are offset, and there is "no movement". That is, in the case of Dot 2, a movement vector Mv21 with Dot 1 due to the landing interference and a movement vector Mv23 with Dot 3 due to the landing interference have directions opposite to each other and have the same magnitude. Accordingly, a movement vector Mv2 of Dot 2 due to the landing interference is expressed as the vector sum of the movement vector Mv21 and the movement vector Mv23 (Mv2=Mv21+Mv23), the influence of the landing interference is offset, and there is no movement. That is, |Mv2|=|Mv21+Mv23|=0.

Since Dot 3 is in contact with Dot 2 positioned adjacent on the left, the movement direction of Dot 3 with Dot 2 due to the landing interference is the left direction of FIG. 66, and the movement amount has the magnitude corresponding to the contact amount. In FIG. 66, the movement vector of Dot 3 is expressed as Mv32.

Since Dot 4 is in contact with Dot 5 positioned adjacent in the upper right direction, the movement direction of Dot 4 with Dot 5 due to the landing interference is the upper right direction, and the movement amount has the magnitude corresponding to the contact amount. In FIG. 66, the movement vector of Dot 4 is expressed as Mv45. Since the contact amount of Dot 4 with Dot 5 is smaller than the contact amount of Dot 1 with Dot 2, the movement amount |Mv45| of Dot 4 is smaller than the movement amount |Mv12| of Dot 1.

Dot 5 is in contact with Dot 4 and Dot 6. In the case of Dot 5, as a vector sum acquired by combining a movement vector Mv54 with Dot 4 adjacent in the lower left direction due to the landing interference and a movement vector Mv56 with Dot 6 adjacent in the lower right direction due to the landing interference, a movement vector Mv5=Mv54+Mv56. As shown in FIG. 66, the movement direction of the movement vector Mv5 of Dot 5 is the down direction, and the movement amount |Mv5| J of Dot 5 may be expressed as $|Mv5|=Mv54|\times 2^{1/2}$.

Since Dot 6 is in contact with Dot 5 positioned adjacent in the upper left direction, the movement direction of Dot 6 with Dot 5 due to the landing interference is the upper left direction, and the movement amount has the magnitude corresponding to the contact amount. In FIG. 66, the movement vector of Dot 6 is expressed as Mv65.

Bo doing this, the movement vectors of each dot of the halftone image with the surrounding dots due to the landing interference are acquired, and Summation A of the movement amounts of each dot due to the landing interference is calculated (step S512 of FIG. 65).

Summation A of the movement amounts calculated in step S512 indicates the summation of the absolute values of the movement amounts of each dot due to the influence of the landing interference in a state in which the parameter of the error of the printing system is not added.

In FIG. 66, the summation is expressed by Summation A=|Mv12|+|Mv2|+|Mv32|+|Mv45|+|Mv5|+|Mv65|.

Subsequently, the movement amount of each dot in the dot arrangement in which at least one error of the dot diameter, the dot shape, the dot forming position shift or the non-jetting is reflected due to the landing interference is calculated (step S513 of FIG. 65).

Figure 67:
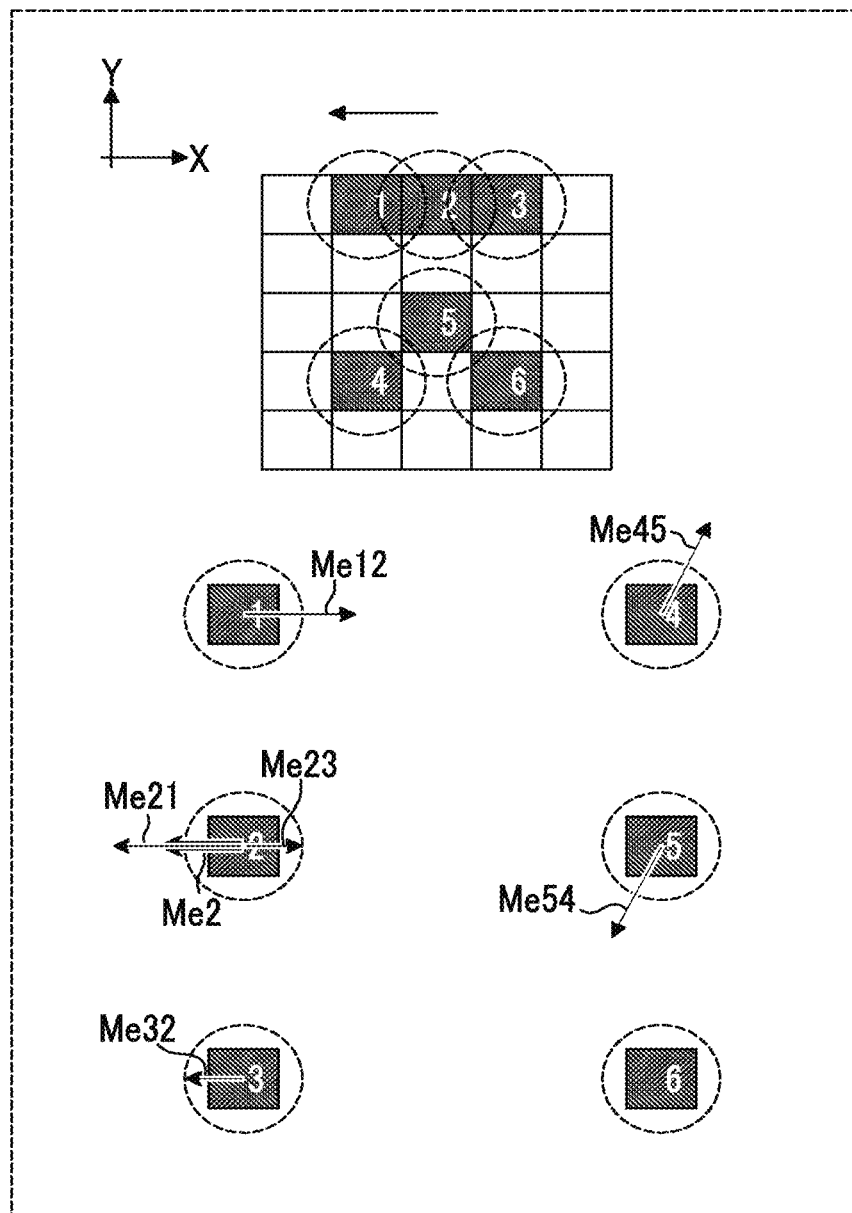
FIG. 67 is an explanatory diagram showing an example of the dot arrangement on which an error due to a dot forming position shift of a specific nozzle of a recording head is reflected.

Here, in order to simplify the description, an example of the dot forming position shift will be described as the kind of reflected error. FIG. 67 shows an example of the dot arrangement on which the error due to the dot forming position shift of the specific nozzle of the recording head is reflected. In FIG. 67, a case where the dot forming position shift occurs in the nozzle serving to record Dot 2 and Dot 5 is shown.

FIG. 67 shows that the landing positions of Dot 2 and Dot 5 due to the dot forming position shift are shifted in the left direction of FIG. 67. The direction of the dot forming position and the shift amount of the landing position are specified by the parameter indicating the error of the dot forming position shift. The shift amount of the landing position due to the dot forming position shift is referred to as a "dot forming position shift amount". In the example of FIG. 67, the direction of the dot forming position shift is a "−X direction", and the dot forming position shift amount is ½ pixel. The dot forming position shift amount of "½ pixel" refers to $p_x/2$ using $p_x$ which is the size of one pixel in the X direction as a unit.

The movement amount due to the landing interference is calculated based on the contact direction and the contact amount of each dot in the dot arrangement shown in FIG. 67 with the surrounding dot.

Dot 1 in FIG. 67 is in contact with Dot 2 positioned adjacent on the right. The landing position of Dot 2 to which the error of the dot forming position shift is added is moved in a direction close to Dot 1 unlike a state (state in which there is no dot forming position shift) before the error described in FIG. 66 is added. Accordingly, in FIG. 67, the contact amount of Dot 1 with Dot 2 has a value greater than the contact amount in FIG. 67.

In FIG. 67, the movement vector of Dot 1 with Dot 2 due to the landing interference is expressed as Me12. When the movement vector of each dot in the dot arrangement to which the error of the dot forming position shift is added due to the influence of the landing interference is described, in a case where i and j are integers indicating the dot numbers, the movement vector of Dot i with Dot j due to the landing interference is described as Meij. The magnitude of the movement vector is described as |Meij|.

The magnitude |Me12| of the movement vector Me12 of Dot 1 shown in FIG. 67 is greater than the magnitude |Mv12| of the movement vector Mv12 of Dot 1 described in FIG. 39.

In the case of Dot 2 in FIG. 67, the movement vector Me21 with Dot 1 due to the landing interference and the movement vector Me23 with Dot 3 due to the landing interference have directions opposite to each other, and have the magnitude of |Me21|>|Me23|. Accordingly, in the case of Dot 2, the movement vector Me21 and the movement vector Me23 are combined, and as the vector sum thereof, the movement vector Me2=Me21+Me23.

Dot 3 in FIG. 67 is in contact with Dot 2 positioned adjacent on the left, but the contact amount due to the dot forming position shift of Dot 2 is smaller than that in the example of FIG. 66. Accordingly, the movement direction of Dot 3 of FIG. 67 with Dot 2 due to the landing interference is the left direction, and the movement amount has the magnitude corresponding to the contact amount. In FIG. 67, the movement vector of Dot 3 is expressed as Me32.

Dot 4 in FIG. 67 is in contact with Dot 5 in which the dot forming position shift occurs. The contact amount of Dot 4 with Dot 5 due to the dot forming position shift of Dot 5 is more increased than the contact amount of Dot 4 with Dot 5 described in FIG. 66. In FIG. 67, the movement vector of Dot 4 is expressed as Me45. The magnitude |Me45| of the movement vector Me45 of Dot 4 shown in FIG. 67 is greater than the magnitude |Mv45| of the movement vector Mv45 of Dot 4 described in FIG. 66.

Dot 5 in FIG. 67 is not in contact with Dot 6 due to the dot forming position shift, and is in contact with only Dot 4. Thus, the movement vector Me54 of Dot 5 of FIG. 67 with Dot 4 due to the landing interference is acquired.

Since Dot 6 of FIG. 67 is not in contact with another surrounding dot, the landing interference of Dot 6 does not occur, and the movement amount due to the influence of the landing interference is "0". That is, the magnitude of the movement vector Me6 of Dot 6 due to the landing interference is |Me6|=0, and there is "no movement amount".

By doing this, the movement vector of each dot of the halftone image to which the predetermined error is added with the surrounding dot due to the landing interference is calculated (step S513), and Summation B of the absolute values of the movement amounts of each dot due to the landing interference is calculated (step S514 of FIG. 65).

Summation B of the movement amounts calculated in step S514 indicates the summation of the absolute values of the movement amounts of each dot due to the influence of the landing interference in a state in which the parameter of the error of the printing system is reflected.

In FIG. 67, the summation may be expressed by Summation B=|Me12|+|Me2|+|Me32|+|Me45|+|Me54|+|Me6|.

Through the steps from step S511 to step S514 of FIG. 65, the summation of the absolute values of the movement amounts of each dot due to the landing interference is calculated in the state of "no dot forming position shift" described in FIG. 66 and the state of "dot forming position shift" described in FIG. 67. That is, Summation A of the absolute values of the movement amount of each dot due to the landing interference in the state of "no dot forming position shift" which is the state in which the error of the dot forming position shift is not added and summation B of the absolute values of the movement amounts of each dot due to the landing interference in the state of "dot forming position shift" which is the state in which the error of the dot forming position shift is added are calculated. FIG. 66 corresponds to the state before the error reflection, and FIG. 67 corresponds to the state after the error reflection.

Summation A and Summation B correspond to forms of "landing interference evaluation values". Summation A and Summation B are evaluation values acquired by adding the movement amounts of each dot due to the landing interference, and are respectively indices indicating the entire degree of influence of the dot movement due to the landing interference. The degree of influence of the landing interference are quantified as values by Summation A and Summation B.

Summation A corresponds to one example of a "first landing interference evaluation value", and Summation B corresponds to one example of a "second landing interference evaluation value".

The process proceeds to step S515 after step S514 of FIG. 65. Step S515 includes a determining process of determining whether or not to update the halftone parameter, and an updating process based on the determining result.

That is, in step S515, the process of comparing Summation A and Summation B of the movement amounts with the specified reference value and updating the halftone parameter in a case where Summation A and Summation B are equal to or less than the specified reference value and the image quality evaluation value calculated in step S503 of FIG. 64 is enhanced is performed. The process of comparing Summation A and Summation B with the specified reference value corresponds to one example of a "comparison process". The determination of whether or not Summation A and Summation B are equal to or less than the specified reference value is performed based on the "comparing result" of the comparison process.

The specified reference value mentioned here is a value that determines an allowable upper limit of the influence of the dot movement due to the landing interference, and is previously determined in a range in which the image quality deterioration due to the landing interference falls in an allowable level. A case where Summation A and Summation B are equal to or less than the specified reference value means that the influence of the dot movement due to the landing interference is equal to or less than the influence of the dot movement expressed by the reference value.

In step S515, it is determined whether or not to update the halftone parameter by combining Summation A and Summation B of the movement amounts with the image quality evaluation value calculated in step S503 of FIG. 64.

The "halftone parameter being updated" means that the halftone parameter is updated by adopting the halftone parameter temporarily set in step S501 of FIG. 64.

According to the configuration described in FIGS. 64 to 67, it is possible to generate the halftone parameter such that the dot arrangement falls in the allowable range represented by the specified reference value based on the comparing result of the process of comparing Summation A and Summation B of the movement amounts which are the landing interference evaluation values with the specified reference value.

Figure 68:
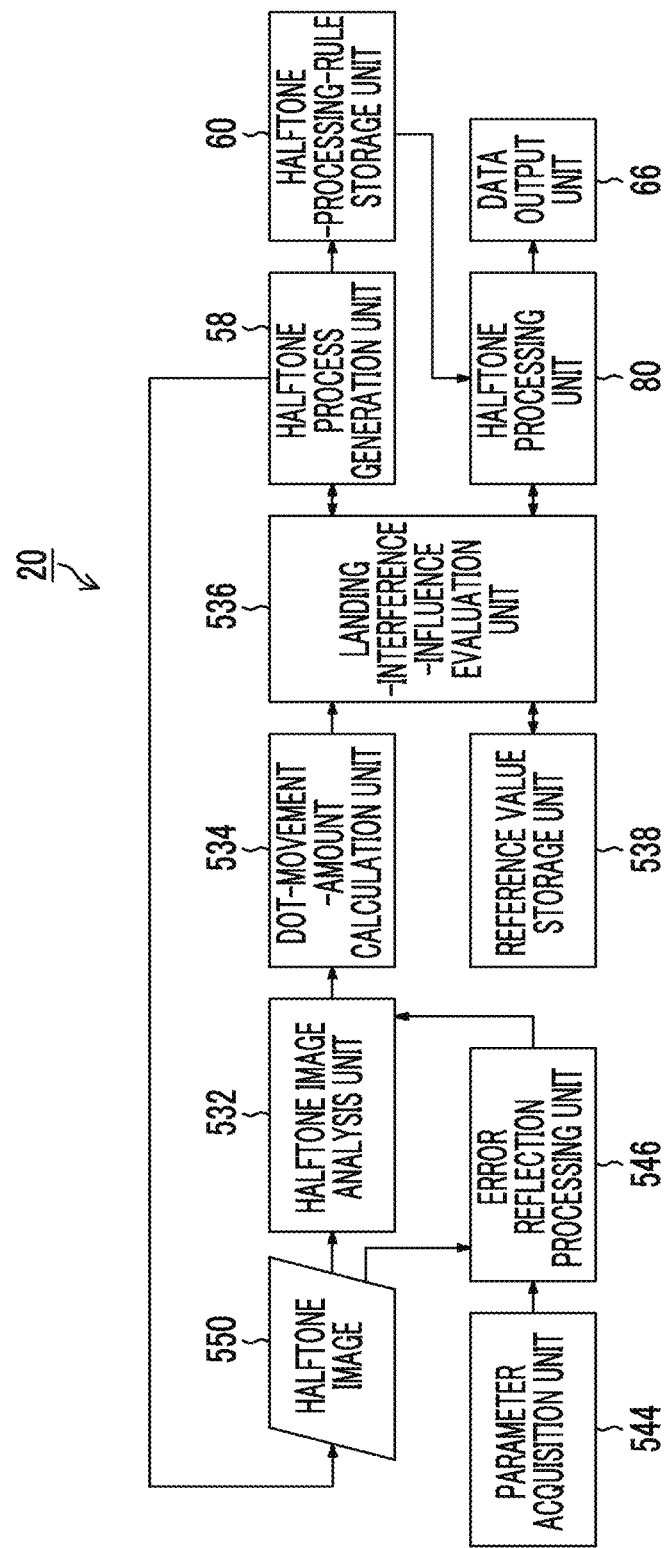
FIG. 68 is a block diagram of major parts for describing the function of an image processing device according to a tenth embodiment.

FIG. 68 is a block diagram of major parts for describing the function of an image processing device according to a tenth embodiment. In FIG. 68, the same or similar elements as or to those of the configuration described in FIG. 3 will be assigned to the same reference numerals, and the description thereof will be omitted.

The image processing device 20 according to the tenth embodiment shown in FIG. 68 has functions of performing the processes described in FIGS. 64 to 67. That is, the image processing device 20 shown in FIG. 68 includes a halftone image analysis unit 532, a dot-movement-amount calculation unit 534, a landing-interference-influence evaluation unit 536, a reference value storage unit 538, a halftone process generation unit 58, a halftone-processing-rule storage unit 60, a halftone processing unit 80, and a data output unit 66. The image processing device 20 includes a parameter acquisition unit 544, and an error reflection processing unit 546.

The halftone image analysis unit 532 analyzes data of a halftone image 550, and generates information of a contact direction and a contact amount of each dot of the halftone image 550 with a surrounding dot which is another dot. The halftone image analysis unit 532 corresponds to one example of "analysis means". The process of causing the halftone image analysis unit 532 to analyze a contact state of the dots and to generate information of the contact direction and contact amount indicating the contact state corresponds to one example of an "analysis process". The processing function of the halftone image analysis unit 532 corresponds to one example of an "analysis function".

The halftone image 550 is the dot image generated during the process of causing the halftone process generation unit 58 to determine the halftone parameter. The dot image refers to an image indicating a dot arrangement form. The halftone image 550 is generated in the process of step S502 of FIG. 64.

The dot-movement-amount calculation unit 534 calculates a movement direction and a movement amount of the dot movement of each dot due to the landing interference based on the information of the contact direction and contact amount of each dot acquired from the halftone image analysis unit 532 with the surrounding dot. The dot-movement-amount calculation unit 534 corresponds to one example of "movement amount calculation means". The process of causing the dot-movement-amount calculation unit 534 to calculate the movement amount of the dot movement corresponds to one example of a movement amount calculation step. The processing function of the dot-movement-amount calculation unit 534 corresponds to one example of a movement amount calculation function.

The landing-interference-influence evaluation unit 536 calculates a landing interference evaluation value for quantitatively evaluating the influence of the dot movement due to the landing interference from the information indicating the movement direction and the movement amount acquired by the dot-movement-amount calculation unit 534. The landing-interference-influence evaluation unit 536 corresponds to one example of "landing-interference-influence evaluation means". The process of causing the landing-interference-influence evaluation unit 536 to calculate the landing interference evaluation value corresponds to one example of a "landing-interference-influence evaluating process". The processing function of the landing-interference-influence evaluation unit 536 corresponds to one example of a "landing-interference-influence evaluation function".

Summation A and Summation B described in FIG. 65 are forms of "landing interference evaluation values". The landing-interference-influence evaluation unit 536 calculates Summation A and Summation B described in FIG. 65.

The reference value storage unit 538 is storage means for storing information of a specified reference value described in step S515 of FIG. 65. The landing-interference-influence evaluation unit 536 compares Summation A and Summation B as the calculated landing interference evaluation values with the specified reference value, and determines the degree of influence of the dot movement due to the landing interference.

The halftone process generation unit 58 generates the halftone processing rule in cooperation with the landing-interference-influence evaluation unit 536.

The parameter acquisition unit 544 is means for acquiring a parameter indicating at least one error of the dot diameter, the dot forming position shift or the non-jetting. In the example described in FIG. 67, a parameter indicating a dot forming position shift direction and a dot forming position shift amount related to the error of the dot forming position shift is acquired. The parameter acquisition unit 544 may be a user interface, may be a communication interface or a data reception terminal that receives parameter information retained in an external storage medium or within the device, or may be an appropriate combination thereof.

The error reflection processing unit 546 performs a process of generating the arrangement of dots on which the error represented by the parameter acquired from the parameter acquisition unit 544 is reflected.

The error reflection processing unit 546 reflects the error represented by the parameter acquired from the parameter acquisition unit 544 on the data of the halftone image 550, and generates a dot image indicating a dot arrangement state after the error reflection. In the example described in FIG. 67, the error reflection processing unit 546 generates data of the dot arrangement to which the error due to the dot forming position shift is added. The error reflection processing unit 546 corresponds to one example of "error reflection processing means".

The halftone image analysis unit 532 may perform analysis the contact direction and the contact amount on the halftone image 550 before the error is added by the error reflection processing unit 546 and an after-error-reflection halftone image acquired by adding the error to the halftone image 550 by means of the error reflection processing unit 546.

A state before the error is added corresponds to one example of a "case where the non-reflection of the error is performed". A state after the error is added" corresponds to one example of a "case where the error is reflected".

The process of step S511 of FIG. 65 is performed by the halftone image analysis unit 532 and the dot-movement-amount calculation unit 534. The process of the step S513 of FIG. 65 is performed by combining the parameter acquisition unit 544, the error reflection processing unit 546, the halftone image analysis unit 532 and the dot-movement-amount calculation unit 534.

The steps of step S512 and step S514 of FIG. 65 are performed by the landing-interference-influence evaluation unit 536. The process of step S515 of FIG. 65 is performed by the landing-interference-influence evaluation unit 536 and the halftone process generation unit 58.

In such a configuration, the halftone process generation unit 58 (see FIG. 68) corresponds to one example of "signal processing means", and the step of causing the halftone process generation unit 58 to generate the halftone parameter corresponds to one example of a "signal processing step". The processing function of the halftone process generation unit 58 corresponds to one example of a "signal processing function".

In addition to the configuration described in FIG. 68, the image processing device 20 of FIG. 68 may have the same configuration as that of the image quality evaluation processing unit 74 or the halftone-selection-chart generation unit 76 described in FIG. 3.

<Case of Error Diffusion Method>

The flowchart of FIG. 64 may be applied to the generation of the halftone parameter of the error diffusion method. Similarly to the example described in FIG. 10, a diffusion coefficient of an error diffusion matrix of each applied gradation section is determined by repeatedly performing the flowchart of FIG. 64 on all the applied gradation sections.

That is, it is assumed that an average value of the respective evaluation values of each gradation is used as an image quality evaluation value by temporarily setting a diffusion coefficient of the error diffusion matrix applied to a certain gradation section for the gradation section (step S501 of FIG. 64), performing the halftone process on the input image (a uniform image of a single gradation) of each gradation of the gradation section (step S502 of FIG. 64), and evaluating the image quality of the halftone image (step S503). The image quality evaluation (step S503) is performed similarly to that in the dither method.

The evaluation (step S504) of the landing interference influence and the halftone parameter update determining and updating process (step S505) are performed similarly to those in the dither method.

<Case where Void-and-Cluster Method is Applied to Dither Method>

Figure 69:
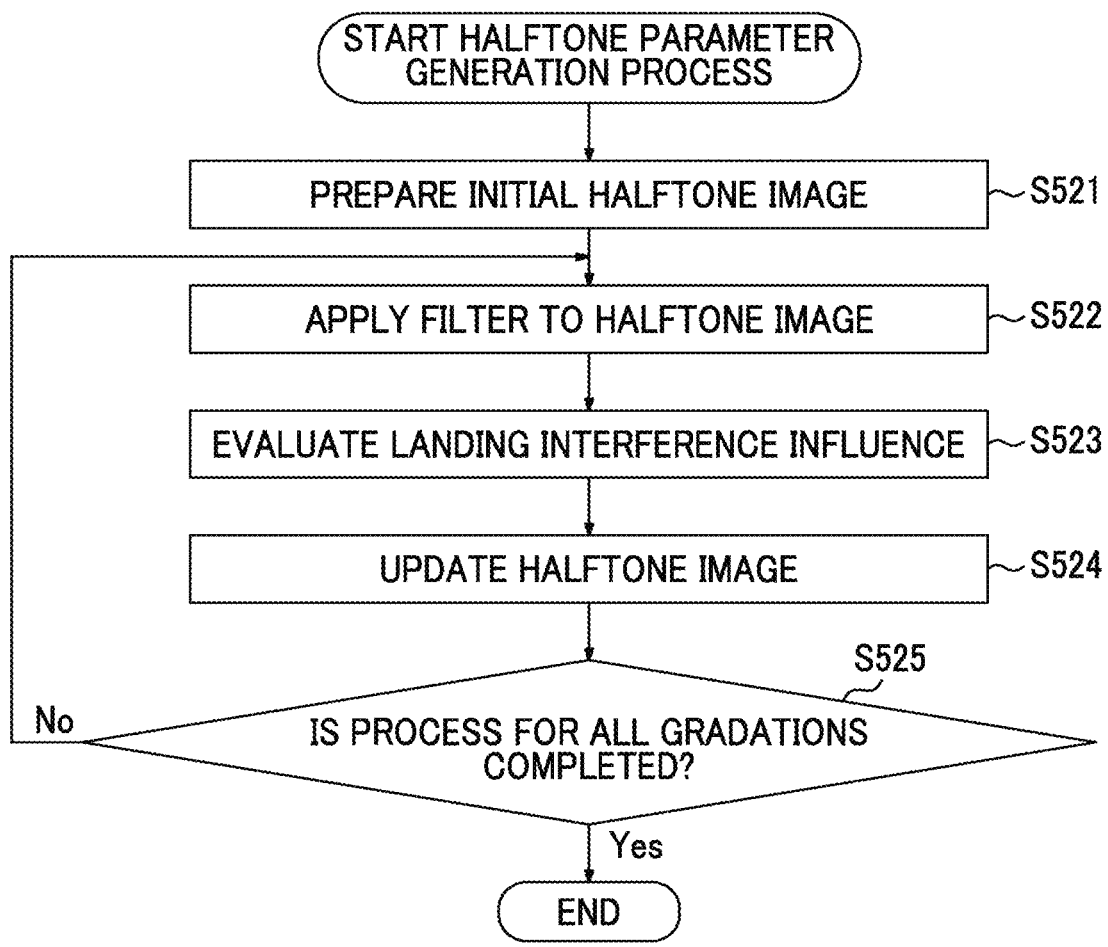
FIG. 69 is a flowchart in a case where the void-and-cluster method is used at the time of halftone design in the dither method as an example of means for suppressing image quality deterioration due to the landing interference.

FIG. 69 is a flowchart in a case where the void-and-cluster method is used at the time of halftone design in the dither method. Instead of the flowchart described in FIG. 14, the flowchart shown in FIG. 69 may be adopted.

In the flowchart shown in FIG. 69, an initial halftone image is initially prepared (step S521). The method of generating the initial halftone image is the same as step S42 of FIG. 14.

Subsequently, the process proceeds to step S522 of FIG. 69, and a filter is applied to the halftone image. For example, as the filter, a low-pass filer such as a Gaussian filter is used. In step S522, the filter may be applied to the halftone image, or the filter may be applied to the simulation image in consideration of the characteristic parameters related to the characteristics of the printing system. However, it is assumed that even in a case where the simulation in consideration of the characteristic parameters is performed, the simulation related to the influence of the landing interference is not performed. This is because the influence of the landing interference is separately evaluated in step S523 of FIG. 69.

Subsequently, the landing interference influence is evaluated (step S523). The halftone image is updated based on the evaluating result of the landing interference influence (step S524).

The more detailed contents of step S523 and step S524 of FIG. 69 are described below.

In step S525, it is determined whether or not the setting (that is, the setting of dots) of the threshold values for all the gradations is completed. If the setting thereof is not completed, the process proceeds to step S522, and the steps of step S522 to S524 are repeated. That is, the filter is applied to the halftone image to which the dots are newly added in step S522, and step S523 and step S524 are performed.

If the process of all the gradations is completed in step S525, and the process of FIG. 69 is ended.

Figure 70:
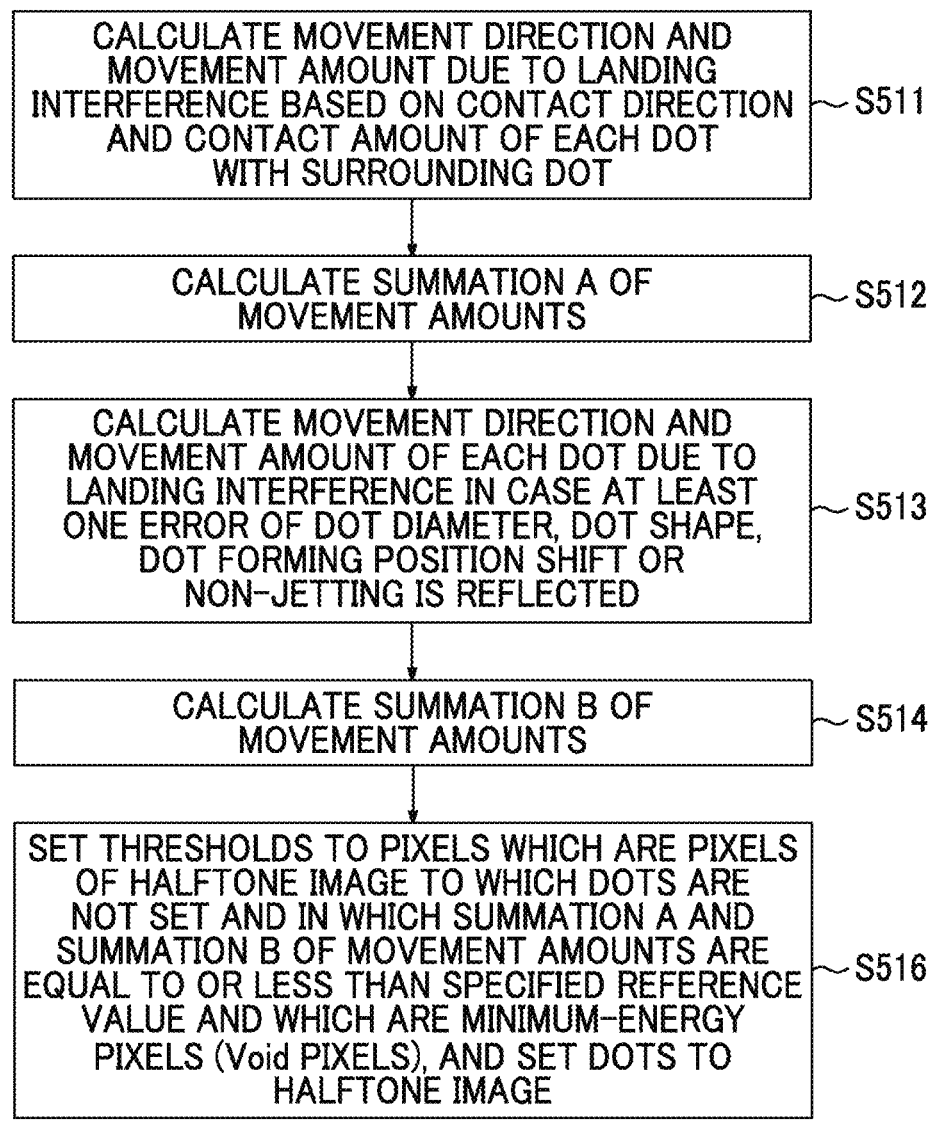
FIG. 70 is a flowchart showing an example of the more detailed processing contents of step S523 and step S524 of FIG. 69.

FIG. 70 is a flowchart showing an example of the more detailed processing contents of step S523 and step S524 of FIG. 69. In the flowchart of FIG. 70, the same steps or similar steps as or to those of the flowchart described in FIG. 65 will be assigned to the same step numbers, and the description thereof will be omitted. The flowchart of FIG. 70 includes the process of step S516 instead of step S515 of the flowchart described in FIG. 65.

Step S511 and step S514 of FIG. 70 correspond to the process of step S523 of FIG. 69, and step S516 of FIG. 70 corresponds to the process of step S524 of FIG. 69.

In step S516 of FIG. 70, the threshold values are set to pixels of which Summation A and Summation B of the movement amounts are respectively equal to or less than the specified reference value and which are the minimum-energy pixels (that is, void pixels) among the pixels of the halftone image in which the dots are not set, and the dots are set to the void pixels of the halftone image.

The flowchart shown in FIG. 70 is the process in a direction in which the threshold values are increased from the initial image, but a method in which the threshold values (that is, gradation values) are decreased from the initial image also follows the known void-and-cluster method. That is, a process of updating the halftone image by regarding the maximum-energy pixels among the pixels to which the dots are set as cluster pixels in which the dots are dense in the energy image acquired by applying the filter to the halftone image, setting the threshold values to the pixels and excluding the dots of the pixels is sequentially repeated.

<Case where Halftone Process Using Direct Binary Search Method is Performed>

Figure 71:
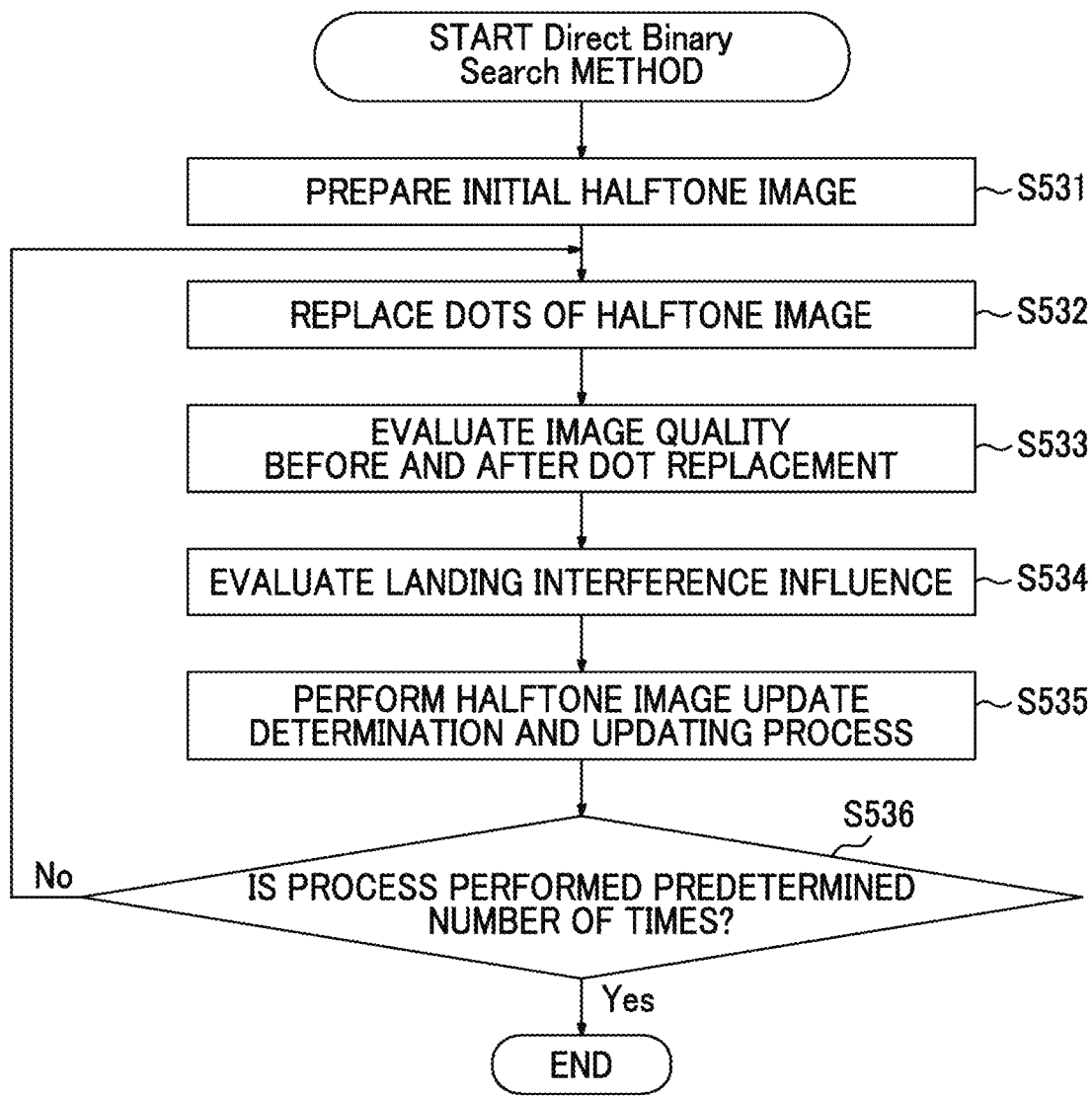
FIG. 71 is a flowchart in a case where the halftone process using the DBS method as an example of means for suppressing image quality deterioration due to the landing interference is performed.

FIG. 71 is a flowchart in a case where the halftone process using the DBS method is performed. The flowchart shown in FIG. 71 may be adopted instead of the flowchart described in FIG. 16.

In the flowchart shown in FIG. 71, an initial halftone image is initially prepared (step S531).

The initial halftone image is separately generated by performing a dither process using the halftone processing rule of the dither method generated in step S14 of FIG. 4 or a simply generated dither mask.

Subsequently, a process of replacing the dots of the halftone image is performed (step S532 of FIG. 71). The image quality is evaluated for the simulation images generated before the dot replacement and after the dot replacement (step S533).

The method of evaluating the image quality of step S533 may adopt the same method as that of step S58 of FIG. 16. It has been described in the flowchart of FIG. 16 that the simulation images are generated using the characteristic parameters related to the characteristics of the printing system when the image quality is evaluated (step S58) (step S56 of FIG. 16).

However, when the image quality is evaluated in the flowchart shown in FIG. 71 (step S533), the generation of the simulation image is not an essential process. That is, the image quality may be evaluated for the halftone image without performing the simulation.

When the image quality is evaluated in step S533, it is assumed that even in a case where the simulation in consideration of the characteristic parameters of the printing system is performed, the simulation related to the influence of the landing interference described in FIG. 11 is not performed as in the example of FIG. 16. This is because the influence of the landing interference is separately evaluated in step S534 of FIG. 71.

Subsequently, the landing interference influence is evaluated (step S534). The halftone image is updated by determining whether or not to update the halftone image based on the evaluating result of the landing interference influence and the evaluating result of the image quality evaluation acquired in step S533 (step S535). The more detailed processing contents of step S534 and step S535 of FIG. 71 are described below.

The steps of step S532 and step S535 are repeated by performing the dot replacement a predetermined number of times according to a preset "pixel updating number of times". That is, in step S536, it is determined whether or not the process of replacing the dots a predetermined number of times is completed. In a case where the process is performed the predetermined number of times, the process proceeds to step S532, and the steps of step S532 to step S535 are repeated. In step S536, in a case where it is determined that the process is performed the predetermined number of times, the process of FIG. 71 is ended.

Figure 72:
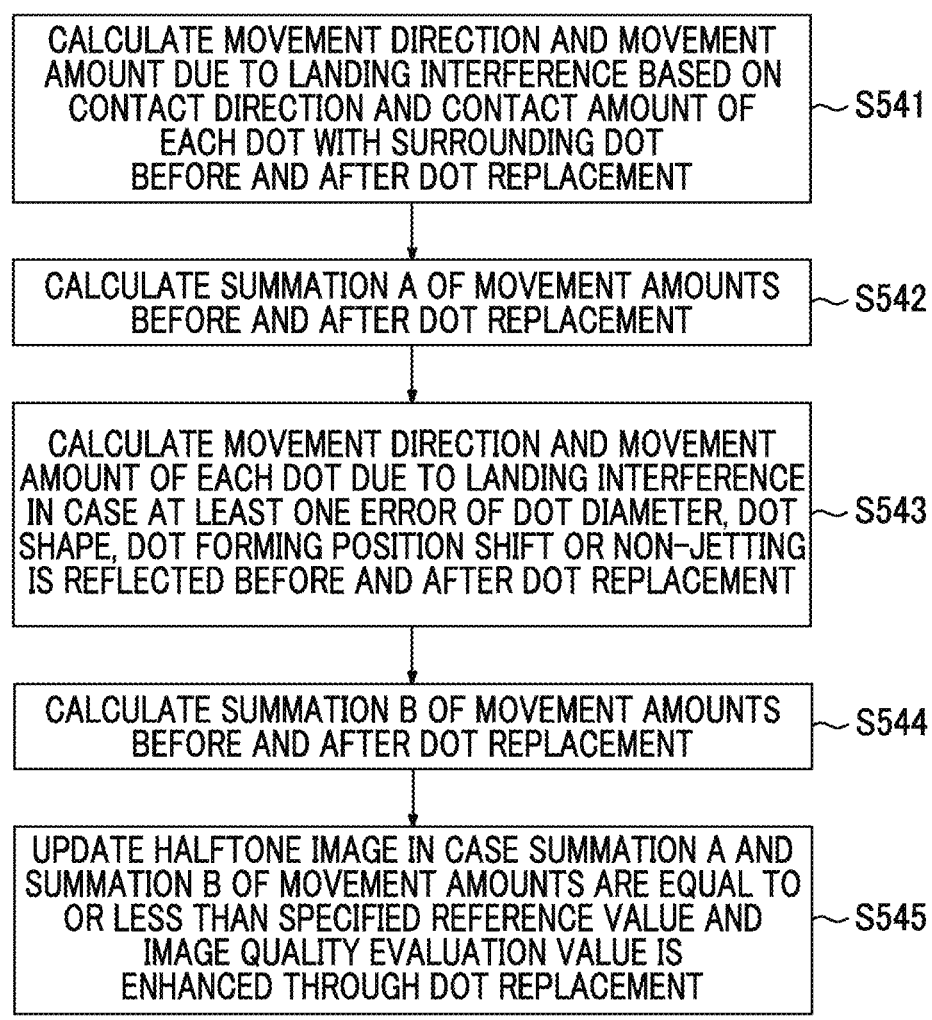
FIG. 72 is a flowchart showing an example of the more detailed processing contents of step S534 and step S535 of FIG. 71.

FIG. 72 is a flowchart showing an example of the more detailed processing contents of step S534 and step S535 of FIG. 71. Step S541 to step S544 of FIG. 72 correspond to the process of step S534 of FIG. 71, and step S545 of FIG. 72 corresponds to the process of step S535 of FIG. 71.

In step S541 of FIG. 72, the movement direction and the movement amount due to the landing interference are calculated based on the contact direction and contact amount of each dot with the surrounding dot for each dot before the dot replacement and after the dot replacement.

Summation A of the movement amounts due to the landing interference is calculated for each dot before the dot replacement and after the dot replacement (step S542). The method of calculating the movement amount of each dot due to the landing interference and the method of calculating Summation A of the movement amounts are the same as those of step S511 and step S512 of FIG. 65 and the example described in FIG. 66.

Among Summations A acquired in step S542 of FIG. 72, the summation of the movement amounts due to the landing interference before the dot replacement is described as "Summation $A_1$", and the summation of the movement amounts due to the landing interference after the dot replacement is described as "Summation $A_2$".

Subsequently, the movement direction and the movement amount due to the landing interference are calculated for each dot of the dot arrangement that reflects at least one error of the dot diameter, the dot shape, the dot forming position shift or the non-jetting of each dot before the dot replacement and after the dot replacement (step S543 of FIG. 72).

Summation B of the movement amounts due to the landing interference is calculated for each dot before the dot replacement and after the dot replacement (step S544). The method of calculating the movement amount of each dot due to the landing interference in a case where the error is reflected and the method of calculating Summation B of the movement amounts are the same as step S513 and step S514 of FIG. 65 and the example described in FIG. 67.

Among Summations B acquired in step S544 of FIG. 72, the summation of the movement amounts due to the landing interference before the dot replacement is described as "Summation $B_1$", and the summation of the movement amounts due to the landing interference after the dot replacement is described as "Summation $B_2$".

The process proceeds to step S545 after step S544 of FIG. 72. Step S545 includes a determining process of determining whether or not to update the halftone image, and an updating process based on the determining result. That is, in step S545, a process of respectively comparing Summation A and Summation B of the movement amounts calculated by replacing the dots with the specified reference value and updating the halftone image in a case where summation A and Summation B are respectively equal to or less than the specified reference value and the image quality evaluation value calculated in step S533 of FIG. 71 is enhanced before and after the dot replacement is performed.

That is, in step S545 of FIG. 72, it is determined whether or not to update the halftone image by combining Summation A2 and Summation B2 of the movement amounts due to the landing interference after the dot replacement and the image quality evaluation value calculated in step S533 of FIG. 71.

The "halftone image being updated" means that the halftone image is updated by adopting the dot arrangement state in which the dots are replaced by performing the dot replacement in step S532 of FIG. 71.

Through the process shown in FIGS. 71 and 72, it is possible to generate the halftone image in which the dot movement amount due to the influence of the landing interference is small.

The "dot movement amount being small" means that the degree of influence of the dot movement is equal to or less than the degree of influence of the dot movement represented as the specified reference value.

According to the configuration described in FIGS. 71 and 72, it is possible to generate the halftone image such that the dot arrangement falls in the allowable range represented as the specified reference value based on the comparing result of the process of respectively comparing Summation $A_2$ and Summation $B_2$ of the movement amounts which are the landing interference evaluation values with the specified reference value.

The halftone process described in FIGS. 71 and 72 may be performed by the halftone processing unit 80 shown in FIG. 68. The halftone image 550 as a target on which the landing interference influence evaluation in this case is performed is the dot image generated during the process performed by the halftone processing unit 80, and is the initial image described in step S531 of FIG. 71, the image after the dot replacement in step S532, or the updated halftone image that is updated in step S535. The halftone processing unit 80 (see FIG. 68) that performs the halftone process described in FIGS. 71 and 72 performs the updating process on the halftone image using the DBS method in cooperation with the landing-interference-influence evaluation unit 536.

In such a configuration, the halftone processing unit 80 (see FIG. 68) corresponds to one example of "signal processing means", and the step of causing the halftone processing unit 80 to generate the halftone image corresponds to one example of a "signal processing step". The processing function of the halftone processing unit 80 corresponds to one example of a "signal processing function".

The processing content of the image processing device 20 according to the embodiment described in FIGS. 64 to 72 described above may be comprehended as an image processing method.

Specific Modification Example described in FIGS. 64 to 72

Modification Example 1

In the description of FIGS. 64 to 72, the example in which the movement amount of the dot movement due to the landing interference is calculated based on the information indicating the contact direction and contact amount of each dot has been described. However, the movement amount of the dot movement due to the landing interference is treated to be approximately proportional to the contact amount of the dot, and thus, it is possible to directly calculate the "landing interference evaluation value for evaluating the degree of influence of the dot movement due to the landing interference" from the contact direction and the contact amount.

Figure 73:
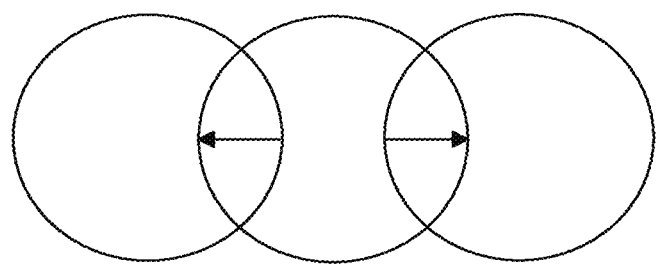
FIG. 73 is an explanatory diagram in a case where a landing interference evaluation value is acquired from a contact direction and a contact amount of a dot.

For example, in the example of the dot arrangement shown in FIG. 73, a central dot is paid attention to, the contact directions and the contact amounts of the central dot with left and right dots are depicted by arrows of FIG. 73. The directions indicated by the arrows represent the contact directions, and the lengths of the arrows represent the contact amounts. The dot arrangement shown in FIG. 73 corresponds to the arrangement form of Dot 1, Dot 2 and Dot 3 described in FIG. 66.

In the contact state shown in FIG. 73, it can be seen that even though the movement amount due to the landing interference is not calculated, since the sum of vectors depicted by two illustrated arrows is "0", the landing interference movement amount is "0". Even though the calculation of the movement vector described in FIG. 66 is not performed, it is possible to calculate the "landing interference evaluation value" from the summation of vectors indicating the contact directions and the contact amounts with the surrounding dots.

Accordingly, it is possible to omit the "dot-movement-amount calculation unit 534" described in FIG. 68.

Modification Example 2

It has been described in each flowchart of FIGS. 65, 70 and 72 that the influence of the dot movement due to the landing interference is suppressed in a case where the predetermined error is reflected in addition to the case where the predetermined error which is at least one error of the dot diameter, the dot shape, the dot forming position shift or the non-jetting is not reflected.

However, when the invention is implemented, the present invention is not limited to such a configuration, and the halftone design or the halftone process may be performed such that the influence of the dot movement due to the landing interference only in a case where the predetermined error may be not reflected or only in a case where the predetermined error is reflected is suppressed. In order to suppress the influence of the dot movement due to the landing interference in a case the predetermined error is not reflected, Summation A may be equal to or less than the specified reference value.

In order to suppress the influence of the dot movement due to the landing interference in a case the predetermined error is reflected, Summation B may be equal to or less than the specified reference value.

The influence of the dot movement due to the landing interference in a case where the predetermined error is reflected is suppressed, and thus, it is possible to perform the halftone design or the halftone process in which the image quality is favorable in a state in which the predetermined error is added or a deterioration in image quality is less (that is, there is the tolerance to the error) even though the predetermined error is added.

Modification Example 3

It is preferable that the kind of the image as the target on which the image quality evaluation is performed in a case where the image quality evaluation is performed without performing the simulation related to the landing interference in step S503 of FIG. 64 is the same as the kind of the image as the target on which the landing interference is performed in step S504. That is, it is preferable that it is determined whether or not to reflect the dot diameter, the dot shape, the dot forming position shift, the dot density, and various other errors on the evaluating target images and the kinds and amounts of the errors to be reflected are the same between the target image for evaluating the image quality and the target image for evaluating the landing interference influence in a case where it is determined to reflect the errors on the evaluating target image.

Similarly, it is preferable that the kind of the image to which the filter is applied without performing the simulation related to the landing interference in step S522 of FIG. 69 is the same as the kind of the evaluating target image of the landing interference influence in step S523.

That is, it is preferable that it is determined whether or not to reflect the dot diameter, the dot shape, the dot forming position shift, the dot density, and other various errors on the image acquired by applying the filter without performing the simulation related to the landing interference and the target image for evaluating the landing interference influence and the kinds and amounts of the reflected errors are the same between these images in a case where it is determined to reflect the errors on these images.

Similarly, it is preferable that the kind of the evaluating target image of the image quality in a case where the image quality evaluation is performed without performing the simulation related to the landing interference in step S533 of FIG. 71 is the same as the kind of the evaluating target image of the landing interference influence in step S534.

Modification Example 4

The updating reference of the halftone parameter of step S505 of FIG. 64 or the updating reference of the halftone image of step S524 of FIG. 69 or the step S535 of FIG. 71 is not limited to the updating reference shown in step S515 of FIG. 65, step S516 of FIG. 70 or step S545 of FIG. 72, and various updating references may be determined.

For example, the updating reference may be a "case where the image quality evaluation value or the energy is equal to or less than a predetermined reference value for a determination reference and the landing interference movement amount summation is enhanced" or a "case where a weighted sum of the image quality evaluation value or the energy and the landing interference movement amount summation is enhanced". The "energy" mentioned herein corresponds to the image quality evaluation value of the energy image acquired by applying the filter such as a Gaussian filter to the dot image.

The "landing interference movement amount summation" corresponds to one example of a "landing interference evaluation value". The "landing interference movement amount summation" may be "Summation A" and "Summation B" described in FIG. 65, 70 or 72, or may be a weighted summation of Summation A and Summation B.

The "case where the landing interference movement amount summation is enhanced" means that an increase/decrease tendency indicating whether the value of the landing interference movement amount summation is increased or decreased is comprehended, and it is determined that the "landing interference movement amount summation is enhanced" in a case where the landing interference movement amount summation is decreased. When it is determined whether or not the landing interference movement amount summation is enhanced, since it is comprehended whether the landing interference movement amount summation is increased or decreased by comparing the value of the landing interference movement amount summation, a comparison process of comparing the landing interference movement amount summation is included. The determining result of whether or not the landing interference movement amount summation is enhanced is based on the "comparing result" of the comparison process.

The "weighted sum of the image quality evaluation value or the energy and the landing interference movement amount summation" corresponds to one example of an "evaluation value generated based on the landing interference evaluation value".

Modification Example 5

In a case where a predetermined error (however, an error other than the non-jetting is used.) is reflected on the dot arrangement of the halftone image, since the landing interference movement amount of the dot group on which the error is reflected is greatly changed unlike a case where the error is not reflected in most cases, the landing interference movement amount of only the dot group on which the error is reflected may be evaluated. That is, in the example of FIG. 67, the summation of the landing interference movement amounts of Dot 2 and Dot 5 may be calculated as the landing interference movement amount summation in a case where the error of the dot forming position shift is reflected.

"Each dot of the plurality of pixels" in a case where the landing interference movement amount which is the movement amount of the dot movement due to the landing interference is not limited to an aspect in which all the dots included in the dot image are used as targets, and some dots of all the dots included in the dot image may be used as targets like an aspect in which only the dot group to which the error is added is used as a target.

Modification Example 6

In a case where the dot forming position shift as the predetermined error is reflected, since the landing interference movement amount in a direction parallel to the direction to which the error is added is greatly changed in most cases, the landing interference movement amount in only the direction parallel to the direction to which the error is added may be evaluated. In this case, for only the dots in contact in the direction to which the error is added, that is, only the dots including the dot movement in only the movement direction parallel to the direction to which the error is added, the summation of the landing interference movement amounts may be calculated, or the summation of the landing interference movement amounts projected in a line in the direction parallel to the direction to which the error is added may be calculated.

In the example shown in FIG. 67, the dots in contact in the direction to which the error is added, that is, the dots including the dot movement in only the movement direction parallel to the direction to which the error is added are Dot 1, Dot 2 and Dot 3. Accordingly, as the landing interference movement amount summation, the summation of the movement amounts of the dot movement due to Dot 1, Dot 2 and Dot 3 to the landing interference may be calculated.

Modification Example 7

In both the single path type ink jet printing system and the serial type ink jet printing system, in a case where the predetermined error is added, the dot movement in a direction perpendicular to the scanning direction on the paper greatly contributes to the occurrence of the streak. The "scanning direction" refers to a direction in which the dots are continuously jetted from the same nozzle. The "scanning direction" in the single path type is the paper transport direction, and the "scanning direction" in the serial type is the movement direction of the head due to the carriage.

The "direction perpendicular to the scanning direction" in the single path type refers to a direction perpendicular to the paper transport direction, that is, the main scanning direction which is the direction perpendicular to the sub scanning direction parallel to the paper transport direction.

The "direction perpendicular to the scanning direction" in the serial type refers to a direction perpendicular to the movement direction of the head due to the carriage, that is, the sub scanning direction which is the direction perpendicular to the main scanning direction parallel to the movement direction of the head due to the carriage.

Accordingly, in a case where the influence of the landing interference in a state in which the predetermined error is added is evaluated, the movement amount of the dot movement in only the direction perpendicular to the scanning direction may be evaluated. In this case, for only the dots in contact in the direction perpendicular to the scanning direction, that is, only the dots including the movement in only the direction perpendicular to the scanning direction, the summation of the landing interference movement amounts may be calculated, or the summation of the landing interference movement amounts projected in line in the direction perpendicular to the scanning direction may be calculated.

In the example of FIG. 67, the "dots including the movement in only the direction perpendicular to the scanning direction" are Dot 1, Dot 2 and Dot 3. In FIG. 67, the direction to which the error is added due to the dot forming position shift is a direction parallel to the X direction, and the scanning direction is the Y direction. Accordingly, both the direction to which the error is added and the direction perpendicular to the scanning direction are equal to the direction parallel to the X direction.

[Another Specific Example of Means for Applying Tolerance to Landing Interference]

Hereinafter, another specific example of the configuration in which the halftone design or the halftone process of suppressing the image quality deterioration due to the landing interference is realized will be described.

Here, the processing content of the halftone design or the halftone process in which the change (that is, the change of the influence of the landing interference) of the dot movement due to the landing interference before and after the error reflection is estimated based on the contact direction and the contact amount of each dot with the surrounding dot and the change of the dot movement before and after the error reflection due to the landing interference is decreased will be described. Through the halftone design or the halftone process, the tolerance to the error is exhibited, and thus, the halftone image in which even though the landing interference occurs, the image quality deterioration due to the influence thereof is relatively low is acquired.

<Application Example to Process of Generating Halftone Parameter in Dither Method or Error Diffusion Method>

Figure 74:
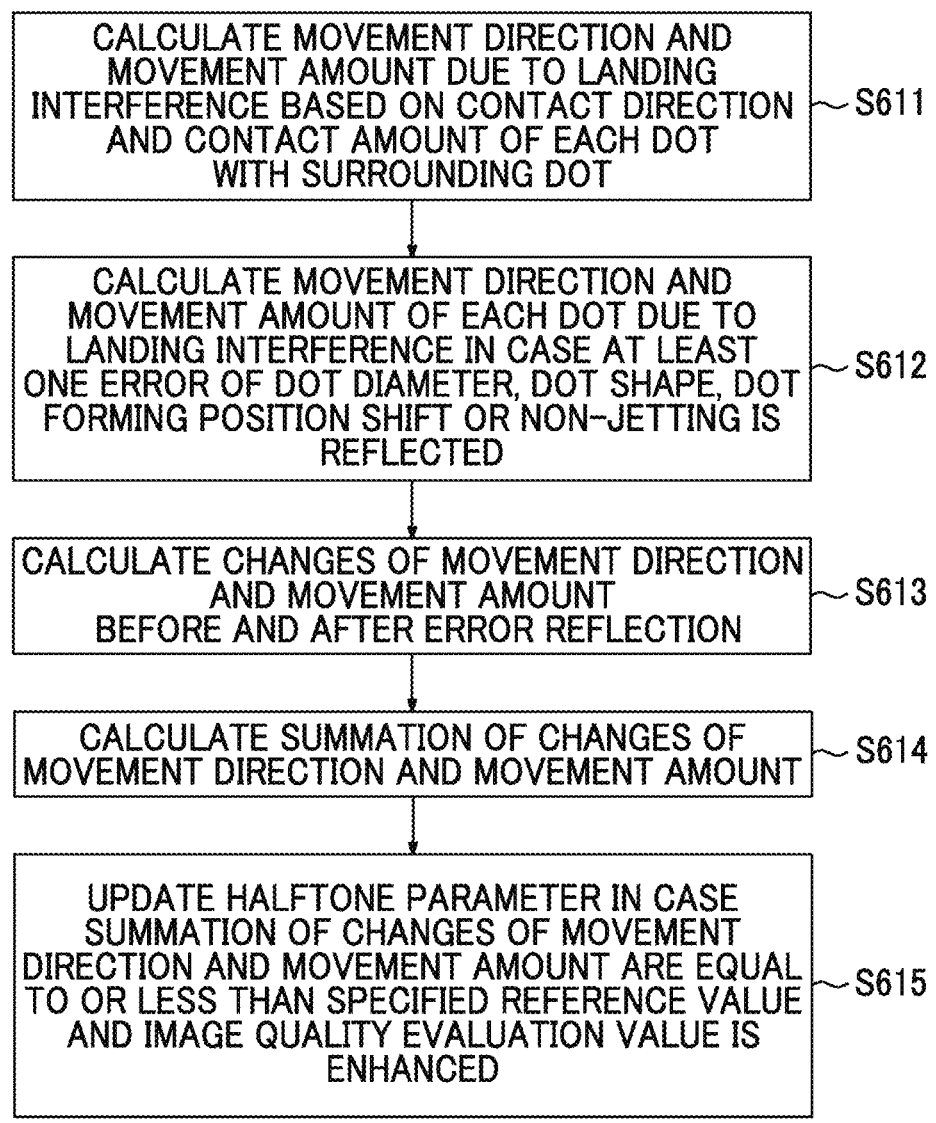
FIG. 74 is a flowchart showing another example of the more detailed processing contents of step S504 and step S505 of FIG. 64.

FIG. 74 is a flowchart showing another example of the more detailed processing contents of step S504 and step S505 of FIG. 64.

Step S611 to step S614 of FIG. 74 correspond to the process of step S504 of FIG. 64, and step S615 of FIG. 74 corresponds to the process of step S505 of FIG. 64.

As shown in FIG. 74, the movement direction and the movement amount due to the landing interference are calculated based on the contact direction and the contact amount of each dot of the plurality of dots included in the halftone image with the surrounding dot (step S611). The method described in FIG. 66 may be applied to the method of calculating the movement direction and the movement amount of the dot movement due to the landing interference. As described in FIG. 66, the movement direction and the movement amount due to the landing interference may be acquired from the contact direction and the contact amount of each dot of the halftone image with the surrounding dot (step S611 of FIG. 74).

Subsequently, the movement direction and the movement amount of each dot in the dot arrangement on which at least one error of the dot diameter, the dot shape, the dot forming position shift or the non-jetting is reflected due to the landing interference are calculated (step S612 of FIG. 74). The method described in FIG. 67 may be applied to the method of calculating the movement direction and the movement amount of each dot in the dot arrangement on which the error is reflected due to the landing interference. As described in FIG. 67, the movement direction and the movement amount due to the landing interference may be acquired from the contact direction and the contact amount of each dot of the halftone image in a state in which the predetermined error is added with the surrounding dot (step S612 of FIG. 74).

Subsequently, the changes of the movement direction and the movement amount before and after the error reflection are calculated (step S613). The movement direction and the movement amount before the error reflection are calculated by step S611. The movement direction and the movement amount after the error reflection are calculated by step S612.

Figure 75:
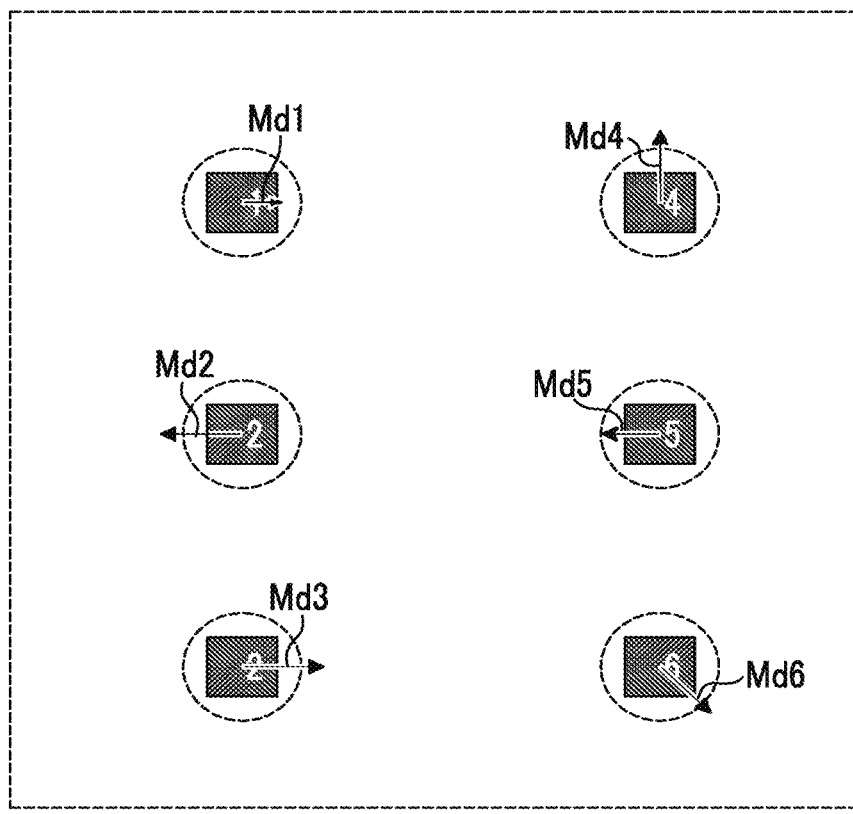
FIG. 75 is an explanatory diagram for describing a method of calculating changes of the movement direction and the movement amount before and after the error of the dot forming position shift shown in FIGS. 66 and 67 is reflected.

FIG. 75 is an explanatory diagram for describing the method of calculating the changes of the movement direction and the movement amount before and after the error of the dot forming position shift shown in FIGS. 66 and 67 is reflected.

The changes of the movement direction and the movement amount of each dot of Dot 1 to Dot 6 described in FIGS. 66 and 67 before and after the error reflection are as shown in FIG. 75. FIG. 66 corresponds to the state before the error reflection, and FIG. 67 corresponds to the state after the error reflection.

In FIG. 75, a change vector indicating the changes of the movement direction and the movement amount before and after the error reflection on each dot is described as "Mdi". A suffix i is an integer indicating the dot number. In the example of FIG. 75, i=1, 2, 3, . . . , and 6.

The changes of the movement direction and the movement amount before and after the error reflection on each dot may be calculated as a difference between a before-error-reflection movement vector indicating the movement direction and the movement amount before the error reflection and an after-error-reflection movement vector indicating the movement direction and the movement amount after the error reflection.

In a case where the before-error-reflection movement vector of Dot i is described as Mvi and the after-error-reflection movement vector thereof is described as Mei, the change vector Mdi of Dot i before and after the error is reflected may be calculated by the expression of Mdi=Mei−Mvi.

The change vector Md1 indicating the changes of the movement direction and the movement mount of Dot 1 before and after the error reflection may be calculated by Md1=Me12−Mv12 as a difference between the after-error-reflection movement vector Me12 shown in FIG. 67 and the before-error-reflection movement vector Mv12 shown in FIG. 66.

Similarly, the change vector Md2 of Dot 2 may be calculated by Md2=Me2−Mv2. The change vector Md3 of Dot 3 may be calculated by Md3=Me32−Mv32. The change vector Md4 of Dot 4 may be calculated by Md4=Me45−Mv45. The change vector Md5 of Dot 5 may be calculated by Md5=Me54−Mv5. The change vector Md6 of Dot 6 may be calculated by Md6=Me6−Mv65.

By doing this, the changes of the movement direction and the movement amount of each dot before and after the error reflection are calculated (step S613 of FIG. 74), and the summation of changes of the movement direction and the movement amount before and after the error reflection is calculated (step S614). The summation of the changes of the movement direction and the movement amount before and after the error reflection calculated in step S614 is the summation of the absolute values of the changes of the movement direction and the movement amount of each dot before and after the error reflection.

In FIG. 75, the summation of the changes of the movement direction and the movement amount before and after the error is reflected may be expressed by summation=|Md1|+|Md2|+|Md3|+|Md4|+|Md5|+|Md6|.

The "summation of the changes of the movement direction and the movement amount" calculated in step S614 corresponds to one example of a "landing interference evaluation value". The summation of the changes of the movement direction and the movement amount is an evaluation value acquired by adding the changes of the movement direction and the movement amount of each dot, and is an index indicating the degree of change of the influence of the dot movement due to the landing interference before and after the error reflection. The influence of the landing interference is quantified as a value by the summation of the changes.

The process proceeds to step S615 after step S614 of FIG. 74. Step S615 includes a determining process of determining whether or not to update the halftone parameter, and an updating process based on the determining result. That is, in step S615, a process of comparing the summations of the changes of the movement direction and the movement amount with the specified reference value and updating the halftone parameter in a case where the summations of the changes of the movement direction and the movement amount are equal to or less than the specified reference value and the image quality evaluation value acquired in step S503 of FIG. 64 is enhanced is performed.

The process of comparing the summation of the changes of the movement direction and the movement amount with the specified reference value corresponds to one example of a "comparison process". The determination of whether or not the summation of the changes of the movement direction and the movement amount is equal to or less than the specified reference value is based on the "comparing result" of the comparison process.

The specified reference value is a value that determines an allowable upper limit of the change of the influence of the dot movement due to the landing interference, and is previously determined in a range in which the image quality deterioration due to the landing interference falls in an allowable level. A case where the summation of the changes of the movement direction and the movement amount is equal to or less than the specified reference value means that the change of the influence of the dot movement due to the landing interference is equal to or less than the change of the influence of the dot movement represented by the reference value.

In step S615 of FIG. 74, it is determined whether or not to update the halftone parameter by combining the summation of the changes of the movement direction and the movement amount with the image quality evaluation value acquired in step S503 of FIG. 64.

The "halftone parameter being updated" means that the halftone parameter is updated by adopting the halftone parameter temporarily set in step S501 of FIG. 64.

According to the configuration described in FIGS. 64, 66, 67, 74 and 75, it is possible to generate the halftone parameter which is the dot arrangement falling within the allowable range represented by the specified reference value based on the comparing result of the process of comparing the summation of the movement direction and the movement amount which is the landing interference evaluation value with the specified reference value.

Figure 76:
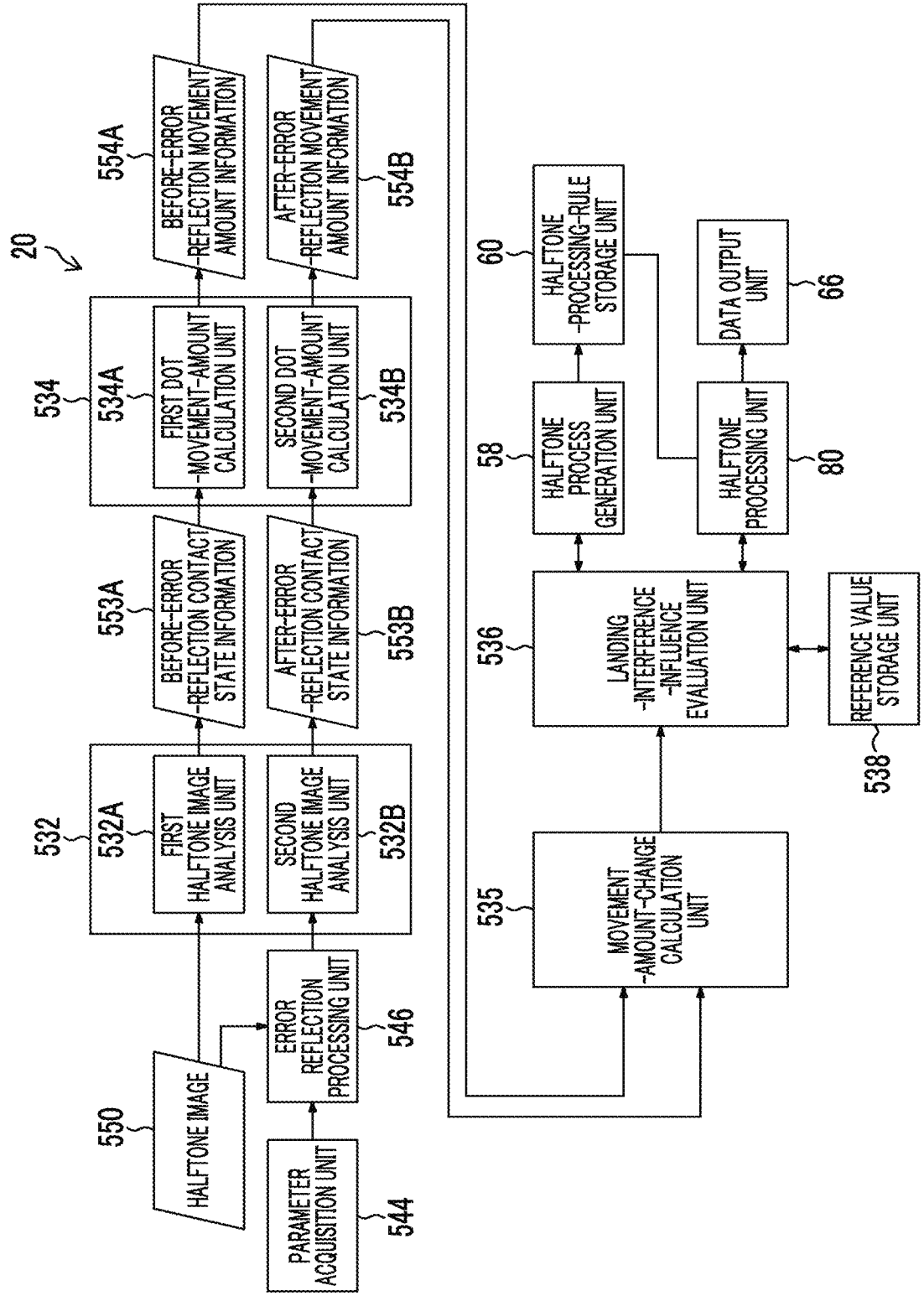
FIG. 76 is a block diagram of major parts for describing the function of an image processing device according to an eleventh embodiment.

FIG. 76 is a block diagram of major parts for describing the function of an image processing device according to an eleventh embodiment. In FIG. 76, the same or similar elements as or to those of the configuration described in FIG. 3 will be assigned to the same reference numerals, and the description thereof will be omitted.

The image processing device 20 according to the eleventh embodiment shown in FIG. 76 has functions of performing the processes described in FIGS. 64, 66, 67, 74 and 75. That is, the image processing device 20 shown in FIG. 76 includes a halftone image analysis unit 532, a dot-movement-amount calculation unit 534, a movement-amount-change calculation unit 535, a landing-interference-influence evaluation unit 536, a reference value storage unit 538, a parameter acquisition unit 544, and an error reflection processing unit 546. The image processing device 20 includes a halftone process generation unit 58, a halftone-processing-rule storage unit 60, a halftone processing unit 80, and a data output unit 66.

The parameter acquisition unit 544 is means for acquiring a parameter indicating at least one error of the dot diameter, the dot shape, the dot forming position shift or the non-jetting. In the example described in FIG. 40, the parameters indicating a dot forming position shift direction and a dot forming position shift amount related to the errors of the dot forming position shift are acquired. The parameter acquisition unit 544 may be a user interface, may be a communication interface or a data reception terminal that receives parameter information retained in an external storage medium or within the device, or may be an appropriate combination thereof.

The error reflection processing unit 546 performs a process of generating the arrangement of dots that reflect the error represented by the parameters acquired from the parameter acquisition unit 544.

The error reflection processing unit 546 reflects the errors represented by the parameters acquired from the parameter acquisition unit 544 on the data of the halftone image 550, and generates a dot image indicating a dot arrangement state after the error reflection. In the example described in FIG. 67, the error reflection processing unit 546 generates data of the dot arrangement to which the error due to the dot forming position shift is added.

The halftone image 550 is the dot image generated during the process of causing the halftone process generation unit 58 to determine the halftone parameter. The halftone image 550 is generated in the process of step S502 of FIG. 64. The halftone image 550 corresponds to one example of "first dot arrangement" which is the dot arrangement before the error is reflected.

The error reflection processing unit 546 corresponds to one example of "error reflection processing means". The step of causing the error reflection processing unit 546 to add the error to the dot of the halftone image 550 and to generate the arrangement of the dots that reflect the errors corresponds to one example of an "error reflection processing step". The dot image generated by reflecting the error on the halftone image 550 by the error reflection processing unit 546 corresponds to one example of "second dot arrangement".

The halftone image analysis unit 532 includes a first halftone image analysis unit 532A, and a second halftone image analysis unit 532B. The first halftone image analysis unit 532A analyzes the data of the halftone image 550 which is the dot image before the error is reflected by the error reflection processing unit 546, and generates before-error-reflection contact state information 553A. The before-error-reflection contact state information 553A is information indicating the contact direction and contact amount of the dot as information depending on the contact state of the dots of the halftone image 550. That is, the first halftone image analysis unit 532A analyzes the contact direction and contact amount of each of the plurality of dots of the halftone image 550 with the surrounding dot which is another dot.

The first halftone image analysis unit 532A corresponds to one example of "first information generation means", and corresponds to one example of "first analysis means". The before-error-reflection contact state information 553A acquired by the first halftone image analysis unit 532A corresponds to one example of "first contact state information", and corresponds to "first information". The step of causing the first halftone image analysis unit 532A to generate the before-error-reflection contact state information 553A corresponds to one example of a "first information generation step".

The second halftone image analysis unit 532B analyzes the data of the halftone image after the error is reflected on the halftone image 550 by the error reflection processing unit 546, and generates the after-error-reflection contact state information 553B. The after-error-reflection contact state information 553B is information indicating the contact direction and the contact amount of the dot as information depending on the contact state of the dots of the halftone image after the error reflection. That is, the second halftone image analysis unit 532B analyzes the contact direction and the contact amount of each dot of the plurality of dots of the dot image after the error reflection by the error reflection processing unit 546 with the surrounding dot which is another dot.

The second halftone image analysis unit 532B corresponds to one example of "second information generation means", and corresponds to one example of "second analysis means". The after-error-reflection contact state information 553B acquired by the second halftone image analysis unit 532B corresponds to one example of "second contact state information", and corresponds to one example of "second information". The step of causing the second halftone image analysis unit 532B to generate the after-error-reflection contact state information 553B corresponds to one example of a "second information generation step".

The halftone image analysis unit 532 may analyze the contact direction and the contact amount for the halftone image 550 before the error is reflected by the error reflection processing unit 546 and the after-error-reflection halftone image after the error is reflected on the halftone image 550 by the error reflection processing unit 546.

The dot-movement-amount calculation unit 534 includes a first dot-movement-amount calculation unit 534A, and a second dot-movement-amount calculation unit 534B. The first dot-movement-amount calculation unit 534A calculates the movement direction and the movement amount of the dot movement of each dot due to the landing interference based on the information of the contact direction and the contact amount which is the before-error-reflection contact state information 553A acquired from the first halftone image analysis unit 532A. The information indicating the movement direction and the movement amount of the dot movement of each dot before the error reflection due to the landing interference calculated by the first dot-movement-amount calculation unit 534A is referred to as before-error-reflection movement amount information 554A. The first dot-movement-amount calculation unit 534A corresponds to one example of "first movement amount calculation means". The before-error-reflection movement amount information 554A acquired from the first dot-movement-amount calculation unit 534A corresponds to one example of "first movement amount information.

The second dot-movement-amount calculation unit 534B calculates the movement direction and the movement amount of the dot movement of each dot due to the landing interference based on the information of the contact direction and the contact amount which is the after-error-reflection contact state information 553B acquired from the second halftone image analysis unit 532B. The information indicating the movement direction and the movement amount of the dot movement of each dot after the error reflection due to the landing interference calculated by the second dot-movement-amount calculation unit 534B is referred to as after-error-reflection movement amount information 554B. The second dot-movement-amount calculation unit 534B corresponds to one example of "second movement amount calculation means. The after-error-reflection movement amount information 554B acquired from the second dot-movement-amount calculation unit 534B corresponds to one example of "second movement amount information".

The process of step S611 of FIG. 74 is performed by the first halftone image analysis unit 532A and the first dot-movement-amount calculation unit 534A. The process of step S612 of FIG. 74 is performed by combining the error reflection processing unit 546, the second halftone image analysis unit 532B and the second dot-movement-amount calculation unit 534B.

The movement-amount-change calculation unit 535 calculates the change of the movement direction and the movement amount of the dot movement due to the landing interference after the error reflection based on the before-error-reflection movement amount information 554A and the after-error-reflection movement amount information 554B. The process of step S613 of FIG. 74 is performed by the movement-amount-change calculation unit 535.

The landing-interference-influence evaluation unit 536 calculates landing interference evaluation values for quantitatively evaluating the change of the influence of the dot movement due to the landing interference before and after the error is reflected from the information indicating the changes of the movement direction and the movement amount acquired by the movement-amount-change calculation unit 535. The landing-interference-influence evaluation unit 536 of the present example calculates the summation of the changes of the movement direction and the movement amount described in step S614 of FIG. 74. The landing-interference-influence evaluation unit 536 corresponds to one example of "landing-interference-influence evaluation means". The step of causing the landing-interference-influence evaluation unit 536 to calculate the landing interference evaluation value corresponds to one example of a "landing interference evaluation step".

The reference value storage unit 538 is storage means for storing information of the specified reference value described in step S615 of FIG. 74. The landing-interference-influence evaluation unit 536 compares the summation of the changes of the movement direction and the movement amount as the calculated landing interference evaluation values with the specified reference value, and determines the degree of influence of the dot movement due to the landing interference.

The halftone process generation unit 58 generates the halftone processing rule in cooperation with the landing-interference-influence evaluation unit 536.

The process of step S615 of FIG. 74 is performed by the landing-interference-influence evaluation unit 536 and the halftone process generation unit 58.

In such a configuration, the halftone process generation unit 58 (see FIG. 76) corresponds to one example of "signal processing means", and the step of causing the halftone process generation unit 58 to generate the halftone parameter corresponds to one example of a "signal processing step".

In addition to the configuration described in FIG. 76, the image processing device 20 of FIG. 76 may have the same configuration as that of the image quality evaluation processing unit 74 or the halftone-selection-chart generation unit 76 described in FIG. 3.

<Case of Error Diffusion Method>

The flowchart of FIG. 64 may be applied to the generation of the halftone parameter of the error diffusion method. Similarly to the example described in FIG. 10, the flowchart of FIG. 64 is repeated for all the applied gradation sections, and thus, a diffusion coefficient of the error diffusion matrix of each applied gradation section is determined.

That is, the average value of the evaluation values for each gradation is used as an image quality evaluation value by temporarily setting the diffusion coefficient of the error diffusion matrix applied to a certain gradation section for the gradation section (step S501 of FIG. 64), performing the halftone process on the input image (a uniform image of a single gradation) having each gradation in the gradation section (step S502 of FIG. 64) and evaluating the image quality of the halftone image (step S503). The image quality evaluation (step S503) is performed similarly to the case of the dither method.

The evaluation (step S504) of the landing interference influence and the halftone parameter update determining and updating process (step S505) are performed similarly to those in the dither method.

<Case where Void-and-Cluster Method is Applied to Dither Method>

Figure 77:
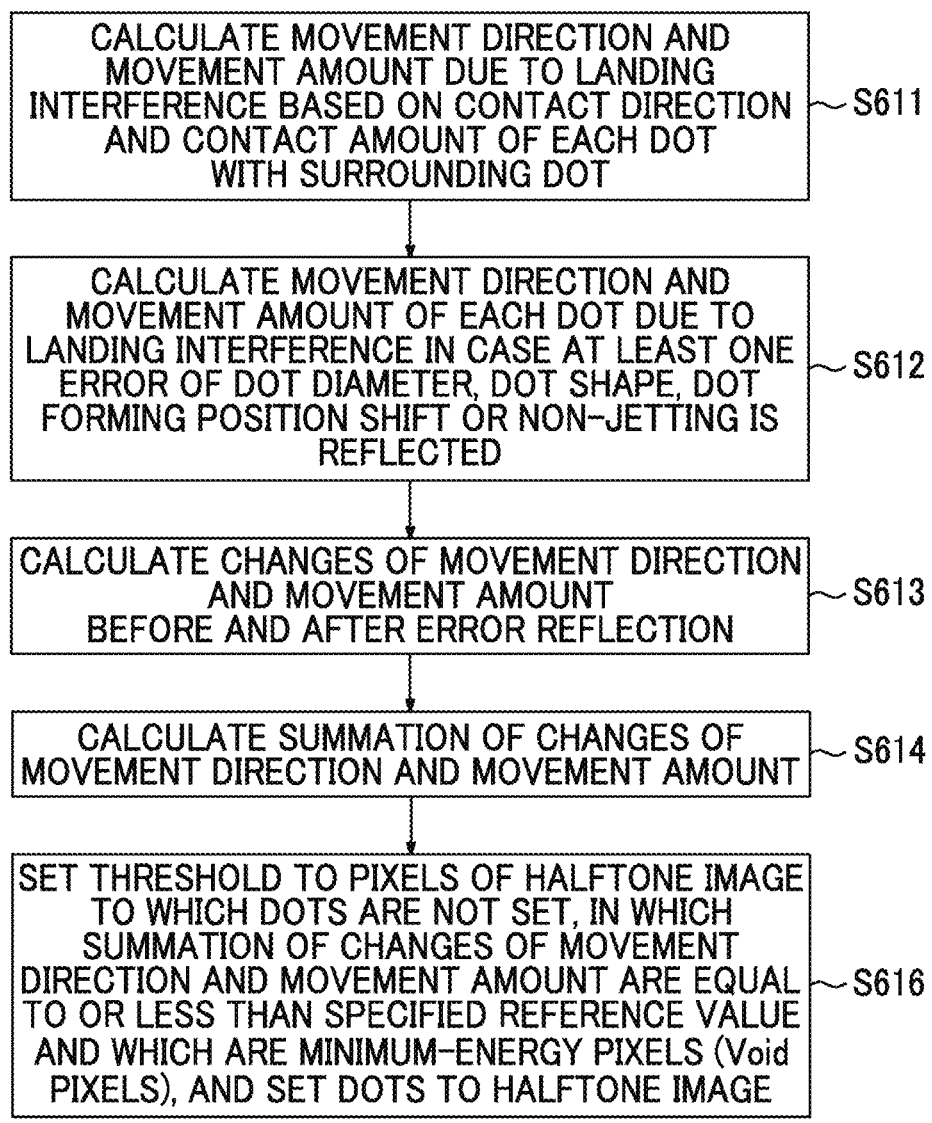
FIG. 77 is a flowchart showing another example of the more detailed processing content of step S523 and step S524 of FIG. 69.

FIG. 77 is a flowchart showing an example of the more detailed processing content of step S523 and step S524 of FIG. 69. In the flowchart of FIG. 77, the same or similar steps as or to the steps of the flowchart described in FIG. 74 will be assigned the same step numbers, and the description thereof will be omitted. The flowchart of FIG. 77 includes the process of step S616 instead of step S615 of the flowchart described in FIG. 77.

Step S611 to step S614 of FIG. 77 correspond to step S523 of FIG. 69, and step S616 of FIG. 77 corresponds to the process of step S524 of FIG. 69.

In step S616 of FIG. 77, the threshold values are set to pixels of which the summation of the changes of the contact state is equal to or less than the specified reference value and which are the minimum-energy pixels (that is, void pixels) among the pixels of the halftone image in which the dots are not set, and the dots are set to the void pixels of the halftone image.

The flowchart shown in FIG. 77 is the process in a direction in which the threshold values are increased from the initial image, but a method in which the threshold values (that is, gradation values) are decreased from the initial image also follows the known void-and-cluster method. That is, a process of updating the halftone image by regarding the maximum-energy pixels among the pixels to which the dots are set as cluster pixels in which the dots are dense in the energy image acquired by applying the filter to the halftone image, setting the threshold values to the pixels and excluding the dots of the pixels is sequentially repeated.

<Case where Halftone Process Using Direct Binary Research Method is Performed>

Figure 78:
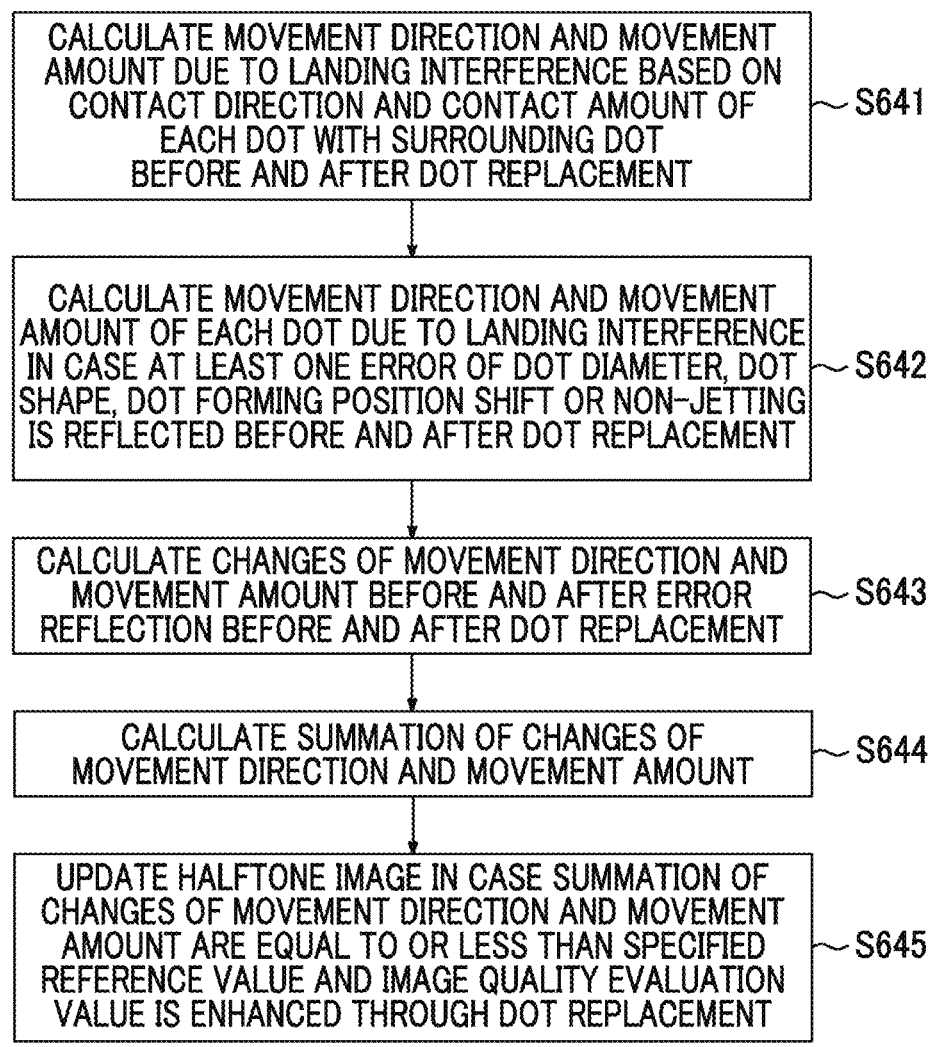
FIG. 78 is a flowchart showing another example of the more detailed processing contents of step S534 and step S535 of FIG. 71.

FIG. 78 is a flowchart showing an example of the more detailed processing contents of step S534 and step S535 of FIG. 71. Step S641 to step S644 of FIG. 78 correspond to the process of step S534 of FIG. 71, and step S645 of FIG. 78 corresponds to the process of step S535 of FIG. 71.

In step S641 of FIG. 78, the movement direction and the movement amount due to the landing interference are calculated based on the contact direction and the contact amount of each dot with the surrounding dot are calculated before the dot replacement and after the dot replacement.

Subsequently, the movement direction and the movement amount of each dot due to the landing interference in the dot arrangement on which at least one error of the dot diameter, the dot shape, the dot forming position shift or the non-jetting are calculated before the dot replacement and after the dot replacement is reflected (step S642 of FIG. 78).

The changes of the movement direction and the movement amount before and after the error reflection are calculated before the dot replacement and after the dot replacement (step S643).

The summation of the changes of the movement direction and the movement amount before and after the error reflection is calculated before the dot replacement and after the dot replacement is reflected (step S644). The method of calculating the changes of the movement direction and the movement amount before and after the error reflection is the same as step S611 to step S614 of FIG. 77 and the example described in FIGS. 66, 67 and 75.

Among the summations of the changes of the movement direction and the movement amount acquired in step S644 of FIG. 78, the summation of the change of the movement direction and the movement amount after the error reflection before the dot replacement is described as "Summation $C_1$", and the summation of the change of the movement direction and the movement amount after the error reflection after the dot replacement is described as "Summation $C_2$"

The process proceeds to step S645 after step S644 of FIG. 78. Step S645 includes a determining process of determining whether or not to update the halftone image, and an updating process based on the determining result. In step S645, a process of comparing the summations of the movement directions and the movement amounts calculated in step S644 with the specified reference value and updating the halftone parameter in a case where the summations of the movement directions and the movement amounts are equal to or less than the specified reference value and the image quality evaluation value are enhanced before and after the dot replacement is performed.

That is, in step S645 of FIG. 78, in a case where Summation C2 of the changes of the movement direction and the movement amount before and after the error reflection after the dot replacement is equal to or less than the specified reference value and the image quality evaluation value acquired in step S533 of FIG. 71 is enhanced before and after the dot replacement, the process of updating the halftone image is performed.

In the present example, it is determined whether or not to update the halftone image by combining the summation of the changes of the movement direction and the movement amount acquired in step S644 of FIG. 78 with the image quality evaluation value acquired in step S533 of FIG. 71.

The "halftone image being updated" means that the halftone image is updated by adopting the dot arrangement state after the dot replacement in which the dot replacement is performed in step S532 of FIG. 71.

Through the halftone process shown in FIGS. 71 and 78, it is possible to generate the halftone image in which the change of the movement amount of the dot due to the influence of the landing interference is less before and after the error is reflected.

The "change of the movement amount of the dot being less" means that the change of the influence of the dot movement is equal to or less than the change represented by the specified reference value.

According to the configuration described in FIGS. 71 to 78, it is possible to generate the halftone image such that the dot arrangement falls in the allowable range represented by the specified reference value based on the comparing result of the process of comparing Summation A and Summation B of the movement amounts which are the landing interference evaluation values with the specified reference value.

The halftone process described in FIGS. 71 and 78 may be performed by the halftone processing unit 80 shown in FIG. 76. The halftone image 550 which is the target of the landing interference influence evaluation in this case is the dot image generated during the process performed by the halftone processing unit 80, and is the initial image described in step S531 of FIG. 71, the image after the dot replacement in step S532, or the updated halftone image that is updated in step S535. The halftone processing unit 80 (see FIG. 76) that performs the halftone process described in FIGS. 71 and 78 performs the updating process on the halftone image using the DBS method in cooperation with the landing-interference-influence evaluation unit 536.

In such configuration, the halftone processing unit 80 (see FIG. 76) corresponds to one example of "signal processing means", and the step of causing the halftone processing unit 80 to generate the halftone image corresponds to one example of a "signal processing step".

The processing content performed by the image processing device 20 according to the embodiment described in FIGS. 74 to 78 described above may be comprehended as an image processing method.

According to the embodiment described in FIGS. 74 to 78, it is possible to perform the halftone design or the halftone process in which the image quality deterioration is less (that is, there is the tolerance to the error) even though the error is added.

Modification Example of Specific Example described FIGS. 74 to 78

Modification Example 8

It has been described in the description of FIGS. 74 to 78 that the movement amount of the dot movement due to the landing interference is calculated based on the information indicating the contact direction and the contact amount of each dot. However, as described in FIG. 73, the movement amount of the dot movement due to the landing interference is treated to be approximately proportional to the contact amount of the dot, and thus, it is possible to directly calculate the landing interference evaluation value from the contact direction and the contact amount.

It is possible to calculate the "landing interference evaluation value" from the change of the summation of the vectors indicating the contact direction and the contact amount with the surrounding dot even though the calculation of the movement vector described in FIG. 66 is not performed.

Accordingly, the "dot-movement-amount calculation unit 534" described in FIG. 76 may be omitted. From a different viewpoint, it is understood that the movement amount information indicating the movement direction and the movement amount of the dot movement due to the landing interference includes the information of the "contact direction and the contact amount". For example, the movement amount information items (554A and 554B) generated by the dot-movement-amount calculation unit 534 are information items (553A and 553B) indicating the contact direction and the contact amount.

Modification Example 9

The updating reference of the halftone parameter of step S505 of FIG. 64 or the updating reference of the halftone image of step S524 of FIG. 69 or the step S535 of FIG. 71 is not limited to the updating reference shown in step S615 of FIG. 74, step S616 of FIG. 77 or step S645 of FIG. 78, and various updating references may be determined.

For example, the updating reference may be a "case where the image quality evaluation value or the energy is equal to or less than a predetermined reference value for a determination reference and the landing interference movement amount summation is enhanced" or a "case where a weighted sum of the image quality evaluation value or the energy and the landing interference movement amount summation is enhanced".

The "summation of the changes of the landing interference movement amount" is one example of a "landing interference evaluation value".

The "case where the landing interference movement amount summation is enhanced" means that an increase/decrease tendency indicating whether the values of the changes of the landing interference movement amount are increased or decreased is comprehended, and it is determined that the "summation of the changes of the landing interference movement amount is enhanced" in a case where the summation of the changes of the landing interference movement amount is decreased. When it is determined whether or not the summation of the changes of the landing interference movement amount is enhanced, since it is comprehended whether the summation of the changes of the landing interference movement amount is increased or decreased by comparing the values of the summations of the changes of the landing interference movement amount calculated from different dot arrangements, a comparison process of comparing the summation of the changes of the landing interference movement amount is included. The determining result of whether or not the summation of the changes of the landing interference movement amount is enhanced is based on the "comparing result" of the comparison process.

The "weighted sum of the image quality evaluation value or the energy and the summation of the changes of the landing interference movement amount" corresponds to one example of an "evaluation value" generated based on the "landing interference evaluation value".

Modification Example 10

In a case where the predetermined error (hereinafter, referred to as an error other than the non-jetting.) is reflected on the dot arrangement of the halftone image, since the landing interference movement amount of the dot group on which the error is reflected is greatly changed unlike the case where the error is not reflected in most cases, the change of the landing interference movement amount of only the dot group on which the error is reflected may be evaluated. That is, the example of FIGS. 66 and 67, the summation of the changes of the landing interference movement amount of only Dot 2 and Dot 5 on which the error of the dot forming position shift is reflected may be calculated.

In a case where the change of the landing interference movement amount after the error reflection is estimated, the present example is not limited to the aspect in which all the dots included in the dot image are used as the targets, and some dots of all the dots included in the dot image may be used as the targets like an aspect in which only the dot group to which the error is added is used as the target.

Modification Example 11

In a case where the dot forming position shift is reflected as the predetermined error, since the landing interference movement amount is greatly changed in a direction parallel to the direction to which the error is added, the change of the landing interference movement amount in only the direction parallel to the direction to which the error is added may be evaluated. In this case, for only the dots in contact in the direction to which the error is added, that is, only the dots including the dot movement in only the movement direction parallel to the direction to which the error is added, the summation of the changes of the landing interference movement amount may be calculated, or the summation of the changes of the landing interference movement amount projected in a line in the direction parallel to the direction to which the error is added may be calculated.

In the example shown in FIG. 67, the dots in contact in the direction to which the error is added, that is, the dots including the dot movement in only the movement direction parallel to the direction to which the error is added are Dot 1, Dot 2 and Dot 3. Accordingly, as the summation of the changes of the landing interference movement amount, the summation of the changes of the movement amounts of the dot movement of Dot 1, Dot 2 and Dot 3 due to the landing interference may be calculated.

Modification Example 12

In both the single path type ink jet printing device and the serial type ink jet printing device, in a case where the predetermined error is added, the dot movement in the direction perpendicular to the scanning direction on the paper greatly contributes to the occurrence of the streak.

Accordingly, in a case where the influence of the landing interference in a state in which the predetermined error is added is evaluated, the change of the movement amount of the dot movement in only the direction perpendicular to the scanning direction may be evaluated. In this case, for only the dots in contact in the direction perpendicular to the scanning direction, that is, only the dots including the movement in only the direction perpendicular to the scanning direction, the summation of the changes of the landing interference movement amount may be calculated, or the summation of the changes of the landing interference movement amount projected in a line in the direction perpendicular to the scanning direction may be calculated.

[Example of Halftone Design or Halftone Process in which Change of Dot Contact State after Error Reflection is Less]

In FIGS. 74 to 78, the example of the halftone design or the halftone process in which the changes of the movement direction and the movement amount of the dot movement due to the landing interference after the error reflection are less has been described.

Hereinafter, another embodiment capable of acquiring the same effect as that of the embodiment described in FIGS. 74 to 78 will be described. In the embodiment to be mentioned below, the halftone design or the halftone process is performed such that the change of the contact state of the dot after the error reflection is less without calculating the movement direction or the movement amount of the dot due to the landing interference. There is an advantage that the influence of the landing interference can be simply evaluated from only the changes of the contact state of the dot before and after the error is added without performing the process of calculating the movement direction and the movement amount of the dot due to the landing interference.

Specifically, the "change of the contact state" mentioned herein may be represented by the number of dots exhibiting any one state change of a first state change in which a state in which a dot is in contact with another dot is changed to a state in which a dot is not in contact with another dot and a second state change in which a state in which a dot is bit in contact with another dot is changed to a state in which a dot is in contact with another dot, or both the state changes of the first state change and the second state change.

The first state change which is the case where the state in which the dots are in contact is changed to the state in which the dots are not in contact is described as "contact→non-contact". The second state change which is the case where the state in which the dots are not in contact is changed to the state in which the dots are in contact is described as "non-contact→contact". It is possible to quantitatively evaluate the change of the contact state by any one of the number of dots of "contact→non-contact" and the number of dots of "non-contact→contact" or the number of dots of both states.

Figure 79:
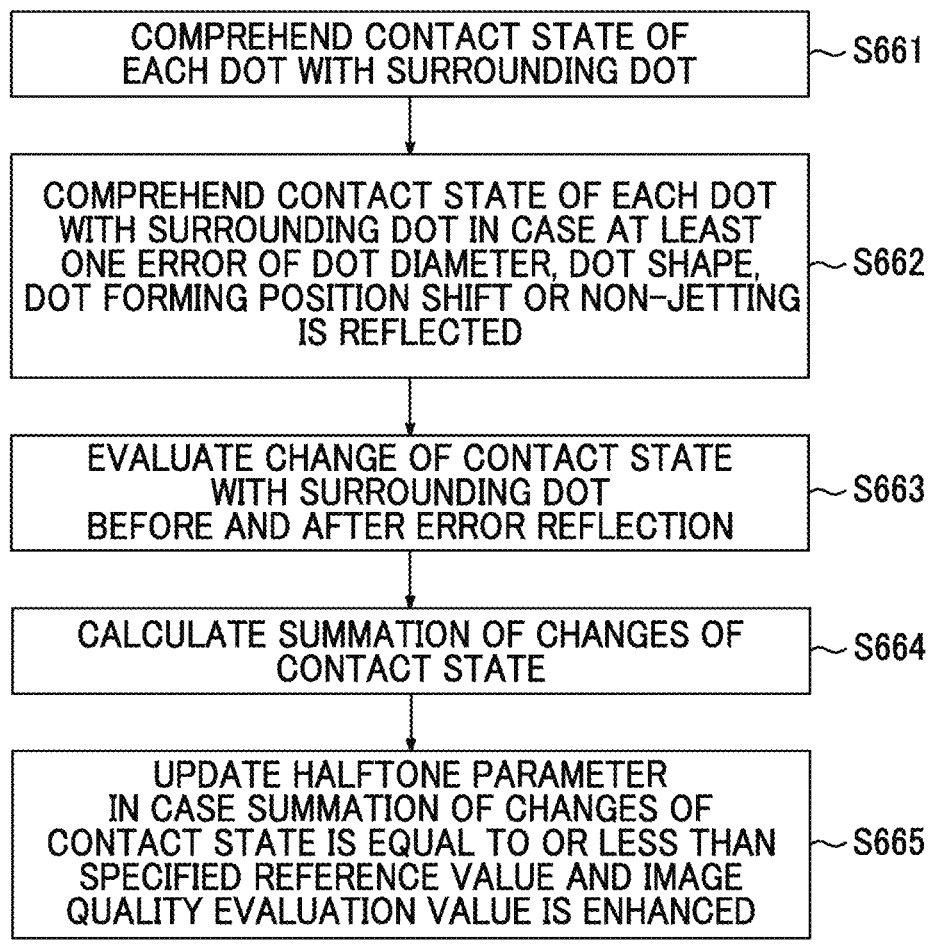
FIG. 79 is a flowchart according to another embodiment capable of being applied instead of the flowchart of FIG. 74.

FIG. 79 is a flowchart capable of being applied instead of the flowchart of FIG. 74. FIG. 79 is a flowchart showing another example of the more detailed processing contents of step S504 and step S505 of FIG. 64. Step S661 to step S664 of FIG. 79 correspond to the process of step S504 of FIG. 64, and step S665 of FIG. 79 corresponds to the process of step S505 of FIG. 64.

As shown in FIG. 79, the contact state of each dot of the plurality of dots included in the halftone image with the surrounding dot is initially comprehended (step S661). Information indicating the contact state of the dot before the error reflection is acquired by step S661. The information indicating the contact state acquired in step S661 is information indicating whether or not each dot is in contact with another dot, and corresponds to one example of "first information".

Subsequently, the contact state of each dot with the surrounding dot in a case where at least one error of the dot diameter, the dot shape, the dot forming position shift or the non-jetting is reflected is comprehended (step S662). Information indicating the contact state of the dot after the error reflection is acquired by step S662. The information indicating the contact state acquired in step S662 is information indicating whether or not each dot is in contact with another dot, and corresponds to one example of "second information".

Subsequently, the change of the contact state with the surrounding dot after the error reflection is evaluated from the information indicating the contact state of the dot before the error reflection acquired by step S661 and the information indicating the contact state of the dot after the error reflection acquired in step S662 (step S663).

In the example of FIGS. 66 and 67, the "change of the contact state" is described. For example, the state change of Dot 5 and Dot 6 is "contact→non-contact". In this case, a total of two state changes of one state change of Dot 5 of interest and one state change of Dot 6 of interest may be regarded as being "contact→non-contact", or the state change of a group of Dot 5 and Dot 6 may be regarded as being "contact→non-contact". The number of groups treated in the latter is half the number of dots treated in the former. The evaluation of the change of the contact state by the number of dots of which the contact state is changed includes the evaluation of the change of the contact state by the number of dot groups of which the contact state is changed.

Figure 80A:
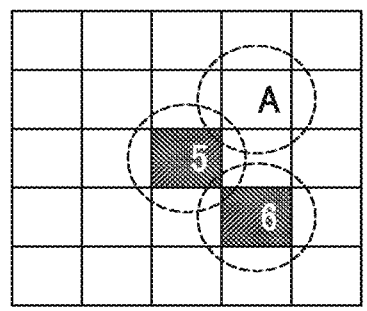
FIG. 80A is an explanatory diagram related to a change of the contact state, and is a diagram showing an example of a dot image before the error reflection.
Figure 80B:
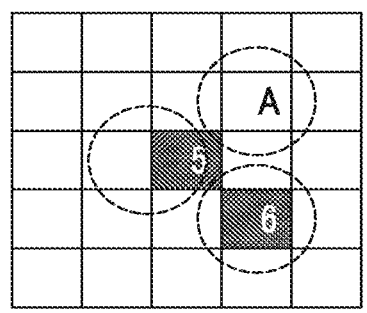
FIG. 80B is an explanatory diagram related to a change of the contact state, and is a diagram showing an example of a dot image after the error reflection.

FIGS. 80A and 80B are explanatory diagrams showing another example related to the change of the contact state. FIG. 80A shows an example of the dot image before the error reflection, and FIG. 80B shows an example of the dot image after the error reflection. Similarly to FIG. 67, in FIG. 80B, the error of the dot forming position shift is added to Dot 5.

As shown in FIG. 80A, another one Dot A in addition to Dot 6 is in contact with Dot 5 in the dot image before the error reflection. As shown in FIG. 80B, since Dot 5 is moved in the dot image after the error reflection, it is considered that the state change of Dot A in addition to Dot 6 is "contact→non-contact". As for the change of the contact state in this case, a total of 4 state changes of two state changes of Dot 5 of interest, one state change of Dot A of interest and one state change of Dot 6 of interest may be regarded as being "contact→non-contact", or the state change of a total of two groups of one group of Dot 5 and Dot 6 and one group of Dot 5 and Dot A may be regarded as being "contact→non-contact".

Figure 81A:
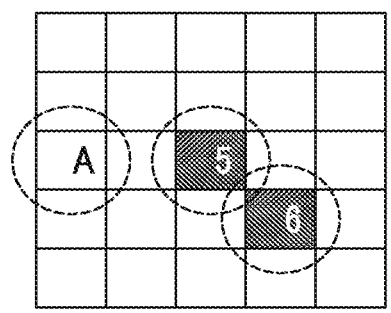
FIG. 81A is an explanatory diagram related to a change of the contact state, and is a diagram showing an example of a dot image before the error reflection.
Figure 81B:
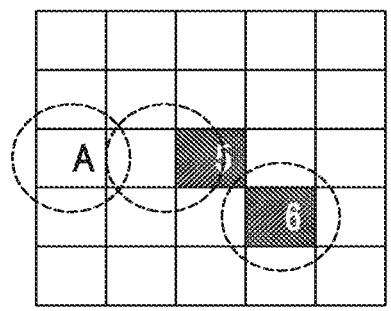
FIG. 81B is an explanatory diagram related to a change of the contact state, and is a diagram showing an example of a dot image after the error reflection.

FIGS. 81A and 81B are explanatory diagrams showing another example related to the change of the contact state. FIG. 81A shows an example of the dot image before the error reflection, and FIG. 81B shows an example of the dot image after the error reflection. Similarly to FIG. 67, in FIG. 81B, the error of the dot forming position shift is added to Dot 5.

As shown in FIGS. 81A and 81B, Dot 5 and Dot 6 before and after the error reflection exhibit the state change of "contact→non-contact", and Dot 5 and Dot A exhibit the state change of "non-contact→contact". In this case, since one "contact 43 non-contact" state change and one "non-contact→contact" state change of Dot 5 of interest, one "non-contact→contact" state change of Dot A of interest, and one "contact→non-contact" state change of Dot 6 of interest, a total of two "contact→non-contact" state changes and two "non-contact→contact" state changes may be regarded as a whole. Alternatively, the "contact→non-contact" state change of a group of Dots 5 and 6 and the "non-contact→contact" state change of a group of Dots 5 and A may be regarded.

In step S663 of FIG. 79, the change of the contact state of the dot before and after the error reflection is evaluated by the above-described method.

Subsequently, the summation of the changes of the contact state is calculated (step S664). The summation calculated in step S664 corresponds to one example of a "landing interference evaluation value". The summation of the changes of the contact state is an evaluation value acquired by adding the changes of the contact state of the dots within the dot image, and is an index indicating the degree of change of the influence of the dot movement due to the landing interference after the error reflection. For example, the summation of the state changes of "non-contact→contact" and "contact→non-contact" is calculated as the landing interference evaluation value.

The process proceeds to step S665 after step S664 of FIG. 79. Step S665 includes a determining process of determining whether or not to update the halftone parameter, and an updating process based on the determining result. That is, in step S665, the process of comparing the summations of the changes of the contact state with the specified reference value and updating the halftone parameter in a case where the summations of the changes of the contact state are equal to or less than the specified reference value and the image quality evaluation value acquired in step S503 of FIG. 64 is enhanced is performed.

The process of comparing the summation of the changes of the contact state with the specified reference value corresponds to one example of a "comparison process". The determination of whether or not the summation of the changes of the contact state is equal to or less than the specified reference value is based on the "comparing result" of the comparison process.

A case where the summation of the changes of the contact state is equal to or less than the specified reference value means that the change of the influence of the dot movement due to the landing interference is equal to or less than the change of the influence of the dot movement represented by the reference value.

In step S665 of FIG. 79, it is determined whether or not to update the halftone parameter by combining the summation of the changes of the contact state with the image quality evaluation value acquired in step S503 of FIG. 64.

Figure 82:
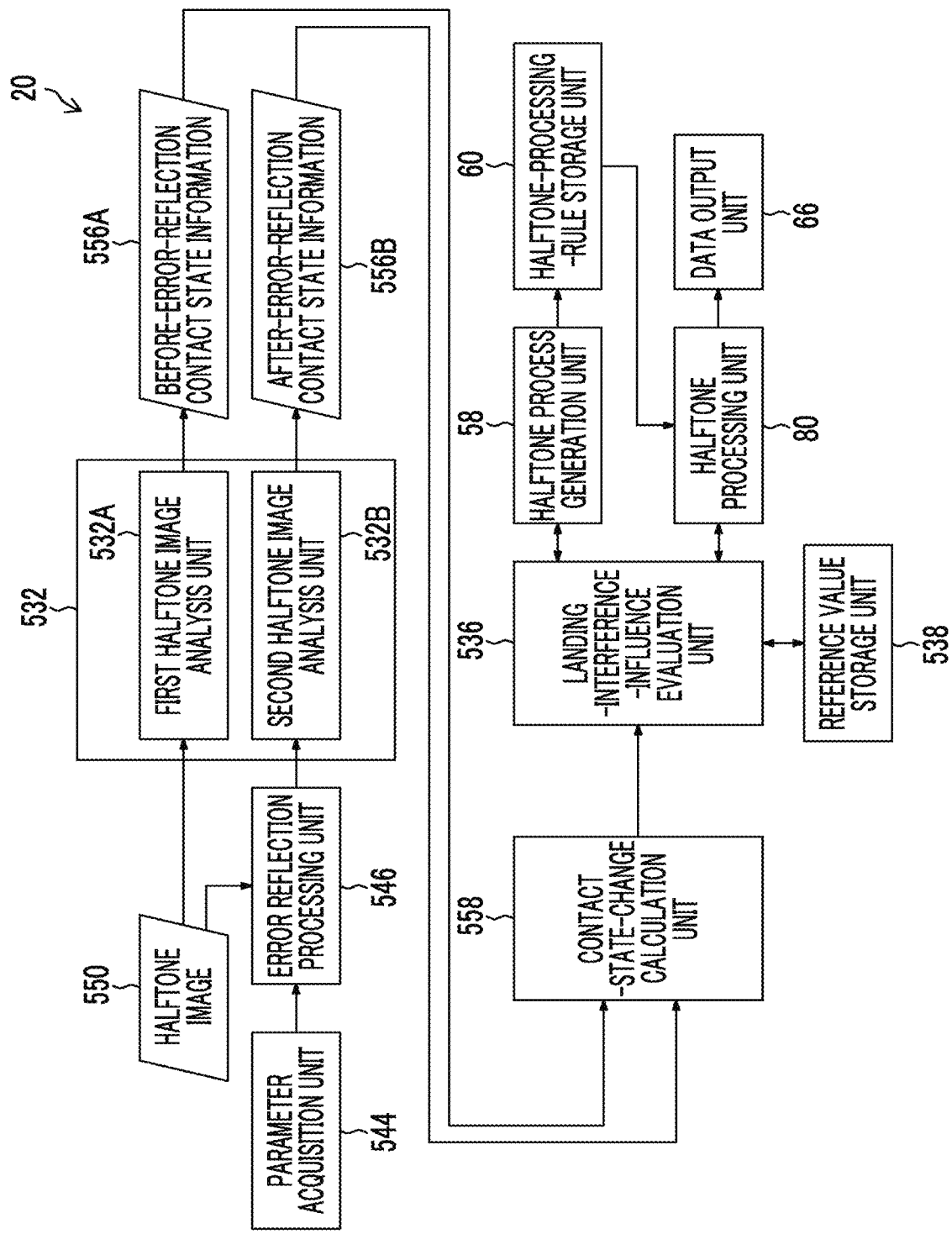
FIG. 82 is a block diagram of major parts for describing the function of an image processing device according to a twelfth embodiment.

FIG. 82 is a block diagram of major parts for describing the function of an image processing device according to a twelfth embodiment. In FIG. 82, the same or similar elements as or to those of the configuration described in FIG. 76 will be assigned the same reference numerals, and the description thereof will be omitted.

The image processing device 20 according to the twelfth embodiment shown in FIG. 82 has the function of the process described in FIG. 79. That is, the image processing device 20 shown in FIG. 82 includes a halftone image analysis unit 532, a contact-state-change calculation unit 558, a landing-interference-influence evaluation unit 536, a reference value storage unit 538, a parameter acquisition unit 544, and an error reflection processing unit 546. The image processing device 20 includes a halftone process generation unit 58, a halftone-processing-rule storage unit 60, a halftone processing unit 80, and a data output unit 66.

A first halftone image analysis unit 532A of the halftone image analysis unit 532 analyzes data of a halftone image 550 before the error is reflected by the error reflection processing unit 546, and generates before-error-reflection contact state information 556A. The before-error-reflection contact state information 556A is information indicating whether each dot of the halftone image 550 is in contact or is not in contact with another dot. The before-error-reflection contact state information 556A corresponds to one example of "first contact state information", and corresponds to one example of "first information".

A second halftone image analysis unit 532B of the halftone image analysis unit 532 analyzes data of a halftone image after the error is reflected on the halftone image 550 by the error reflection processing unit 546, and generates after-error-reflection contact state information 556B. The after-error-reflection contact state information 556B is information indicating whether each dot of an after-error-reflection contact halftone image is in contact or is not in contact with another dot. The after-error-reflection contact state information 556B corresponds to one example of "second contact state information", and corresponds to one example of "second information".

The process of step S661 of FIG. 79 is performed by the first halftone image analysis unit 532A of FIG. 82. The process of step S662 of FIG. 79 is performed by combining the error reflection processing unit 546 with the second halftone image analysis unit 532B.

The contact-state-change calculation unit 558 calculates a change of an after-error-reflection contact state based on the before-error-reflection contact state information 556A and the after-error-reflection contact state information 556B. The process of step S663 of FIG. 79 is performed by the contact-state-change calculation unit 558.

The landing-interference-influence evaluation unit 536 calculates a landing interference evaluation value for quantitatively evaluating a change of the influence of the dot movement due to the landing interference before and after the error is reflected from the information indicating the change of the contact state acquired by the contact-state-change calculation unit 558. The landing-interference-influence evaluation unit 536 of the present example calculates the summation of the changes of the contact sate described in step S664 of FIG. 79.

The reference value storage unit 538 of FIG. 82 is storage means for storing information of the specified reference value described in step S665 of FIG. 79. The landing-interference-influence evaluation unit 536 of FIG. 82 compares the summation of the changes of the contact state as the calculated landing interference evaluation value with the specified reference value, and determines the degree of change of the influence of the dot movement due to the landing interference.

The process of step S665 of FIG. 79 is performed by the landing-interference-influence evaluation unit 536 and the halftone process generation unit 58 of FIG. 82.

<Case where Void-and-Cluster Method is Applied to Dither Method>

Figure 83:
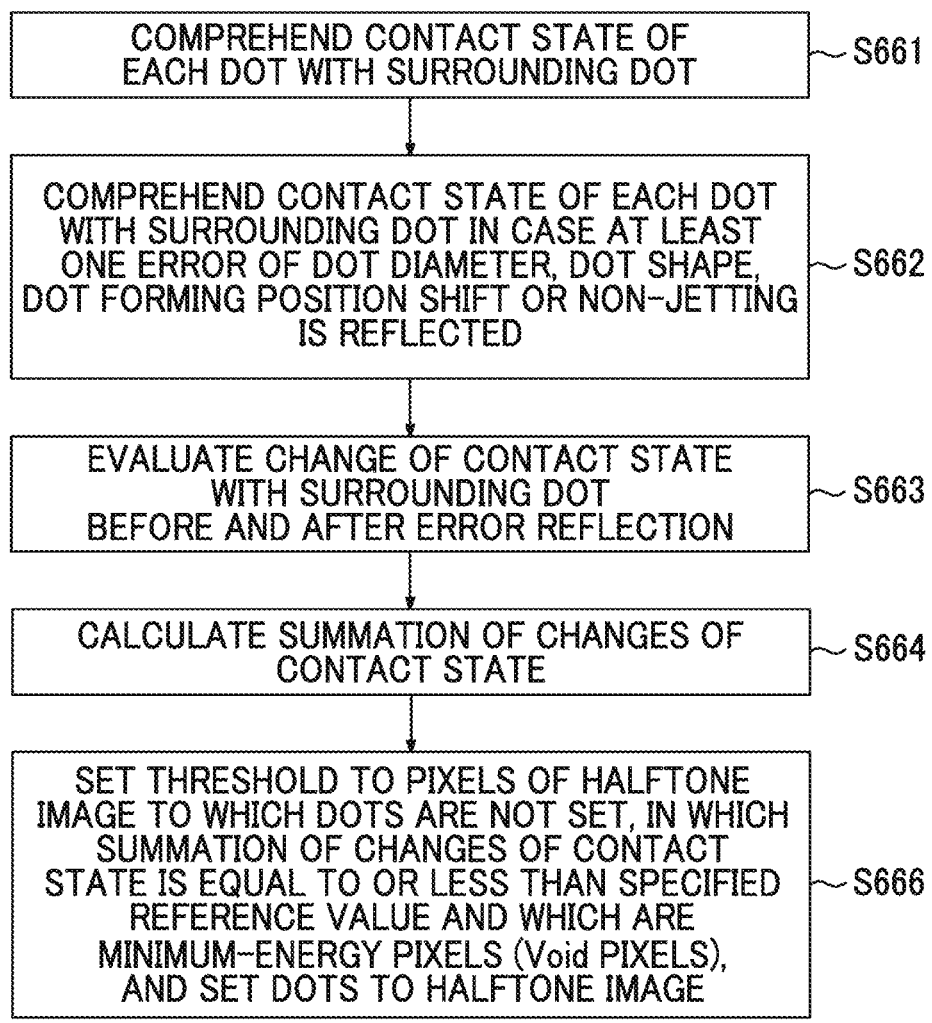
FIG. 83 is a flowchart according to another embodiment capable of being applied instead of the flowchart of FIG. 77.

FIG. 83 is a flowchart capable of being applied instead of the flowchart of FIG. 77.

FIG. 83 is a flowchart showing an example of the more detailed processing contents of step S523 and step S524 of FIG. 69. In the flowchart of FIG. 83, the same or similar elements as or to the steps of the flowchart described in FIG. 79 will be assigned the same reference numerals, and the description thereof will be omitted. The flowchart of FIG. 83 includes the process of step S666 instead of step S665 of the flowchart described in FIG. 79.

Step S661 to step S664 of FIG. 83 correspond to the process of step S523 of FIG. 69, and step S666 of FIG. 83 corresponds to the process of step S524 of FIG. 69.

In step S666 of FIG. 83, the threshold values are set to pixels of which the summation of the changes of the contact state is equal to or less than the specified reference value and which are the minimum-energy pixels (that is, void pixels) among the pixels of the halftone image in which the dots are not set, and the dots are set to the void pixels of the halftone image.

The flowchart shown in FIG. 83 is the process in a direction in which the threshold values are increased from the initial image, but a method in which the threshold values (that is, gradation values) are decreased from the initial image also follows the known void-and-cluster method. That is, a process of updating the halftone image by regarding the maximum-energy pixels among the pixels to which the dots are set as cluster pixels in which the dots are dense in the energy image acquired by applying the filter to the halftone image, setting the threshold values to the pixels and excluding the dots of the pixels is sequentially repeated.

<Case where Halftone Process Using Direct Binary Research Method is Performed>

Figure 84:
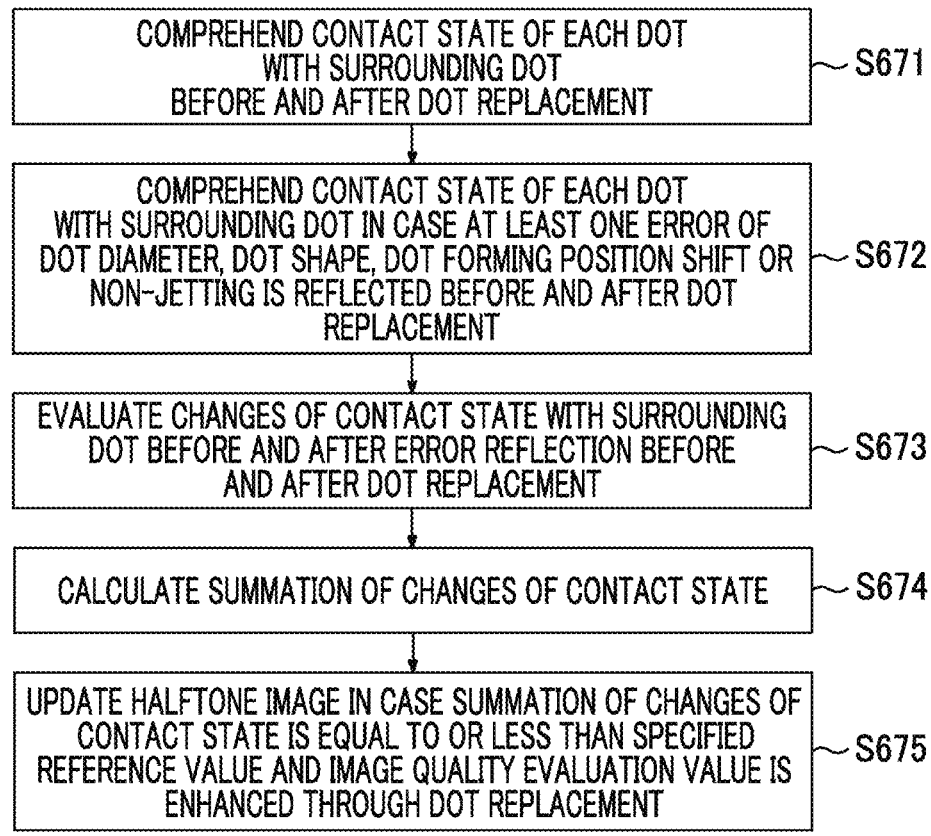
FIG. 84 is a flowchart according to another embodiment capable of being applied instead of the flowchart of FIG. 78.

FIG. 84 is a flowchart capable of being applied instead of the flowchart of FIG. 78. FIG. 84 is a flowchart showing an example of the more detailed processing contents of step S534 and step S535 of FIG. 71. Step S671 to step S674 of FIG. 84 correspond to the process of step S534 of FIG. 71, and step S675 of FIG. 84 corresponds to the process of step S535 of FIG. 71.

In step S671 of FIG. 84, the contact state of each dot with the surrounding dot is comprehended before the dot replacement and after the dot replacement. In step S671, information indicating the contact state of the dot before the error reflection before and after the dot replacement is acquired. The information indicating the contact state of the dot before dot replacement and before the error reflection acquired in step S671 and the information indicating the contact state of the dot after the dot replacement and before the error reflection correspond to one example of "first contact state information and correspond to one example of "first information".

Subsequently, the contact state of each dot in the dot arrangement on which at least one error of the dot diameter, the dot shape, the dot forming position shift or the non-jetting is reflected with the surrounding dot is comprehended before the dot replacement and after the dot replacement (step S672). In step S672, information indicating the contact state of the dot after the error reflection before and after the dot replacement is acquired. The information indicating the contact state of the dot before the dot replacement and after the error reflection acquired in step S672 and the information indicating the contact state of the dot after the dot replacement and after the error reflection correspond to one example of "second contact state information" and correspond to one example of "second information".

Subsequently, the change of the contact state with the surrounding dot before and after the error reflection is evaluated before the dot replacement and after the dot replacement (step S673). The method of evaluating the change of the contact state is the same as the method described in step S663 of FIG. 79.

The summations of the changes of the contact state before and after the error reflection are calculated before the dot replacement and after the dot replacement (step S674 of FIG. 84). The method of acquiring the summation of the changes of the contact state is the same as the example described in step S664 of FIG. 79.

Among the summations of the changes of the contact state acquired in step S674 of FIG. 84, the summation of the changes of the contact state before the dot replacement is described as "Summation $E_1$", and the summation of the changes of the contact state after the dot replacement is described as "Summation $E_2$".

The process proceeds to step S675 after step S674 of FIG. 84. Step S675 includes a determining process of determining whether or not to update the halftone image, and an updating process based on the determining result. That is, in step S675, a process of comparing the summations of the changes of the contact state calculated in step S674 with the specified reference value and updating the halftone image in a case where the summations of the changes of the contact state are equal to or less than the specified reference value and the image quality evaluation value is enhanced before and after the dot replacement is performed.

That is, in step S675 of FIG. 84, in a case where summation $E_2$ of the changes of the contact state after the dot replacement is equal to or less than the specified reference value and the image quality evaluation value calculated in step S533 of FIG. 71 is enhanced before and after the dot replacement, the process of updating the halftone image is performed.

In the present example, it is determined whether or not to update the halftone image by combining the summations of the changes of the contact state calculated in step S674 of FIG. 84 with the image quality evaluation value calculated in step S533 of FIG. 71.

Through the halftone process shown in FIGS. 71 and 84, it is possible to generate the halftone image in which the change of the dot contact state due to the influence of the landing interference before and after the error is reflected is less.

The "change of the dot contact state being less" means that the degree of change of the dot contact state is equal to or less than the degree of change represented by the specified reference numeral. That is, the change of the dot contact state being less means that the change of the influence due to the dot movement is less.

The halftone process described in FIGS. 71 and 84 may be performed by the halftone processing unit 80 shown in FIG. 82. The halftone image 550 as the target of the landing interference influence evaluation in this case is the dot image generated during a process performed by the halftone processing unit 80, and is the initial image described in step S531 of FIG. 71, the image after dot replacement in step S532, or the updated halftone image that is updated in step S535. The halftone processing unit 80 (see FIG. 82) that performs the halftone process described in FIGS. 71 and 84 performs the updating process on the halftone image using the DBS method in cooperation with the landing-interference-influence evaluation unit 536.

In such configuration, the halftone processing unit 80 (see FIG. 82) corresponds to one example of "signal processing means", and the step of causing the halftone processing unit 80 to generate the halftone image corresponds to one example of a "signal processing step".

According to the embodiment described in FIGS. 71 to 84, it is possible to generate the halftone image such that the dot arrangement falls in the allowable range represented by the specified reference value based on the comparing result of the process of comparing the summation of the changes of the contact stage as the landing interference evaluation value with the specified reference value.

The processing content performed by the image processing device 20 according to the embodiment described in FIGS. 79 to 84 described above may be comprehended as an image processing method.

According to the embodiment described in FIGS. 79 to 84, it is possible to perform the halftone design or the halftone process in which the image quality deterioration is less (that is, there is the tolerance to the error) even though the error is added based on only the change of the dot contact state without calculating the movement direction and the movement amount of the dot movement due to the landing interference.

Modification Example of Specific Example Described in FIGS. 79 to 84

Modification Example 13

When the influence of the landing interference is evaluated, it has been described in the above-described specific example that the summation of the state changes of "non-contact→contact" and "contact→non-contact" is calculated as the landing interference evaluation value, and the method of calculating the landing interference evaluation value is not limited to this example. For example, the summation of the state changes of "non-contact→contact" and the summation of the state changes "contact→non-contact" may be respectively used as the landing interference evaluation values. The summation of the state changes of only any one of "non-contact→contact" and "contact→non-contact" may be used as the landing interference evaluation value.

Modification Example 14

The updating reference of the halftone parameter of step S505 of FIG. 64 or the updating reference of the halftone image of step S524 of FIG. 69 or the step S535 of FIG. 71 is not limited to the updating reference shown in step S665 of FIG. 79, step S666 of FIG. 83 or step S675 of FIG. 84, and various updating references may be determined.

For example, the updating reference may be a "case where the image quality evaluation value or the energy is equal to or less than a predetermined reference value for a determination reference and the summation of the changes of the contact state is enhanced" or a "case where a weighted sum of the image quality evaluation value or the energy and the summation of the changes of the contact state is enhanced".

The "summation of the changes of the contact state" is one example of a "landing interference evaluation value". The "summation of the changes of the contact state" may be the summation of the state changes of "contact→non-contact", may be a weighted summation of the summation of the state changes of "contact→non-contact" and the summation of the state changes of "non-contact→contact", or may be the summation of the state changes of any one of "contact→non-contact" and "non-contact→contact".

The "case where the summation of the changes of the contact state is enhanced" means that an increase/decrease tendency indicating whether the value of the summation of the changes of the contact state is increased or decreased is comprehended, and it is determined that the "summation of the changes of the contact state is enhanced" in a case where the summation of the changes of the contact state is decreased. When it is determined whether or not the summation of the changes of the contact state is enhanced, since it is comprehended whether the summation of the changes of the contact state is increased or decreased by comparing the value of the summation of the changes of the contact state acquired from different dot arrangements, a comparison process of comparing the summation of the changes of the contact state is included. The determining result of whether or not the summation of the changes of the contact state is enhanced is based on the "comparing result" of the comparison process.

The "weighted sum of the image quality evaluation value or the energy and the summation of the changes of the contact state" is a total evaluation value acquired by adding the evaluation of the image quality and the evaluation of the influence of the landing interference, and corresponds to one example of an "evaluation value generated based on the landing interference evaluation value".

Modification Example 15

In a case where a predetermined error (hereinafter, an error other than the non-jetting is used.) is reflected on the dot arrangement of the halftone image, since the contact state of the dot group on which the error is reflected is greatly changed unlike a case where the error is not reflected in most cases, the change of the contact state of only the dot group on which the error is reflected may be evaluated. That is, the example of FIG. 67, the summation of the changes of the contact state of only Dot 2 and Dot 5 is reflected may be calculated as the summation of the changes of the contact state on which the error of the dot forming position shift is reflected.

In a case where the change of the contact state of the dot before and after the error reflection is calculated, the present example is not limited to the aspect in which all the dots included in the dot image are used as the targets, and some dots of all the dots included in the dot image may be used as targets like an aspect in which only the dot group to which the error is added is used as a target.

Modification Example 16

In a case where the dot forming position shift as the predetermined error is reflected, since the contact state of the dot in a direction parallel to the direction to which the error is added is greatly changed in most cases, only the change of the contact state in only the direction parallel to the direction to which the error is added may be evaluated. In this case, only any one of the state change of "contact→a non-contact" in a direction parallel to the direction to which the error of the dot forming position shift is added and the state change of "non-contact→contact" or both the state changes may be evaluated, or the landing interference evaluation value may be calculated.

Modification Example 17

As already described, in both the single path type and serial type ink jet printing devices, in a case where the predetermined error is added, the dot movement in the direction perpendicular to the scanning direction on the paper greatly contributes the occurrence of the streak. Accordingly, only the change of the contact state of the dot in the direction perpendicular to the scanning direction may be evaluated. In this case, "contact→non-contact" and/or "non-contact→contact" in the direction perpendicular to the scanning direction is paid attention to, and only the number of dots exhibiting "contact→-contact" and/or "non-contact-→contact" in the direction perpendicular to the scanning direction may be evaluated.

For example, in the example of FIGS. 81A and 81B, the direction to which the error due to the dot forming position shift is added is a direction (a horizontal direction in the drawings) parallel to the X direction, and the scanning direction is the Y direction (a vertical direction in the drawing). In the example shown in FIGS. 81A and 81B, the "change of the contact state of the dot in the direction perpendicular to the scanning direction" is the state change of "non-contact→contact" of Dot 5 and Dot A.

[Still Another Specific Example of Means for Applying Tolerance to Landing Interference]

Hereinafter, still another specific example of the configuration in which the halftone design or the halftone process of suppressing the image quality deterioration due to the landing interference is realized will be described. Here, the processing content of the halftone design and the halftone process having favorable dispersibility of the dot for each group (that is, on a per group basis) by estimating the movement direction and the movement amount of the dot movement due to the landing interference based on the contact direction and the contact amount of each dot with the surrounding dot and classifying the dots into groups according to the movement direction and the movement amount will be described. Even though the landing interference occur, the halftone image in which the image quality deterioration due to the influence thereof is relatively less is acquired by performing the halftone design or the halftone process.

Three examples of an example of the process of generating the halftone parameter in the dither method or the error diffusion method, an example of the process of generating the halftone parameter by the void-and-cluster with respect to the dither method, and an example of the halftone process in the direct binary search method will be described by referring to FIGS. 10, 14 and 16 already described.

<Application Example to Process of Generating Halftone Parameter in Dither Method or Error Diffusion Method>

Figure 85:
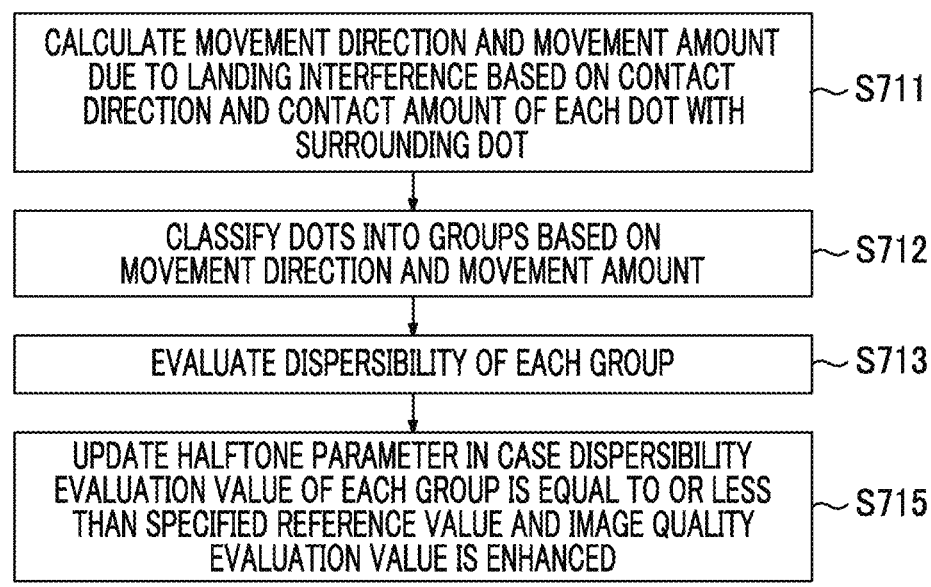
FIG. 85 is a flowchart showing another example of the more detailed processing contents of step S504 and step S505 of FIG. 64.

FIG. 85 is a flowchart showing an example of the more detailed processing contents of step S504 and step S505 of FIG. 64.

Step S711 to step S713 of FIG. 85 correspond to step S504 of FIG. 64, and step S715 of FIG. 85 corresponds to the process of step S505 of FIG. 64.

As shown in FIG. 85, the movement direction and the movement amount due to the landing interference are initially calculated based on the contact direction and the contact amount of each dot of the plurality of dots included in the halftone image with the surrounding dot (step S711). The method described in FIG. 66 may be applied to the method of calculating the movement direction and the movement amount due to the landing interference. As described in FIG. 66, the movement vector of each dot of the halftone image with the surrounding dot due to the landing interference, that is, the movement direction and the movement amount is calculated (step S711 of FIG. 85), and the dots are classified into groups based on the movement direction and the movement amount (step S712). The detailedness of the movement direction and the movement amount classified into the groups does not matter. For example, the movement directions are classified into 8 groups of left, right, up, down, upper left, upper right, lower left, and lower right, and the movement amounts are classified into three groups of "no movement or minute-scale movement", "medium-scale movement" and "large-scale movement". Thus, it is possible to perform the classification into a total of 24 groups by the combinations of the movement directions and the movement amounts. The "minute-scale movement", "medium-scale movement" and "large-scale movement" related to the movement amount are categories acquired by dividing the degree of movement amount into 3 steps. It is possible to appropriately set the value range of the movement amount for determining the categories of the minute-scale movement, the medium-scale movement and the large-scale movement".

In the example of FIG. 66, Dot 2 is classified as the group of "no movement or minute-scale movement". Dot 3 is classified as the group of "medium-scale movement to the left", Dot 1 is classified as the group of "medium-scale movement to the right", Dot 5 is classified as the group of "medium-scale movement down", Dot 6 is classified as the group of "medium-scale movement to the upper left", and Dot 4 is classified as the group of "medium-scale to the upper right".

It has been described in FIG. 67 that the error of the dot forming position shift is reflected on the dot image shown in FIG. 66. As described in FIG. 67, the movement vector of each dot of the halftone image in a state in which the predetermined error is added with the surrounding dot due to the landing interference, that is, the movement direction and the movement amount may be calculated.

Accordingly, a configuration in which the movement direction and the movement amount due to the landing interference are calculated based on the contact direction and the contact amount of each dot of the after-error-reflection halftone image in which at least one error of the dot diameter, the dot shape, the dot forming position shift or the non-jetting is reflected and the group classifying process is performed based on the acquired movement direction and movement amount may be adopted.

In the example shown in FIG. 67, in a case where the classification into a total of 24 groups is performed by the combinations of the movement directions of the dot movement due to the landing interference are classified into 8 kinds of groups and the movement amounts are classified into 3 kinds of groups, Dot 3 and Dot 6 are classified as the group of "no movement or minute-scale movement". Dot 2 of FIG. 67 is classified as the group of "medium-scale movement to the left", Dot 1 is classified as the group of "large-scale movement to the right", Dot 4 is classified as the group of "large-scale movement to the upper right", and Dot 5 is classified as the group of "large-scale movement to the lower left".

A configuration in which the group classifying process and the evaluation of the dispersibility of each group are performed in only a case where at least one error of the dot diameter, the dot shape, the dot forming position shift or the non-jetting is reflected may be adopted.

The dot group of each group classified in terms of the movement direction and the movement amount of the dot movement due to the landing interference in a case where at least one error of the dot diameter, the dot shape, the dot forming position shift or the non-jetting is reflected has favorable dispersibility, and thus, it is possible to perform the halftone design or the halftone process in which the image quality is favorable in a state in which the error is added or the image quality deterioration is less even though the error is added (that is, there is the tolerance to the error).

The "favorable dispersibility" refers to a state in which the distance between adjacent dots is uniform or the density is uniform, and in the present example, root mean square (RMs) granularity is calculated as a dispersibility evaluation value as an index for evaluation dispersibility by applying a visual transfer function (VTF) which is a function representing human visual sensitivity to the dot data.

The RMS granularity is the root mean square of density variations, and is expressed by the following expression.

$$\text{SQRT}(\Sigma(Di-D\_ave)^2/(N-1))$$

Here, SQRT( ) represents a function for acquiring the square root of values designated by parameters described in parentheses. Di represents the density of each pixel. D_ave represents a density average. N represents the number of pixels. $\Sigma(Di-D\_ave)^2$ represents the summation of all pixels of $(Di-D\_ave)^2$.

A state in which the value of the RMS granularity is small refers to "favorable dispersibility".

The process proceeds to step S713 after the group classifying process of Step S712 of FIG. 38. In step S713, a process of evaluating the dispersibility of dots belonging to each group of the classified groups is performed. As mentioned above, in the present example, the RMS granularity is calculated as the dispersibility evaluation value as the index for evaluating the dispersibility by applying the visual transfer function to the dot data.

It may be considered that the dispersibility evaluation value is one example of the landing interference evaluation value for evaluating the influence of the dot movement due to the landing interference. The degree of influence of the landing interference is quantified as a value by the dispersibility evaluation value.

The process proceeds to step S715 after step S713 of FIG. 85. Step S715 includes a determining process of determining whether or not to update the halftone parameter, and an updating process based on the determining result.

In step S715, a process of comparing the dispersibility evaluation value of each group acquired for each group with the specified reference value and updating the halftone parameter in a case where the dispersibility evaluation value of each group is equal to or less than the specified reference value and the image quality evaluation value acquired in step S503 of FIG. 64 is enhanced is performed. The process of comparing the dispersibility evaluation value of each group with the specified reference value corresponds to one example of a "comparison process". The determination of whether or not the dispersibility evaluation value of each group is equal to or less than the specified reference value is based on the "comparing result" of the comparison process.

The specified reference value mentioned herein is a value that determines an allowable upper limit of the influence of the dot movement due to the landing interference, and is previously determined in a range in which the image quality deterioration due to the landing interference falls in an allowable level. A case where the dispersibility evaluation value is equal to or less than the specified reference value means that favorable dispersibility equal to or greater than the dispersibility represented by the reference value is acquired for each group. That is, a case where the dispersibility of each group is equal to or less than the specified reference value means that the influence of the dot movement due to the landing interference is equal to or less than the influence of the dot movement represented by the reference value.

In step S715, it is determined whether or not to update the halftone parameter by combining the dispersibility of each group with the image quality evaluation value acquired in step S503 of FIG. 64.

The "halftone parameter being updated" means that the halftone parameter is updated by adopting the halftone parameter temporarily set in step S501 of FIG. 64.

According to the configuration described in FIGS. 64 and 85, it is possible to generate the halftone parameter such that the dot arrangement falls in the allowable range represented by the specified reference value based on the comparing result of the process of comparing the dispersibility evaluation value with the specified reference value.

That is, according to the process described in FIGS. 64 and 85, it is possible to generate the halftone processing rule in which the dispersibility of each dot group which is moved in the same movement direction by the same movement amount is favorable and the image quality deterioration due to the landing interference is less, that is, which has the tolerance to the landing interference even though the dot movement due to the landing interference occurs.

As the "same movement direction", the range of the movement directions classified as the same group is comprehensively described as the "same movement direction". The range of the movement direction corresponding to the "same movement direction" is different depending on the detailedness of the classification when the group classifying process is performed.

As the "same movement amount", the range of the movement amounts classified as the same group is comprehensively described as the "same movement group". The range of the movement amount corresponding to the "same movement amount" is different depending on the detailedness of the classification when the group classifying process is performed.

Figure 86:
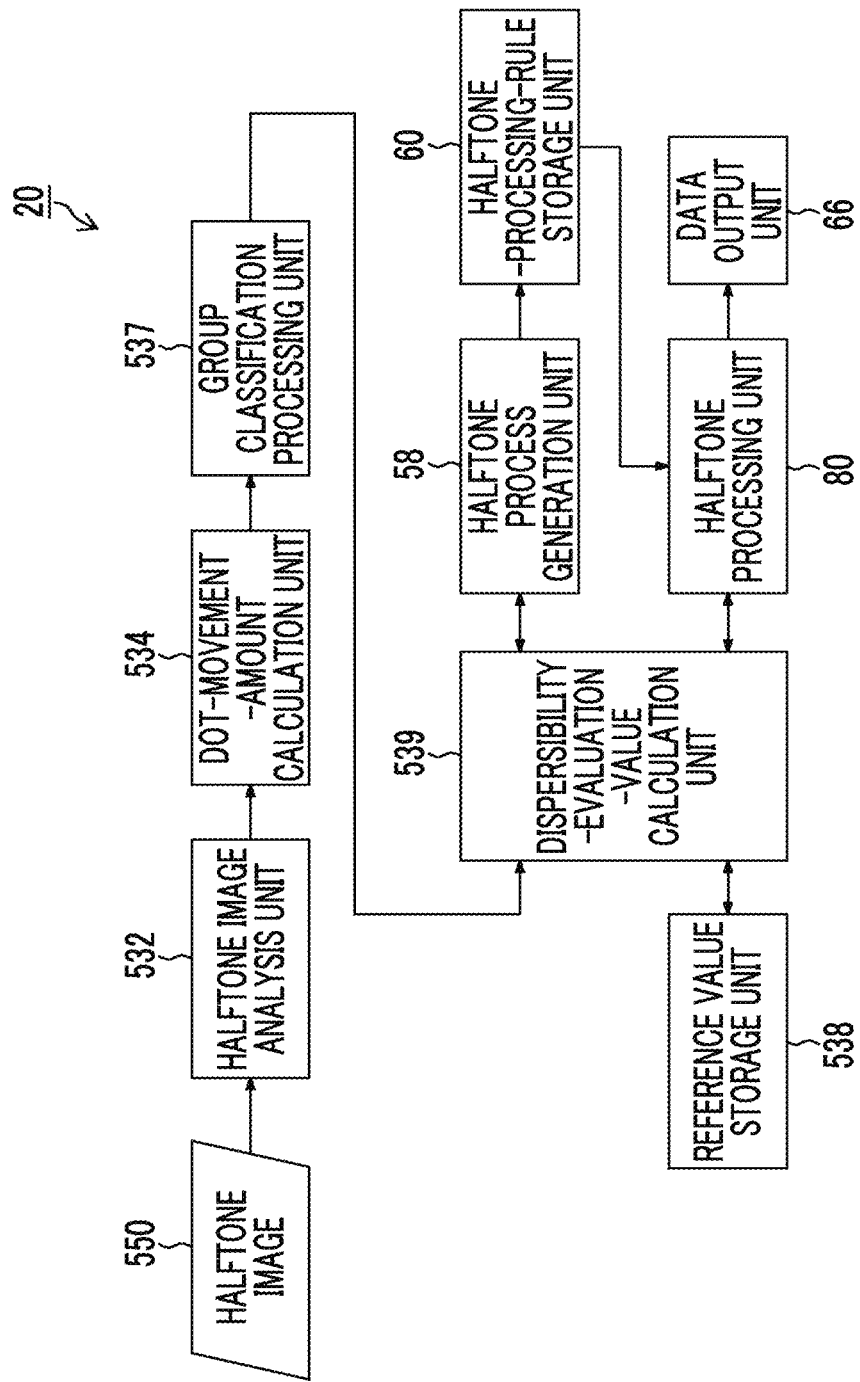
FIG. 86 is a block diagram of major parts for describing the function of an image processing device according to a thirteenth embodiment.

FIG. 86 is a block diagram of major parts for describing the function of an image processing device according to a thirteenth embodiment. In FIG. 86, the same or similar elements as or to those of the configuration described in FIG. 3 will be assigned the same reference numerals, and the description thereof will be omitted.

An image processing device 20 according to the thirteenth embodiment shown in FIG. 86 has a function of performing the processes described in FIGS. 64 and 85. That is, the image processing device 20 shown in FIG. 86 includes a halftone image analysis unit 532, a dot-movement-amount calculation unit 534, a group classification processing unit 537, a reference value storage unit 538, a dispersibility-evaluation-value calculation unit 539, a halftone process generation unit 58, a halftone-processing-rule storage unit 60, a halftone processing unit 80, and a data output unit 66.

The halftone image analysis unit 532 analyzes data of a halftone image 550, and generates information of the contact direction and the contact amount of each dot of the halftone image 550 with the surrounding dot which is another dot. The halftone image analysis unit 532 corresponds to one example of "analysis means". The process of causing the halftone image analysis unit 532 to analyze the contact state of the dot and to generate the information of the contact direction and the contact amount indicating the contact state corresponds to one example of an "analysis process". The processing function of the halftone image analysis unit 532 corresponds to one example of an "analysis function".

The halftone image 550 is the dot image generated during the process of causing the halftone process generation unit 58 to determine the halftone parameter. The dot image refers to an image indicating a dot arrangement form. The halftone image 550 is generated in the process of step S502 of FIG. 64.

The dot-movement-amount calculation unit 534 calculates a movement direction and a movement amount of the dot movement of each dot due to the landing interference based on the information of the contact direction and contact amount of each dot acquired from the halftone image analysis unit 532 with the surrounding dot. The dot-movement-amount calculation unit 534 corresponds to one example of "movement amount calculation means". The process of causing the dot-movement-amount calculation unit 534 to calculate the movement amount of the dot movement corresponds to one example of a movement amount calculation step. The processing function of the dot-movement-amount calculation unit 534 corresponds to one example of a movement amount calculation function.

The group classification processing unit 537 performs a group classifying process of classifying the dots into one or a plurality of groups based on the information indicating the movement direction and the movement amount calculated by the dot-movement-amount calculation unit 534. It is understood that since the information of the movement direction and the movement amount acquired from the dot-movement-amount calculation unit 534 is generated based on the information of the contact direction and the contact amount acquired from the halftone image analysis unit 532, the group classification processing unit 537 performs the group classifying process based on the information of the contact direction and the contact amount acquired from the halftone image analysis unit 532. The group classification processing unit 537 corresponds to one example of "group classification means". The process of causing the group classification processing unit 537 to perform the group classifying process corresponds to one example of a "group classifying process".

The dispersibility-evaluation-value calculation unit 539 calculates the dispersibility evaluation value for evaluating the dispersibility of the dot group for each group classified by the group classification processing unit 537. The dispersibility-evaluation-value calculation unit 539 may further have a function of generating another evaluation value based on the dispersibility evaluation value of each group. As the evaluation value generated based on the dispersibility evaluation value of each group, there may be a weighted sum of the dispersibility evaluation values of the respective groups, and a weighted sum of the dispersibility evaluation value of each group and the image quality evaluation value generated in step S503 of FIG. 37. The dispersibility-evaluation-value calculation unit 539 corresponds to one example of "dispersibility-evaluation-value calculation means". The process of causing the dispersibility-evaluation-value calculation unit 539 to calculate the dispersibility evaluation value corresponds to one example of a "dispersibility-evaluation-value calculation step".

The reference value storage unit 538 is storage means for storing the information of the specified reference value described in step S715 of FIG. 85. The dispersibility-evaluation-value calculation unit 539 compares the calculated dispersibility evaluation value or the evaluation value generated based on the dispersibility evaluation value with the specified reference value, and determines the degree of influence of the dot movement due to the landing interference. The dispersibility-evaluation-value calculation unit 539 has a function of the landing-interference-influence evaluation means for evaluating the influence of the landing interference.

The halftone process generation unit 58 generates the halftone processing rule in cooperation with the dispersibility-evaluation-value calculation unit 539.

The process of step S711 of FIG. 85 is performed by the halftone image analysis unit 532 and the dot-movement-amount calculation unit 534. The process of step S712 of FIG. 85 is performed by the group classification processing unit 537. The process of step S713 of FIG. 85 is performed by the dispersibility-evaluation-value calculation unit 539. The process of step S715 of FIG. 85 is performed by the dispersibility-evaluation-value calculation unit 539 and the halftone process generation unit 58.

In such a configuration, the halftone process generation unit 58 (see FIG. 86) corresponds to one example of "signal processing means", and the process of causing the halftone process generation unit 58 to generate the halftone parameter corresponds to one example of a "signal processing step". The processing function of the halftone process generation unit 58 corresponds to one example of a "signal processing function".

In addition to the configuration described in FIG. 86, the image processing device 20 of FIG. 86 may have the same configuration as that of the image quality evaluation processing unit 74 or the halftone-selection-chart generation unit 76 described in FIG. 3.

<Case of Error Diffusion Method>

The flowchart of FIG. 64 may be applied to the generation of the halftone parameter of the error diffusion method. Similarly to the example described in FIG. 10, a diffusion coefficient of an error diffusion matrix of each applied gradation section is determined by repeatedly performing the flowchart of FIG. 64 on all the applied gradation sections.

That is, it is assumed that an average value of the respective evaluation values of each gradation is used as an image quality evaluation value by temporarily setting a diffusion coefficient of the error diffusion matrix applied to a certain gradation section for the gradation section (step S501 of FIG. 64), performing the halftone process on the input image (a uniform image of a single gradation) of each gradation of the gradation section (step S502 of FIG. 64), and evaluating the image quality of the halftone image (step S503). The image quality evaluation (step S503) is performed similarly to that in the dither method.

The evaluation (step S504) of the landing interference influence and the halftone parameter update determining and updating process (step S505) are performed similarly to those in the dither method.

<Case where Void-and-Cluster Method is Applied to Dither Method>

Figure 87:
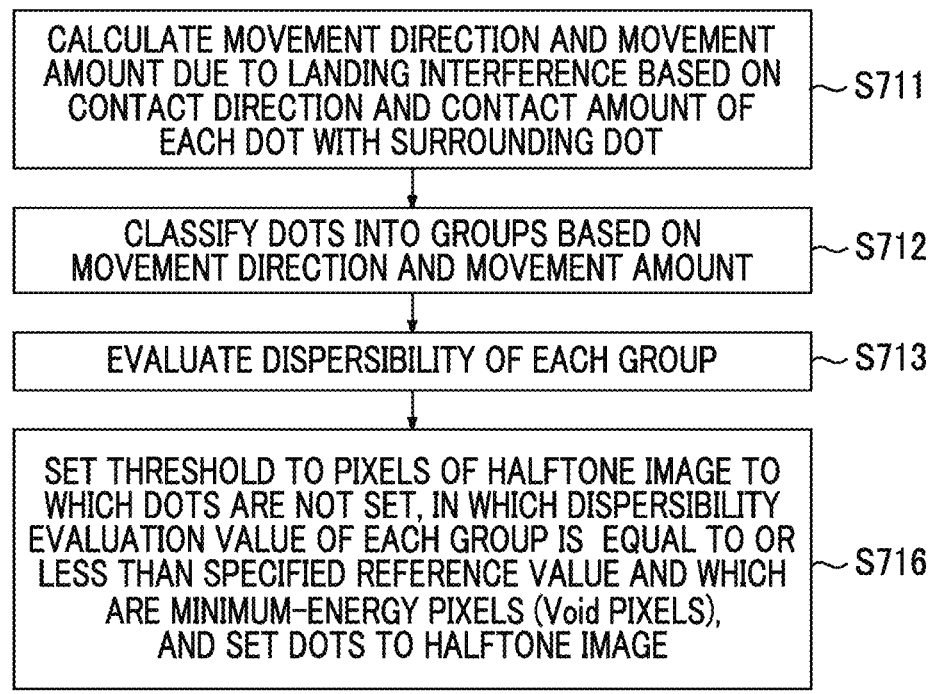
FIG. 87 is a flowchart showing another example of the more detailed processing contents of step S523 and step S524 of FIG. 69.

FIG. 87 is a flowchart showing an example of the more detailed processing contents of step S523 and step S524 of FIG. 69. In the flowchart of FIG. 87, the same or similar steps as or to the steps of the flowchart described in FIG. 85 will be assigned the same step numbers, and the description thereof will be omitted. The flowchart of FIG. 87 includes the process of step S716 instead of step S715 of the flowchart described in FIG. 85.

Step S711 to step S713 of FIG. 87 correspond to the process of step S523 of FIG. 69, and step S716 of FIG. 87 corresponds to the process of step S524 of FIG. 69.

In step S716 of FIG. 87, the threshold values are set to pixels of which the dispersibility evaluation values of the respective groups are respectively equal to or less than the specified reference value and which are the minimum-energy pixels (that is, void pixels) among the pixels of the halftone image in which the dots are not set, and the dots are set to the void pixels of the halftone image.

The flowchart shown in FIG. 87 is the process in a direction in which the threshold values are increased from the initial image, but a method in which the threshold values (that is, gradation values) are decreased from the initial image also follows the known void-and-cluster method. That is, a process of updating the halftone image by regarding the maximum-energy pixels among the pixels to which the dots are set as cluster pixels in which the dots are dense in the energy image acquired by applying the filter to the halftone image, setting the threshold values to the pixels and excluding the dots of the pixels is sequentially repeated.

<Case where Halftone Process Using Direct Binary Search Method is Performed>

Figure 88:
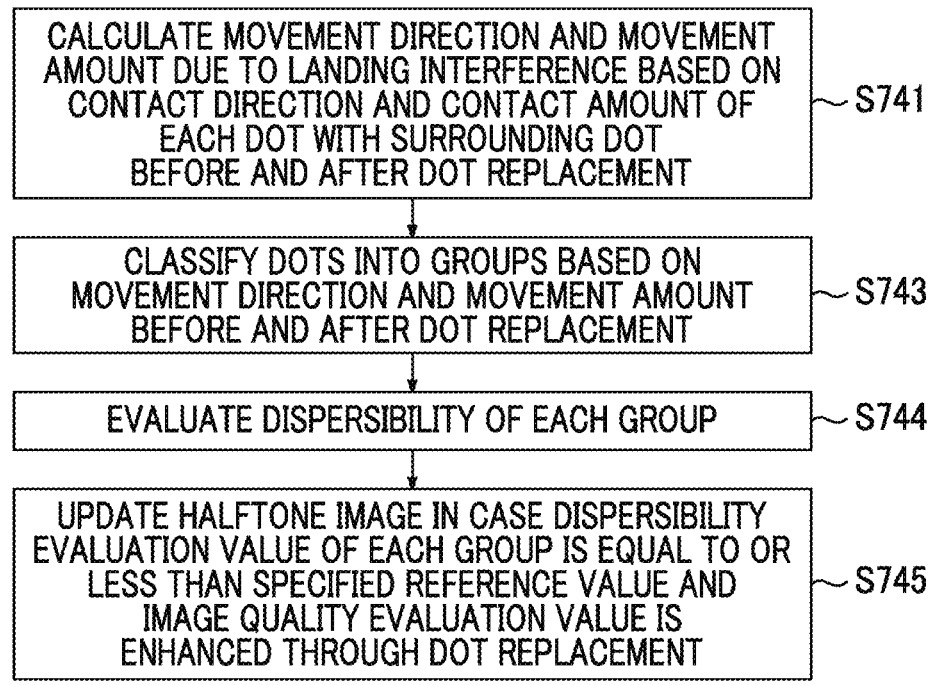
FIG. 88 is a flowchart showing another example of the more detailed processing contents of step S534 and step S535 of FIG. 71.

FIG. 88 is a flowchart showing an example of the more detailed processing contents of step S534 and step S535 of FIG. 71. Step S741 to step S744 of FIG. 88 correspond to the process of step S534 of FIG. 71, and step S745 of FIG. 88 corresponds to the process of step S535 of FIG. 71.

In step S741 of FIG. 88, the movement direction and the movement amount due to the landing interference are calculated based on the contact direction and the contact amount of each dot with the surrounding dot before the dot replacement and after the dot replacement.

The dots are classified into groups based on the movement direction and the movement amount before the dot replacement and after the dot replacement (step S743). The method of calculating the movement amount of each dot due to the landing interference and the group classifying method are the same as step S711 and step S712 of FIG. 85 and the example described in FIG. 66.

Subsequently, the dispersibility of each group is evaluated (step S744 of FIG. 88). The dispersibility evaluation value of each group of the dot image before the dot replacement and the dispersibility evaluation value of each group of the dot image after the dot replacement are acquired.

The process proceeds to step S745 after step S744. Step S745 includes a determining process of determining whether or not to update the halftone image, and an updating process based on the determining result. That is, in step S745, a process of comparing the dispersibility evaluation value of each group of the dot image after the dot replacement calculated through the dot replacement with the specified reference value and updating the halftone image in a case where the dispersibility evaluation value of each group is equal to or less than the specified reference value and the image quality evaluation value acquired in step S533 of FIG. 71 is enhanced before and after the dot replacement is performed.

That is, in step S745 of FIG. 88, it is determined whether or not to update the halftone image by combining the dispersibility evaluation value of each group after the dot replacement with the image quality evaluation value acquired in step S533 of FIG. 71.

The "halftone parameter being updated" means that the halftone image is updated by adopting the dot arrangement state after the dot replacement on which the dot replacement is performed in step S532 of FIG. 71.

According to the configuration described in FIGS. 71 and 88, it is possible to generate the halftone processing rule in which the dispersibility of each dot group which is moved in the same movement direction by the same movement amount is favorable and the image quality deterioration due to the landing interference is less, that is, which has the tolerance to the landing interference even though the dot movement due to the landing interference occurs. The "favorable dispersibility" means that the dot group has favorable dispersibility which is equal to or greater than a reference of the dispersibility represented by the specified reference value.

According to the configuration described in FIGS. 71 and 88, it is possible to generate the halftone image such that the dot arrangement falls in an allowable range indicated by the specified reference value based on the comparing result of the process of comparing the dispersibility evaluation value with the specified reference value by calculating the dispersibility evaluation value of each group for each group of the dot groups in which the movement direction and the movement amount of the dot movement due to the landing interference are the same.

The halftone process described in FIGS. 71 and 88 may be performed by the halftone processing unit 80 shown in FIG. 86. The halftone image 550 as a target on which the landing interference influence evaluation in this case is performed is the dot image generated during the process performed by the halftone processing unit 80, and the initial image described in step S531 of FIG. 71, the image after the dot replacement in step S532, or the updated halftone image that is updated in step S535. The halftone processing unit 80 (see FIG. 86) that performs the halftone process described in FIGS. 71 and 88 performs the updating process on the halftone image using the DBS method in cooperation with the dispersibility-evaluation-value calculation unit 539.

In such a configuration, the halftone processing unit 80 (see FIG. 86) corresponds to one example of "signal processing means", and the process of causing the halftone processing unit 80 to generate the halftone image corresponds to one example of a "signal processing step". The processing function of the halftone processing unit 80 corresponds to one example of a "signal processing function".

[Example of Halftone Design and/or Halftone Process Having Error Tolerance]

Hereinafter, the configuration examples in which the image quality deterioration due to the landing interference in a case where there is at least one error of the dot diameter, the dot shape, the dot forming position shift or the non-jetting is suppressed will be described.

Figure 89:
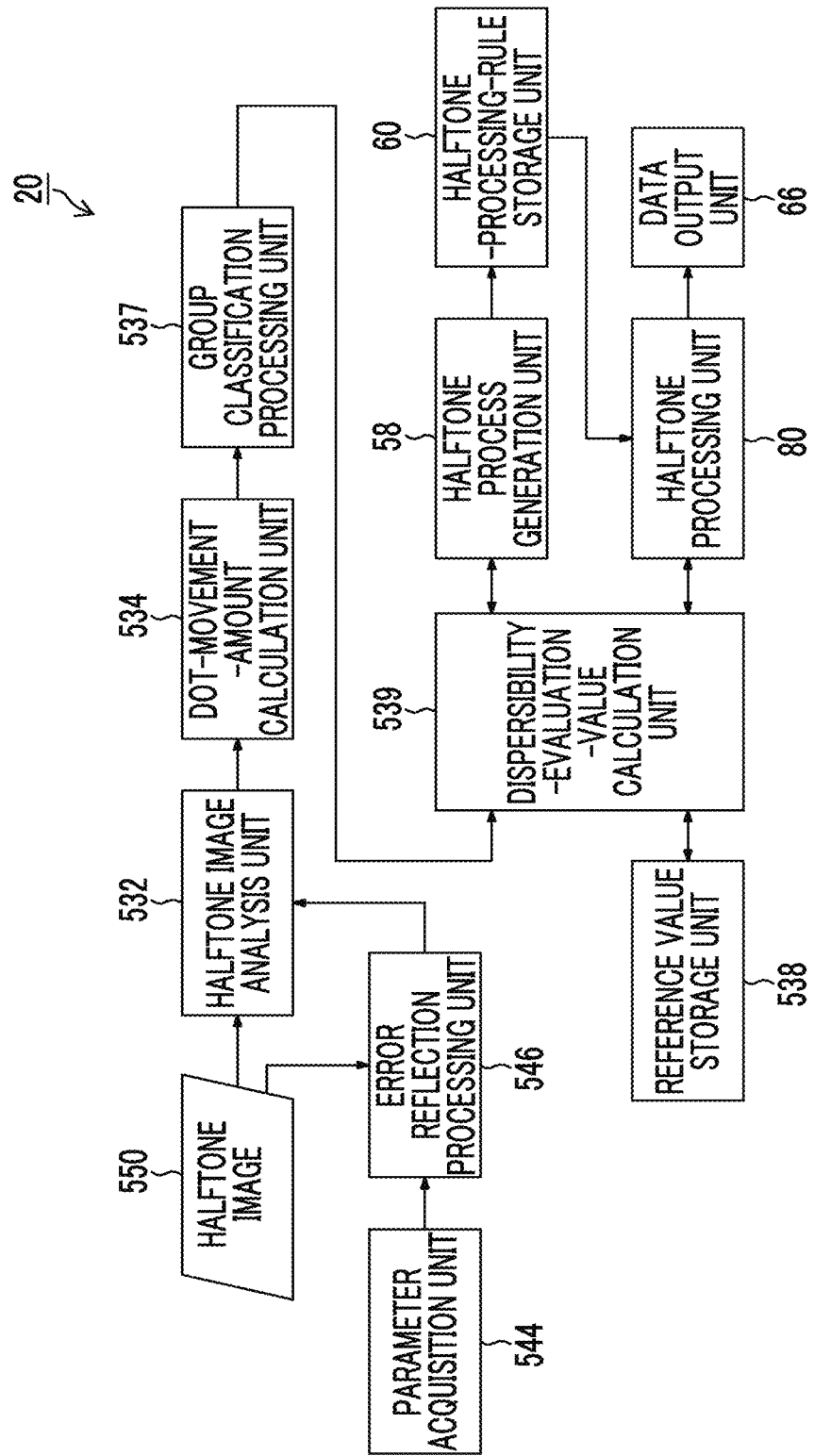
FIG. 89 is a block diagram of major parts for describing the function of an image processing device according to a fourteenth embodiment.

FIG. 89 is a block diagram of major parts for describing a function of an image processing device according to a fourteenth embodiment. In FIG. 89, the same or similar elements as or to those of the configuration described in FIGS. 3 and 86 will be assigned the same reference numerals, and the description thereof will be omitted.

An image processing device 20 according to the fourteenth embodiment described in FIG. 89 includes a parameter acquisition unit 544, and an error reflection processing unit 546 in addition to the configuration described in FIG. 86.

The parameter acquisition unit 544 is means for acquiring the parameter indicating at least one error of the dot diameter, the dot shape, the dot forming position shift or the non-jetting.

In the example described in FIG. 67, the parameter indicating the dot forming position shift direction and the dot forming position shift amount related to the error of the dot forming position is acquired. The parameter acquisition unit 544 may be a user interface, may be a communication interface or a data reception terminal that receives parameter information retained in an external storage medium or within the device, or may be an appropriate combination thereof.

The error reflection processing unit 546 performs a process of generating the arrangement of dots on which the error represented by the parameter acquired from the parameter acquisition unit 544 is reflected. The error reflection processing unit 546 reflects the error represented by the parameter acquired from the parameter acquisition unit 544 on the data of the halftone image 550, and generates a dot image indicating a dot arrangement state after the error reflection. In the example described in FIG. 67, the error reflection processing unit 546 generates data of the dot arrangement to which the error due to the dot forming position shift is added. The error reflection processing unit 546 corresponds to one example of "error reflection processing means". The process of causing the error reflection processing unit 546 to add the error on the dot of the halftone image 550 and generate the dot arrangement on which the error is reflected corresponds to one example of an error reflection processing step.

The halftone image analysis unit 532 may perform analysis the contact direction and the contact amount on an after-error-reflection halftone image after the error is added to the halftone image 550 by the error reflection processing unit 546.

The halftone image analysis unit 532 may perform analysis the contact direction and the contact amount on the halftone image 550 before the error is added by the error reflection processing unit 546 and an after-error-reflection halftone image acquired by adding the error to the halftone image 550 by means of the error reflection processing unit 546.

The halftone image 550 before the error is added (that is, the case where the non-reflection of the error is performed) is a dot image.

In such a configuration shown in FIG. 89, the movement direction and the movement amount of the dot movement due to the landing interference may be calculated for an after-error-reflection-dot acquired by reflecting at least one error of the dot diameter, the dot shape, the dot forming position shift or the non-jetting on the halftone image 550, and the group classification process may be performed depending on the movement direction and the movement amount. The specific group classification method is as described in FIG. 67.

Although the flowchart of the processes performed by the image processing device 20 according to the fourteenth embodiment shown in FIG. 89 is not shown, the movement direction and the movement amount are calculated based on the contact direction and the contact amount of each dot in a case where at least one error of the dot diameter, the dot shape, the dot forming position shift or the non-jetting is reflected instead of the process of step S711 of FIG. 85 or 87 with the surrounding dot. Thereafter, similarly to the flowchart of FIG. 85 or 87, the group classification process is performed based on the movement direction and the movement amount in a case where the error is reflected (step S712), and the evaluation of the dispersibility of each group is performed (step S713).

As for the halftone process using the direct binary search method, the movement direction and the movement amount due to the landing interference are calculated based on the contact direction and the contact amount of each dot with the surrounding dot before the dot replacement and after the dot replacement in a case where at least one error of the dot diameter, the dot shape, the dot forming position shift or the non-jetting is reflected instead of step S741 of FIG. 88. Thereafter, similarly to the flowchart of FIG. 88, the group classification process is performed based on the movement direction and the movement amount before the dot replacement and after the dot replacement in a case where the error is reflected (step S743), and the evaluation of the dispersibility of each group is performed (step S744).

According to the configuration of the fourteenth embodiment, the respective dot groups in which the influence of the dot movement due to the landing interference is the same in a case where the predetermined error which is at least one of the dot diameter, the dot shape, the dot forming position shift or the non-jetting is reflected have favorable dispersibility having, and thus, it is possible to perform the halftone design and/or the halftone process in which the image quality is favorable in a state in which the predetermined error is added or the image quality deterioration is less (that is, there is the tolerance to the error) even in a state in which the predetermined error is added.

The group classification and the evaluation of the dispersibility of each group may be performed in only a case where the predetermined error which is at least one error of the dot diameter, the dot shape, the dot forming position shift or the non-jetting is reflected, or the group classification and the evaluation of the dispersibility of each group may be performed in a case where the predetermined error is not reflected and in a case where the predetermined error is reflected.

The processing content performed by the image processing device 20 according to the embodiment described in FIGS. 85 to 89 may be comprehended as the image processing method.

Specific Modification Example Described in FIGS. 85 to 89

Modification Example 18

It has been described in FIGS. 85 to 89 that the movement direction and the movement amount of the dot movement due to the landing interference are calculated based on the information indicating the contact direction and the contact amount of each dot. However, as described in FIG. 73, the movement amount of the dot movement due to the landing interference is treated to be approximately proportional to the contact amount of the dot, and thus, it is possible to directly perform the group classification process from the contact direction and the contact amount.

In the contact state shown in FIG. 73, it can be seen that even though the movement direction and the movement amount due to the landing interference are not calculated, since the sum of vectors depicted by two illustrated arrows is "0", the landing interference movement amount is "0". Even though the calculation of the movement vector described in FIG. 66 is not performed, it is possible to perform the group classification process using the vectors indicating the contact directions and the contact amounts with the surrounding dots.

Accordingly, it is possible to omit the "dot-movement-amount calculation unit 534" described in FIG. 86 or 89.

Modification Example 19

Each of the dispersibility evaluation values of the respective groups may be used as the evaluation value for evaluating the influence of the landing interference, or a weighted sum of the dispersibility evaluation values of the respective groups may be used as the evaluation value. In a case where the predetermined error which is at least one error of the dot diameter, the dot shape, the dot forming position shift or the non-jetting is reflected, the updating reference of the halftone parameter or the halftone image may be set using the "evaluation value on which the error is not reflected" calculated without reflecting the predetermined error and the "evaluation value on which the error is reflected" calculated by reflecting the predetermined error, or the updating reference may be set for the weighted sum of the evaluation value on which the error is not reflected and the evaluation value on which the error is reflected.

Modification Example 20

The updating reference of the halftone parameter of step S505 of FIG. 64 or the updating reference of the halftone image of step S524 of FIG. 69 or the step S535 of FIG. 71 is not limited to the updating reference shown in step S716 of FIG. 87 or step S745 of FIG. 88, and various updating references may be determined.

For example, the updating reference may be a "case where the image quality evaluation value or the energy is equal to or less than a predetermined reference value for a determination reference and the dispersibility evaluation value of each group is enhanced" or a "case where a weighted sum of the image quality evaluation value or the energy and the dispersibility evaluation value of each group is enhanced". Instead of the "dispersibility evaluation value of each group", the "evaluation value generated based on the dispersibility evaluation value of each group" may be used, and the updating reference may be a "case where the image quality evaluation value or the energy is equal to or less than a predetermined reference value for a determination reference and the evaluation value generated based on the dispersibility evaluation value of each group is enhanced" or a "case where a weighted sum of the image quality evaluation value or the energy and the evaluation value generated based on the dispersibility evaluation value of each group is enhanced". The "energy" mentioned herein corresponds to the image quality evaluation value of the energy image acquired by applying the filter such as a Gaussian filter to the dot image.

The "case where the dispersibility evaluation value is enhanced" means that an increase/decrease tendency indicating whether the value of the dispersibility evaluation value is increased or decreased is comprehended, and it is determined that the "dispersibility evaluation value is enhanced" in a case where the dispersibility evaluation value is decreased, that is, in a case where the dispersibility is improved. When it is determined whether or not the dispersibility evaluation value is enhanced, since it is comprehended whether the dispersibility evaluation value is increased or decreased by comparing the values of the dispersibility evaluation values calculated from different dot images, a comparison process of comparing the dispersibility evaluation value is included. The determining result of whether or not the dispersibility evaluation value is enhanced is based on the "comparing result" of the comparison process.

The "weighted sum of the image quality evaluation value or the energy and the dispersibility evaluation value" corresponds to one example of an "evaluation value generated based on the dispersibility evaluation value". The "weighted sum of the image quality evaluation value or the energy and the dispersibility evaluation value of each group" may correspond to one example of a weighted sum of the image quality evaluation value and the dispersibility evaluation value, or may be a weighted sum of the energy and the dispersibility evaluation value.

Modification Example 21

In a case where the predetermined error (here, the error other than the non-jetting is used) is reflected on the dot arrangement of the halftone image, since the movement direction and the movement amount of the dot group on which the error is reflected due to the landing interference are greatly changed in most cases unlike the case where the error is not reflected, the group classification process may be performed on only the dot group on which the error is reflected. That is, in the example shown in FIG. 67, the group classification may be performed on only Dot 2 and Dot 5 on which the error of the dot forming position shift is reflected.

The dot group as a target on which the group classification process of evaluating the influence of the dot movement due to the landing interference is performed is not limited to an aspect in which all the dots included in the dot image are used as targets, and some dots of all the dots included in the dot image may be used as targets like an aspect in which only the dot group to which the predetermined error is added is used as a target.

Modification Example 22

In a case where the dot forming position shift is reflected as the predetermined error, since the movement amount due to the landing interference is greatly changed in a direction parallel to a direction to which the error is added in most cases, the group classification process may be performed for only the dots of which the movement direction of the dot movement due to the landing interference is a direction parallel to a direction to which the error is added. In this case, for only the dots in contact in the direction parallel to the direction to which the error is added, that is, for only the dots including the dot movement in only the movement direction parallel to the direction to which the error is added, the group classification process may be performed.

In the example shown in FIG. 67, the dots in contact in the direction to which the error is added, that is, the dots including the dot movement in only the movement direction parallel to the direction to which the error is added are Dot 1, Dot 2 and Dot 3. Accordingly, in the example shown in FIG. 67, the group classification process is performed on Dot 1, Dot 2 and Dot 3.

Modification Example 23

In a case where the dot forming position shift is reflected as the predetermined error, the dispersibility evaluation value may be calculated for only the group to which the dots of which the movement direction of the dot movement due to the landing interference is a direction parallel to a direction which the error is added belong.

Modification Example 23 is not limited to the adaptation to the combination with the configuration of Modification Example 22, and may be applied to a case where the group classification is performed without imposing the restrictions of Modification Example 22 in the group classification process. The dispersibility-evaluation-value calculation unit 539 shown in FIG. 86 or 89 may have a function of calculating the dispersibility evaluation value for only the specified group in Modification Example 23.

<Variation of System Configuration>

The respective devices such as the means for acquiring the characteristic parameters related to the characteristics of the printing system, that is, the device that allows the user to input the characteristic parameters, the chart output control device that outputs the characteristic parameter acquisition chart, the printing device that prints the characteristic parameter acquisition charts according to the control, the device that reads the characteristic parameter acquisition charts and acquires the characteristic parameters based on the analyzing result of the read image, the device that generates two or more kinds of halftone processing rules, the chart output control device that outputs the halftone selection charts, the device that generates the simulation image from the halftone processing result of the halftone selection chart, the device that reads the output result of the halftone selection chart and calculates the image evaluation value from the chart read image and the device that allows the user to perform the operation of selecting the halftone processing rule may be an integrated-type system, or may be a functionally-distributed separation type system provided by combining a plurality of systems.

Similarly, the configurations of the image processing device 20 described in FIG. 36, the image processing device 20A described in FIG. 37, the image processing device 21 described in FIG. 47, the image processing device 20B described in FIG. 48, the image processing device 20 described in FIG. 68, the image processing device 20 described in FIGS. 76 and 82, and the image processing device 20 described in FIGS. 86 and 89 may be an integrated-type system, or may be a functionally-distributed separation type system provided by combining a plurality of systems.

Modification Example 1 of System Configuration

For example, the device that performs the process of acquiring the characteristic parameter and the device that performs the process of generating the halftone processing rule may be provided as different devices.

Modification Example 2 of System Configuration

The device that performs the process of outputting the halftone selection chart and the device that allows the user to perform the selection operation of the halftone process may be provided as different devices.

Modification Example 3 of System Configuration

The device that performs the process of acquiring the characteristic parameter and the device that retains the priority parameter and performs the process of generating the halftone processing rule may be provided as different devices.

Modification Example 4 of System Configuration

As another configuration example, the device that performs the process of outputting the characteristic parameter acquisition chart, the image reading device that reads the output characteristic parameter acquisition chart, the device that performs the process of generating and acquiring the characteristic parameter from the read image of the characteristic parameter acquisition chart and the device that performs the process of generating the halftone processing rule using the acquired characteristic parameter may be provided as different devices.

For example, the operation form may be configured such that the process of outputting the characteristic parameter acquisition charts or the halftone selection charts and reading the images of the charts is performed in a factory of a printing machine manufacturer or a local printing system of a printer company, the acquired read images are collectively sent to a server of the printing machine manufacturer of a development branch or a separate company, the acquisition of the characteristic parameters and the generation of the halftone processing rules are performed in a system of the development branch or the separate company, the generated halftone processing rules are repeatedly sent to the original individual local printing system.

Configuration Examples

The above-described embodiments may have the following configurations.

Configuration Example 1

Whenever a new print job is executed, or during the execution of the print job, the system error parameter may be automatically acquired from the outputting and reading result of the chart, and the halftone processing rule may be generated based on the acquired parameter. Whenever a new print job is executed, or during the execution of the print job, the chart may be output and read, and the halftone generation may be newly performed in a case where the system error parameter is equal or greater than a specified reference, or for only the changed parameter. In this case, if the system error parameter (including the characteristic parameter) is not changed, that is, in a case where the change amount of the system error parameter falls in a specified reference, the process of generating the halftone processing rule is omitted, and a time loss is not generated.

The chart may be output together with an image immediately before the image on which the halftone process is performed. In this case, the time loss is reduced. The halftone process and the process of generating the halftone processing rule may be performed in parallel.

Configuration Example 2

Any one of the chart content, the chart output condition, the scanning condition (synonym for the reading condition of the chart), the parameter acquisition method and the generation content of the halftone processing rule, or a plurality of combinations thereof may be changed in response to the quality request of the user for the print image acquired by the quality request acquisition means. In such a configuration, it is possible to reduce a time loss required for the process.

[Configuration 3]

A dedicated chart (dot-reproduction-accuracy investigation dedicated chart) to investigate dot reproduction accuracy may be output by the dot-reproduction-accuracy-investigation-dedicated-chart output means, the dot reproduction accuracy may be analyzed from the dot-reproduction-accuracy investigation dedicated chart by the dot-reproduction-accuracy analysis means, and any one of the content of the parameter acquisition chart, the chart output condition, the scanning condition, the parameter acquisition method and the generation content of the halftone processing rule or a plurality of combinations thereof may be changed based on the analyzing result. In such a configuration, it is possible to reduce a time loss required for the process.

<Program Causing Computer to Function as Image Processing Device>

As the image processing device described in the above-described embodiments, programs for operating a computer may be recorded a compact disc read-only memory (CD-ROM), a magnetic disk, and a computer-readable medium (non-transitory tangible information storage medium), and the programs may be provided through the information storage medium. Instead of the aspect in which the programs are provided while being stored in the information storage medium, program signals may be provided as a download service via a communication network such as the Internet.

The programs are incorporated in the computer, and thus, the computer may realize the function of the image processing device 20. A part or all of the programs for realizing printing control including the image processing function described in the present embodiment may be incorporated in a higher control device such as a host computer, or may be operated as an operating program of a central processing unit (CPU) of the printing device 24.

<<Printing Medium>>

The "printing medium" is referred to as various terms such as a print medium, a printed medium, an image forming target medium, an image receiving medium, a jetted medium, and a recording sheet. When the present invention is implemented, the material or shape of the printing medium is not particularly limited, and various sheets such as resin sheet such as continuous paper, cut paper, seal paper or overhead projector (OHP) sheet, film, fabric, nonwoven fabric, a printed board on which a wiring pattern is formed, and rubber sheet may be used irrespective of the material or shape thereof.

<<Image Quality Deterioration>>

The "image quality deterioration" mentioned in the present specification primarily refers to the occurrence of the streak or unevenness and granularity deterioration. As the image quality deterioration, there are various causes such as ink aggregate unevenness, gloss unevenness, banding of density, color, gloss, or a combination thereof, or bleeding.

<<Combination of Embodiments>>

The configuration acquired by appropriately combining the configurations described as the aforementioned embodiments or modification examples or the other configuration examples may be adopted. For example, the configuration of the following combination may be adopted.

[1] The configurations of the first embodiment to the third embodiment may be appropriately combined with the configuration of the fourth embodiment or the configuration of the modification example of the fourth embodiment.

[2] The configurations of two or more embodiments of the first embodiment, the second embodiment and the third embodiment may be appropriately combined with the configuration of the seventh embodiment.

[3] The configuration of the ninth embodiment or the configurations of the first embodiment to the third embodiment may be appropriately combined with the configuration of the eighth embodiment.

[4] The configurations of two or more modification examples of Modification Example 5, Modification Example 6 and Modification Example 7 may be appropriately combined with the configuration of the tenth embodiment.

[5] The configurations of two or more modification examples of Modification Example 10, Modification Example 11 and Modification Example 12 may be appropriately combined with the configuration of the eleventh embodiment.

[6] The configurations of two or more modification examples of Modification Example 15, Modification Example 16 and Modification Example 17 may be appropriately combined with the configuration of the twelfth embodiment.

[7] The configurations of two or more modification examples of Modification Example 21, Modification Example 22 and Modification Example 23 may be appropriately combined with the configuration of the thirteenth embodiment or the configuration of the fourteenth embodiment.

Advantages of Embodiments

According to the aforementioned embodiments, there are the following advantages.

(1) It is possible to simply acquire various characteristic parameters related to the characteristics of the printing system from the read image of the characteristic parameter acquisition chart. Accordingly, it is possible to greatly reduce the operation load of the user related to the setting of the characteristic parameters unlike the configuration in which the user inputs all the various characteristic parameters through the user interface. It is possible to generate the halftone processing rule appropriate for the printing system based on the characteristic parameters acquired from the characteristic parameter acquisition chart.

(2) It is possible to generate the halftone processing rule appropriate for the printing system in consideration of the system error on the assumption of the actual printing performed by the printing system. Accordingly, it is possible to realize the appropriate halftone process capable of acquiring favorable image quality, and it is possible to acquire the print image having favorable image quality.

(3) Since the characteristic parameters are updated depending on the difference between the existing characteristic parameter and the new characteristic parameter, it is possible to update the characteristic parameter according to the change of the characteristics of the printing system. Accordingly, the halftone processing rule is generated using the updated characteristic parameter, and thus, it is possible to perform the printing using the halftone processing rule corresponding to the change of the characteristics of the printing system.

(4) According to the method of generating the processing rule, during the execution of an arbitrary print job, the characteristic parameter acquisition chart used to generate the halftone processing rule used for the subsequently output image is output together with the image, and thus, it is possible to determine the change of the characteristics of the printing system whenever the image is output (whenever the characteristic parameter acquisition chart is output) and it is possible to generate the halftone processing rule corresponding to the change of the characteristics of the printing system. Accordingly, the image is output using the halftone processing rule corresponding to the change of the characteristics of the printing system, and thus, it is possible to prevent the image quality from being deteriorated even in a case where the characteristics of the printing system are changed.

(5) As described in the seventh embodiment, the chart output condition is set depending on the printing mode, and thus, it is possible to appropriately comprehend the characteristic parameters indicating the characteristics of the printing system for each printing mode.

(6) Since the characteristic parameter acquisition chart is optimized by setting the chart output condition depending on the printing mode, the processing time until the characteristic parameter is acquired after the characteristic parameter acquisition chart is output is reduced in a case where the characteristic parameter acquisition chart is reduced.

(7) Since the characteristic parameter acquisition chart is optimized by setting the chart output condition depending on the printing mode, the usage amount of the ink and the usage amount of the printing medium used until the characteristic parameter is acquired after the characteristic parameter acquisition chart is output in a case where the characteristic parameter acquisition chart is reduced.

(8) As described in the eighth embodiment to the fourteenth embodiment, it is possible to generate the halftone parameter or the halftone image having tolerance to the landing interference. It is possible to suppress the image quality deterioration caused by the landing interference, and it is possible to realize the generation of the halftone image capable of forming the image having high image quality.

It is possible to generate the halftone parameter or the halftone image having tolerance to at least one error of the dot diameter, the dot shape, the dot forming position shift or the non-jetting, and it is possible to suppress the image quality deterioration caused by the error.

(9) It is possible to generate the halftone processing rule appropriate for the printing system in consideration of the system error on the assumption of the actual printing performed by the printing system. Accordingly, it is possible to realize the appropriate halftone process capable of acquiring favorable image quality, and it is possible to acquire the print image having favorable image quality.

(10) It is possible to simply acquire various characteristic parameters related to the characteristics of the printing system from the read image of the characteristic parameter acquisition chart. Accordingly, it is possible to greatly reduce the operation load of the user related to the setting of the characteristic parameters unlike the configuration in which the user inputs all the various characteristic parameters through the user interface. It is possible to generate the halftone processing rule appropriate for the printing system based on the characteristic parameters acquired from the characteristic parameter acquisition chart.

The constituent requirements of the above-described embodiments of the present invention may be changed, added and removed without departing from the gist of the present invention. The present invention is not limited to the above-described embodiment, and may be variously modified by those skilled in the art within the technical spirit of the present invention.

EXPLANATION OF REFERENCES

10: printing system
20, 20A, 21: image processing device
24: printing device
26: image reading device
32: display device
34: input device
52: characteristic parameter acquisition unit
53: system-error-parameter acquisition unit
54: characteristic parameter storage unit
55: system-error-parameter storage unit
56: priority parameter retention unit
58: halftone process generation unit
58A: previous-stage halftone process generation unit
58B; halftone automatic selection unit
59: determination-evaluation-value calculation unit
60: halftone-processing-rule storage unit
62: characteristic-parameter-acquisition-chart generation unit
64: image analysis unit
67: system error setting unit
70: evaluation value calculation unit
74: image quality evaluation processing unit
76: halftone-selection-chart generation unit
100: characteristic parameter acquisition chart
101: printing medium
102C, 102M, 102Y, 102K: single dot pattern
104C, 104M, 104Y, 104K: first continuous dot pattern
106C, 106M, 106Y, 106K: second continuous dot pattern
150: halftone selection chart
151, 152: primary color patch
200: characteristic parameter acquisition chart
201: printing medium
202C, 202M, 202Y, 202K: single dot pattern
204C, 204M, 204Y, 204K: first continuous dot pattern
206C, 206M, 206Y, 206K: second continuous dot pattern
230: characteristic parameter update determination unit
300: printing mode selection unit
302: chart-output-condition setting unit
304: characteristic-parameter-acquisition-chart storage unit
323: specified value acquisition unit
532: halftone image analysis unit
532A: first halftone image analysis unit
532B: second halftone image analysis unit
534: dot-movement-amount calculation unit
534A: first dot-movement-amount calculation unit
534B: second dot-movement-amount calculation unit
535: movement-amount-change calculation unit
536: landing-interference-influence evaluation unit
537: group classification processing unit
538: reference value storage unit
539: dispersibility-evaluation-value calculation unit
546: error reflection processing unit
558: contact-state-change calculation unit

What is claimed is:

1. A printing system comprising:
a processor, and
a memory, the memory storing instructions to cause the processor to perform:
outputting, together with a continuously outputted image, a characteristic parameter acquisition chart including a pattern for acquiring characteristic parameters related to characteristics of a printing system;
reading the outputted characteristic parameter acquisition chart;
acquiring the characteristic parameters by analyzing a read image of the characteristic parameter acquisition chart; and
generating halftone processing rules that define the processing contents of halftone processes used in the printing system based on the acquired characteristic parameters.

2. The printing system according to claim 1, wherein:
the characteristic parameter acquisition chart is outputted together with an image outputted two or more images earlier than the image on which the halftone processes are performed;
the characteristic parameters are acquired by using the characteristic parameter acquisition chart having been outputted together with the image two or more images earlier than the image on which the halftone processes are performed; and
the halftone processing rules are generated by using the characteristic parameter acquisition chart having been outputted together with the image outputted two or more images earlier than the image on which the halftone processes are performed.

3. The printing system according to claim 2, wherein any one or more processes of a process of causing the processor to output the characteristic parameter acquisition chart, a process of causing the processor to acquire the characteristic parameters, and a process of causing the processor to generate the halftone processing rules are performed in parallel with the halftone processes performed by the processor for performing the halftone processes by using the generated halftone processing rules.

4. A printing system comprising:
a processor; and
a memory, the memory storing instructions to cause the processor to perform:
outputting, together with one of a plurality of images, a characteristic parameter acquisition chart including a pattern for acquiring characteristic parameters related to characteristics of a printing system;
reading the outputted characteristic parameter acquisition chart;
acquiring the characteristic parameters by analyzing a read image of the characteristic parameter acquisition chart;
generating halftone processing rules that define the processing contents of halftone processes used in the printing system based on the acquired characteristic parameters; and
performing the halftone processes on a plurality of images by using the generated halftone processing rules.

5. A printing method comprising:
outputting, together with a continuously outputted image, a characteristic parameter acquisition chart including a pattern for acquiring characteristic parameters related to characteristics of a printing system;
reading the outputted characteristic parameter acquisition chart;
acquiring the characteristic parameters by analyzing a read image of the characteristic parameter acquisition chart; and
generating halftone processing rules that define the processing contents of halftone processes used in the printing system based on the acquired characteristic parameters.

6. The method according to claim 5, wherein:
the characteristic parameter acquisition chart is outputted together with an image outputted two or more images earlier than the image on which the halftone processes are performed;
the characteristic parameters are acquired by using the characteristic parameter acquisition chart having been outputted together with the image two or more images earlier than the image on which the halftone processes are performed; and
the halftone processing rules are generated by using the characteristic parameter acquisition chart having been outputted together with the image outputted two or more images earlier than the image on which the halftone processes are performed.

7. The method according to claim 6, wherein any one or more processes of a process of outputting the characteristic parameter acquisition chart, a process of acquiring the characteristic parameters, and a process of generating the halftone processing rules are performed in parallel with the halftone processes using the generated halftone processing rules.

8. A printing method comprising:
outputting, together with one of a plurality of images, a characteristic parameter acquisition chart including a pattern for acquiring characteristic parameters related to characteristics of a printing system;
reading the outputted characteristic parameter acquisition chart;
acquiring the characteristic parameters by analyzing a read image of the characteristic parameter acquisition chart;
generating halftone processing rules that define the processing contents of halftone processes used in the printing system based on the acquired characteristic parameters; and
performing the halftone processes on a plurality of images by using the generated halftone processing rules.

9. An image processing device comprising:
a processor; and
a memory, the memory storing instructions to cause the processor to perform:
outputting, together with a continuously outputted image, a characteristic parameter acquisition chart including a pattern for acquiring characteristic parameters related to characteristics of a printing system;
reading the outputted characteristic parameter acquisition chart;
acquiring the characteristic parameters by analyzing a read image of the characteristic parameter acquisition chart; and
generating halftone processing rules that define the processing contents of halftone processes used in the printing system based on the acquired characteristic parameters.

10. The image processing device according to claim 9, wherein:
the characteristic parameter acquisition chart is outputted together with an image outputted two or more images earlier than the image on which the halftone processes are performed;
the characteristic parameters are acquired by using the characteristic parameter acquisition chart having been outputted together with the image two or more images earlier than the image on which the halftone processes are performed; and
the halftone processing rules are generated by using the characteristic parameter acquisition chart having been outputted together with the image outputted two or more images earlier than the image on which the halftone processes are performed.

11. The image processing device according to claim 10, wherein any one or more processes of a process of causing the processor to output the characteristic parameter acquisition chart, a process of causing the processor to acquire the characteristic parameters, and a process of causing the processor to generate the halftone processing rules are performed in parallel with the halftone processes performed by the processor for performing the halftone processes by using the generated halftone processing rules.

12. An image processing device comprising:
a processor; and
a memory, the memory storing instructions to cause the processor to perform:
outputting, together with one of a plurality of images, a characteristic parameter acquisition chart including a pattern for acquiring characteristic parameters related to characteristics of a printing system;
reading the outputted characteristic parameter acquisition chart;
acquiring the characteristic parameters by analyzing a read image of the characteristic parameter acquisition chart;

generating halftone processing rules that define the processing contents of halftone processes used in the printing system based on the acquired characteristic parameters; and performing the halftone processes on a plurality of images by using the generated halftone processing rules.

* * * * *